US008374931B2

(12) United States Patent
Bhatia et al.

(10) Patent No.: US 8,374,931 B2

(45) Date of Patent: Feb. 12, 2013

(54) CONSISTENT SET OF INTERFACES DERIVED FROM A BUSINESS OBJECT MODEL

(75) Inventors: Kulwant Singh Bhatia, Bangalore (IN); Suresh Honnappanavar, Gadag (IN); Miguel Lencinas, Schwetzingen (DE); Bianka Woelke, Heidelberg (DE); Steffen Rotsch, Rauenberg (DE); Thomas Schira, Wiesloch (DE); Beate Weiner, Lorsch (DE)

(73) Assignee: SAP AG, Walldorf (DE)

( * ) Notice: Subject to any disclaimer, the term of this patent is extended or adjusted under 35 U.S.C. 154(b) by 426 days.

(21) Appl. No.: 11/731,857

(22) Filed: Mar. 30, 2007

(65) Prior Publication Data

US 2008/0046421 A1 Feb. 21, 2008

Related U.S. Application Data

(60) Provisional application No. 60/788,574, filed on Mar. 31, 2006, provisional application No. 60/837,196, filed on Aug. 11, 2006, provisional application No. 60/819,942, filed on Jul. 10, 2006.

(51) Int. Cl.
*G06Q 40/00* (2012.01)

(52) U.S. Cl. ............................................ 705/35; 705/8

(58) Field of Classification Search .................... 705/35, 705/8

See application file for complete search history.

(56) References Cited

U.S. PATENT DOCUMENTS

| | | | |
|---|---|---|---|
| 3,223,321 | A | 12/1965 | Baumgartner |
| 5,126,936 | A | 6/1992 | Champion et al. |
| 5,210,686 | A | 5/1993 | Jernigan |
| 5,247,575 | A | 9/1993 | Sprague et al. |
| 5,255,181 | A | 10/1993 | Chapman et al. |
| 5,321,605 | A | 6/1994 | Chapman et al. |
| 5,463,555 | A | 10/1995 | Ward et al. |
| 5,787,237 | A | 7/1998 | Reilly |
| 5,812,987 | A | 9/1998 | Luskin et al. |
| 5,966,695 | A | 10/1999 | Melchione et al. |
| 5,970,465 | A | 10/1999 | Dietrich et al. |
| 5,970,475 | A | 10/1999 | Barnes et al. |
| 5,983,284 | A | 11/1999 | Argade |
| 6,047,264 | A | 4/2000 | Fisher et al. |
| 6,073,137 | A | 6/2000 | Brown et al. |
| 6,092,196 | A | 7/2000 | Reiche |
| 6,104,393 | A | 8/2000 | Santos-Gomez |
| 6,115,690 | A | 9/2000 | Wong |
| 6,125,391 | A | 9/2000 | Meltzer et al. |
| 6,138,118 | A | 10/2000 | Koppstein et al. |
| 6,154,732 | A | 11/2000 | Tarbox |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

No Author, FSML-Financial Services Markup Language (Jul. 14, 1999) http://xml.coverpages.org/FSML-v1500a.pdf.*

(Continued)

*Primary Examiner* — Sarah Monfeldt
*Assistant Examiner* — Stephanie M Ziegle
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction.

27 Claims, 137 Drawing Sheets

U.S. PATENT DOCUMENTS 6,222,533 B1 4/2001 Notani et al.
6,226,675 B1 5/2001 Meltzer et al.
6,229,551 B1 5/2001 Huang
6,327,700 B1 12/2001 Chen et al.
6,331,972 B1 12/2001 Harris et al.
6,332,163 B1 12/2001 Bowman-Amuah
6,424,979 B1 7/2002 Livingston et al.
6,434,159 B1 8/2002 Woodward et al.
6,438,594 B1 8/2002 Bowman-Amuah
6,542,912 B2 4/2003 Meltzer et al.
6,591,260 B1 7/2003 Schwarzhoff et al.
6,725,122 B2 4/2004 Mori et al.
6,738,747 B1 5/2004 Tanaka et al.
6,745,229 B1 6/2004 Gobin et al.
6,763,353 B2 7/2004 Li et al.
6,775,647 B1 8/2004 Evans et al.
6,868,370 B1 3/2005 Burbridge et al.
6,937,992 B1 8/2005 Benda et al.
6,970,844 B1 11/2005 Bierenbaum
7,020,594 B1 3/2006 Chacon
7,039,606 B2 5/2006 Hoffman et al.
7,076,449 B2 7/2006 Tsunenari et al.
7,131,069 B1 10/2006 Rush et al.
7,206,768 B1 4/2007 deGroeve et al.
7,249,157 B2 7/2007 Stewart et al.
7,269,569 B2 9/2007 Spira et al.
7,292,965 B1 11/2007 Mehta et al.
7,321,864 B1 1/2008 Gendler
7,363,271 B2 4/2008 Morimoto
7,379,931 B2 * 5/2008 Morinville ........................ 707/3
7,383,990 B2 6/2008 Veit
7,406,358 B2 7/2008 Preiss
7,481,367 B2 1/2009 Fees et al.
7,509,278 B2 3/2009 Jones
7,515,697 B2 4/2009 Eng et al.
7,516,088 B2 4/2009 Johnson et al.
7,574,383 B1 8/2009 Parasnis et al.
7,627,504 B2 12/2009 Brady et al.
7,634,482 B2 12/2009 Mukherjee et al.
7,788,319 B2 8/2010 Schmidt et al.
7,805,383 B2 9/2010 Veit et al.
7,853,491 B2 12/2010 Wittmer et al.
7,865,426 B2 1/2011 Volpert
7,873,965 B2 1/2011 Hayton et al.
7,941,236 B2 5/2011 Spearman
2001/0042032 A1 11/2001 Crawshaw et al.
2002/0013721 A1 1/2002 Dabbiere et al.
2002/0026394 A1 2/2002 Savage et al.
2002/0046053 A1 4/2002 Hare et al.
2002/0052754 A1 5/2002 Joyce et al.
2002/0072988 A1 6/2002 Aram
2002/0087481 A1 7/2002 Harif
2002/0087483 A1 7/2002 Harif
2002/0107765 A1 8/2002 Walker
2002/0112171 A1 8/2002 Ginter et al.
2002/0138318 A1 9/2002 Ellis et al.
2002/0147668 A1 10/2002 Smith et al.
2002/0152104 A1 10/2002 Ojha et al.
2002/0152145 A1 10/2002 Wanta et al.
2002/0156693 A1 10/2002 Stewart et al.
2002/0156930 A1 10/2002 Velasquez
2002/0157017 A1 10/2002 Mi et al.
2002/0169657 A1 11/2002 Singh et al.
2002/0184070 A1 12/2002 Chen et al.
2002/0186876 A1 12/2002 Jones et al.
2002/0194045 A1 12/2002 Shay et al.
2003/0004799 A1 1/2003 Kish
2003/0069648 A1 4/2003 Douglas et al.
2003/0086594 A1 * 5/2003 Gross ............................ 382/118
2003/0120502 A1 6/2003 Robb et al.
2003/0126077 A1 7/2003 Kantor et al.
2003/0167193 A1 * 9/2003 Jones et al. ....................... 705/7
2003/0171962 A1 9/2003 Hirth et al.
2003/0172007 A1 9/2003 Helmolt et al.
2003/0172135 A1 9/2003 Bobick et al.
2003/0195815 A1 10/2003 Li et al.
2003/0204452 A1 10/2003 Wheeler
2003/0208389 A1 11/2003 Kurihara et al.
2003/0212614 A1 11/2003 Chu et al.
2003/0216978 A1 11/2003 Sweeney et al.
2003/0220875 A1 11/2003 Lam et al.
2003/0229550 A1 12/2003 DiPrima et al.
2003/0233295 A1 12/2003 Tozawa et al.
2003/0236748 A1 12/2003 Gressel et al.
2004/0024662 A1 2/2004 Gray et al.
2004/0034577 A1 2/2004 Van Hoose et al.
2004/0039665 A1 2/2004 Ouchi
2004/0073510 A1 4/2004 Logan
2004/0083201 A1 4/2004 Sholl et al.
2004/0083233 A1 4/2004 Willoughby
2004/0138942 A1 7/2004 Pearson et al.
2004/0148227 A1 7/2004 Tabuchi et al.
2004/0172360 A1 9/2004 Mabrey et al.
2004/0220910 A1 11/2004 Zang et al.
2004/0254945 A1 12/2004 Schmidt et al.
2004/0267714 A1 12/2004 Frid et al.
2005/0015273 A1 1/2005 Iyer
2005/0021366 A1 1/2005 Pool et al.
2005/0033588 A1 2/2005 Ruiz et al.
2005/0038744 A1 2/2005 Viijoen
2005/0049903 A1 3/2005 Raja
2005/0071262 A1 3/2005 Kobeh et al.
2005/0080640 A1 4/2005 Bhaskaran et al.
2005/0108085 A1 5/2005 Dakar et al.
2005/0131947 A1 6/2005 Laub et al.
2005/0159997 A1 7/2005 John
2005/0171833 A1 8/2005 Jost et al.
2005/0187797 A1 8/2005 Johnson
2005/0187866 A1 8/2005 Lee
2005/0194431 A1 9/2005 Fees et al.
2005/0194439 A1 9/2005 Zuerl et al.
2005/0197849 A1 9/2005 Fotteler et al.
2005/0197851 A1 9/2005 Veit
2005/0197878 A1 9/2005 Fotteler et al.
2005/0197881 A1 9/2005 Fotteler et al.
2005/0197882 A1 9/2005 Fotteler et al.
2005/0197886 A1 9/2005 Veit
2005/0197887 A1 9/2005 Zuerl et al.
2005/0197896 A1 9/2005 Veit et al.
2005/0197897 A1 9/2005 Veit et al.
2005/0197898 A1 9/2005 Veit et al.
2005/0197899 A1 9/2005 Veit et al.
2005/0197900 A1 9/2005 Veit
2005/0197901 A1 9/2005 Veit et al.
2005/0197902 A1 9/2005 Veit
2005/0197928 A1 9/2005 Fotteler et al.
2005/0197941 A1 9/2005 Veit
2005/0209732 A1 9/2005 Audimoolam et al.
2005/0210406 A1 9/2005 Biwer et al.
2005/0216321 A1 9/2005 Veit
2005/0216371 A1 9/2005 Fotteler et al.
2005/0222888 A1 10/2005 Hosoda et al.
2005/0222896 A1 10/2005 Rhyne et al.
2005/0222945 A1 10/2005 Pannicke et al.
2005/0228821 A1 10/2005 Gold
2005/0234754 A1 10/2005 Veit
2005/0246240 A1 11/2005 Padilla
2005/0256753 A1 11/2005 Veit et al.
2006/0004934 A1 1/2006 Guldner et al.
2006/0005098 A1 1/2006 Lotz et al.
2006/0020515 A1 1/2006 Lee et al.
2006/0026586 A1 2/2006 Remmel et al.
2006/0047574 A1 3/2006 Sundaram et al.
2006/0047598 A1 3/2006 Hansen
2006/0059005 A1 3/2006 Horn et al.
2006/0059059 A1 3/2006 Horn et al.
2006/0059060 A1 3/2006 Horn et al.
2006/0069598 A1 3/2006 Schweitzer et al.
2006/0069629 A1 3/2006 Schweitzer et al.
2006/0069632 A1 3/2006 Kahn et al.
2006/0074728 A1 4/2006 Schweitzer et al.
2006/0080338 A1 4/2006 Seubert et al.
2006/0085336 A1 4/2006 Seubert et al.
2006/0085412 A1 4/2006 Johnson et al.
2006/0085450 A1 4/2006 Seubert et al.
2006/0089885 A1 4/2006 Finke et al.
2006/0095373 A1 5/2006 Venkatasubramanian et al.

| | | | | |
|---|---|---|---|---|
| 2006/0184435 | A1 | 8/2006 | Mostowfi | |
| 2006/0212376 | A1 | 9/2006 | Snyder et al. | |
| 2006/0280302 | A1 | 12/2006 | Baumann et al. | |
| 2006/0282360 | A1 | 12/2006 | Kahn et al. | |
| 2007/0027742 | A1 | 2/2007 | Emuchay et al. | |
| 2007/0043583 | A1 | 2/2007 | Davulcu et al. | |
| 2007/0055688 | A1 | 3/2007 | Blattner | |
| 2007/0078799 | A1 | 4/2007 | Huber-Buschbeck et al. | |
| 2007/0112574 | A1 | 5/2007 | Greene | |
| 2007/0124227 | A1 | 5/2007 | Dembo et al. | |
| 2007/0129978 | A1 | 6/2007 | Shirasu et al. | |
| 2007/0132585 | A1 | 6/2007 | Llorca et al. | |
| 2007/0150387 | A1 | 6/2007 | Seubert et al. | |
| 2007/0150836 | A1 | 6/2007 | Deggelmann et al. | |
| 2007/0156428 | A1 | 7/2007 | Brecht-Tillinger et al. | |
| 2007/0156545 | A1 | 7/2007 | Lin | |
| 2007/0156552 | A1 | 7/2007 | Manganiello | |
| 2007/0156690 | A1 | 7/2007 | Moser et al. | |
| 2007/0165622 | A1 | 7/2007 | O'Rourke et al. | |
| 2007/0214065 | A1* | 9/2007 | Kahlon et al. | 705/28 |
| 2007/0225949 | A1 | 9/2007 | Sundararajan et al. | |
| 2007/0226090 | A1 | 9/2007 | Stratton | |
| 2007/0255639 | A1 | 11/2007 | Seifert | |
| 2007/0265860 | A1 | 11/2007 | Herrmann et al. | |
| 2007/0265862 | A1 | 11/2007 | Freund et al. | |
| 2007/0294159 | A1 | 12/2007 | Cottle | |
| 2008/0005012 | A1 | 1/2008 | Deneef | |
| 2008/0021754 | A1 | 1/2008 | Horn et al. | |
| 2008/0040243 | A1 | 2/2008 | Chang et al. | |
| 2008/0046104 | A1 | 2/2008 | Van Camp et al. | |
| 2008/0046421 | A1 | 2/2008 | Bhatia et al. | |
| 2008/0120129 | A1 | 5/2008 | Seubert et al. | |
| 2008/0120190 | A1 | 5/2008 | Joao et al. | |
| 2008/0120204 | A1 | 5/2008 | Conner et al. | |
| 2008/0133303 | A1 | 6/2008 | Singh et al. | |
| 2008/0154969 | A1 | 6/2008 | DeBie | |
| 2008/0162266 | A1 | 7/2008 | Griessmann et al. | |
| 2008/0196108 | A1 | 8/2008 | Dent et al. | |
| 2008/0215354 | A1 | 9/2008 | Halverson et al. | |
| 2008/0243578 | A1 | 10/2008 | Veit | |
| 2008/0288317 | A1 | 11/2008 | Kakar | |
| 2009/0006203 | A1 | 1/2009 | Fordyce et al. | |
| 2009/0063287 | A1 | 3/2009 | Tribout et al. | |
| 2009/0077074 | A1 | 3/2009 | Hosokawa | |
| 2009/0089198 | A1 | 4/2009 | Kroutik | |
| 2009/0192926 | A1 | 7/2009 | Tarapata | |
| 2009/0222360 | A1 | 9/2009 | Schmitt et al. | |
| 2009/0248431 | A1 | 10/2009 | Schoknecht et al. | |
| 2009/0248547 | A1 | 10/2009 | Doenig et al. | |
| 2009/0271245 | A1 | 10/2009 | Joshi et al. | |
| 2009/0326988 | A1 | 12/2009 | Barth et al. | |
| 2010/0014510 | A1 | 1/2010 | Boreli et al. | |
| 2010/0070391 | A1 | 3/2010 | Storr et al. | |
| 2010/0070395 | A1 | 3/2010 | Elkeles et al. | |
| 2010/0106555 | A1 | 4/2010 | Mneimneh et al. | |
| 2010/0161425 | A1 | 6/2010 | Sideman | |
| 2011/0046775 | A1 | 2/2011 | Bailey et al. | |

FOREIGN PATENT DOCUMENTS

| | | |
|---|---|---|
| CN | 1632806 | 6/2005 |
| CN | 1767537 | 5/2006 |
| CN | 101174957 | 5/2008 |

OTHER PUBLICATIONS

SAP Structured Entity Relationship Model (SAP-SERM) for R/3 System Release 4.0 Introduction and Index; Dec. 1998; 6 pages.

SAP Structured Entity Relationship Model (SAP-SERM) for R/3 System Release 4.0 (Part 1); Dec. 1998; 5954 pages.

SAP Structured Entity Relationship Model (SAP-SERM) for R/3 System Release 4.0 (Part 2); Dec. 1998; 7838 pages.

Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf; 36 pages.

"UML in the .com Enterprise: Modeling CORBA, Comoponents, XML/XMI and Metadata Workshop"; http://www.omg.org/news/meetings/workshops/uml_presentations.htm.

Medjahed, Brahim et al; "Business-to-Business Interactions: Issues and Enabling Technologies"; The VLDB Journal; vol. 12, No. 1; Apr. 3, 2003; pp. 59-89.

Medjahed, Brahim et al.; "Composing Web Services on the Semantic Web"; The VLDB Journal; vol. 12, No. 4, Sep. 23, 2003; pp. 333-351.

Born, Marc et al.; "Customizing UML for Component Design"; www.dot-profile.de; UML Workshop, Palm Springs, CA; Nov. 2000.

Kappel, Gerti et al.; "A Framework for Workflow Management Systems Based on Objects, Rules and Roles"; ACM Computing Surveys; ACM Press; vol. 32; Mar. 2000; 5 pages.

Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.

Microsoft; "Creating an XML Web Service Proxy"; 2001; mshelp://ms.msdnqtr.2003apr.1033/cpguide/html/cpconcreatingwebserviceproxy.htm; 3 pages.

Proceedings of OMG Workshops; http://www.omg.org/news/meetings/workshops/proceedings.htm; pp. 1-3.

Meltzer, Bart et al.; "XML and Electronic Commerce: Enabling the Network Economy"; SIGMOD Record; ACM Press; vol. 27, No. 4; Dec. 1998; pp. 21-24.

Huhns, Michael N. et al.; "Automating Supply-Chain Mangement"; Jul. 15-19, 2002; pp. 1017-1024.

Soederstroem, Eva; "Standardising the Business Vocabulary of Standards"; SAC, Madrid, Spain; 2002; pp. 1048-1052.

Bastide, Remi et al.; "Formal Specification of CORBA Services: Experience and Lessons Learned"; 2000; pp. 105-117.

Glushko, Robert J. et al.; "An XML Framework for Agent-Based E-Commerce"; Communications of the ACM; vol. 42, No. 3; Mar. 1999; pp. 106-114.

Coen-Porisini, Alberto et al.; "A Formal Approach for Designing CORBA-Based Applications"; ACM Transactions on Software Engineering and Methodology; vol. 12, No. 2; Apr. 2003; pp. 107-151.

Yang, J. et al.; "Service Deployment for Virtual Enterprises"; IEEE; 2001; pp. 107-115.

Karp, Alan H.; "E-speak E-xplained"; Communications of the ACM; vol. 46, No. 7; Jul. 2003; pp. 113-118.

Gillibrand, David: "Essential Business Object Design"; Communications of the ACM; vol. 43, No. 2; Feb. 2000; pp. 117-119.

Cole, James et al.; "Extending Support for Contracts in ebXML"; IEEE; 2001; pp. 119-127.

DiNitto, Elisabetta et al.; "Deriving Executable Process Descriptions from UML"; ICSE '02; May 19-25, 2002; pp. 155-165.

Stumptner, Markus et al.; "On the Road to Behavior-Based Integration"; First Asia-Pacific Conferences on Conceptual Modelling; Dunedin, New Zealand; Jan. 2004; pp. 15-22.

Gosain, Sanjay et al.; "The Impact of Common E-Business Interfaces"; Communications of the ACM; vol. 46, No. 2; Dec. 2003; pp. 186-195.

Damodaran, Suresh; "B2B Integration over the Internet with XML—RosettaNet Successes and Challenges"; WWW2004; May 17-22, 2004; pp. 188-195.

Schulze, Wolfgang et al.: "Standardising on Workflow-Management—The OMG Workflow Management Facility"; SIGGROUP Bulletin; vol. 19, No. 1; Apr. 1998; pp. 24-30.

Sutherland, Jeff; "Business Objects in Corporate Information Systems"; ACM Computing Surveys; vol. 27, No. 2; Jun. 1995; pp. 274-276.

Arsanjani, Ali; "Developing and Integrating Enterprise Components and Services"; Communications of the ACM; vol. 45, No. 10; Oct. 2002; pp. 31-34.

Kim, Dan Jong et al.; "A Comparison of B2B E-Service Solutions"; Communications of the ACM; vol. 46, No. 12; Dec. 2003; pp. 317-324.

Hasselbring, Wilhelm; "Information System Integration"; Communications of the ACM; vol. 43, No. 6; Jun. 2000; pp. 33-38.

Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.

Hogg, K. et al.; "An Evaluation of Web Services in the Design of a B2B Application"; 27th Australasian Computer Science Conference; Dunedin, New Zealand; 2004; pp. 331-340.
Gruhn, Volker et al.; "Workflow Management Based on Process Model Repositories"; IEEE 1998: pp. 379-388.
Kim. HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy: Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirl et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anal et al.; "Integrating and Customizing Heterogeneous E-Commerce Applications"; The VLDB Journal; Aug. 2001; pp. 16-38.
Office Action issued in related U.S. Appl. No. 11/145,464 on Jan. 22, 2009; 49 pages.
International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
Office Action issued in related U.S. Appl. No. 11/640,422 on Apr. 2, 2009; 13 pages.
Office Action issued in related U.S. Appl. No. 11/155,368 on May 14, 2009; 26 pages.
Office Action issued in related U.S. Appl. No. 11/803,178 on Jun. 29, 2009; 10 pages.
Office Action issued in related U.S. Appl. No. 11/864,786 on Jun. 22, 2009; 12 pages.
Office Action issued in related U.S. Appl. No. 11/166,065 on Jun. 24, 2009; 26 pages.
Office Action issued in related U.S. Appl. No. 11/364,538 on Aug. 4, 2009; 12 pages.
Office Action issued in related U.S. Appl. No. 11/145,464 on Aug. 5, 2009; 31 pages.
He, Ning et al.; "B2B Contract Implementation Using Windows DNS"; 2001; pp. 71-79.
Webster's Revised Unabridged Dictionary (1913+1828); Def. "merchandise".
Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
"Header", Newton's Telecom Dictionary; 12th Edition, 2004; pp. 389-390).
BAPI_EmployeePrivAddress.Getdetail.pdf; 1 page.
BAPI_EmployeePrivAddress.Getdetail_Parameters.pdf; 1 page.
BO_Emp1Communication.pdf; 1 page.
BAPI_Emp1Communication.Getdetail.pdf; 1 page.
Office Action issued in related U.S. Appl. No. 11/640,422 on Dec. 30, 2009; 9 pages.
Office Action issued in U.S. Appl. No. 11/640,422 on May 14, 2010; 12 pages.
Office Action issued in related U.S. Appl. No. 11/803,178 on Mar. 4, 2010; 43 pages.
Office Action issued in related U.S. Appl. No. 11/775,821 on Jan. 22, 2010; 16 pages.
Notice of Allowance issued in related U.S. Appl. No. 11/775,821 on Jul. 16, 2010; 4 pages.

Newton's Telecom Dictionary; 18th Edition; 2002; pp. 347, 454.
Notice of Allowance issued in related U.S. Appl. No. 12/147,395 on Oct. 26, 2010; 10 pages.
Office Action issued in related U.S. Appl. No. 12/147,399 on Jan. 26, 2011; 16 pages.
Notice of Allowance issued in related U.S. Appl. No. 11/775,821 on Oct. 22, 2010; 4 pages.
Notice of Allowance issued in related U.S. Appl. No. 11/364,538 on Dec. 13, 2010; 5 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Office Action issued in related U.S. Appl. No. 11/864,871 on Oct. 1, 2010; 30 pages.
Office Action issued in related U.S. Appl. No. 12/059,971 on Nov. 4, 2010; 20 pages.
Office Action issued in related U.S. Appl. No. 12/060,149 on Aug. 26, 2010; 15 pages.
Notice of Allowance issued in related U.S. Appl. 12/060,178 on Dec. 6, 2010; 4 pages.
Office Action issued in related U.S. Appl. No. 12/060,171 on Jan. 26, 2011; 17 pages.
Notice of Allowance issued in related U.S. Appl. No. 11/145,464 on Nov. 1, 2010; 4 pages.
Notice of Allowance issued in U.S. Appl. No. 11/155,368 on Oct. 7, 2010; 4 pages.
Notice of Allowance issued in related U.S. Appl. No. 11/166,065 on Sep. 20, 2010; 6 pages.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Communication Pursuant to Article 94(3) issued in European Application No. 05757432.9 on Apr. 12, 2011; 5 pages.
Notice of Allowance issued in U.S. Appl. No. 12/147,395 on May 4, 2011; 10 pages. Notice of Allowance issued in related U.S. Appl. No. 12/147,449 on Apr. 28, 2011; 9 pages.
Office Action issued in related U.S. Appl. No. 12/334,175 on May 27, 2011; 12 pages.
Office Action issued in U.S. Appl. No. 12/147,414 on Apr. 14, 2011; 30 pages.
Office Action issued in U.S. Appl. No. 12/147,378 on Jun. 17, 2011; 10 pages.
Notice of Allowance issued in U.S. Appl. No. 12/323,139 on Mar. 4, 2011; 13 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Office Action issued in related U.S. Appl. No. 12/060,155 on May 10, 2011; 8 pages.
Notice of Allowance issued in related U.S. Appl. No. 11/145,464 on Feb. 23, 2011; 7 pages.
Notice of Allowance issued in U.S. Appl. No. 11/155,368 on Mar. 14, 2011; 7 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.
Notice of Allowance issued in related U.S. Appl. No. 11/775,821 on Feb. 4, 2011; 4 pages.
Office Action issued in U.S. Appl. No. 11/864,811 on Mar. 18, 2011; 10 pages.
Definition of "header" and "message header"; Newton's Telecom Dictionary; 18th Edition; 2002; pp. 347, 464.
Diehl et al.; "Service Architecture for an Object-Oriented Next Generation Profile Register"; date unknown; 8 pages.
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
Communication Pursuant to Article 94(3) issued in European Application No. 05766672.9 on Jul. 14, 2011; 4 pages.
Office Action issued in U.S. Appl. No. 12/147,414 on Oct. 26, 2011; 27 pages.
Notice of Allowance issued in U.S. Appl. No. 12/147,378 on Nov. 9, 2011; 16 pages.
Office Action issued in U.S. Appl. No. 12/323,116 on Sep. 6, 2011; 8 pages.
Office Action issued in U.S. Appl. No. 12/323,116 on Jan. 27, 2012; 7 pages.
Office Action issued in U.S. Appl. No. 12/571,140 on Sep. 26, 2011; 14 pages.
Office Action issued in related U.S. Appl. No. 12/060,054 on Dec. 7, 2011; 15 pages.
Office Action issued in U.S. Appl. No. 12/060,144 on Dec. 8, 2011; 18 pages.
Office Action issued in U.S. Appl. No. 12/059,804 on Nov. 14, 2011; 15 pages.
Office Action issued in related U.S. Appl. No. 12/059,860 on Aug. 3, 2011; 15 pages.
Office Action issued in related U.S. Appl. No. 12/059,860 on Jan. 23, 2012; 16 pages.
Office Action issued in related U.S. Appl. No. 12/060,192 on Sep. 6, 2011; 18 pages.
Notice of Allowance issued in related U.S. Appl. No. 12/060,178 on Sep. 2, 2011; 9 pages.
Office Action issued in related U.S. Appl. No. 12/060,062 on Jul. 13, 2011; 16 pages.
Office Action issued in related U.S. Appl. No. 12/060,155 on Oct. 31, 2011; 15 pages
Notice of Allowance issued in U.S. Appl. No. 11/155,368 on Nov. 8, 2011; 7 pages.
Office Action issued in U.S. Appl. No. 12/815,698 on Jan. 20, 2012; 10 pages.
Office Action issued in U.S. Appl. No. 12/815,618 on Dec. 22, 2011; 8 pages.
Notice of Allowance issued in related U.S. Appl. No. 11/864,866 on Jul. 22, 2011; 6 pages.

Notice of Allowance issued in U.S. Appl. No. 11/775,821 on Sep. 21, 2011; 5 pages.
Notice of Allowance issued in U.S. Appl. No. 11/775,821 on Dec. 30, 2011; 5 pages.
Notice of Allowance issued in related U.S. Appl. No. 11/364,538 on Jul. 26, 2011; 6 pages.
Office Action issued in U.S. Appl. No. 11/864,811 on Jul. 26, 2011; 7 pages.
Notice of Allowance issued in U.S. Appl. No. 11/864,811 on Nov. 14, 2011; 8 pages.
Notice of Allowance issued in related U.S. Appl. No. 11/864,832 on Jul. 7, 2011;11 pages.
Notice of Allowance issued in related U.S. Appl. No. 11/864,832 on Jan. 9, 2012;12 pages.
Office Action issued in related U.S. Appl. No. 11/864,863 on Jul. 21, 2011; 29 pages.
Office Action issued in related U.S. Appl. No. 11/864,863 on Dec. 22, 2011; 20 pages.
Notice of Allowance issued in related U.S. Appl. No. 11/803,178 on May 17, 2011; 13 pages.
Notice of Allowance issued in U.S. Appl. No. 11/640,422 on Sep. 29, 2011; 7 pages.

* cited by examiner

FIG. 27E
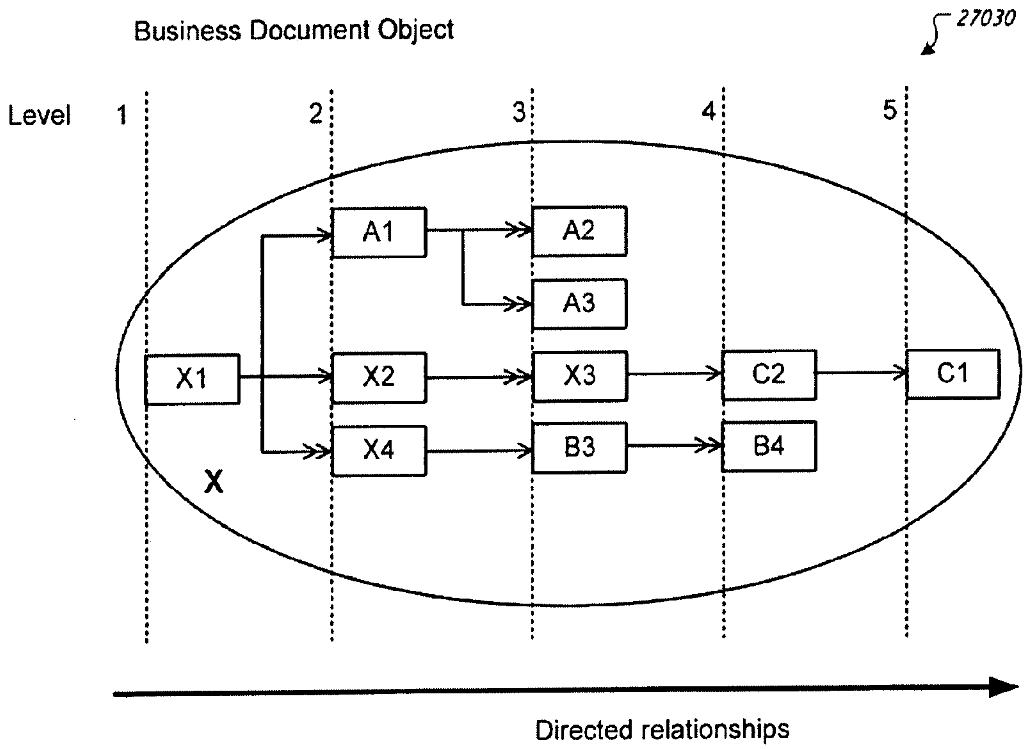
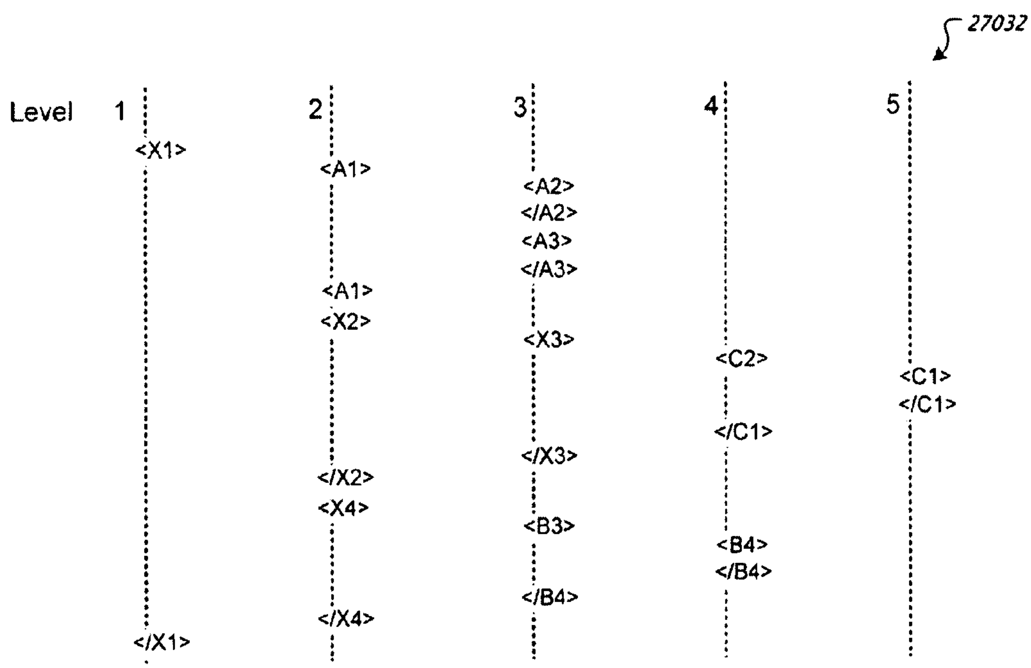

FIG. 42-1

| Package | level1 | level2 | level3 | Cardinality | Datatype Name |
|---|---|---|---|---|---|
| EmployeeLeaveRequestRejectCheckResponse 4200 | EmployeeLeaveRequestRejectCheckResponse 4202 | | | | EmployeeLeaveRequestRejectCheckResponse 4204 |
| MessageHeader 4206 | | MessageHeader 4208 | | 1 4210 | BusinessDocumentMessageHeader 4212 |
| EmployeeLeaveRequest 4214 | | EmployeeLeaveRequest 4216 | | 0..1 4218 | EmployeeLeaveRequest 4220 |
| | | | ID 4222 | 1 4224 | BusinessTransactionDocumentID 4226 |
| | | | VersionID 4228 | 1 4230 | VersionID 4232 |

FIG. 42-2

| Package | | level1 | level2 | level3 | Cardinality | Datatype Name |
|---|---|---|---|---|---|---|
| | | | | LifeCycleStatusCode 4234 | 1 4236 | EmployeeLeaveRequestLifeCycleStatusCode 4238 |
| | Log 4240 | | Log 4242 | | 0..1 4244 | Log 4246 |

FIG. 43-1

| Package | level 1 | level 2 | level 3 | level 4 | Cardinality | Datatype Name |
|---|---|---|---|---|---|---|
| EmployeeNameByEmployeeResponseMessage 4300 | EmployeeNameByEmployeeResponseMessage 4302 | | | | | <MessageDataType> 4304 |
| MessageHeader 4306 | | MessageHeader 4308 | | | 1 4310 | BusinessDocumentMessageHeader 4312 |
| Employee 4314 | | Employee 4316 | | | 0..1 4318 | |
| | | | Name 4320 | | 1 4322 | PersonName 4324 |
| Log 4326 | | Log 4328 | | | 0..1 4330 | Log 4332 |
| | | | MaximumLogItemSeverityCode 4334 | | 0..1 4336 | LogItemSeverityCode 4338 |

FIG. 43-2

| Package | level 1 | level 2 | level 3 | level 4 | Cardinality | Datatype Name |
|---|---|---|---|---|---|---|
| | | | Item 4340 | | 1..n 4342 | LogItem 4344 |
| | | | | TypeID 4346 | 0..1 4348 | Identifier 4350 |
| | | | | Severity 4352 | 0..1 4354 | LogItemseverityCode 4356 |
| | | | | Note 4358 | 1 4360 | Note 4362 |
| | | | | WebAddress 4364 | 0..1 4366 | WebAddress 4368 |

FIG. 44-1

| Package | level1 | level2 | level3 | level4 | Cardinality | Datatype Name |
|---|---|---|---|---|---|---|
| Employ-eePhotoByEmploy-eeResponseMes-sage 4400 | Employ-eePhotoByEmploy-eeResponseMes-sage 4402 | | | | | <Message-DataType> 4404 |
| Message-Header 4406 | | Message-Header 4408 | | | 1 4410 | Business-Document-Message-Header 4412 |
| Employee 4414 | | Employee 4416 | | | 0..1 4418 | |
| | | | Photo 4420 | | 1 4422 | BinaryObject 4424 |
| Log 4426 | | Log 4428 | | | 0..1 4430 | Log 4432 |

FIG. 44-2

| Package | level1 | level2 | level3 | level4 | Cardinality | Datatype Name |
|---|---|---|---|---|---|---|
| | | | Maximum-LogItemSeverity-Code 4434 | | 0..1 4436 | LogItem-SeverityCode 4438 |
| | | | Item 4440 | | 1..n 4442 | LogItem 4444 |
| | | | | TypeID 4446 | 0..1 4448 | Identifier 4450 |
| | | | | Severity 4452 | 0..1 4454 | LogItem-severityCode 4456 |
| | | | | Note 4458 | 1 4460 | Note 4462 |
| | | | | WebAd-dress 4464 | 0..1 4466 | WebAddress 4468 |

FIG. 45

| Package | level1 | level2 | level3 | Cardinality | Datatype Name |
|---|---|---|---|---|---|
| Employee-Message 4500 | Organisational-CentreEmployeeSimpleByEmployeeQueryMessage 4502 | | | | <Message-DataType> 4504 |
| Message-Header 4506 | | MessageHeader 4508 | | 1 4510 | BusinessDocumentMessage-Header 4512 |
| Employee 4514 | | OrganisationalCentreEmployeeSimpleSelection-ByEmployee 4516 | | 1..1 4518 | ... |
| | | | EmployeeID 4520 | 0..1 4522 | EmployeeID 4524 |
| | | | WorkAgreememtID 4526 | 0..1 4528 | WorkAgreementID 4530 |
| | | | KeyDate 4532 | 0..1 4534 | Date 4536 |

FIG. 46-1

| Package | level1 | level2 | level3 | level4 | Cardinality | Datatype Name |
|---|---|---|---|---|---|---|
| EmployeeMessage 4600 | Organisation-alCentreEm-ployeeSimple-ByEmployeeR-esponse 4602 | | | | | <Message-DataType> 4604 |
| MessageHeader 4606 | | MessageHeader 4608 | | | 1 4610 | BusinessDocu-mentMessage-Header 4612 |
| Employee 4614 | | Employee 4616 | | | 0..n 4618 | ... |
| | | | ID 4620 | | 1 4622 | EmployeeID 4624 |
| | | | PersonFormatted-Name 4626 | | 1 4628 | PersonFormat-tedName 4630 |
| WorkAgreement 4632 | | | WorkAgreement 4634 | | 0..n 4636 | |

FIG. 46-2

| Package | level1 | level2 | level3 | level4 | Cardinality | Datatype Name |
|---|---|---|---|---|---|---|
| Log 4644 | | | | ID 4638 | 1 4640 | WorkAgreement-ID 4642 |
| | | Log 4646 | | | 0..1 4648 | Log 4650 |

FIG. 47-1

| Package | level1 | level2 | level3 | Cardinality | Datatype Name |
|---|---|---|---|---|---|
| Employee-Message 4700 | ReportingEm-ployeeSimple-ByEmploye-eQueryMessage 4702 | | | | <Message-DataType> 4704 |
| Message-Header 4706 | | MessageHeader 4708 | | 1 4710 | Business-Document-Message-Header 4712 |
| Employee 4714 | | ReportingEmployeeSimple-SelectionByEmploye 4716 | | 1..1 4718 | ... |
| | | | EmployeeID 4720 | 0..1 4722 | EmployeeID 4724 |
| | | | WorkAgreememt_ID 4726 | 0..1 4728 | WorkAgree-mentID 4730 |

FIG. 47-2

| Package | level1 | level2 | level3 | Cardinality | Datatype Name |
|---|---|---|---|---|---|
| | | | ReportingLineRelativeLevel-Value 4732 | 0..1 4734 | ReportingLineRelativeLevel-Value 4736 |
| | | | KeyDate 4738 | 0..1 4740 | Date 4742 |

FIG. 48-1

| Package | level1 | level2 | level3 | level4 | level5 | level6 | Cardinality | Datatype Name |
|---|---|---|---|---|---|---|---|---|
| EmployeeMessage 4800 | ReportingEmployeeSimpleByEmployeeResponse 4802 | | | | | | | <MessageDataType> 4804 |
| MessageHeader 4806 | | MessageHeader 4808 | | | | | 1 4810 | BusinessDocumentMessageHeader 4812 |
| Employee 4814 | | Employee 4816 | | | | | 0..n 4818 | ... |
| | | | ID 4820 | | | | 1 4822 | EmployeeID 4824 |
| | | | PersonFormattedName 4826 | | | | 1 4828 | PersonFormattedName 4830 |
| Position 4832 | | | EmployeeAssignment 4834 | | | | 0..n 4836 | |

FIG. 48-2

| Package | level1 | level2 | level3 | level4 | level5 | level6 | Cardinality | Datatype Name |
|---|---|---|---|---|---|---|---|---|
| | | | | Position 4838 | | | 1 4840 | |
| | | | | | ID 4842 | | 1 4844 | PoistionID 4846 |
| | | | | | Description 4848 | | 1 4850 | Description 4852 |
| | | | | | Organisa-tionalCen-treManag-ingPosition-Indicator 4854 | | 0..1 4856 | Managing-PositionIndi-cator 4858 |
| | | | | | Organisa-tionalCen-treAs-sigmnent 4860 | | 0..1 4862 | |
| | | | | | | Organisa-tionalCen-treID 4864 | 1 4866 | Organisa-tionalCen-treID 4868 |

FIG. 48-3

| Package | level1 | level2 | level3 | level4 | level5 | level6 | Cardinality | Datatype Name |
|---|---|---|---|---|---|---|---|---|
| | | | | | | Organisa-tionalCentre-Name 4870 | 1 4872 | MEDIUM_Name 4874 |
| | | | | | | Organisa-tionalCentre-Business-Character-Code 4876 | 1 4878 | Organisa-tionalCen-treBusi-nessCharac-terCode 4880 |
| | | | | | | | | |
| WorkA-greement 4882 | | | | WorkA-greement 4884 | | | 0..1 4886 | |
| | | | | | ID 4888 | | 1 4890 | WorkA-greementID 4892 |
| Log 4894 | | Log 4896 | | | | | 0..1 4898 | Log 48100 |

FIG. 49

| Package | level1 | level2 | level3 | Cardinality | Datatype Name |
|---|---|---|---|---|---|
| Employee-Message 4900 | ReportingLine-ManagerSimple-ByEmploye-eQueryMessage 4902 | | | | <MessageDataType> 4904 |
| Mes-sageHead er 4906 | | MessageHeader 4908 | | 1 4910 | BusinessDocument-MessageHeader 4912 |
| Employee 4914 | | ReportingLineManager-SimpleSelectionByEm-ployee 4916 | | 1 4918 | ... |
| | | | EmployeeID 4920 | 0..1 4922 | EmployeeID 4924 |
| | | | WorkAgreememtID 4926 | 0..1 4928 | WorkAgreementID 4930 |
| | | | KeyDate 4932 | 0..1 4934 | Date 4936 |

FIG. 50-1

| Package | level1 | level2 | level3 | level4 | Cardinality | Datatype Name |
|---|---|---|---|---|---|---|
| EmployeeMessage 5000 | ReportingLine-ManagerSim-pleByEmploy-eeResponse 5002 | | | | | <Message-DataType> 5004 |
| MessageHeader 5006 | | Message-Header 5008 | | | 1 5010 | BusinessDocu-mentMessage-Header 5012 |
| Employee 5014 | | Employee 5016 | | | 0..n 5018 | ... |
| | | | ID 5020 | | 1 5022 | EmployeeID 5024 |
| | | | PersonFormatted-Name 5026 | | 1 5028 | PersonFormat-tedName 5030 |
| WorkAgree-ment 5032 | | | WorkAgreement 5034 | | 0..n 5036 | |

FIG. 50-2

| Package | level1 | level2 | level3 | level4 | Cardinality | Datatype Name |
|---|---|---|---|---|---|---|
| | | | | ID 5038 | 1 5040 | WorkAgreement-tID 5042 |
| Log 5044 | | Log 5046 | | | 0..1 5048 | Log 5050 |

FIG. 51

| Package | level1 | level2 | level3 | Cardinality | Datatype Name |
| --- | --- | --- | --- | --- | --- |
| EmployeeMessage 5100 | ReportingLinePeerByEmployeeQueryMessage 5102 | | | | <MessageDataType> 5104 |
| MessageHeader 5106 | | MessageHeader 5108 | | 1 5110 | BusinessDocumentMessageHeader 5112 |
| Employee 5114 | | ReportingLinePeerSelectionByEmployee 5116 | | 1 5118 | ... |
| | | | EmployeeID 5120 | 0..1 5122 | EmployeeID 5124 |
| | | | WorkAgreememtID 5126 | 0..1 5128 | WorkAgreementID 5130 |
| | | | KeyDate 5132 | 0..1 5134 | Date 5136 |

FIG. 52

| Package | level1 | level2 | level3 | level4 | Cardinality | Datatype Name |
|---|---|---|---|---|---|---|
| EmployeeMessage 5200 | ReportingLine-PeerByEmploy-eeResponse 5202 | | | | | <MessageDataType> 5204 |
| MessageHeader 5206 | | Message-Header 5208 | | | 1 5210 | BusinessDocumentMes-sageHeader 5212 |
| Employee 5214 | | Employee 5216 | | | 0..n 5218 | ... |
| | | | ID 5220 | | 1 5222 | EmployeeID 5224 |
| | | | PersonFormat-tedName 5226 | | 1 5228 | PersonFormattedName 5230 |
| WorkAgree-ment 5232 | | | WorkAgreement 5234 | | 0..n 5236 | |
| | | | | ID 5238 | 1 5240 | WorkAgreementID 5242 |
| Log 5244 | | Log 5246 | | | 0..1 5248 | Log 5250 |

FIG. 60

| Package | level1 | level2 | level3 | Cardinality | Datatype Name |
|---|---|---|---|---|---|
| EmployeeLeaveRequestAllowedApproverByIdentifyingElementsResponse 6000 | EmployeeLeaveRequestAllowedApproverByIdentifyingElementsResponse 6002 | | | | EmployeeLeaveRequestAllowedApproverByIdentifyingElements-Response 6004 |
| MessageHeader 6006 | | MessageHeader 6008 | | 1 6010 | BusinessDocument-MessageHeader 6012 |
| EmployeeLeaveRequest 6014 | | EmployeeLeaveRequestAllowedApprover 6016 | | 0..n 6018 | EmployeeLeaveRequestConfiguration-SelectionByEmployee 6020 |
| | | | EmployeeID 6022 | 1 6024 | WorkAgreementID 6026 |
| | | | WorkAgreementID 6028 | 1 6030 | Text 6032 |
| | | | SortableName 6034 | 1 6036 | PersonSortableName 6038 |
| Log 6040 | | Log 6042 | | 0..1 6044 | Log 6046 |

FIG. 61-1

| Package | level1 | level2 | level3 | Cardinality | Datatype Name |
|---|---|---|---|---|---|
| EmployeeLeaveRequestAllowedApproverByIdentifyingElementsQuery 6100 | EmployeeLeaveRequestAllowedApproverByIdentifyingElementsQuery 6102 | | | | EmployeeLeaveRequestAllowedApproverByIdentifyingElementsQuery 6104 |
| MessageHeader 6106 | | MessageHeader 6108 | | 1 6110 | BusinessDocumentMessageHeader 6112 |
| Selection 6114 | | EmployeeLeaveRequestAllowedApproverSelectionByIdentifyingElements 6116 | | 1 6118 | EmployeeLeaveRequestAllowedApproverSelectionByIdentifyingElements 6120 |
| | | | EmployeeLeaveRequest_OwnerWorkAgreementID 6122 | 0..1 6124 | WorkAgreementID 6126 |
| | | | ApproverSearchText 6128 | 0..1 6130 | SearchText 6132 |

FIG. 61-2

| Package | | level1 | level2 | level3 | Cardinality | Datatype Name |
|---|---|---|---|---|---|---|
| | | | | EmployeeLeaveRequest_ApproverSortableName 6134 | 0..1 6136 | PersonSortableName 6138 |
| | | | | EmployeeLeaveRequest_ApproverEmployeeID 6140 | 0..1 6142 | EmployeeID 6144 |
| | | | | EmployeeLeaveRequest_ApproverWorkAgreementID 6146 | 0..1 6148 | WorkAgreementID 6150 |

FIG. 62-1

| Package | level1 | level2 | level3 | Cardinality | Datatype Name |
| --- | --- | --- | --- | --- | --- |
| EmployeeLeaveRequestApproveConfirmation 6200 | EmployeeLeaveRequestApproveConfirmation 6202 | | | | EmployeeLeaveRequestApproveConfirmation 6204 |
| MessageHeader 6206 | | MessageHeader 6208 | | 1 6210 | BusinessDocumentMessageHeader 6212 |
| EmployeeLeaveRequest 6214 | | EmployeeLeaveRequest 6216 | | 0..1 6218 | EmployeeLeaveRequest 6220 |
| | | | ID 6222 | 1 6224 | BusinessTransactionDocumentID 6226 |
| | | | VersionID 6228 | 1 6230 | VersionID 6232 |

FIG. 62-2

| Package | | level1 | level2 | level3 | Cardinality | Datatype Name |
|---|---|---|---|---|---|---|
| | | | | LifeCycleStatus-Code 6234 | 1 6236 | Employ-eeLeaveRe-questLifeCy-cleStatusCode 6238 |
| | Log 6240 | | Log 6242 | | 0..1 6244 | Log 6246 |

FIG. 63

| Package | level1 | level2 | level3 | level4 | Cardinality | Datatype Name |
|---|---|---|---|---|---|---|
| EmployeeLeaveRequestApproveRequest 6300 | EmployeeLeaveRequestApproveRequest 6302 | | | | | EmployeeLeaveRequestApproveRequest 6304 |
| MessageHeader 6306 | | MessageHeader 6308 | | | 1 6310 | BusinessDocumentMessageHeader 6312 |
| EmployeeLeaveRequest 6314 | | EmployeeLeaveRequest 6316 | | | 1 6318 | EmployeeLeaveRequest 6320 |
| | | | ID 6322 | | 1 6324 | BusinessTransactionDocumentID 6326 |
| | | | VersionID 6328 | | 1 6330 | VersionID 6332 |
| EmployeeLeaveRequestHeader 6334 | | | Note 6336 | | 0..1 6338 | Note 6340 |
| | | | | Text 6342 | 1 6344 | Text 6346 |

FIG. 64-1

| Package | level1 | level2 | level3 | Cardinality | Datatype Name |
|---|---|---|---|---|---|
| EmployeeLeaveRequestByParticipantQueryMessage 6400 | EmployeeLeaveRequestByParticipantQueryMessage 6402 | | | | EmployeeLeaveRequestByParticipantQueryMessage 6404 |
| MessageHeader 6406 | | MessageHeader 6408 | | 1 6410 | BusinessDocumentMessageHeader 6412 |
| Selection 6414 | | EmployeeLeaveRequestSelectionByParticipant 6416 | | 1 6418 | EmployeeLeaveRequestSelectionByParticipant 6420 |
| | | | EmployeeLeaveRequestParticipantRoleCode 6422 | 1 6424 | EmployeeLeaveRequestParticipantRoleCode 6426 |

FIG. 64-2

| Package | | level1 | level2 | level3 | Cardinality | Datatype Name |
|---|---|---|---|---|---|---|
| | | | | EmployeeLeaveRequestParticipantEmployeeIDInterval 6428 | 0..n 6430 | EmployeeID-Interval 6432 |
| | | | | EmloyeeLeaveRequestParticipantWorkAgreementIDInterval 6434 | 0..n 6436 | WorkAgreementIDInterval 6438 |
| | | | | EmloyeeLeaveRequestLifeCycleStatusCodeInterval 6440 | 0..n 6442 | EmployeeRequestLifeCycleStatusInterval 6444 |
| | | | | AsOfDate 6446 | 0..1 6448 | Date 6450 |

FIG. 65-1

| Package | level1 | level2 | level3 | level4 | level5 | Cardinality | Datatype Name |
|---|---|---|---|---|---|---|---|
| EmployeeLeaveRequestByParticipantResponseMessage 6500 | EmployeeLeaveRequestByParticipantResponseMessage 6502 | | | | | | EmployeeLeaveRequestByParticipantResponseMessage 6504 |
| MessageHeader 6506 | | MessageHeader 6508 | | | | 1 6510 | BusinessDocumentMessageHeader 6512 |
| EmployeeLeaveRequest 6514 | | EmployeeLeave Request 6516 | | | | 0..n 6518 | EmployeeLeaveRequest 6520 |
| | | | ID 6522 | | | 1 6524 | BusinessTransactionDocumentID 6526 |
| | | | VersionID 6528 | | | 1 6530 | VerionID 6532 |

FIG. 65-2

| Package | level1 | level2 | level3 | level4 | level5 | Cardinality | Datatype Name |
|---|---|---|---|---|---|---|---|
| | | | FirstSubmission-DateTime 6534 | | | 1 6536 | DateTime 6538 |
| | | | LifeCycleStus Code 6540 | | | 1 6542 | EmployeeLeaveRequestLifeCycleStatusCode 6544 |
| | | | Action 6546 | | | 0..n 6548 | EmployeeRequestActionCode 6550 |
| EmployeeRequestHeader 6552 | | | Participant 6554 | | | 1..n 6556 | Participant 6558 |
| | | | | RoleCode 6560 | | 1 6562 | EmployeeLeaveRequestParticipantRoleCode 6564 |
| | | | | EmployeeID 6566 | | 1 6568 | EmployeeID 6570 |

FIG. 65-3

| Package | level1 | level2 | level3 | level4 | level5 | Cardinality | Datatype Name |
|---|---|---|---|---|---|---|---|
| | | | | WorkA-greementID 6572 | | 1 6574 | WorkAgreementID 6576 |
| | | | | Formatted-Name 6578 | | 1 6580 | PersonFormatted-Name 6582 |
| | | | Note 6584 | | | 0..n 6586 | Note 6588 |
| | | | | AuthorEm-ployeeID 6590 | | 1 6592 | EmployeeID 6594 |
| | | | | Author-WorkA-greementID 6596 | | 1 6598 | WorkAgreementID 65100 |
| | | | | AuthorFor-mattedName 65102 | | 1 65104 | PersonFormatted-Name 65106 |
| | | | | DateTime 65108 | | 1 65110 | DateTime 65112 |

FIG. 65-4

| Package | level1 | level2 | level3 | level4 | level5 | Cardinality | Datatype Name |
|---|---|---|---|---|---|---|---|
| | | | | Text 65114 | | 1 65116 | Text 65118 |
| BusinessTransactionDocumentReference 65120 | | | LeaveEmployeeTimeReference 65122 | | | 0..1 65124 | BusinessTransactionDocumentReference/EmployeeTimeID 65126 |
| | | | | ActionCode 65128 | | 1 65130 | ActionCode 65132 |
| | | | | LeaveEmployeeTimeReference 65134 | | 1 65136 | BusinessTransactionDocumentReference 65138 |
| EmployeeTimeItem 65140 | | | LeaveEmployeeTimeItem 65142 | | | 0..n 65144 | LeaveEmployeeTimeItem 65146 |

FIG. 65-5

| Package | level1 | level2 | level3 | level4 | level5 | Cardinality | Datatype Name |
|---|---|---|---|---|---|---|---|
| | | | | Category-Code 65148 | | 1 65150 | EmployeeTimeItem-CategoryCode 65152 |
| | | | | TypeCode 65154 | | 1 65156 | EmployeeTimeItem-TypeCode 65158 |
| | | | | Validity 65160 | | 1 65162 | EmployeeTimeItem-Validity 65164 |
| | | | | Employ-eeTimeAc-count-LineItem 65166 | | 0..n 65168 | EmployeeTimeAc-countLineItem 65170 |
| | | | | | Employ-eeTimeAc count-TypeCode 65172 | 1 65174 | EmployeeTimeAc-countTypeCode 65176 |

FIG. 65-6

| Package | level1 | level2 | level3 | level4 | level5 | Cardinality | Datatype Name |
|---|---|---|---|---|---|---|---|
| | | | | | TypeCode 65178 | 1 65180 | EmployeeTimeAccountLineItemTypeCode 65182 |
| | | | | | Quantity 65184 | 1 65186 | Quantity 65188 |
| Log 65190 | | Log 65192 | | | | 0..1 65194 | Log 65196 |

FIG. 66-1

| Package | level1 | level2 | level3 | Cardinality | Datatype Name |
|---|---|---|---|---|---|
| EmployeeLeaveRequestCancelConfirmation 6600 | EmployeeLeaveRequestCancelConfirmation 6602 | | | | EmployeeLeaveRequestCancelConfirmation 6604 |
| MessageHeader 6606 | | MessageHeader 6608 | | 1 6610 | BusinessDocumentMessageHeader 6612 |
| EmployeeLeaveRequest 6614 | | EmployeeLeaveRequest 6616 | | 0..1 6618 | EmployeeLeaveRequest 6620 |
| | | | ID 6622 | 1 6624 | BusinessTransactionDocumentID 6626 |

FIG. 66-2

| Package | | level1 | level2 | level3 | Cardinality | Datatype Name |
|---|---|---|---|---|---|---|
| | | | | VersionID 6628 | 1 6630 | VersionID 6632 |
| | | | | LifeCycleStatusCode 6634 | 1 6636 | Employ-eeLeaveR eques-tLifeCy-cleStatus-Code 6638 |
| | Log 6640 | | Log 6642 | | 0..1 6644 | Log 6646 |

FIG. 67

| Package | level1 | level2 | level3 | level4 | Cardinality | Datatype Name |
|---|---|---|---|---|---|---|
| EmployeeLeaveRequest-CancelRequest 6700 | Employ-eeLeaveRequest-CancelRequest 6702 | | | | | EmployeeLeaveRe-questCancelRequest 6704 |
| MessageHeader 6706 | | MessageHeader 6708 | | | 1 6710 | BusinessDocumentMes-sageHeader 6712 |
| EmployeeLeaveRe-quest 6714 | | Employ-eeLeaveRequest 6716 | | | 1 6718 | EmployeeLeaveRequest 6720 |
| | | | ID 6722 | | 1 6724 | BusinessTransaction-DocumentID 6726 |
| | | | VersionID 6728 | | 1 6730 | VersionID 6732 |
| Employ-eeLeaveRe-questHeader 6734 | | | Note 6736 | | 0..1 6738 | Note 6740 |
| | | | | Text 6742 | 1 6744 | Text 6746 |

FIG. 68-1

| Package | level1 | level2 | level3 | level4 | level5 | Cardinality | Datatype Name |
|---|---|---|---|---|---|---|---|
| EmployeeLeaveRequestCreateCheckResponse 6800 | EmployeeLeaveRequestCreateCheckResponse 6802 | | | | | | EmployeeLeaveRequestCreateCheckResponse 6804 |
| MessageHeader 6806 | | MessageHeader 6808 | | | | 1 6810 | BusinessDocumentMessageHeader 6812 |
| EmployeeLeaveRequest 6814 | | EmployeeLeaveRequest 6816 | | | | 0..1 6818 | EmployeeLeaveRequest 6820 |
| | | | LifeCycleStatusCode 6822 | | | 1 6824 | EmployeeLeaveRequestLifeCycleStatusCode 6826 |

FIG. 68-2

| Package | level1 | level2 | level3 | level4 | level5 | Cardinality | Datatype Name |
|---|---|---|---|---|---|---|---|
| EmployeeLeave RequestHeader 6828 | | | Participant 6830 | | | 1..n 6832 | Participant 6834 |
| | | | | RoleCode 6836 | | 1 6838 | EmployeeLeaveRequestParticipantRoleCode 6840 |
| | | | | EmployeeID 6842 | | 1 6844 | EmployeeID 6846 |
| | | | | WorkAgreementID 6848 | | 1 6850 | WorkAgreementID 6852 |
| | | | | FormattedName 6854 | | 1 6856 | PersonFormattedName 6858 |

FIG. 68-3

| Package | level1 | level2 | level3 | level4 | level5 | Cardinality | Datatype Name |
|---|---|---|---|---|---|---|---|
| | | | Note 6860 | | | 0..n 6862 | Note 6864 |
| | | | | AuthorEmployeeID 6866 | | 1 6868 | EmployeeID 6870 |
| | | | | AuthorWorkAgreementID 6872 | | 1 6874 | WorkAgreementID 6876 |
| | | | | AuthorFormattedName 6878 | | 1 6880 | PersonFormattedName 6882 |
| | | | | DateTime 6884 | | 1 6886 | DateTime 6888 |
| | | | | Text 6890 | | 1 6892 | Text 6894 |
| BusinessTransactionDocumentReference 6896 | | | LeaveEmployeeTimeReference 6898 | | | 0..1 68100 | LeaveEmployeeTimeReference 68102 |
| | | | | ActionCode 68104 | | 1 68106 | ActionCode 68108 |

FIG. 68-4

| Package | level1 | level2 | level3 | level4 | level5 | Cardinality | Datatype Name |
|---|---|---|---|---|---|---|---|
| EmployeeTimeItem 68116 | | | | LeaveEmployeeTimeReference 68110 | | 1 68112 | BusinessTransaction-DocumentReference 68114 |
| | | | LeaveEmploy-eeTimeItem 68118 | | | 0..n 68120 | LeaveEmploy-eeTimeItem 68122 |
| | | | | Category-Code 68124 | | 1 68126 | EmployeeTimeItem-CategoryCode 68128 |
| | | | | TypeCode 68130 | | 1 68132 | EmployeeTimeItem-TypeCode 68134 |
| | | | | Validity 68136 | | 1 68138 | EmployeeTimeItem-Validity 68140 |

FIG. 68-5

| Package | level1 | level2 | level3 | level4 | level5 | Cardinality | Datatype Name |
|---|---|---|---|---|---|---|---|
| | | | | Employ-eeTimeAc-count-LineItem 68142 | | 0..n 68144 | EmployeeTimeAc-countLineItem 68146 |
| | | | | | EmployeeTimeAc-count-Type-Code 68148 | 1 68150 | EmployeeTimeAc-countTypeCode 68152 |
| | | | | | Type 68154 | 1 68156 | EmployeeTimeAc-countLineItemType-Code 68158 |
| | | | | | Quan-tity 68160 | 1 68162 | Quantity 68164 |
| Log 68166 | | Log 68168 | | | | 0..1 68170 | Log 68172 |

FIG. 69-1

| Package | level1 | level2 | level3 | level4 | level5 | Cardinality | Datatype Name |
|---|---|---|---|---|---|---|---|
| EmployeeLeaveRequest-CreateConfirmation 6900 | Employ-eeLeaveRe-questCre-ateConfirma-tion 6902 | | | | | | EmployeeLeaveRequestCre-ateConfirmation 6904 |
| MessageHeader 6906 | | Mes-sage-Header 6908 | | | | 1 6910 | BusinessDocumentMes-sageHeader 6912 |
| EmployeeLeaveRe-quest 6914 | | Employ eeLeav eRe-quest 6916 | | | | 0..1 6918 | EmployeeLeaveRequest 6920 |
| | | | ID 6922 | | | 1 6924 | BusinessTransactionDocu-mentID 6926 |
| | | | Ver-sionID 6928 | | | 1 6930 | VersionID 6932 |

FIG. 69-2

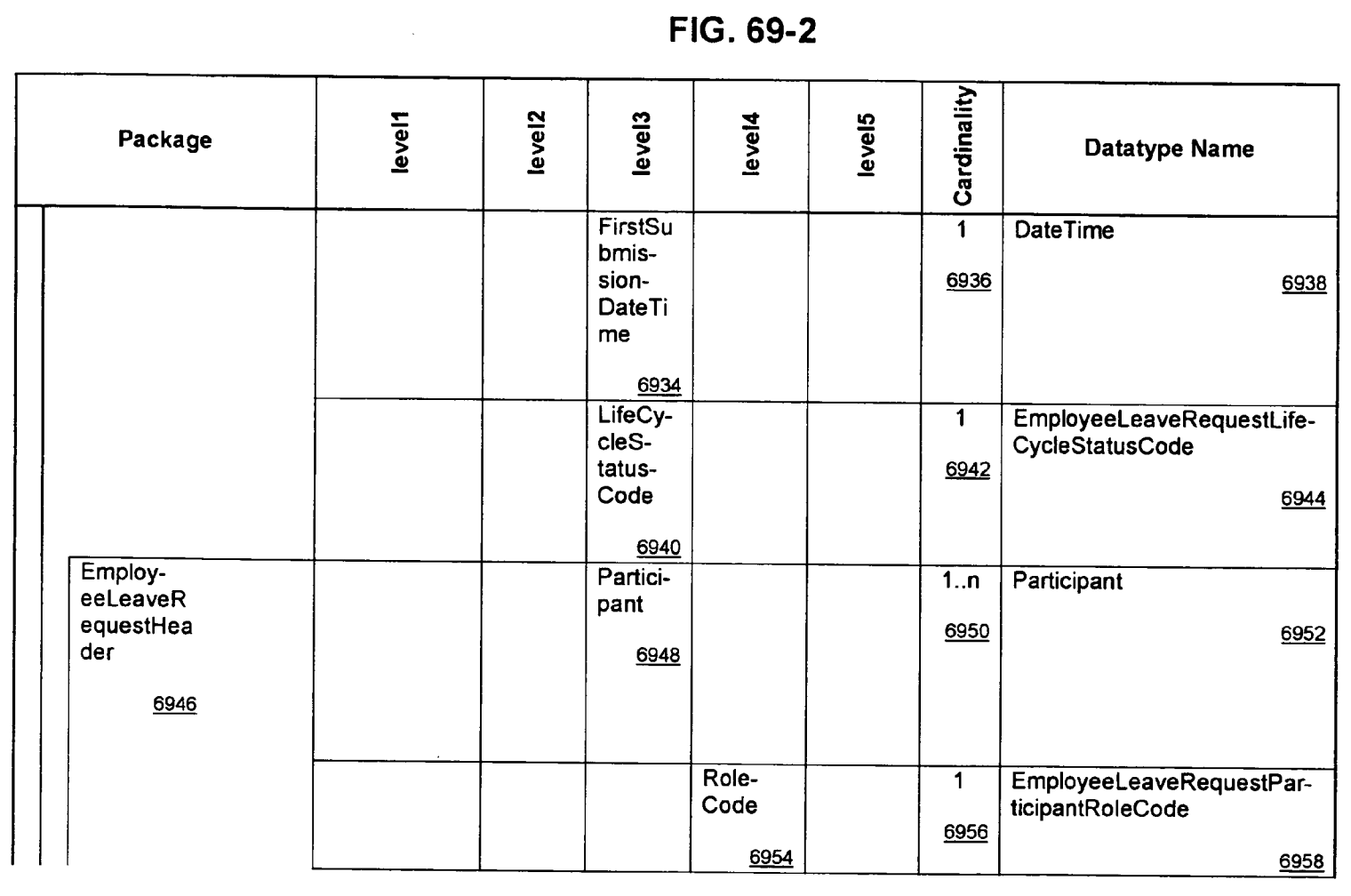

| Package | level1 | level2 | level3 | level4 | level5 | Cardinality | Datatype Name |
|---|---|---|---|---|---|---|---|
| | | | FirstSubmission-DateTime 6934 | | | 1 6936 | DateTime 6938 |
| | | | LifeCycleStatus-Code 6940 | | | 1 6942 | EmployeeLeaveRequestLifeCycleStatusCode 6944 |
| EmployeeLeaveRequestHeader 6946 | | | Partici-pant 6948 | | | 1..n 6950 | Participant 6952 |
| | | | | Role-Code 6954 | | 1 6956 | EmployeeLeaveRequestParticipantRoleCode 6958 |

FIG. 69-3

| Package | level1 | level2 | level3 | level4 | level5 | Cardinality | Datatype Name |
|---|---|---|---|---|---|---|---|
| | | | | EmployeeID 6960 | | 1 6962 | EmployeeID 6964 |
| | | | | WorkAgreementID 6966 | | 1 6968 | WorkAgreementID 6970 |
| | | | | FormattedName 6972 | | 1 6974 | PersonFormattedName 6976 |
| | | | Note 6978 | | | 0..n 6980 | Note 6982 |
| | | | | AuthorEmployeeID 6984 | | 1 6986 | EmployeeID 6988 |

FIG. 69-4

| Package | level1 | level2 | level3 | level4 | level5 | Cardinality | Datatype Name |
|---|---|---|---|---|---|---|---|
| | | | | Author-WorkAgreementID 6990 | | 1 6992 | WorkAgreementID 6994 |
| | | | | Author-Formatted-Name 6996 | | 1 6998 | PersonFormattedName 69100 |
| | | | | DateTime 69102 | | 1 69104 | DateTime 69106 |
| | | | | Text 69108 | | 1 69110 | Text 69112 |
| BusinessTransactionDocumentReference 69114 | | | LeaveEmployeeTimeReference 69116 | | | 0..1 69118 | LeaveEmployeeTimeReference 69120 |

FIG. 69-5

| Package | level1 | level2 | level3 | level4 | level5 | Cardinality | Datatype Name |
|---|---|---|---|---|---|---|---|
| | | | | Action-Code 69122 | | 1 69124 | ActionCode 69126 |
| | | | | LeaveEmploy-eeTimeRefer-ence 69128 | | 1 69130 | BusinessTransactionDocu-mentReference 69132 |
| Employ-eeTimeItem 69134 | | | LeaveEmploy-eeTimeItem 69136 | | | 0..n 69138 | LeaveEmployeeTimeItem 69140 |
| | | | | Cate-gory-Code 69142 | | 1 69144 | EmployeeTimeItemCate-goryCode 69146 |

FIG. 69-6

| Package | level1 | level2 | level3 | level4 | level5 | Cardinality | Datatype Name |
|---|---|---|---|---|---|---|---|
| | | | | Type-Code 69148 | | 1 69150 | EmployeeTimeItemTypeCode 69152 |
| | | | | Validity 69154 | | 1 69156 | EmployeeTimeItemValidity 69158 |
| | | | | Employ-eeTime Account LineItem 69160 | | 0..n 69162 | EmployeeTimeAccount-LineItem 69164 |
| | | | | | Employ-eeTime Account Type-Code 69166 | 1 69168 | EmployeeTimeAccountType-Code 69170 |
| | | | | | Type-Code 69172 | 1 69174 | EmployeeTimeAccount-LineItemTypeCode 69176 |

FIG. 69-7

| Package | level1 | level2 | level3 | level4 | level5 | Cardinality | Datatype Name |
|---|---|---|---|---|---|---|---|
| | | | | | Quantity 69178 | 1 69180 | Quantity 69182 |
| Log 69184 | | Log 69186 | | | | 0..1 69188 | Log 69190 |

FIG. 70-1

| Package | level1 | level2 | level3 | level4 | Cardinality | Datatype Name |
|---|---|---|---|---|---|---|
| EmployeeLeaveRequest-CreateRequest 7000 | Employ-eeLeaveRequestCre-ateRequest 7002 | | | | | Employ-eeLeaveRe-questCreateRe-quest 7004 |
| MessageHeader 7006 | | Message-Header 7008 | | | 1 7010 | BusinessDocu-mentMessage-Header 7012 |
| EmployeeLeaveRe-quest 7014 | | Employ-eeLeaveRe-quest 7016 | | | 1 7018 | Employ-eeLeaveRequest 7020 |
| Employ-eeLeaveRe-questHeader 7022 | | | Participant 7024 | | 0..n 7026 | Participant 7028 |
| | | | | RoleCode 7030 | 1 7032 | Employ-eeLeaveRe-questParticipan-tRoleCode 7034 |

FIG. 70-2

| Package | | | | level1 | level2 | level3 | level4 | Cardinality | Datatype Name |
|---|---|---|---|---|---|---|---|---|---|
| | | | | | | | WorkAgree-mentID 7036 | 1 7038 | WorkAgreemen-tID 7040 |
| | | | | | | Note 7042 | | 0..1 7044 | Note 7046 |
| | | | | | | | Text 7048 | 1 7050 | Text 7052 |
| | | | Business-Transaction-Documen-tReference 7054 | | | LeaveEmploy-eeTimeReference 7056 | | 0..1 7058 | LeaveEmploy-eeTimeReference 7060 |
| | | | | | | | ActionCode 7062 | 1 7064 | ActionCode 7066 |
| | | | | | | | LeaveEm-ployeeTimeRe ference 7068 | 1 7070 | BusinessTransac-tionDocumen-tReference 7072 |

FIG. 70-3

| Package | | | level1 | level2 | level3 | level4 | Cardinality | Datatype Name |
|---|---|---|---|---|---|---|---|---|
| | | Employ-eeTimeItem 7074 | | | LeaveEmploy-eeTimeItem 7076 | | 0..n 7078 | LeaveEmploy-eeTimeItem 7080 |
| | | | | | | CategoryCode 7082 | 1 7084 | Employ-eeTimeItemCate-goryCode 7086 |
| | | | | | | TypeCode 7088 | 1 7090 | Employ-eeTimeItem-TypeCode 7092 |
| | | | | | | Validity 7094 | 1 7096 | Employ-eeTimeItemValid-ity 7098 |

FIG. 71

| Package | level1 | level2 | level3 | Cardinality | Datatype Name |
|---|---|---|---|---|---|
| EmployeeLeaveRequestDefaultByEmployeeQueryMessage 7100 | EmployeeLeaveRequestDefaultByEmployeeQueryMessage 7102 | | | | EmployeeLeaveRequestDefaultByEmployeeQueryMessage 7104 |
| Message-Header 7106 | | MessageHeader 7108 | | 1 7110 | BusinessDocumentMessage-Header 7112 |
| Selection 7114 | | EmployeeLeaveRequestDefaultsSelectionByEmployee 7116 | | 1 7118 | EmployeeLeaveRequestDefaultSelectionByEmployee 7120 |
| | | | Employee_ID 7122 | 0..1 7124 | EmployeeID 7126 |
| | | | WorkAgreement_ID 7128 | 0..1 7130 | WorkAgreementID 7132 |

FIG. 72-1

| Package | level1 | level2 | level3 | level4 | Cardinality | Datatype Name |
|---|---|---|---|---|---|---|
| EmployeeLeaveRequestDefault-ByEmployeeResponseMessage 7200 | Employ-eeLeaveRe-questDefault-ByEmploy-eeResponse-Message 7202 | | | | | Employ-eeLeaveRe-questDe-faultByEm-ployeeRe-sponseMes-sage 7204 |
| MessageHeader 7206 | | Message-Header 7208 | | | 1 7210 | Business-Document-Message-Header 7212 |
| EmployeeLeaveRequest 7214 | | Employ-eeLeaveRe-quest 7216 | | | 0..n 7218 | Employ-eeLeaveRe-quest 7220 |
| EmployeeLeaveRe-questHeader 7222 | | | Participant 7224 | | 0..n 7226 | Participant 7228 |
| | | | | RoleCode 7230 | 1 7232 | Employ-eeLeaveRe-questPartici-pantRole-Code 7234 |

FIG. 72-2

| Package | level1 | level2 | level3 | level4 | Cardinality | Datatype Name |
|---|---|---|---|---|---|---|
| | | | | EmployeeID 7236 | 1 7238 | EmployeeID 7240 |
| | | | | WorkAgreementID 7242 | 1 7244 | WorkAgreementID 7246 |
| | | | | FormattedName 7248 | 1 7250 | PersonFormattedName 7252 |
| | | | Note 7254 | | 0..1 7256 | Note 7258 |
| | | | | AuthorEmployeeID 7260 | 1 7262 | EmployeeID 7264 |
| | | | | AuthorWorkAgreementID 7266 | 1 7268 | WorkAgreementID 7270 |
| | | | | AuthorFormattedName 7272 | 1 7274 | PersonFormattedName 7276 |

FIG. 72-3

| Package | level1 | level2 | level3 | level4 | Cardinality | Datatype Name |
|---|---|---|---|---|---|---|
| | | | | DateTime 7278 | 1 7280 | DateTime 7282 |
| | | | | Text 7284 | 1 7286 | Text 7288 |
| EmployeeTimeItem 7290 | | | LeaveEmployeeTimeItem 7292 | | 1..n 7294 | LeaveEmployeeTimeItem 7296 |
| | | | | CategoryCode 7298 | 1 72100 | Employ-eeTimeItem-Category-Code 72102 |

FIG. 72-4

| Package | level1 | level2 | level3 | level4 | Cardinality | Datatype Name |
|---|---|---|---|---|---|---|
| | | | | TypeCode 72104 | 1 72106 | Employ-eeTimeItem-TypeCode 72108 |
| | | | | Validity 72110 | 1 72112 | Employ-eeTimeItem-Validity 72114 |
| Log 72116 | | Log 72118 | | | 0..1 72120 | Log 72122 |

FIG. 73

| Package | level1 | level2 | level3 | Cardinality | Datatype Name |
| --- | --- | --- | --- | --- | --- |
| EmployeeLeaveRequestRejectConfirmation 7300 | EmployeeLeaveRequestRejectConfirmation 7302 | | | | EmployeeLeaveRequestRejectConfirmation 7304 |
| MessageHeader 7306 | | MessageHeader 7308 | | 1 7310 | BusinessDocumentMessageHeader 7312 |
| EmployeeLeaveRequest 7314 | | EmployeeLeaveRequest 7316 | | 0..1 7318 | EmployeeLeaveRequest 7320 |
| | | | ID 7322 | 1 7324 | BusinessTransactionDocumentID 7326 |
| | | | VersionID 7328 | 1 7330 | VersionID 7332 |
| | | | LifeCycleStatusCode 7334 | 1 7336 | EmployeeLeaveRequestLifeCycleStatusCode 7338 |
| Log 7340 | | Log 7342 | | 0..1 7344 | Log 7346 |

FIG. 74

| Package | level1 | level2 | level3 | level4 | Cardinality | Datatype Name |
|---|---|---|---|---|---|---|
| EmployeeLeaveRequestRejectRequest 7400 | EmployeeLeaveRequestRejectRequest 7402 | | | | | EmployeeLeaveRequestRejectRequest 7404 |
| MessageHeader 7406 | | MessageHeader 7408 | | | 1 7410 | BusinessDocumentMessageHeader 7412 |
| EmployeeLeaveRequest 7414 | | EmployeeLeaveRequest 7416 | | | 1 7418 | EmployeeLeaveRequest 7420 |
| | | | ID 7422 | | 1 7424 | BusinessTransactionDocumentID 7426 |
| | | | VersionID 7428 | | 1 7430 | VersionID 7432 |
| EmployeeLeaveRequestHeader 7434 | | | Note 7436 | | 0..1 7438 | Note 7440 |
| | | | | Text 7442 | 1 7444 | Text 7446 |

FIG. 75-1

| Package | level1 | level2 | level3 | level4 | level5 | Cardinality | Datatype Name |
|---|---|---|---|---|---|---|---|
| EmployeeLeaveRequestUpdateConfirmation 7500 | EmployeeLeaveRequestUpdateConfirmation 7502 | | | | | | EmployeeLeaveRequestUpdateConfirmation 7504 |
| MessageHeader 7506 | | MessageHeader 7508 | | | | 1 7510 | BusinessDocumentMessageHeader 7512 |
| EmployeeLeaveRequest 7514 | | EmployeeLeaveRequest 7516 | | | | 0..1 7518 | EmployeeLeaveRequest 7520 |
| | | | ID 7522 | | | 1 7524 | BusinessTransactionDocumentID 7526 |
| | | | VersionID 7528 | | | 1 7530 | VersionID 7532 |

FIG. 75-2

| Package | level1 | level2 | level3 | level4 | level5 | Cardinality | Datatype Name |
|---|---|---|---|---|---|---|---|
| | | | FirstSub-mission-DateTime 7534 | | | 1 7536 | DateTime 7538 |
| | | | LifeCy-cleS-tatusCode 7540 | | | 1 7542 | Employ-eeLeaveRe-questLifeCy-cleStatusCode 7544 |
| Employ-eeLeaveRe-questHeader 7546 | | | Partici-pant 7548 | | | 1..n 7550 | Participant 7552 |
| | | | | RoleCode 7554 | | 1 7556 | EmployeeRe-questPartici-pantRoleCode 7558 |
| | | | | EmployeeID 7560 | | 1 7562 | EmployeeID 7564 |
| | | | | WorkAgree-mentID 7566 | | 1 7568 | WorkAgree-mentID 7570 |

FIG. 75-3

| Package | level1 | level2 | level3 | level4 | level5 | Cardinality | Datatype Name |
|---|---|---|---|---|---|---|---|
| | | | | Formatted-Name 7572 | | 1 7574 | PersonFor-mattedName 7576 |
| | | | Note 7578 | | | 0..n 7580 | Note 7582 |
| | | | | AuthorEm-ployeeID 7584 | | 1 7586 | EmployeeID 7588 |
| | | | | AuthorWorkA-greementID 7590 | | 1 7592 | WorkAgree-mentID 7594 |
| | | | | AuthorFormat-tedName 7596 | | 1 7598 | PersonFor-mattedName 75100 |
| | | | | DateTime 75102 | | 1 75104 | DateTime 75106 |
| | | | | Text 75108 | | 1 75110 | Text 75112 |

FIG. 75-4

| Package | level1 | level2 | level3 | level4 | level5 | Cardinality | Datatype Name |
|---|---|---|---|---|---|---|---|
| BusinessTransactionDocumentReference 75114 | | | LeaveEmployeeTimeReference 75116 | | | 0..1 75118 | LeaveEmployeeTimeReference 75120 |
| | | | | ActionCode 75122 | | 1 75124 | ActionCode 75126 |
| | | | | LeaveEmployeeTimeReference 75128 | | 1 75130 | BusinessTransactionDocumentReference 75132 |
| EmployeeTimeItem 75134 | | | LeaveEmployeeTimeItem 75136 | | | 0..n 75138 | LeaveEmployeeTimeItem 75140 |

FIG. 75-5

| Package | level1 | level2 | level3 | level4 | level5 | Cardinality | Datatype Name |
|---|---|---|---|---|---|---|---|
| | | | | CategoryCode 75142 | | 1 75144 | Employ-eeTimeItem-CategoryCode 75146 |
| | | | | TypeCode 75148 | | 1 75150 | Employ-eeTimeItem-TypeCode 75152 |
| | | | | Validity 75154 | | 1 75156 | Employ-eeTimeItem-Validity 75158 |
| | | | | Employ-eeTimeAc-countLineItem 75160 | | 0..n 75162 | Employ-eeTimeAc-countLineItem 75164 |
| | | | | | Employ-eeTimeAc-countType-Code 75166 | 1 75168 | Employ-eeTimeAc-countType-Code 75170 |

FIG. 75-6

| Package | level1 | level2 | level3 | level4 | level5 | Cardinality | Datatype Name |
|---|---|---|---|---|---|---|---|
| | | | | | TypeCode 75172 | 1 75174 | EmployeeTimeAccountLineItem TypeCode 75176 |
| | | | | | Quantity 75178 | 1 75180 | Quantity 75182 |
| Log 75184 | | Log 75186 | | | | 0..1 75188 | Log 75190 |

FIG. 76-1

| Package | level1 | level2 | level3 | level4 | Cardinality | Datatype Name |
|---|---|---|---|---|---|---|
| EmployeeLeaveRequestUpdateRequest 7600 | EmployeeLeaveRequestUpdateRequest 7602 | | | | | EmployeeLeaveRequestUpdateRequest 7604 |
| MessageHeader 7606 | | MessageHeader 7608 | | | 1 7610 | BusinessDocumentMessageHeader 7612 |
| EmployeeLeaveRequest 7614 | | EmployeeLeaveRequest 7616 | | | 1 7618 | EmployeeLeaveRequest 7620 |
| | | | ID 7622 | | 1 7624 | BusinessTransactionDocumentID 7626 |
| | | | VersionID 7628 | | 1 7630 | VersionID 7632 |

FIG. 76-2

| Package | level1 | level2 | level3 | level4 | Cardinality | Datatype Name |
|---|---|---|---|---|---|---|
| EmployeeLeaveRe-questHeader 7634 | | | Partici-pant 7636 | | 0..1 7638 | Participant 7640 |
| | | | | RoleCode 7642 | 1 7644 | Employ-eeLeaveRe-questParticipan-tRoleCode 7646 |
| | | | | WorkA-greemen-tID 7648 | 1 7650 | WorkAgreemen-tID 7652 |
| | | | Note 7654 | | 0..1 7656 | Note 7658 |
| | | | | Text 7660 | 1 7662 | Text 7664 |

FIG. 76-3

| Package | | | | level1 | level2 | level3 | level4 | Cardinality | Datatype Name |
|---|---|---|---|---|---|---|---|---|---|
| | | EmployeeTimeItem 7666 | | | | LeaveEmployeeTimeItem 7668 | | 0..n 7670 | LeaveEmployeeTimeItem 7672 |
| | | | | | | | Category 7674 | 1 7676 | EmployeeTimeItemCategoryCode 7678 |
| | | | | | | | Type 7680 | 1 7682 | EmployeeTimeItemTypeCode 7684 |
| | | | | | | | Validity 7686 | 1 7688 | EmployeeTimeItemValidity 7690 |

FIG. 77

| Package | level1 | level2 | level3 | Cardinality | Datatype Name |
|---|---|---|---|---|---|
| EmployeeLeaveRequestApproveCheckResponse 7700 | EmployeeLeaveRequestApproveCheckResponse 7702 | | | | EmployeeLeaveRequestApproveCheckResponse 7704 |
| MessageHeader 7706 | | MessageHeader 7708 | | 1 7710 | BusinessDocumentMessageHeader 7712 |
| EmployeeLeaveRequest 7714 | | EmployeeLeaveRequest 7716 | | 0..1 7718 | EmployeeLeaveRequest 7720 |
| | | | ID 7722 | 1 7724 | BusinessTransactionDocumentID 7726 |
| | | | VersionID 7728 | 1 7730 | VersionID 7732 |
| | | | LifeCycleStatusCode 7734 | 1 7736 | EmployeeLeaveRequestLifeCycleStatusCode 7738 |
| Log 7740 | | Log 7742 | | 0..1 7744 | Log 7746 |

FIG. 78-1

| Package | level1 | level2 | level3 | level4 | Cardinality | Datatype Name |
|---|---|---|---|---|---|---|
| EmployeeLeaveRequestApproveCheckQuery 7800 | EmployeeLeaveRequestApproveCheckQuery 7802 | | | | | EmployeeLeaveRequestApproveCheckQuery 7804 |
| MessageHeader 7806 | | MessageHeader 7808 | | | 1 7810 | BusinessDocumentMessageHeader 7812 |
| EmployeeLeaveRequest 7814 | | EmployeeLeaveRequest 7816 | | | 1 7818 | EmployeeLeaveRequest 7820 |
| | | | ID 7822 | | 1 7824 | BusinessTransactionDocumentID 7826 |
| | | | VersionID 7828 | | 1 7830 | VersionID 7832 |

FIG. 78-2

| Package | | | level1 | level2 | level3 | level4 | Cardinality | Datatype Name |
|---|---|---|---|---|---|---|---|---|
| | | EmployeeLeaveRequestHeader 7834 | | | Note 7836 | | 0..1 7838 | Note 7840 |
| | | | | | | Text 7842 | 1 7844 | Text 7846 |

FIG. 79

| Package | level1 | level2 | level3 | Cardinality | Datatype Name |
|---|---|---|---|---|---|
| EmployeeLeaveRequestCancelCheckResponse 7900 | EmployeeLeaveRequestCancelCheckResponse 7902 | | | | EmployeeLeaveRequestCancelCheckResponse 7904 |
| MessageHeader 7906 | | MessageHeader 7908 | | 1 7910 | BusinessDocumentMessageHeader 7912 |
| EmployeeLeaveRequest 7914 | | EmployeeLeaveRequest 7916 | | 0..1 7918 | EmployeeLeaveRequest 7920 |
| | | | ID 7922 | 1 7924 | BusinessTransactionDocumentID 7926 |
| | | | VersionID 7928 | 1 7930 | VersionID 7932 |
| | | | LifeCycleStatusCode 7934 | 1 7936 | EmployeeLeaveRequestLifeCycleStatusCode 7938 |
| Log 7940 | | Log 7942 | | 0..1 7944 | Log 7946 |

FIG. 80

| Package | level1 | level2 | level3 | level4 | Cardinality | Datatype Name |
|---|---|---|---|---|---|---|
| EmployeeLeaveRequestCancelCheckQuery 8000 | EmployeeLeaveRequestCancelCheckQuery 8002 | | | | | EmployeeLeaveRequestCancelCheckQuery 8004 |
| MessageHeader 8006 | | MessageHeader 8008 | | | 1 8010 | BusinessDocumentMessageHeader 8012 |
| EmployeeLeaveRequest 8014 | | EmployeeLeaveRequest 8016 | | | 1 8018 | EmployeeLeaveRequest 8020 |
| | | | ID 8022 | | 1 8024 | BusinessTransactionDocumentID 8026 |
| | | | VersionID 8028 | | 1 8030 | VersionID 8032 |
| EmployeeLeaveRequestHeader 8034 | | | Note 8036 | | 0..1 8038 | Note 8040 |
| | | | | Text 8042 | 1 8044 | Text 8046 |

FIG. 81-1

| Package | level1 | level2 | level3 | level4 | Cardinality | Datatype Name |
|---|---|---|---|---|---|---|
| EmployeeLeaveRequest-CreateCheckQuery 8100 | Employ-eeLeaveRe-questCre-ateCheckQu ery 8102 | | | | | Employ-eeLeaveRequest-CreateCheckQuery 8104 |
| MessageHeader 8106 | | Message-Header 8108 | | | 1 8110 | BusinessDocu-mentMessage-Header 8112 |
| EmployeeLeaveRe-quest 8114 | | Employ-eeLeaveRe-quest 8116 | | | 1 8118 | Employ-eeLeaveRequest 8120 |
| Employ-eeLeaveRe-questHeader 8122 | | | Participant 8124 | | 0..n 8126 | Participant 8128 |
| | | | | RoleCode 8130 | 1 8132 | Employ-eeLeaveRequest-ParticipantRole-Code 8134 |
| | | | | WorkAgree-mentID 8136 | 1 8138 | WorkAgreementID 8140 |
| | | | Note 8142 | | 0..1 8144 | Note 8146 |

FIG. 81-2

| Package | | | level1 | level2 | level3 | level4 | Cardinality | Datatype Name |
|---|---|---|---|---|---|---|---|---|
| | | | | | | Text 8148 | 1 8150 | Text 8152 |
| | | Business-Transaction-Documen-tReference 8154 | | | LeaveEmploy-eeTimeReference 8156 | | 0..1 8158 | LeaveEmploy-eeTimeReference 8160 |
| | | | | | | ActionCode 8162 | 1 8164 | ActionCode 8166 |
| | | | | | | LeaveEm-ployeeTimeRe ference 8168 | 1 8170 | BusinessTransac-tionDocumen-tReference 8172 |
| | | Employ-eeTimeIt em 8174 | | | LeaveEmploy-eeTimeItem 8176 | | 0..n 8178 | LeaveEmploy-eeTimeItem 8180 |

FIG. 81-3

| Package | | | level1 | level2 | level3 | level4 | Cardinality | Datatype Name |
|---|---|---|---|---|---|---|---|---|
| | | | | | | CategoryCode 8182 | 1 8184 | Employ-eeTimeItemCate-goryCode 8186 |
| | | | | | | TypeCode 8188 | 1 8190 | Employ-eeTimeItemType-Code 8192 |
| | | | | | | Validity 8194 | 1 8196 | Employ-eeTimeItemValidity 8198 |

FIG. 82

| Package | level1 | level2 | level3 | level4 | Cardinality | Datatype Name |
|---|---|---|---|---|---|---|
| EmployeeLeaveRequestRejectCheckQuery 8200 | EmployeeLeaveRequestRejectCheckQuery 8202 | | | | | EmployeeLeaveRequestRejectCheckQuery 8204 |
| MessageHeader 8206 | | MessageHeader 8208 | | | 1 8210 | BusinessDocumentMessageHeader 8212 |
| EmployeeLeaveRequest 8214 | | EmployeeLeaveRequest 8216 | | | 1 8218 | EmployeeLeaveRequest 8220 |
| | | | ID 8222 | | 1 8224 | BusinessTransactionDocumentID 8226 |
| | | | VersionID 8228 | | 1 8230 | VersionID 8232 |
| EmployeeLeaveRequestHeader 8234 | | | Note 8236 | | 0..1 8238 | Note 8240 |
| | | | | Text 8242 | 1 8244 | Text 8246 |

FIG. 83-1

| Package | level1 | level2 | level3 | level4 | level5 | Cardinality | Datatype Name |
|---|---|---|---|---|---|---|---|
| EmployeeLeaveRequestUpdateCheckResponse 8300 | EmployeeLeaveRequestUpdateCheckResponse 8302 | | | | | | EmployeeLeaveRequestUpdateCheckResponse 8304 |
| MessageHeader 8306 | | MessageHeader 8308 | | | | 1 8310 | BusinessDocumentMessageHeader 8312 |
| EmployeeLeaveRequest 8314 | | EmployeeLeaveRequest 8316 | | | | 0..1 8318 | EmployeeLeaveRequest 8320 |
| | | | ID 8322 | | | 1 8324 | BusinessTransactionDocumentID 8326 |
| | | | VersionID 8328 | | | 1 8330 | VersionID 8332 |

FIG. 83-2

| Package | level1 | level2 | level3 | level4 | level5 | Cardinality | Datatype Name |
|---|---|---|---|---|---|---|---|
| | | | FirstSub-mission-DateTime 8334 | | | 1 8336 | DateTime 8338 |
| | | | LifeCy-cleS-tatusCode 8340 | | | 1 8342 | Employ-eeLeaveRe-questLifeCy-cleStatusCode 8344 |
| Employ-eeLeaveRe-questHeader 8346 | | | Partici-pant 8348 | | | 1..n 8350 | Participant 8352 |
| | | | | RoleCode 8354 | | 1 8356 | EmployeeRe-questPartici-pantRoleCode 8358 |
| | | | | EmployeeID 8360 | | 1 8362 | EmployeeID 8364 |
| | | | | WorkAgree-mentID 8366 | | 1 8368 | WorkAgree-mentID 8370 |

FIG. 83-3

| Package | level1 | level2 | level3 | level4 | level5 | Cardinality | Datatype Name |
|---|---|---|---|---|---|---|---|
| | | | | Formatted-Name 8372 | | 1 8374 | PersonFor-mattedName 8376 |
| | | | Note 8378 | | | 0..n 8380 | Note 8382 |
| | | | | AuthorEm-ployeeID 8384 | | 1 8386 | EmployeeID 8388 |
| | | | | AuthorWorkA-greementID 8390 | | 1 8392 | WorkAgree-mentID 8394 |
| | | | | AuthorFormat-tedName 8396 | | 1 8398 | PersonFor-mattedName 83100 |
| | | | | DateTime 83102 | | 1 83104 | DateTime 83106 |
| | | | | Text 83108 | | 1 83110 | Text 83112 |

FIG. 83-4

| Package | | | level1 | level2 | level3 | level4 | level5 | Cardinality | Datatype Name |
|---|---|---|---|---|---|---|---|---|---|
| | | BusinessTransactionDocumentReference 83114 | | | LeaveEmployeeTimeReference 83116 | | | 0..1 83118 | LeaveEmployeeTimeReference 83120 |
| | | | | | | ActionCode 83122 | | 1 83124 | ActionCode 83126 |
| | | | | | | LeaveEmployeeTimeReference 83128 | | 1 83130 | BusinessTransactionDocumentReference 83132 |
| | | EmployeeTimeItem 83134 | | | LeaveEmployeeTimeItem 83136 | | | 0..n 83138 | LeaveEmployeeTimeItem 83140 |

FIG. 83-5

| Package | level1 | level2 | level3 | level4 | level5 | Cardinality | Datatype Name |
|---|---|---|---|---|---|---|---|
| | | | | CategoryCode 83142 | | 1 83144 | Employ-eeTimeItem-CategoryCode 83146 |
| | | | | TypeCode 83148 | | 1 83150 | Employ-eeTimeItem-TypeCode 83152 |
| | | | | Validity 83154 | | 1 83156 | Employ-eeTimeItem-Validity 83158 |
| | | | | Employ-eeTimeAc-countLineItem 83160 | | 0..n 83162 | Employ-eeTimeAc-countLineItem 83164 |
| | | | | | Employ-eeTimeAc-countType-Code 83166 | 1 83168 | Employ-eeTimeAc-countType-Code 83170 |

FIG. 83-6

| Package | level1 | level2 | level3 | level4 | level5 | Cardinality | Datatype Name |
|---|---|---|---|---|---|---|---|
| | | | | | TypeCode 83172 | 1 83174 | Employ-eeTimeAc-countLineItem TypeCode 83176 |
| | | | | | Quantity 83178 | 1 83180 | Quantity 83182 |
| Log 83184 | | Log 83186 | | | | 0..1 83188 | Log 83190 |

FIG. 84-1

| Package | level1 | level2 | level3 | level4 | Cardinality | Datatype Name |
|---|---|---|---|---|---|---|
| EmployeeLeaveRequestUpdateCheckQuery 8400 | EmployeeLeaveRequestUpdateCheckQuery 8402 | | | | | EmployeeLeaveRequestUpdateCheckQuery 8404 |
| MessageHeader 8406 | | MessageHeader 8408 | | | 1 8410 | BusinessDocumentMessageHeader 8412 |
| EmployeeLeaveRequest 8414 | | EmployeeLeaveRequest 8416 | | | 1 8418 | EmployeeLeaveRequest 8420 |
| | | | ID 8422 | | 1 8424 | BusinessTransactionDocumentID 8426 |
| | | | VersionID 8428 | | 1 8430 | VersionID 8432 |
| EmployeeLeaveRequestHeader 8434 | | | Participant 8436 | | 0..1 8438 | Participant 8440 |
| | | | | RoleCode 8442 | 1 8444 | EmployeeLeaveRequestParticipantRoleCode 8446 |

FIG. 84-2

| Package | level1 | level2 | level3 | level4 | Cardinality | Datatype Name |
|---|---|---|---|---|---|---|
| | | | | WorkA-gree-mentID 8448 | 1 8450 | WorkAgreementID 8452 |
| | | | Note 8454 | | 0..1 8456 | Note 8458 |
| | | | | Text 8460 | 1 8462 | Text 8464 |
| Employ-eeTimeItem 8466 | | | LeaveEmploy-eeTimeItem 8468 | | 0..n 8470 | LeaveEmploy-eeTimeItem 8472 |
| | | | | Cate-gory 8474 | 1 8476 | EmployeeTimeItem-CategoryCode 8478 |

FIG. 84-3

| Package | level1 | level2 | level3 | level4 | Cardinality | Datatype Name |
|---|---|---|---|---|---|---|
| | | | | Type 8480 | 1 8482 | EmployeeTimeItem-TypeCode 8484 |
| | | | | Validity 8486 | 1 8488 | EmployeeTimeItem-Validity 8490 |

CONSISTENT SET OF INTERFACES DERIVED FROM A BUSINESS OBJECT MODEL

RELATED APPLICATIONS

This application claims the benefit of U.S. Provisional Application Ser. No. 60/788,574 filed Mar. 31, 2006 and U.S. Provisional Application Ser. No. 60/837,196 filed Aug. 11, 2006, and also claims the benefit of U.S. Provisional Application Ser. No. 60/819,942 filed Jul. 10, 2006 with respect to ServiceConfirmation, as disclosed for example at pages 3884-3911, and ServiceOrder, as disclosed for example at pages 3912-4003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the generation and use of consistent interfaces derived from a business object model. More particularly, the present disclosure relates to the generation and use of consistent interfaces that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

Methods and systems consistent with the subject matter described herein facilitate e-commerce by providing consistent interfaces that can be used during a business transaction. Such business entities may include different companies within different industries. For example, one company may be in the chemical industry, while another company may be in the automotive industry. The business entities also may include different businesses within a given industry, or they may include different departments within a given company.

The interfaces are consistent across different industries and across different business units because they are generated using a single business object model. The business object model defines the business-related concepts at a central location for a number of business transactions. In other words, the business object model reflects the decisions made about modeling the business entities of the real world acting in business transactions across industries and business areas. The business object model is defined by the business objects and their relationships to each other (overall net structure).

A business object is a capsule with an internal hierarchical structure, behavior offered by its operations, and integrity constraints. Business objects are semantically disjointed, i.e., the same business information is represented once. The business object model contains all of the elements in the messages, user interfaces and engines for these business transactions. Each message represents a business document with structured information. The user interfaces represent the information that the users deal with, such as analytics, reporting, maintaining or controlling. The engines provide services concerning a specific topic, such as pricing or tax.

Methods and systems consistent with the subject matter described herein generate interfaces from the business object model by assembling the elements that are required for a given transaction in a corresponding hierarchical manner. Because each interface is derived from the business object model, the interface is consistent with the business object model and with the other interfaces that are derived from the business object model. Moreover, the consistency of the interfaces is also maintained at all hierarchical levels. By using consistent interfaces, each business entity can easily exchange information with another business entity without the need for human interaction, thus facilitating business transactions.

Example methods and systems described herein provide an object model and, as such, derive two or more interfaces that are consistent from this object model. Further, the subject matter described herein can provide a consistent set of interfaces that are suitable for use with more than one industry. This consistency is reflected at a structural level as well as through the semantic meaning of the elements in the interfaces. Additionally, the techniques and components described herein provide a consistent set of interfaces suitable for use with different businesses. Methods and systems consistent with the subject matter described herein provide a consistent set of interfaces suitable for use with a business scenario that spans across the components within a company. These components, or business entities, may be heterogeneous.

For example, a user or a business application of any number of modules, including one may execute or otherwise implement methods that utilize consistent interfaces that, for example, query business objects, respond to the query, create/change/delete/cancel business objects, and/or confirm the particular processing, often across applications, systems, businesses, or even industries. The foregoing example computer implementable methods—as well as other disclosed processes—may also be executed or implemented by or within software. Moreover, some or all of these aspects may be further included in respective systems or other devices for identifying and utilizing consistence interfaces. For example, one system implementing consistent interfaces derived from a business object model may include memory storing a plurality of global data types and at least a subset of BudgetMonitoring, Employee, EmployeeLeaveRequest, EmployeeLeaveRequestConfiguration, EmployeeTime, EmployeeTimeAccount, EmployeeTimeAgreement, EmployeeTimeCalendar, EmployeeTimeSheet, EmployeeTimeSheetConfiguration, Employment, FinancialAccountingForBanks, InsuranceContractReturn Information, OrganisationalCentre, ServiceConfirmation, ServiceOrder, and WorkAgreement.

The foregoing example computer implementable methods—as well as other disclosed processes—may also be executed or implemented by or within software. Moreover, some or all of these aspects may be further included in respective systems or other devices for identifying and utilizing a generic database query. The details of these and other aspects and embodiments of the disclosure are set forth in the accompanying drawings and the description below. Other features, objects, and advantages of the various embodiments will be apparent from the description and drawings, as well as from the claims.

DESCRIPTION OF DRAWINGS

FIGS. 27A-E depict a hierarchization process in accordance with methods and systems consistent with the subject matter described herein;

FIGS. 42-1 through 42-2 show an exemplary EmployeeLeaveRequestRejectCheckResponse Element Structure;

FIGS. 43-1 through 43-2 show an exemplary Employee NameByEmployeeResponseMessage Element Structure;

FIGS. 44-1 through 44-2 show an exemplary Employee PhotoByEmployeeResponseMessage Element Structure;

FIG. 45 shows an exemplary OrganisationalCentreEmployeeSimpleByEmployeeQueryMessage Element Structure;

FIGS. 46-1 through 46-2 show an exemplary OrganisationalCentreEmployeeSimpleByEmployeeResponseMessage Element Structure;

FIGS. 47-1 through 47-2 show an exemplary ReportingEmployeeByEmployeeQuery Element Structure;

FIGS. 48-1 through 48-3 show an exemplary ReportingEmployeeByEmployeeResponse Element Structure;

FIG. 49 shows an exemplary ReportingLineManagerSimpleByEmployeeQuery Element Structure;

FIGS. 50-1 through 50-2 show an exemplary Reporting LineManagerSimpleByEmployeeResponse Element Structure;

FIG. 51 shows an exemplary ReportingLinePeerByEmployeeQuery Element Structure;

FIG. 52 shows an exemplary ReportingLinePeerByEmployeeResponse Element Structure;

FIG. 60 shows an exemplary EmployeeLeaveRequestAllowedApproverByIdentifyingElementsResponse Element Structure;

FIGS. 61-1 through 61-2 show an exemplary EmployeeLeaveRequestAllowedApproverByIdentifyingElementsQuery Element Structure;

FIGS. 62-1 through 62-2 show an exemplary EmployeeLeaveRequestApproveConfirmation Element Structure;

FIG. 63 shows an exemplary EmployeeLeaveRequestApproveRequest Element Structure;

FIGS. 64-1 through 64-2 show an exemplary EmployeeLeaveRequestByParticipantQueryMessage Element Structure;

FIGS. 65-1 through 65-6 show an exemplary EmployeeLeaveRequestByParticipantResponseMessage Element Structure;

FIGS. 66-1 through 66-2 show an exemplary EmployeeLeaveRequestCancelConfirmation Element Structure;

FIG. 67 shows an exemplary EmployeeLeaveRequestCancelRequest Element Structure;

FIGS. 68-1 through 68-5 show an exemplary EmployeeLeaveRequestCreateCheckResponse Element Structure;

FIGS. 69-1 through 69-7 show an exemplary EmployeeLeaveRequestCreateConfirmation Element Structure;

FIGS. 70-1 through 70-3 show an exemplary EmployeeLeaveRequestCreateRequest Element Structure;

FIG. 71 shows an exemplary EmployeeLeaveRequestDefaultByEmployeeQueryMessage Element Structure;

FIGS. 72-1 through 72-4 show an exemplary EmployeeLeaveRequestDefaultByEmployeeResponseMessage Element Structure;

FIG. 73 shows an exemplary EmployeeLeaveRequestRejectConfirmation Element Structure;

FIG. 74 shows an exemplary EmployeeLeaveRequestRejectRequest Element Structure;

FIGS. 75-1 through 75-6 show an exemplary EmployeeLeaveRequestUpdateConfirmation Element Structure;

FIGS. 76-1 through 76-3 show an exemplary EmployeeLeaveRequestUpdateRequest Element Structure;

FIG. 77 shows an exemplary EmployeeLeaveRequestApproveCheckResponse Element Structure;

FIGS. 78-1 through 78-2 show an exemplary EmployeeLeaveRequestApproveCheckQuery Element Structure;

FIG. 79 shows an exemplary EmployeeLeaveRequestCancelCheckResponse Element Structure;

FIG. 80 shows an exemplary EmployeeLeaveRequestCancelCheckQuery Element Structure;

FIGS. 81-1 through 81-3 show an exemplary EmployeeLeaveRequestCreateCheckQuery Element Structure;

FIG. 82 shows an exemplary EmployeeLeaveRequestRejectCheckQuery Element Structure;

FIGS. 83-1 through 83-6 show an exemplary EmployeeLeaveRequestUpdateCheckResponse Element Structure; and FIGS. 84-1 through 84-3 show an exemplary EmployeeLeaveRequestUpdateCheckQuery Element Structure.

DETAILED DESCRIPTION

Overview

Figure 1:
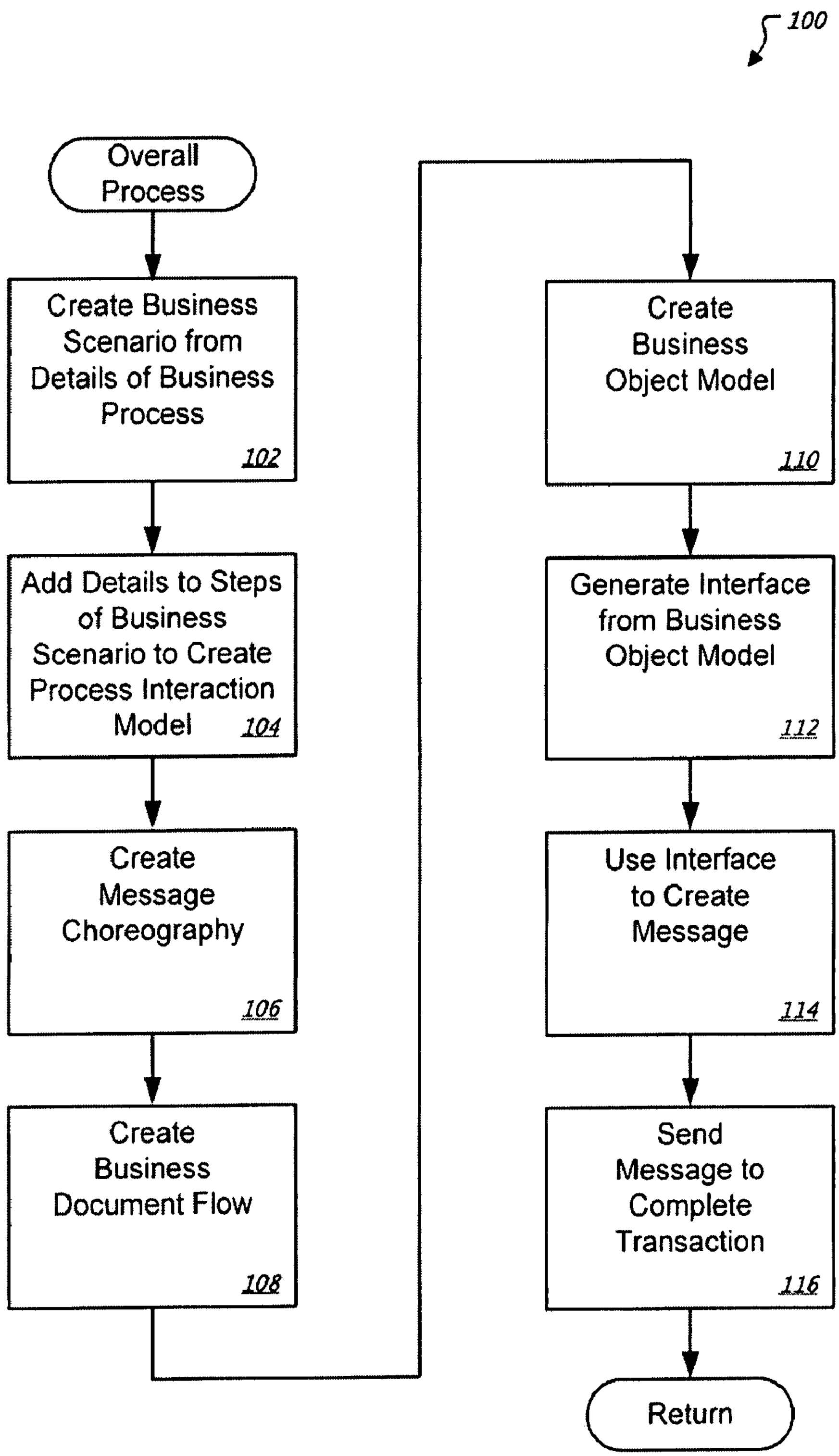
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a "create", "update", or "delete" of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
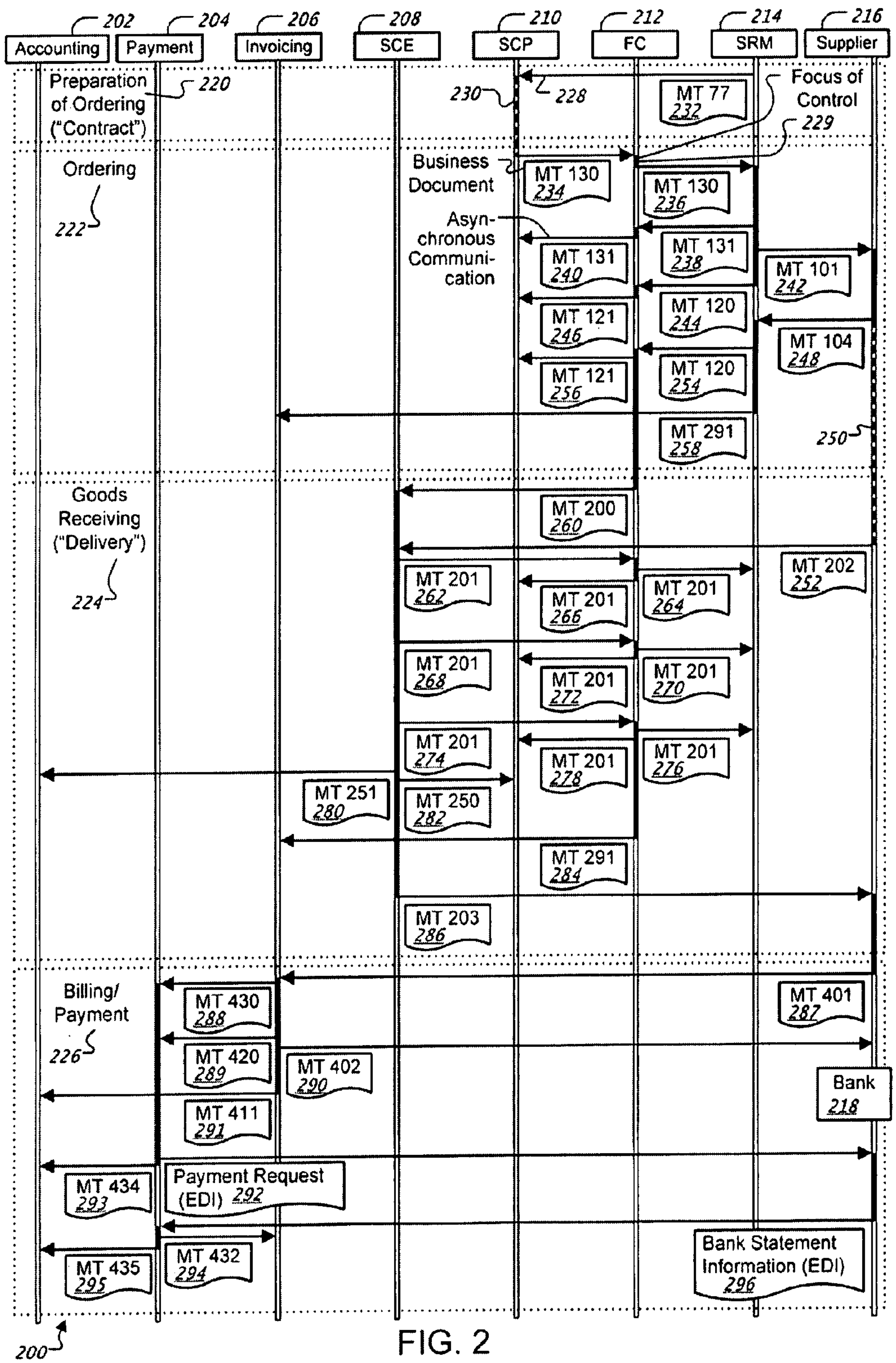
FIG. 2 depicts a business document flow for an invoice request in accordance with methods and systems consistent with the subject matter described herein.

FIG. 2 depicts an exemplary business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type. A list of various message types with their corresponding codes description is provided below.

| Name | Description |
|---|---|
| Source of Supply Notification | A SourceOfSupplyNotification is a notice to Supply Chain Planning about available sources of supply. |
| Catalogue Update Notification | A CatalogueUpdateNotification is a notice from a catalogue provider to an interested party about a new catalogue transmitted in the message or about changes to an existing catalogue transmitted in the message. |
| Catalogue Publication Request | A CataloguePublicationRequest is a request from catalogue authoring to the Catalogue Search Engine (the publishing system) to publish a new or changed catalogue or to delete an already published catalogue (the catalogue is possibly split into several transmission packages). |
| CataloguePublication TransmissionPackage Notification | A CataloguePublicationTransmissionPackageNotification is the notification of the Catalogue Search Engine (the publishing system) to Catalogue Authoring about a package of a catalogue publication transmission and information about the reception of this package and the validity of its content. |
| CataloguePublication Confirmation | A CataloguePublicationConfirmation is the confirmation of the Catalogue Search Engine (the publishing system) to Catalogue Authoring whether the publication or deletion of a catalogue requested by a CataloguePublicationRequest was successful or not. |
| CataloguePublication Transmission CancellationRequest | A CataloguePublicationTransmissionCancellationRequest is the request of Catalogue Authoring to Catalogue Search Engine (the publishing system) to cancel the transmission of a catalogue and to restore an earlier published state (if such exists) of the catalogue. Moreover, no more packages are sent for this transmission. |
| CataloguePublication TransmissionCancellation Confirmation | A CataloguePublicationTransmissionCancellationConfirmation is the confirmation of Catalogue Search Engine (the publishing system) whether the transmission of a catalogue has been cancelled successfully and an earlier published state of this catalogue (if such exists) has been restored or not. |
| CataloguePublication TransmissionItemLock Request | A CataloguePublicationTransmissionItemLockRequest is the request of Catalogue Authoring to lock single items of the catalogue contained in the catalogue publication transmission. |
| Catalogue Publication Transmission Item Lock Confirmation | A CataloguePublicationTransmissionItemLockConfIrmation is the confirmation of Catalogue Search Engine (the publishing system) to Catalogue Authoring whether single items of the catalogue contained in the catalogue publication transmission could be locked or not. To lock means that if the catalogue is not yet published the items must not be published and if the catalogue is already published, the publication of these items must be revoked. |

-continued

| Name | Description |
| --- | --- |
| Purchase Order Request | A PurchaseOrderRequest is a request from a purchaser to a seller to deliver goods or provide services. |
| Purchase Order Change Request | A PurchaseOrderChangeRequest is a change to a purchaser's request to the seller to deliver goods or provide services. |
| Purchase Order Cancellation Request | A PurchaseOrderCancellationRequest is the cancellation of a purchaser's request to the seller to deliver goods or provide services. |
| Purchase Order Confirmation | A PurchaseOrderConfirmation is a confirmation, partial confirmation, or change from a seller to the purchaser, regarding the requested delivery of goods or provision of services. |
| Purchase Order Information | A PurchaseOrderInformation is information from a purchasing system for interested recipients about the current state of a purchase order when creating or changing a purchase order, confirming a purchase order or canceling a purchase order. |
| Purchase Order Planning Notification | A PurchaseOrderPlanningNotification is a message by means of which planning applications are notified about those aspects of a purchase order that are relevant for planning. |
| Purchase Requirement Request | A PurchaseRequirementRequest is a request from a requestor to a purchaser to (externally) procure products (materials, services) (external procurement). |
| Purchase Order Requirement Confirmation | A PurchaseRequirementConfirmation is a notice from the purchaser to the requestor about the degree of fulfillment of a requirement. |
| Product Demand Influencing Event Notification | A ProductDemandInfluencingEventNotification is a notification about an event which influences the supply or demand of products. |
| Product Forecast Notification | A ProductForecastNotification is a notification about future product demands (forecasts). |
| Product Forecast Revision Notification | A ProductForecastRevisionNotification is a notification about the revision of future product demands (forecasts). |
| Product Activity Notification | A ProductActivityNotification is a message which communicates product-related activities of a buyer to a vendor. Based on this, the vendor can perform supply planning for the buyer. |
| RFQ Request | An RFQRequest is the request from a purchaser to a bidder to participate in a request for quotation for a product. |
| RFQ Change Request | An RFQChangeRequest is a change to the purchaser's request for a bidder to participate in the request for quotation for a product. |
| RFQ Cancellation Request | An RFQCancellationRequest is a cancellation by the purchaser of a request for quotation for a product. |
| RFQ Result Notification | An RFQResultNotification is a notification by a purchaser to a bidder about the type and extent of the acceptance of a quote or about the rejection of the quote. |
| Quote Notification | A QuoteNotification is the quote of a bidder communicated to a purchaser concerning the request for quotation for a product by the purchaser. |
| Sales Order Fulfillment Request | A SalesOrderFulfillmentRequest is a request (or change or cancellation of such a request) from a selling component to a procuring component, to fulfill the logistical requirements (e.g., available-to-promise check, scheduling, requirements planning, procurement, and delivery) of a sales order. |
| Sales Order Fulfillment Confirmation | A SalesOrderFulfillmentConfirmation is a confirmation, partial confirmation or change from the procuring component to the selling component, regarding a sales order with respect to which procurement has been requested. |
| Order ID Assignment Notification | An OrderIDAssignmentNotification is a message that allows a buyer to assign a vendor order numbers for identifying "purchase orders generated by the vendor." |
| Delivery Execution Request | A DeliveryExecutionRequest is a request to a warehouse or supply chain execution to prepare and execute the outbound delivery of goods or the acceptance of an expected or announced inbound delivery. |
| Delivery Information | A DeliveryInformation is a message about the creation, change, and execution status of a delivery. |
| Despatched Delivery Notification | A DespatchedDeliveryNotification is a notification communicated to a product recipient about the planned arrival, pickup, or issue date of a ready-to-send delivery, including details about the content of the delivery. |
| Received Delivery Notification | A ReceivedDeliveryNotification is a notification communicated to a vendor about the arrival of the delivery sent by him to the product recipient, including details about the content of the delivery. |

-continued

| Name | Description |
|---|---|
| Delivery Schedule Notification | A DeliveryScheduleNotification is a message that is sent from a buyer to a vendor to notify the latter about the quantity of a product to be delivered with a certain liability at a certain date in accordance with a given scheduling agreement between buyer and vendor. |
| Vendor Generated Order Notification | A VendorGeneratedOrderNotification is a message that is used by a vendor/seller to transfer the replenishment order that he has initiated and planned to a customer/buyer so that the latter can create a purchase order. The notification sent by the vendor/seller to the customer/buyer regarding the planned replenishment order can be regarded as a "purchase order generated by the seller." |
| Vendor Generated Order Confirmation | VendorGeneratedOrderConfirmation is the confirmation from a customer/buyer that a purchase order has been created for the replenishment order initiated and planned by his vendor/seller. This confirmation from the customer/buyer for a "purchase order generated by the seller" can be regarded as a "purchase order" in the traditional sense, which, in turn, triggers the corresponding fulfillment process at the vendor/seller. |
| Replenishment Order Notification. | A ReplenishmentOrderNotification is a message that is used by Logistics Planning (SCP, vendor) to transfer a replenishment order planned for a customer/buyer to Logistics Execution (SCE, vendor) in order to trigger further processing for the order and prepare the outbound delivery. |
| Replenishment Order Confirmation | A ReplenishmentOrderConfirmation is a message that is used by Logistics Execution (SCE, vendor) to confirm to Logistics Planning (SCP, vendor) that a replenishment order that is planned for a customer/buyer can be fulfilled. |
| Service Acknowledgement Request | A ServiceAcknowledgementRequest is a request by a seller to a purchaser to confirm the services recorded. |
| Service Acknowledgement Confirmation | A ServiceAcknowledgementConfirmation is a confirmation (or rejection) of the services recorded. |
| Inventory Change Notification | An InventoryChangeNotification is a summery of detailed information about inventory changes in inventory management, which is required for logistics planning. |
| Inventory Change Accounting Notification | An InventoryChangeAccountingNotification is a summary of aggregated information about inventory changes in inventory management, which is required for financials. |
| Inventory Change Accounting Cancellation Request | An InventoryChangeAccountingCancellationRequest is a request for the full cancellation of posting information previously sent to financials with respect to a goods movement. |
| Billing Due Notification | A BillingDueNotification is a notification about billing-relevant data communicated to an application in which the subsequent operative processing of billing takes place. |
| Invoicing Due Notification | An InvoicingDueNotification is a notification about invoicing-relevant data communicated to an application in which the operative verification and creation of invoices takes place, and/or in which "self billing" invoices (evaluated receipt settlement) are created. |
| Invoice Request | An InvoiceRequest is a legally binding notice about accounts receivable or accounts payable for delivered goods or provided services - typically a request that payment be made for these goods or services. |
| Invoice Confirmation | An InvoiceConfirmation is the response of a recipient of an invoice to the bill-from-party by which the invoice as a whole is confirmed, rejected, or classified as "not yet decided." |
| Invoice Issued Information | An InvoiceIssuedInformation is information about provided services, delivered products, or credit or debit memo request items that have been billed, the items of an invoice that have been used for this, and the extent to which they have been billed. |
| Invoice Accounting Notification | An InvoiceAccountingNotification is a notification to financials about information on incoming or outgoing invoices from invoice verification or billing. |
| Invoice Accounting Cancellation Request | An InvoiceAccountingCancellationRequest is a request for the full cancellation of posting information previously sent to financials, regarding an incoming or outgoing invoice or credit memo. |
| Tax Due Notification | A TaxDueNotification communicates data from tax determination and calculation relevant for tax reports and tax payments to the tax register of a company. |

-continued

| Name | Description |
|---|---|
| Payment Due Notification | A PaymentDueNotification notifies an application (Payment), in which subsequent operative processing of payments take place, about due dates (accounts receivable and accounts payable) of business partners. |
| Credit Agency Report Query | A CreditAgencyReportQuery is an inquiry to a credit agency concerning the credit report for a business partner. |
| Credit Agency Report Response | A CreditAgencyReportResponse is a response from a credit agency concerning the inquiry about the credit report for a business partner. |
| Credit Worthiness Query | A CreditWorthinessQuery is an inquiry to credit management concerning the credit worthiness of a business partner. |
| Credit Worthiness Response | A CreditWorthinessResponse is a response from credit management concerning the inquiry about the credit worthiness of a business partner. |
| Credit Worthiness Change Information | A CreditWorthinessChangeInformation is information about changes of the credit worthiness of a business partner. |
| Credit Commitment Query | A CreditCommitmentQuery is an inquiry from credit management concerning existing payment obligations of a business partner. |
| Credit Commitment Response | A CreditCommitmentResponse is a response concerning an inquiry from credit management about existing payment obligations of a business partner. |
| Credit Commitment Record Notification | A CreditCommitmentRecordNotification is a notice to credit management about existing payment obligations of business partners. |
| Credit Worthiness Critical Parties Query | A CreditWorthinessCriticalPartiesQuery is an inquiry to credit management about business partners, for which the credit worthiness has been rated as critical. |
| Credit Worthiness Critical Parties Response | A CreditWorthinessCriticalPartiesResponse is a response from credit management concerning an inquiry about business partners, for which the credit worthiness has been rated as critical. |
| Credit Payment Record Notification | A CreditPaymentRecordNotification is a notice to credit management about the payment behavior of business partners. |
| Personnel Time Sheet Information | A PersonnelTimeSheetInformation communicates recorded personnel times and personnel time events from an upstream personnel time recording system to personnel time management. |

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
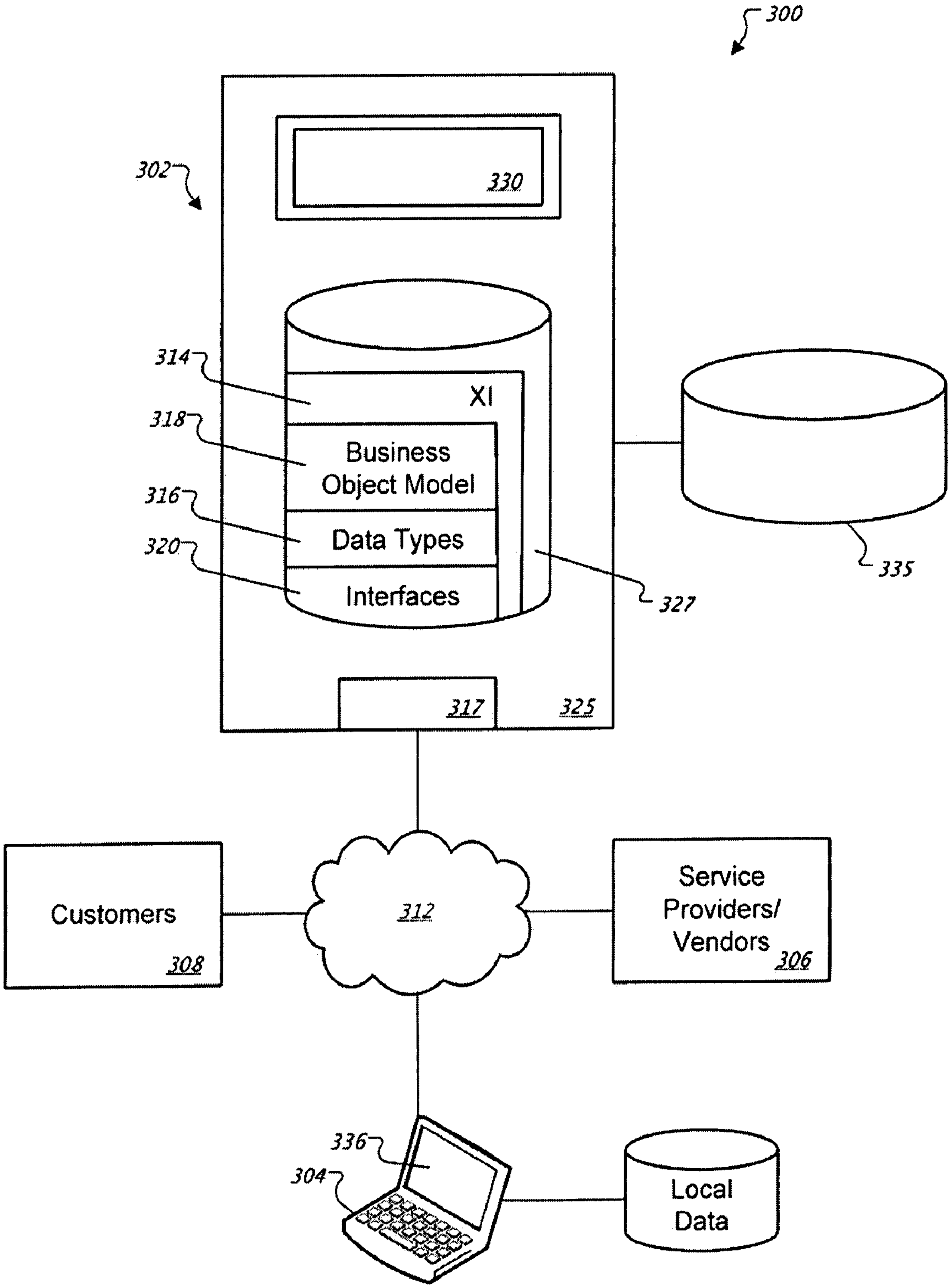
FIG. 3A illustrates an example system for the transmission of data between a client and a hosted software application by an object property setter, in accordance with certain embodiments included in the present disclosure.

Turning to the illustrated embodiment in FIG. 3A, system 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with system 300. Generally, FIG. 3A provides merely one example of computers that may be used with the disclosure. Each computer is generally intended to encompass any suitable processing device. For example, although FIG. 3A illustrates one server 302 that may be used with the disclosure, system 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or offshore, so long as it remains operable to store information associated with the system 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java® and ABAP). XI 314 is based on an open architecture, and makes use of open standards, such as eXtensible Markup Language (XML)™ and Java® environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
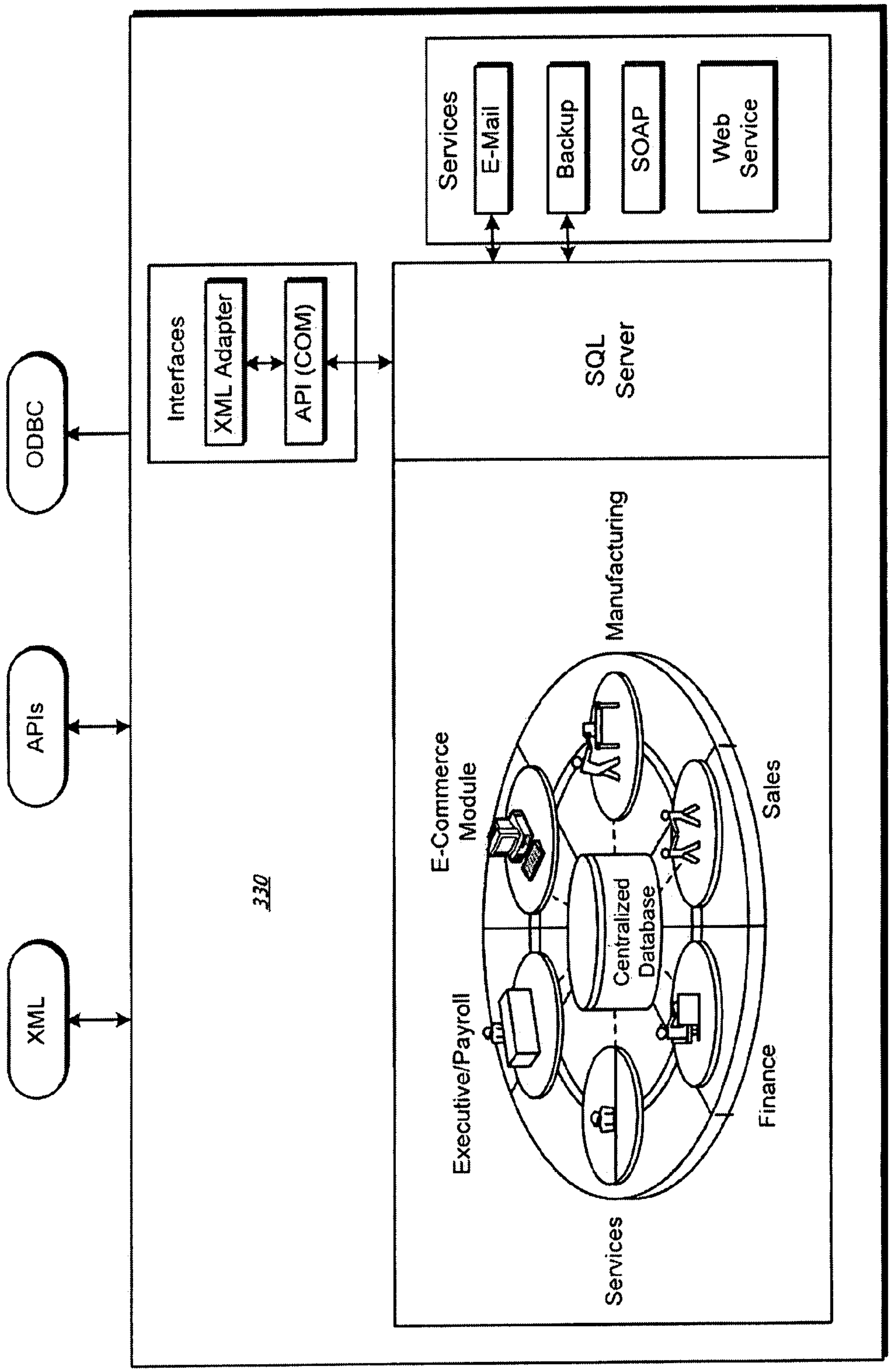
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 130 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, system 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of system 300. It should be understood that automatically further contemplates any suitable administrator or other user interaction with application 330 or other components of system 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in system 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use system 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with system 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of system 300 for any suitable purpose, such as viewing application or other transaction data. Generally, GUI 336 provides the particular user with an efficient and user-friendly presentation of data provided by or communicated within system 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in system 300 and efficiently presents the results to the user. Server 302 can accept data from client 304 via the web browser (e.g., Microsoft Internet Explorer or Netscape Navigator) and return the appropriate HTML or XML responses to the browser using network 312.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
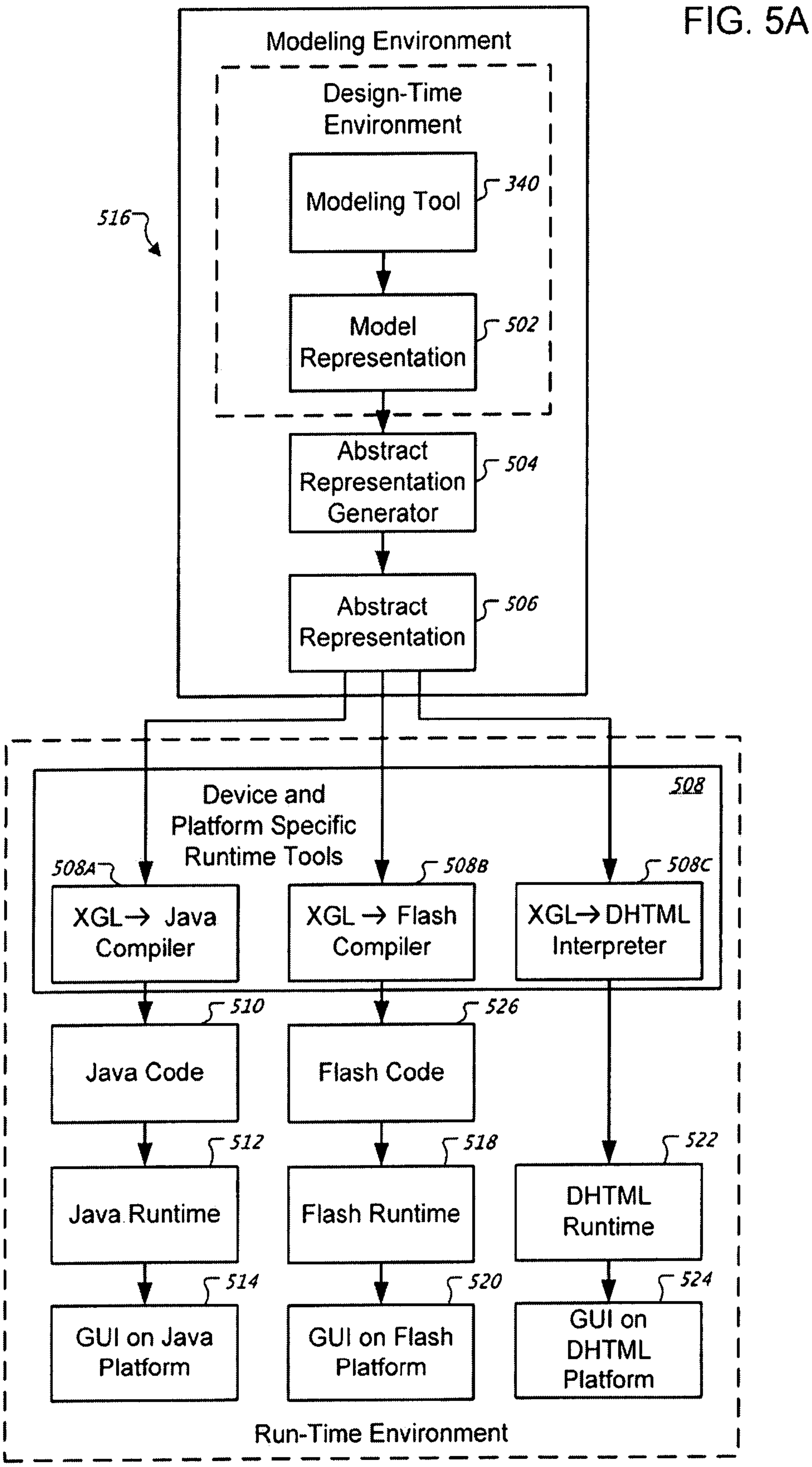
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 may be a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508*a* may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508*b* may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508*c* may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
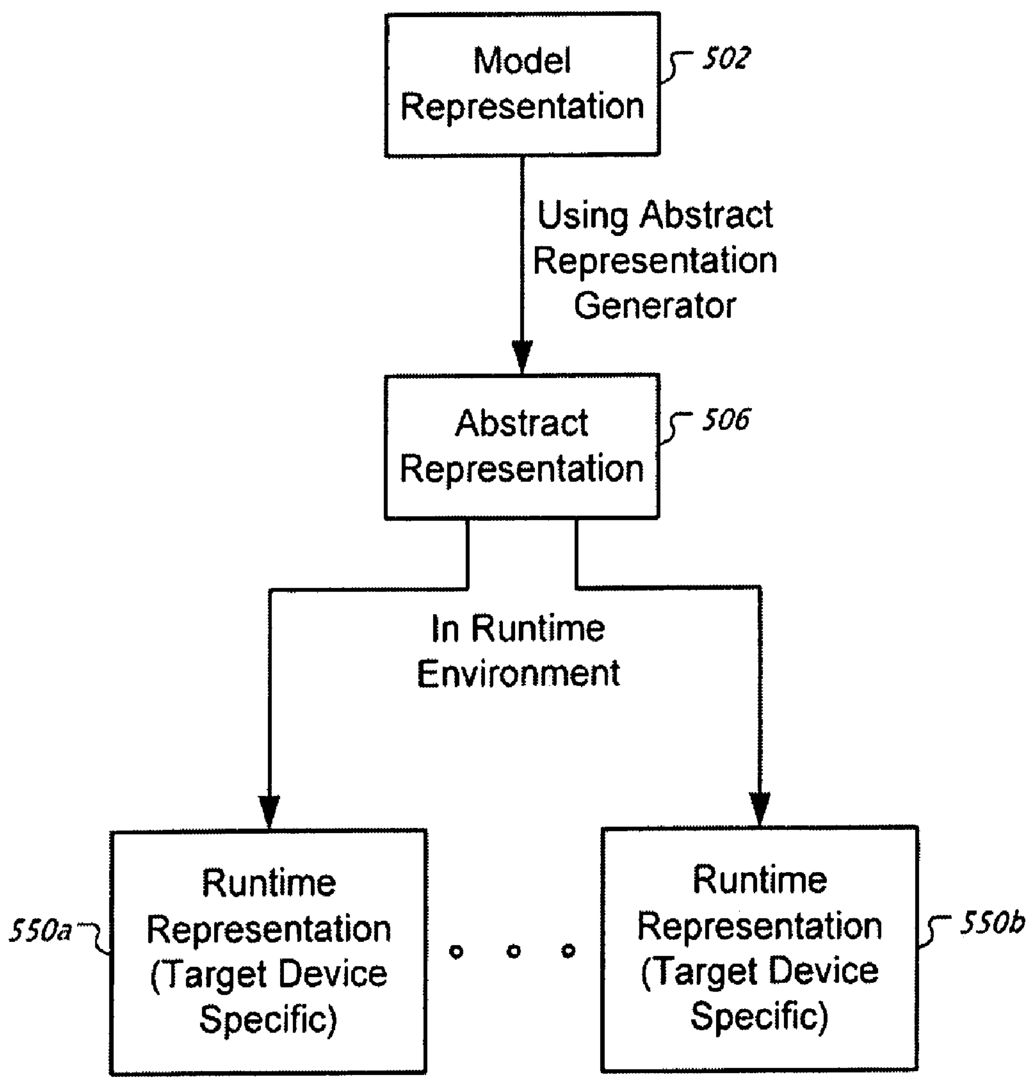
FIG. 5B depicts a simplified process for mapping a model representation to a runtime representation using the example development environment of FIG. 4A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

Message Overview

To perform an end-to-end business transaction, consistent interfaces are used to create business documents that are sent within messages between heterogeneous programs or modules.

Message Categories

Figure 6:
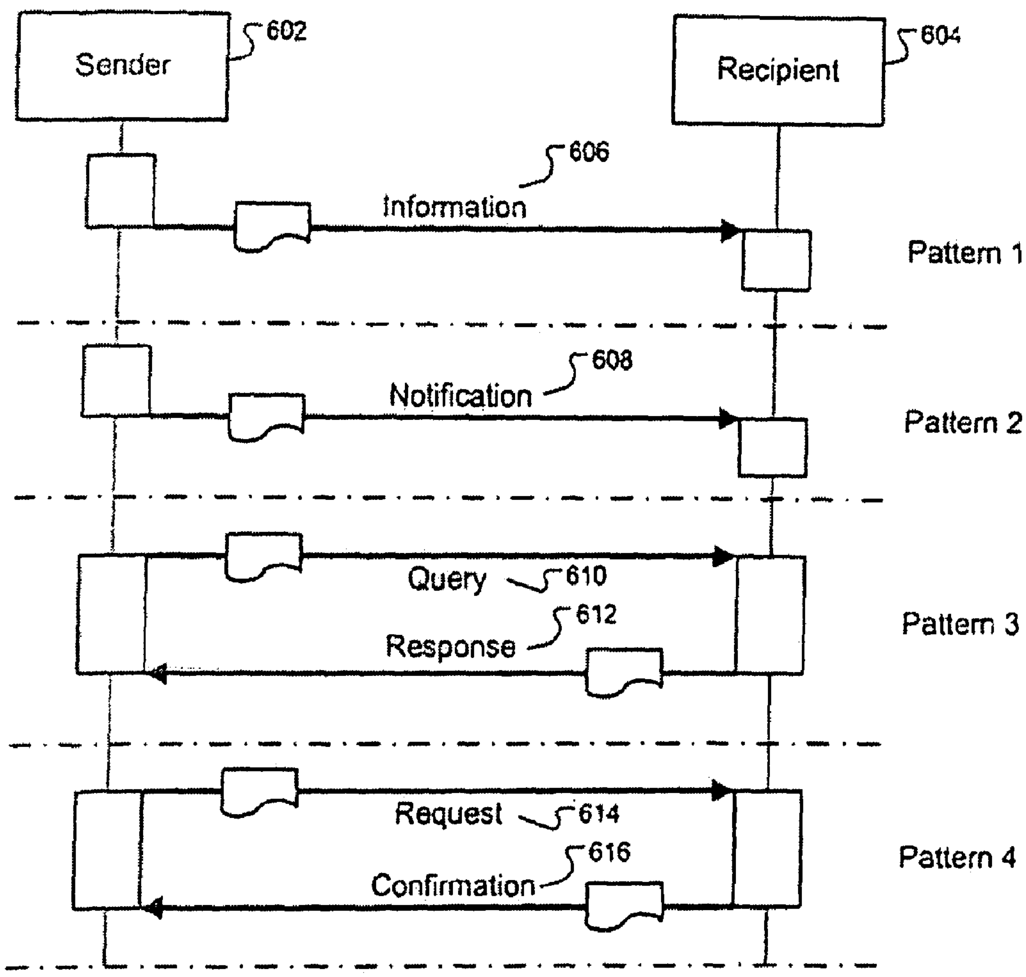
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

A business object is a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

Data Types

Data types are used to type object entities and interfaces with a structure. This typing can include business semantic. For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

Packages

Packages group the entities in the business object model and the resulting interfaces into groups of semantically associated information. Packages also may include "sub"-packages, i.e., the packages may be nested.

Figure 7:
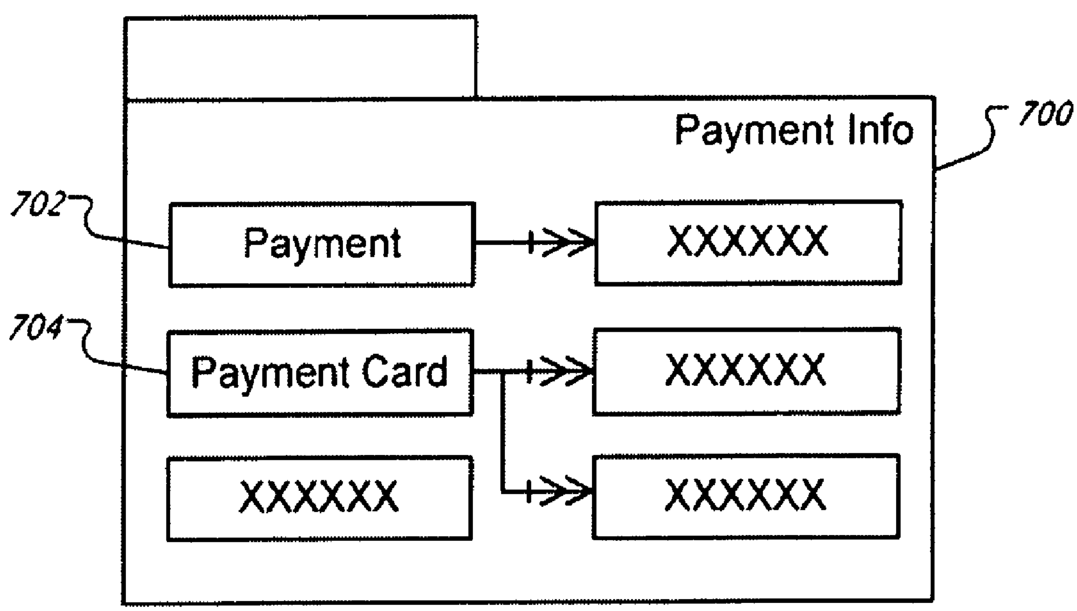
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
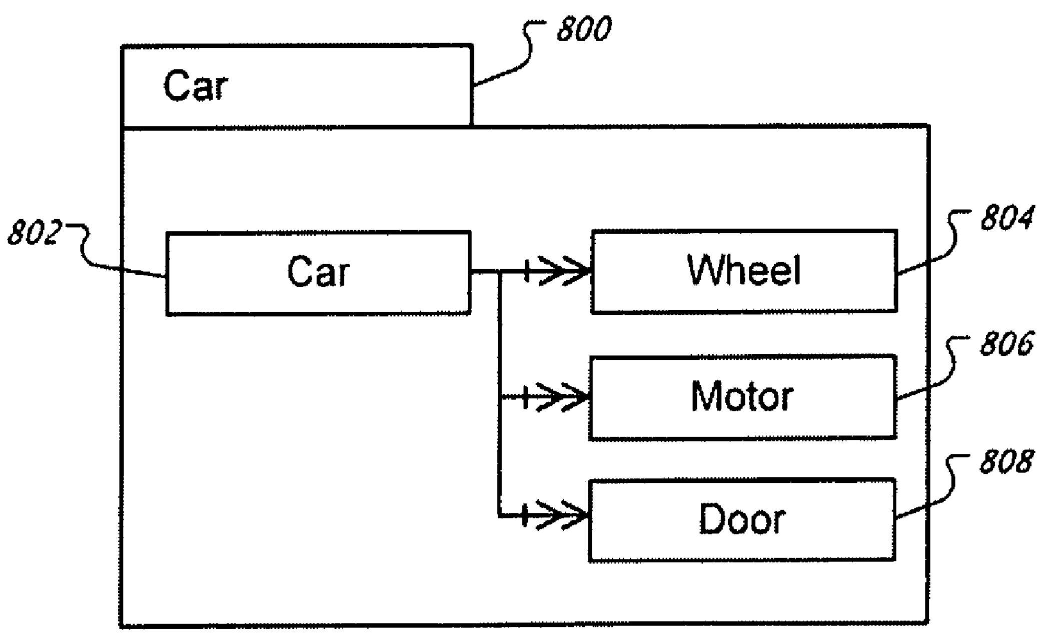
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
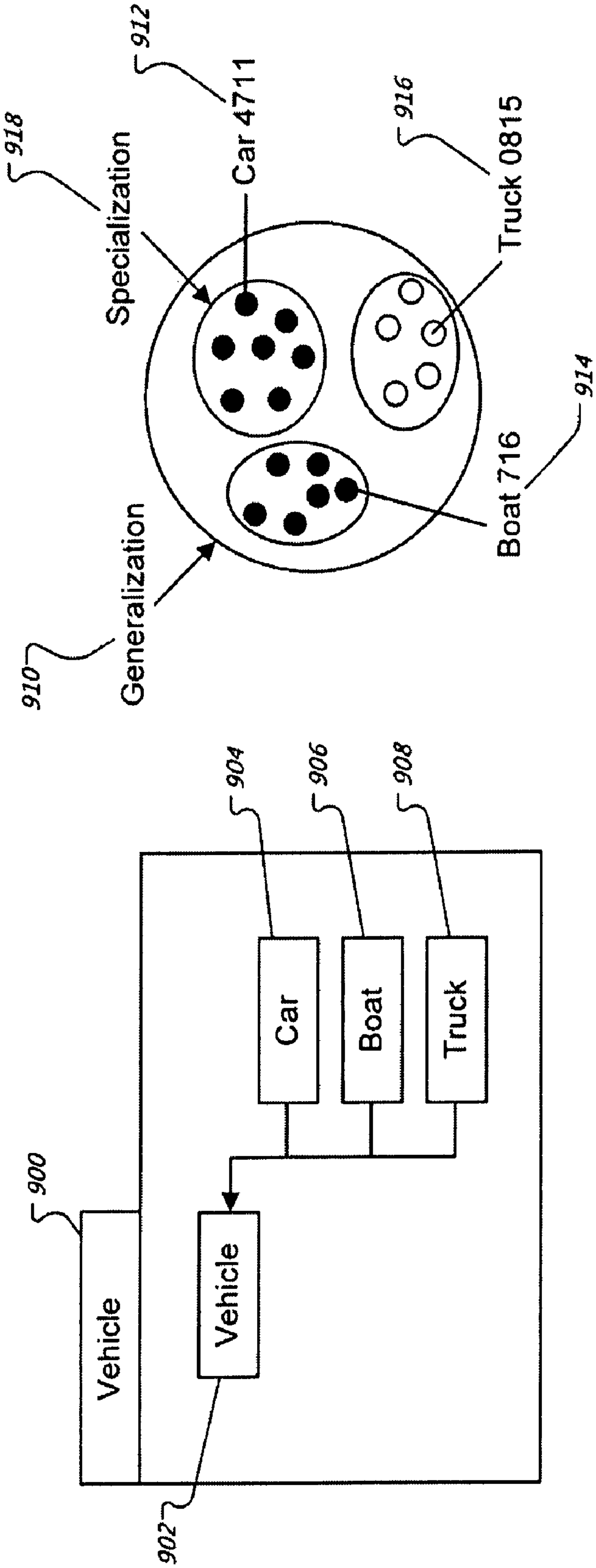
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
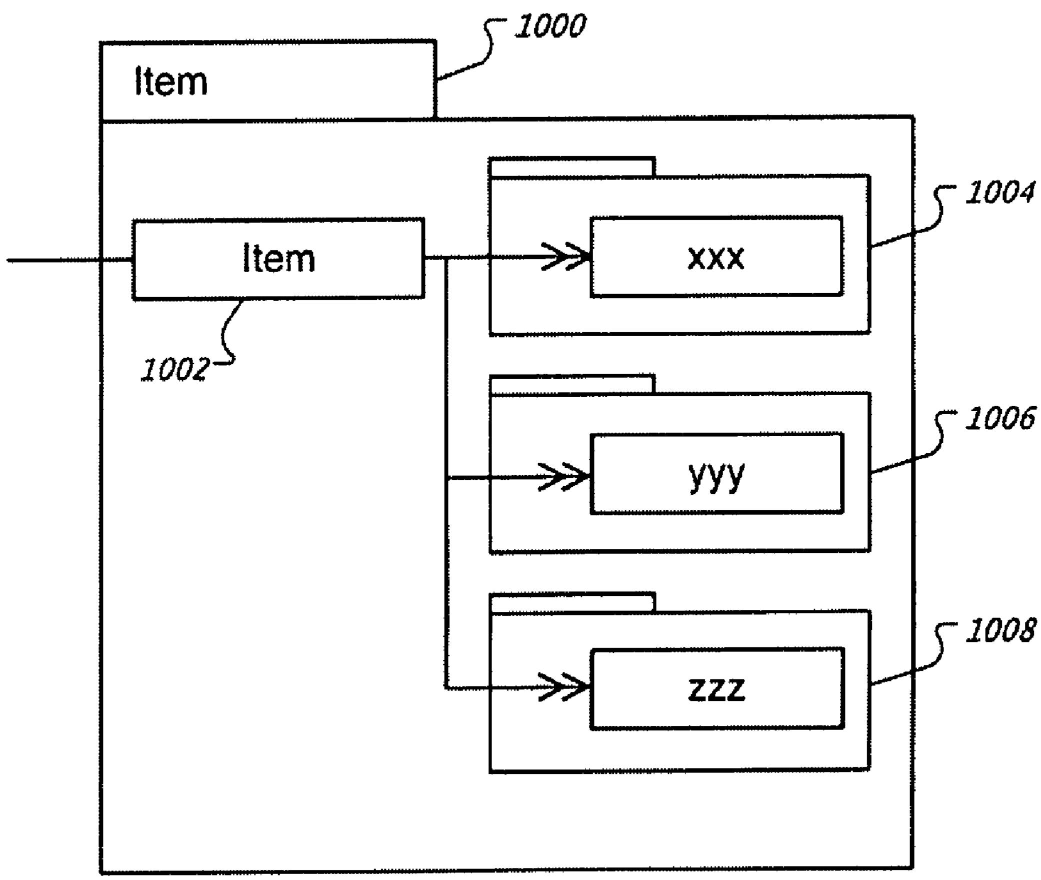
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
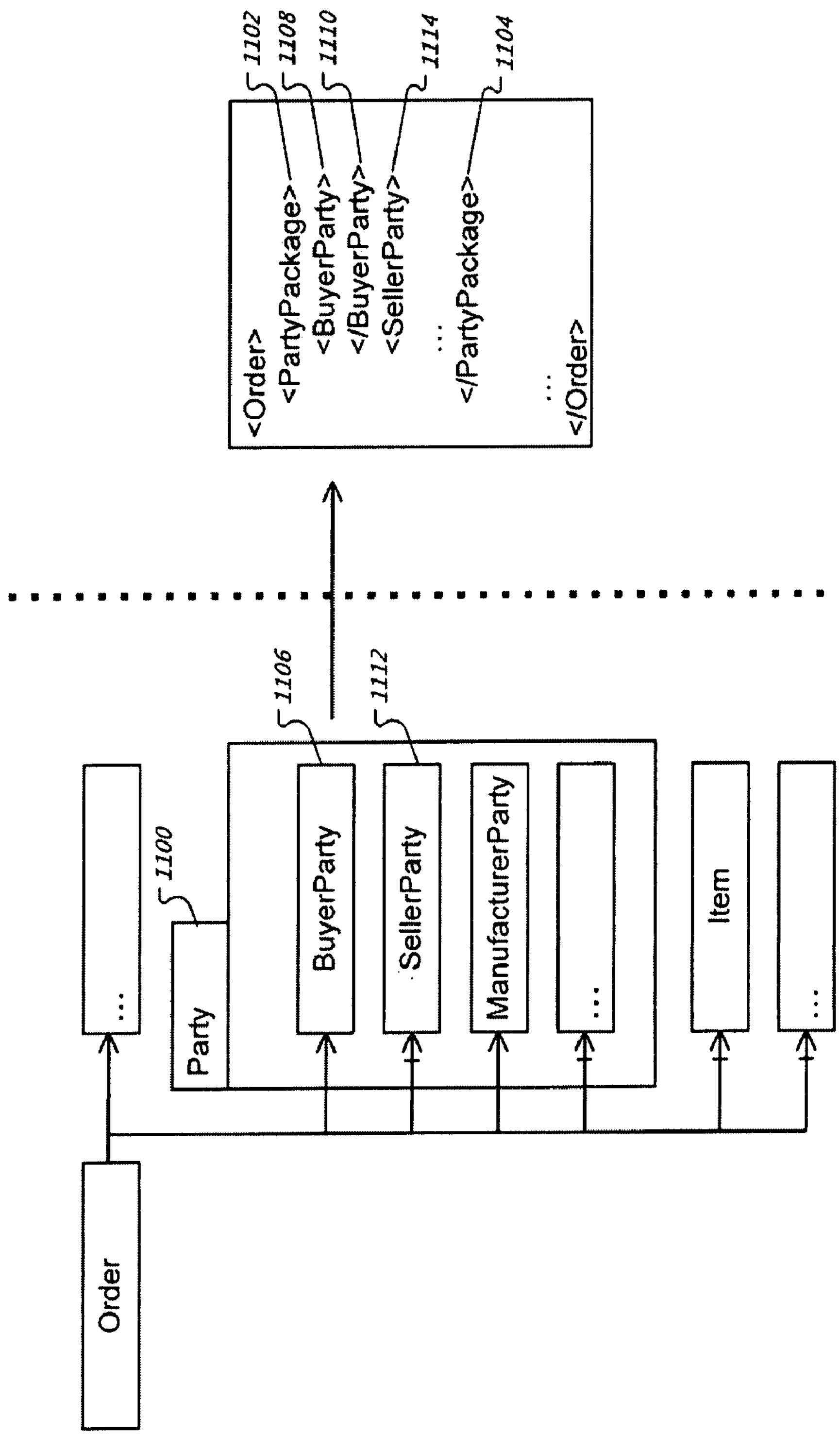
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

Relationships

Relationships describe the interdependencies of the entities in the business object model, and are thus an integral part of the business object model.

Cardinality of Relationships

Figure 12:
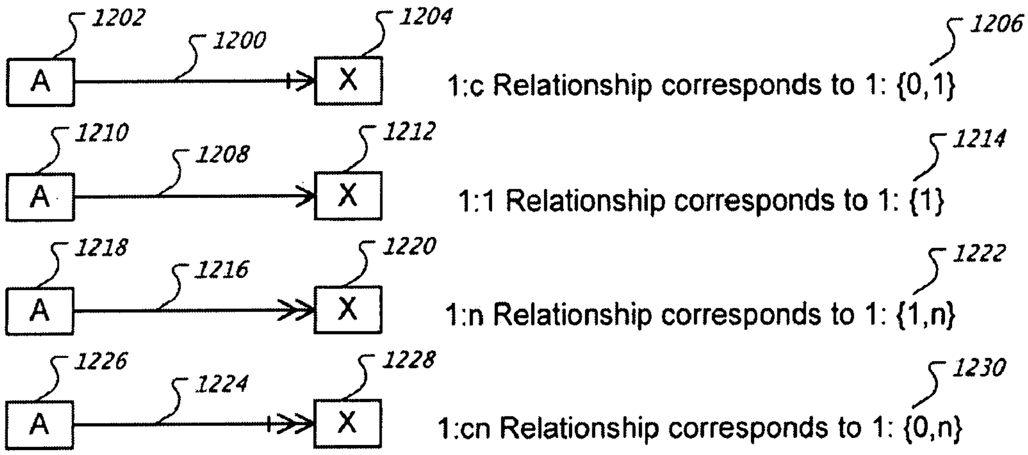
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

Types of Relationships

Composition

Figure 13:
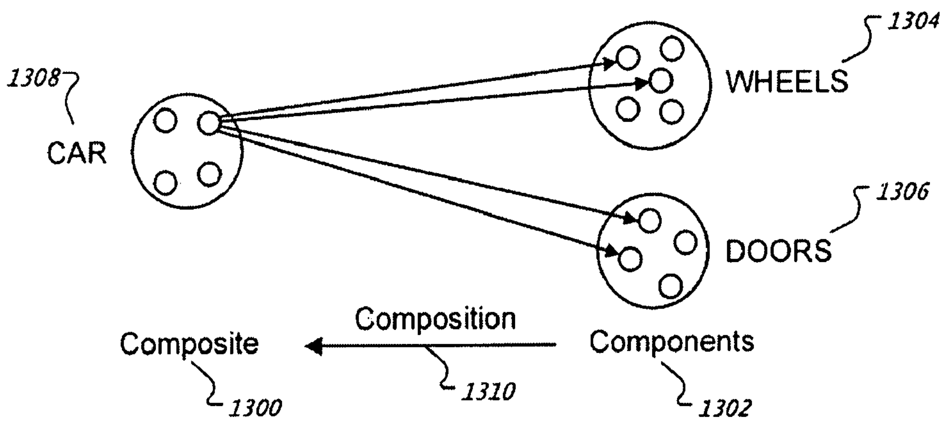
FIG. 13 depicts an example of a composition in accordance with methods and systems consistent with the subject matter described herein.
Figure 14:
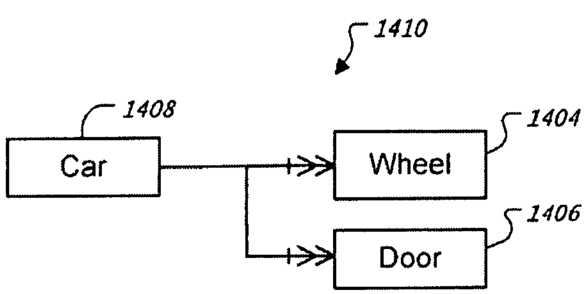
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

Aggregation

Figure 15:
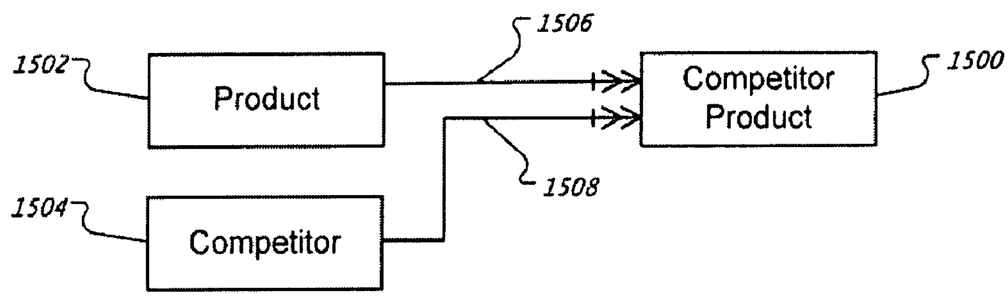
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

Association

Figure 16:
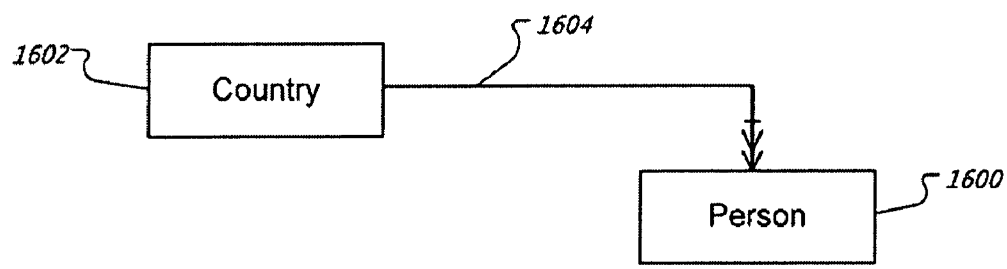
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

Specialization

Figure 17:
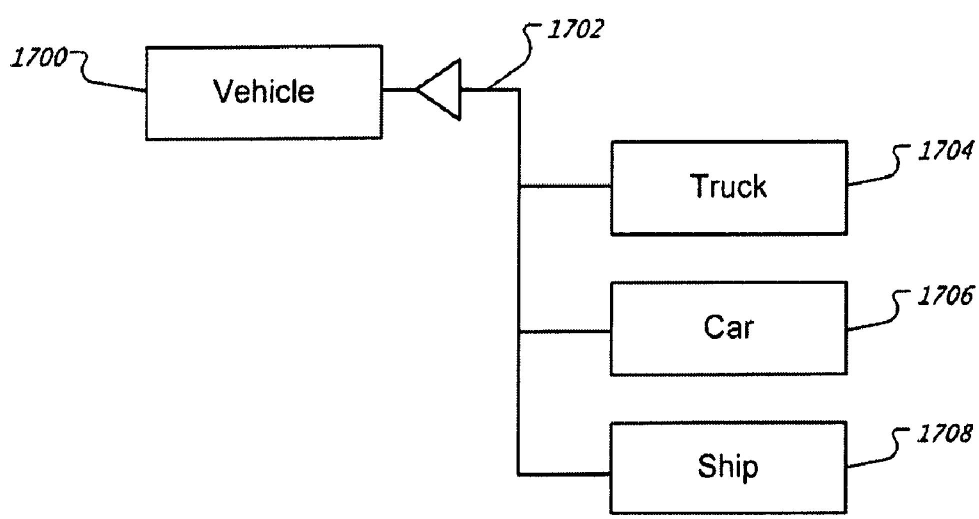
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
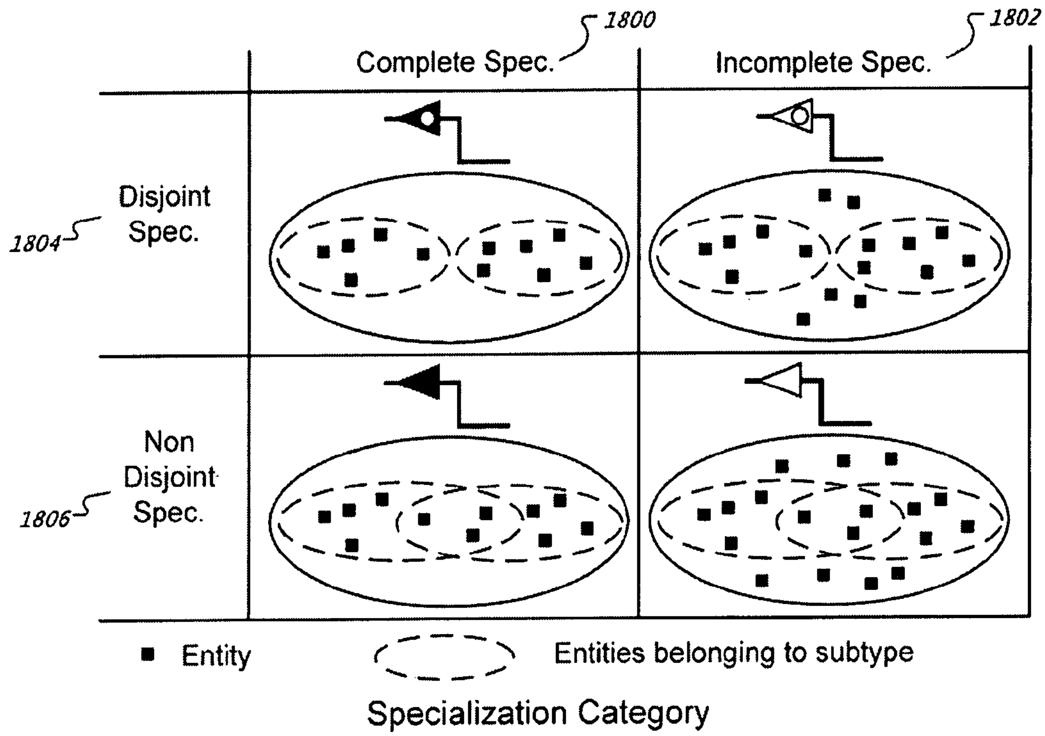
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

Structural Patterns

Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

Hierarchy

Figure 19:
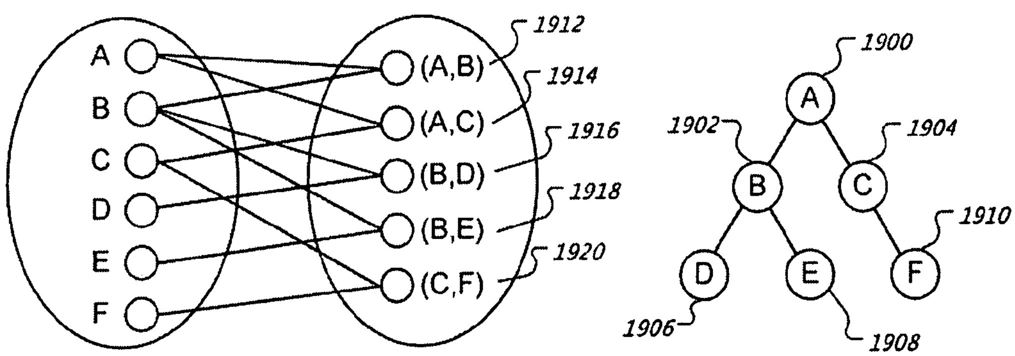
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
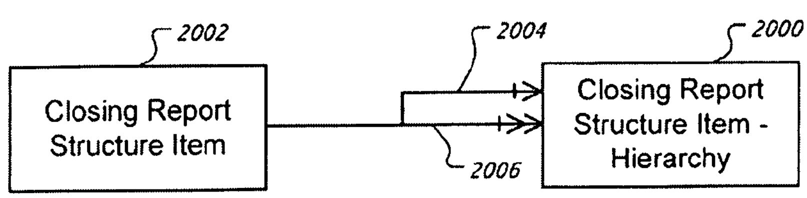
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

Creation of the Business Object Model

Figure 21A:
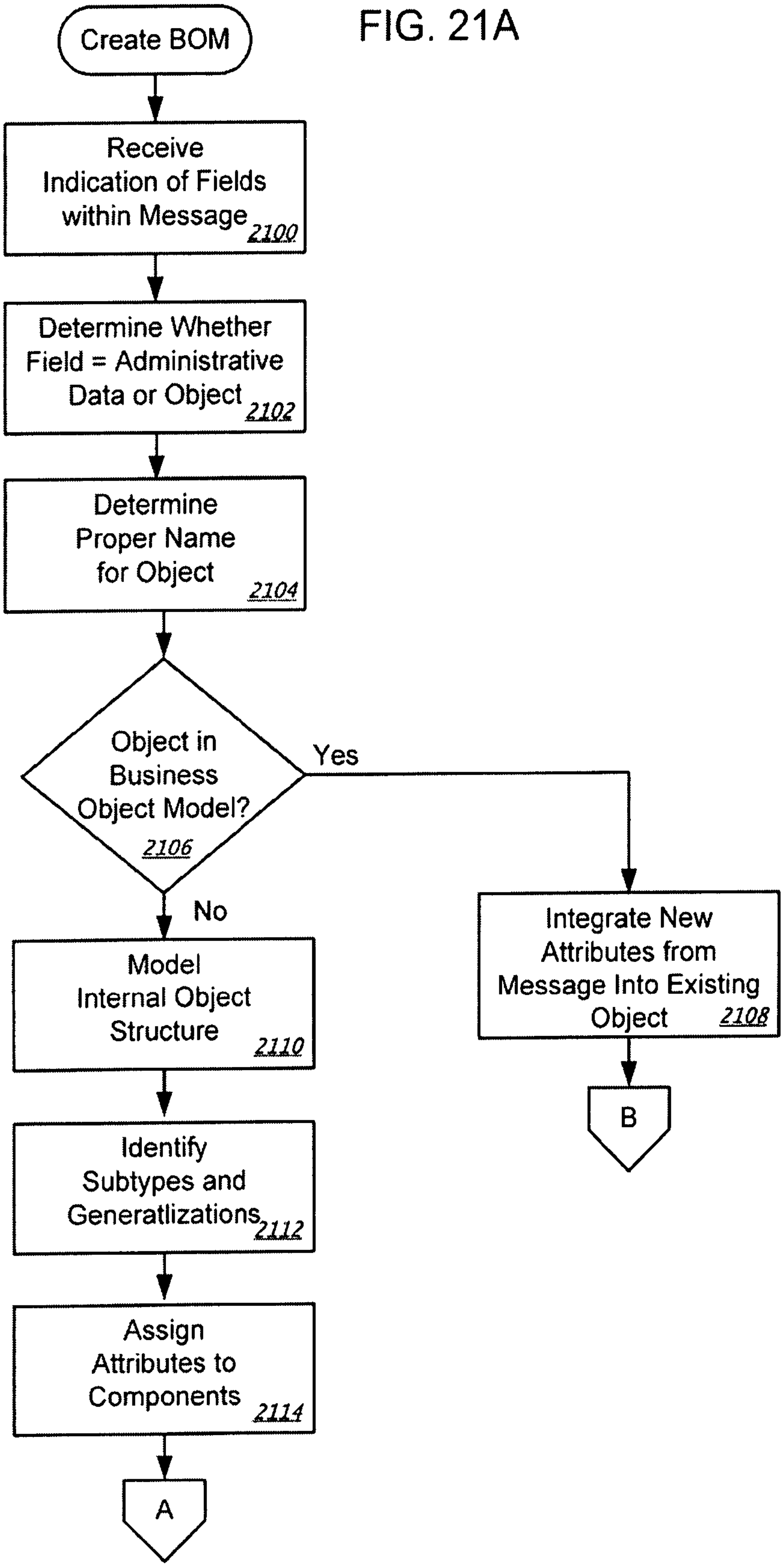
FIGS. 21A-B depict a flow diagram of the steps performed to create a business object model in accordance with methods and systems consistent with the subject matter described herein.
Figure 21B:
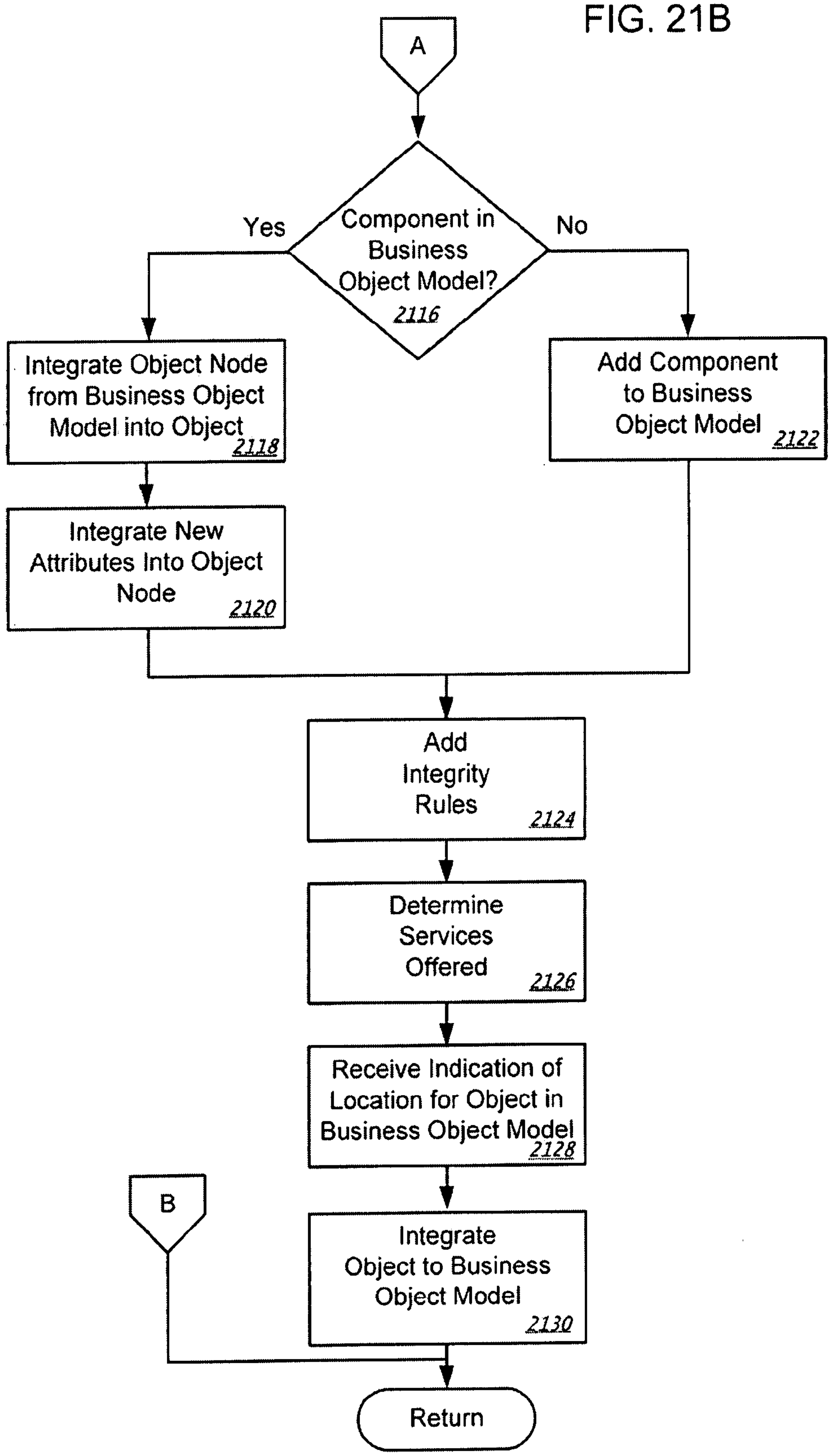

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main |
| AdditionalID | Object |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |
| Holder | |
| ExpirationDate | |
| AttachmentID | |
| AttachmentFilename | |
| DescriptionofMessage | |
| ConfirmationDescriptionof Message | |
| FollowUpActivity | |
| ItemID | |
| ParentItemID | |
| HierarchyType | |
| ProductID | |
| ProductType | |
| ProductNote | |
| ProductCategoryID | |

-continued

| |
|---|
| Amount |
| BaseQuantity |
| ConfirmedAmount |
| ConfirmedBaseQuantity |
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | |
|---|---|---|
| ID | Purchase Order | |
| AdditionalID | | |
| PostingDate | | |
| LastChangeDate | | |
| AcceptanceStatus | | |
| Note | | |
| CompleteTransmission Indicator | | |
| Buyer | | Buyer |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | | Seller |
| SellerAddress | | |

-continued

| | | |
|---|---|---|
| Location | Location | |
| LocationType | | |
| DeliveryItemGroupID | DeliveryTerms | |
| DeliveryPriority | | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |
| ItemID | Purchase Order | |
| ParentItemID | Item | |
| HierarchyType | | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation Name | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobilNumber | | |
| Facsimile | | |
| Email | | |
| ItemSeller | | Seller |
| ItemSellerAddress | | |
| ItemLocation | | Location |
| ItemLocationType | | |
| ItemDeliveryItemGroupID | | |
| ItemDeliveryPriority | | |
| ItemDeliveryCondition | | |
| ItemTransferLocation | | |
| ItemNumberofPartial Delivery | | |
| ItemQuantityTolerance | | |
| ItemMaximumLeadTime | | |
| ItemTransportServiceLevel | | |
| ItemTranportCondition | | |
| ItemTransportDescription | | |
| ContractReference | | Contract |
| QuoteReference | | Quote |
| CatalogueReference | | Catalogue |

-continued

| |
|---|
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscountTerms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation | | | 0 . . . 1 |
| | Description | | | |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetUnitPrice | 0 . . . 1 |
| | | ConfirmedPrice | | 0 . . . 1 |
| | | | NetUnitPrice | 0 . . . 1 |
| | | Buyer | | 0 . . . 1 |
| | | Seller | | 0 . . . 1 |
| | | Location | | 0 . . . 1 |
| | | DeliveryTerms | | 0 . . . 1 |
| | | Attachment | | 0 . . . n |
| | | Description | | 0 . . . 1 |
| | | ConfirmationDescription | | 0 . . . 1 |
| | | ScheduleLine | | 0 . . . n |
| | | | DeliveryPeriod | 1 |
| | | ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | |
|---|---|---|---|
| Purchase Order | | | 1 |
| | PurchaseOrder Update | | |
| | | PurchaseOrder Request | |
| | | PurchaseOrder Change | |
| | | PurchaseOrder Confirmation | |

-continued

| | | | | |
|---|---|---|---|---|
| PurchaseOrder Cancellation PurchaseOrder Information | | | | |
| Party | | | | |
| | BuyerParty | | | 0 . . . 1 |
| | | Address | | 0 . . . 1 |
| | | ContactPerson | | 0 . . . 1 |
| | | | Address | 0 . . . 1 |
| | SellerParty | | | 0 . . . 1 |
| Location | | | | |
| | ShipToLocation | | | 0 . . . 1 |
| | | Address | | 0 . . . 1 |
| | ShipFromLocation | | | 0 . . . 1 |
| | | Address | | 0 . . . 1 |
| DeliveryTerms | | | | 0 . . . 1 |
| | Incoterms | | | 0 . . . 1 |
| | PartialDelivery | | | 0 . . . 1 |
| | QuantityTolerance | | | 0 . . . 1 |
| | Transport | | | 0 . . . 1 |
| CashDiscount Terms | | | | 0 . . . 1 |
| | MaximumCash Discount | | | 0 . . . 1 |
| | NormalCashDiscount | | | 0 . . . 1 |
| PaymentForm | | | | 0 . . . 1 |
| | PaymentCard | | | 0 . . . 1 |
| Attachment | | | | 0 . . . n |
| Description | | | | 0 . . . 1 |
| Confirmation Description | | | | 0 . . . 1 |
| Item | | | | 0 . . . n |
| | HierarchyRelationship | | | 0 . . . 1 |
| | Product | | | 0 . . . 1 |
| | ProductCategory | | | 0 . . . 1 |
| | Price | | | 0 . . . 1 |
| | | NetUnitPrice | | 0 . . . 1 |
| | ConfirmedPrice | | | 0 . . . 1 |
| | | NetUnitPrice | | 0 . . . 1 |
| | Party | | | |
| | | BuyerParty | | 0 . . . 1 |
| | | SellerParty | | 0 . . . 1 |
| | Location | | | |
| | | ShipTo Location | | 0 . . . 1 |
| | | ShipFrom Location | | 0 . . . 1 |
| | DeliveryTerms | | | 0 . . . 1 |
| | Attachment | | | 0 . . . n |
| | Description | | | 0 . . . 1 |
| | Confirmation Description | | | 0 . . . 1 |
| | ScheduleLine | | | 0 . . . n |
| | | Delivery Period | | 1 |
| | ConfirmedScheduleLine | | | 0 . . . n |

After identifying the subtypes and generalizations, the developers assign the attributes to these components (step 2114). The attributes for a portion of the components are shown below.

| | | |
|---|---|---|
| Purchase Order | | 1 |
| | ID | 1 |
| | SellerID | 0 . . . 1 |
| | BuyerPosting DateTime | 0 . . . 1 |
| | BuyerLast ChangeDate Time | 0 . . . 1 |
| | SellerPosting DateTime | 0 . . . 1 |
| | SellerLast ChangeDate Time | 0 . . . 1 |

-continued

| | | | |
|---|---|---|---|
| Acceptance StatusCode | | | 0 . . . 1 |
| Note | | | 0 . . . 1 |
| ItemList Complete Transmission Indicator | | | 0 . . . 1 |
| BuyerParty | | | 0 . . . 1 |
| | StandardID | | 0 . . . n |
| | BuyerID | | 0 . . . 1 |
| | SellerID | | 0 . . . 1 |
| | Address | | 0 . . . 1 |
| | ContactPerson | | 0 . . . 1 |
| | | BuyerID | 0 . . . 1 |
| | | SellerID | 0 . . . 1 |
| | | Address | 0 . . . 1 |
| SellerParty | | | 0 . . . 1 |
| Product RecipientParty | | | 0 . . . 1 |

-continued

| | | |
|---|---|---|
| VendorParty | | 0 . . . 1 |
| Manufacturer Party | | 0 . . . 1 |
| BillToParty | | 0 . . . 1 |
| PayerParty | | 0 . . . 1 |
| CarrierParty | | 0 . . . 1 |
| ShipTo Location | | 0 . . . 1 |
| | StandardID | 0 . . . n |
| | BuyerID | 0 . . . 1 |
| | SellerID | 0 . . . 1 |
| | Address | 0 . . . 1 |
| ShipFrom Location | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

Structure of the Business Object Model

The business object model, which serves as the basis for the process of generating consistent interfaces, includes the elements contained within the interfaces. These elements are arranged in a hierarchical structure within the business object model.

Interfaces Derived from Business Object Model

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. Communication between components takes place via messages that contain business documents. The business document ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object. The interface represents a usage-specific, hierarchical view of the underlying usage-neutral object model.

Figure 27A:
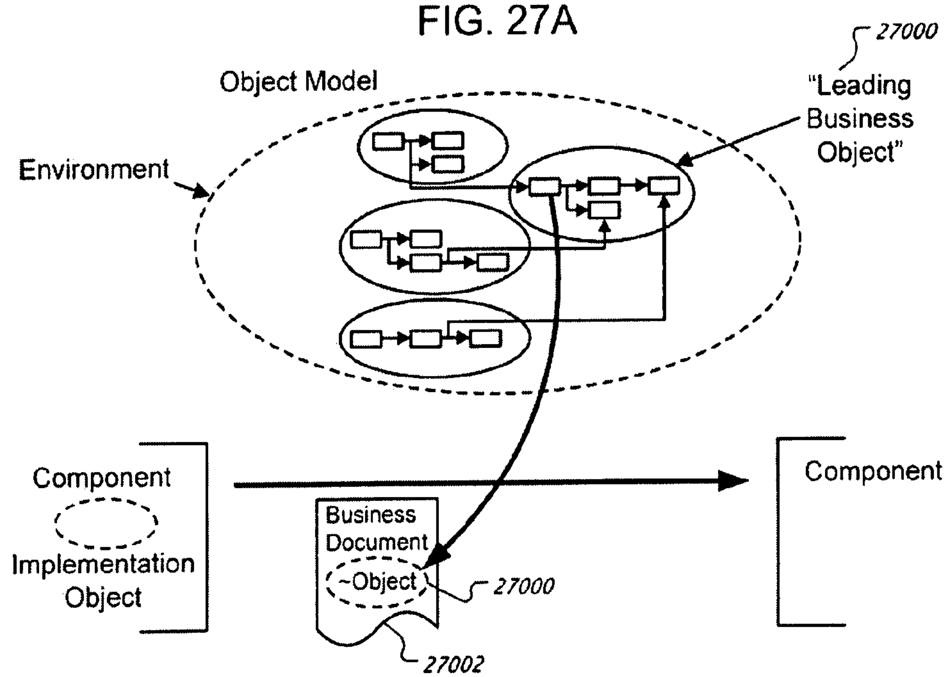
Figure 27B:
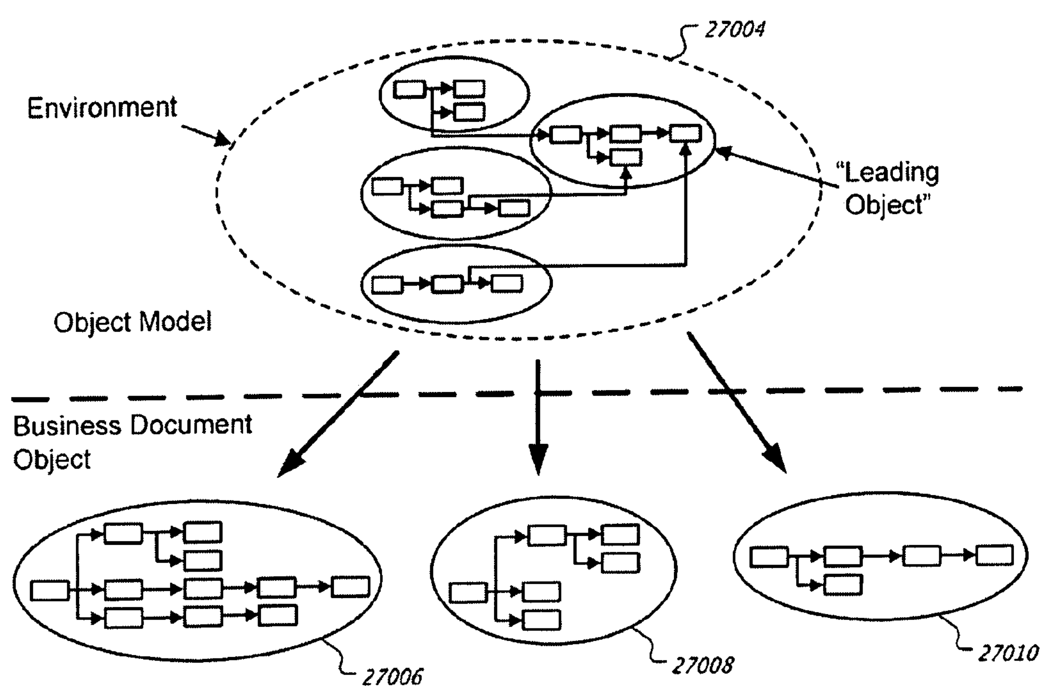

As illustrated in FIG. 27B, several business document objects 27006, 27008, and 27010 as overlapping views may be derived for a given leading object 27004. Each business document object results from the object model by hierarchization.

Figure 27C:
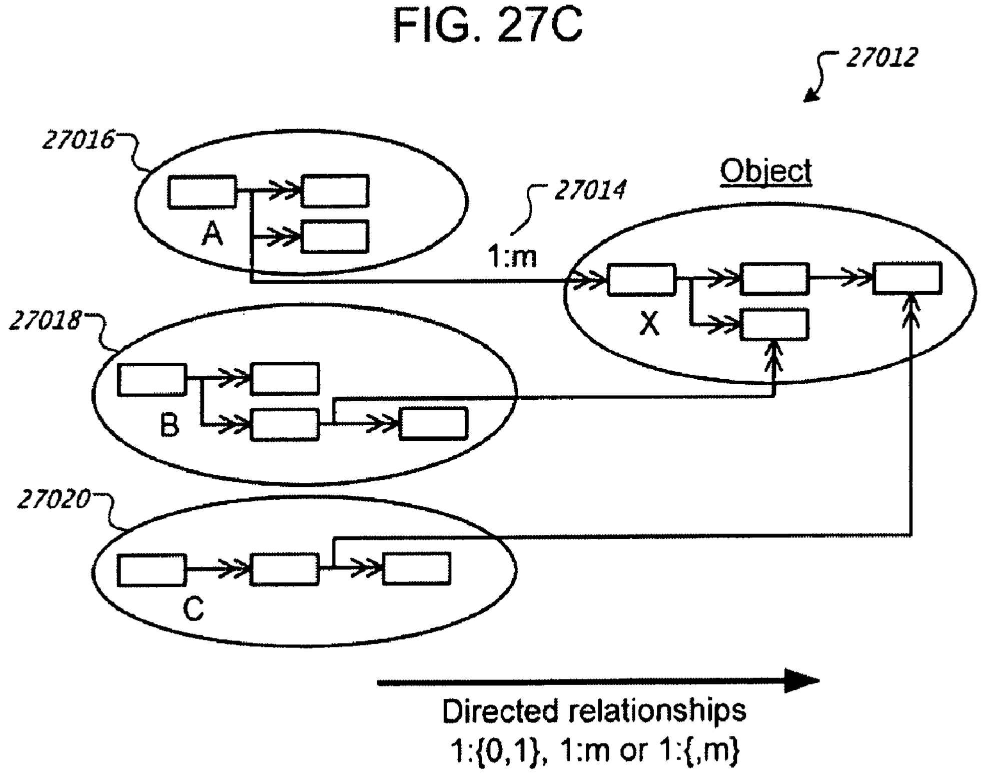

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
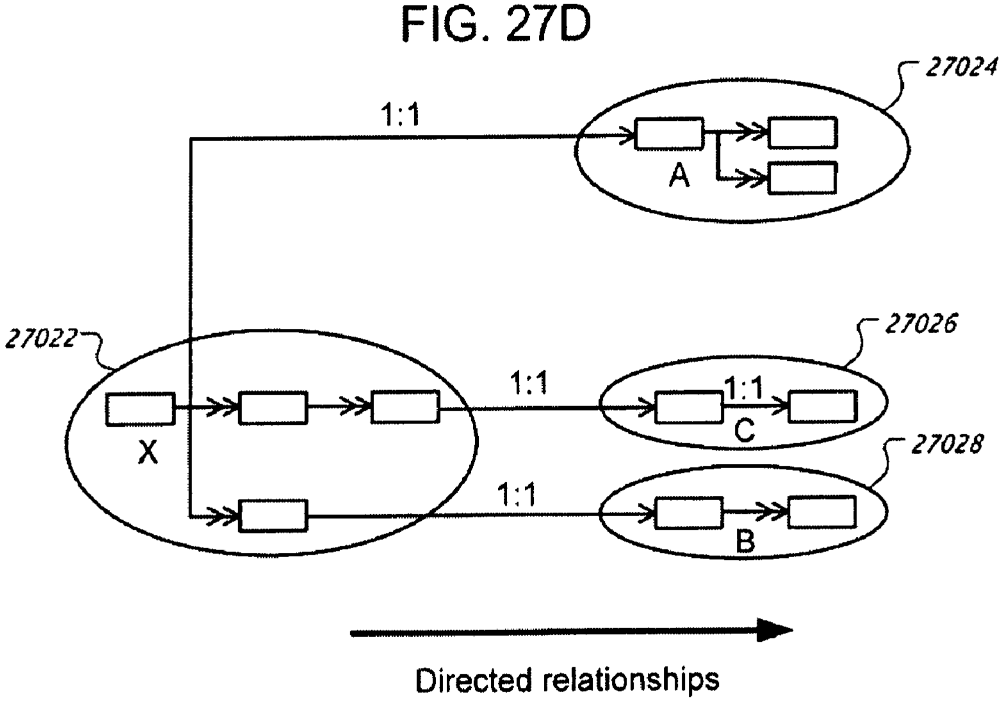

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process:

- A business document object always refers to a leading business document object and is derived from this object.
- The name of the root entity in the business document entity is the name of the business object or the name of a specialization of the business object or the name of a service specific view onto the business object.
- The nodes and elements of the business object that are relevant (according to the semantics of the associated message type) are contained as entities and elements in the business document object.
- The name of a business document entity is predefined by the name of the corresponding business object node. The name of the superordinate entity is not repeated in the name of the business document entity. The "full" semantic name results from the concatenation of the entity names along the hierarchical structure of the business document object.
- The structure of the business document object is, except for deviations due to hierarchization, the same as the structure of the business object.
- The cardinalities of the business document object nodes and elements are adopted identically or more restrictively to the business document object.
- An object from which the leading business object is dependent can be adopted to the business document object. For this arrangement, the relationship is inverted, and the object (or its parts, respectively) are hierarchically subordinated in the business document object.
- Nodes in the business object representing generalized business information can be adopted as explicit entities to the business document object (generally speaking, multiply TypeCodes out). When this adoption occurs, the entities are named according to their more specific semantic (name of TypeCode becomes prefix).
  - Party nodes of the business object are modeled as explicit entities for each party role in the business document object. These nodes are given the name <Prefix><Party Role>Party, for example, BuyerParty, ItemBuyerParty.
  - BTDReference nodes are modeled as separate entities for each reference type in the business document object. These nodes are given the name <Qualifier><BO><Node>Reference, for example SalesOrderReference, OriginSalesOrderReference, SalesOrderItemReference.
  - A product node in the business object comprises all of the information on the Product, ProductCategory, and Batch. This information is modeled in the business document object as explicit entities for Product, ProductCategory, and Batch.
- Entities which are connected by a 1:1 relationship as a result of hierarchization can be combined to a single entity, if they are semantically equivalent. Such a combination can often occurs if a node in the business document object that results from an assignment node is removed because it does not have any elements.
- The message type structure is typed with data types.
  - Elements are typed by GDTs according to their business objects.
  - Aggregated levels are typed with message type specific data types (Intermediate Data Types), with their names being built according to the corresponding paths in the message type structure.
  - The whole message type structured is typed by a message data type with its name being built according to the root entity with the suffix "Message".
- For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
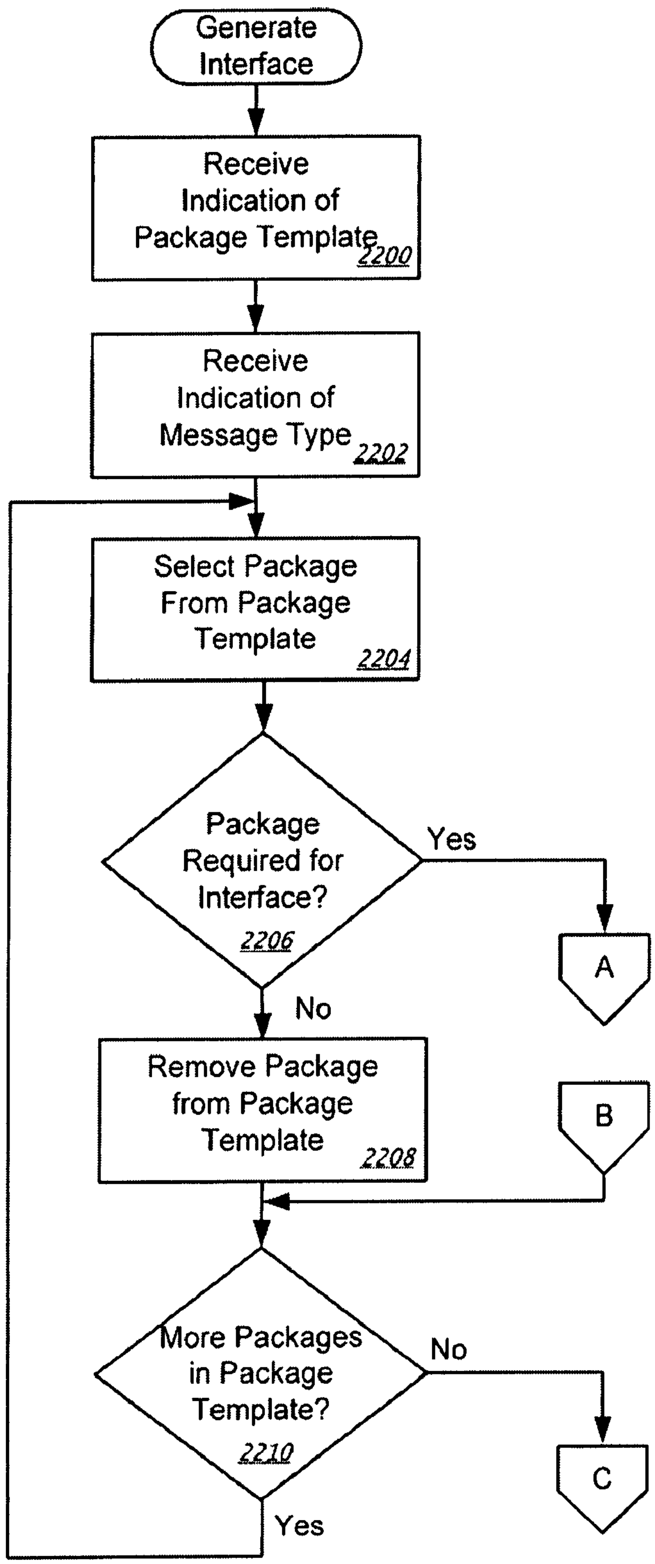
FIGS. 22A-F depict a flow diagram of the steps performed to generate an interface from the business object model in accordance with methods and systems consistent with the subject matter described herein.
Figure 22B:
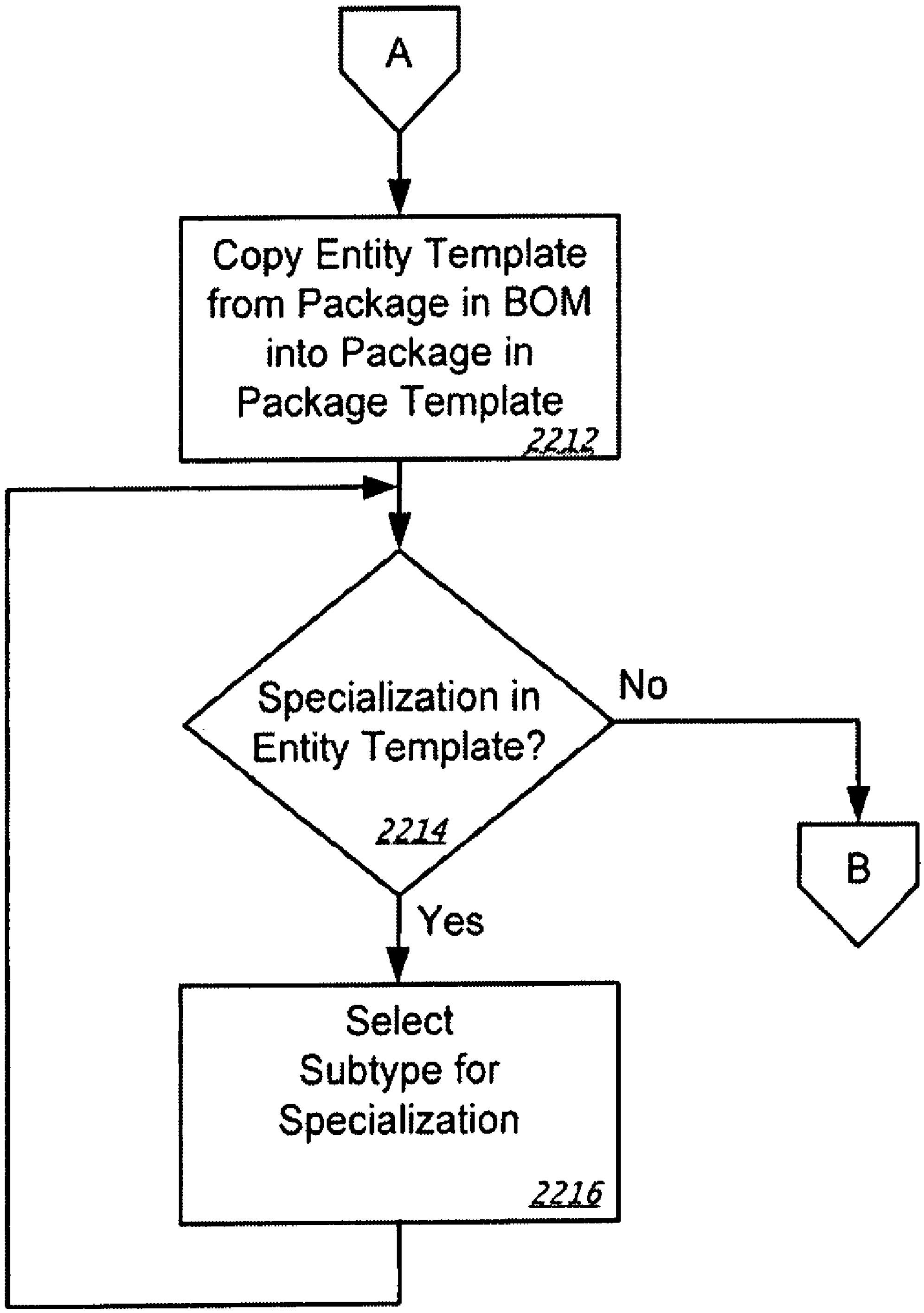
Figure 22C:
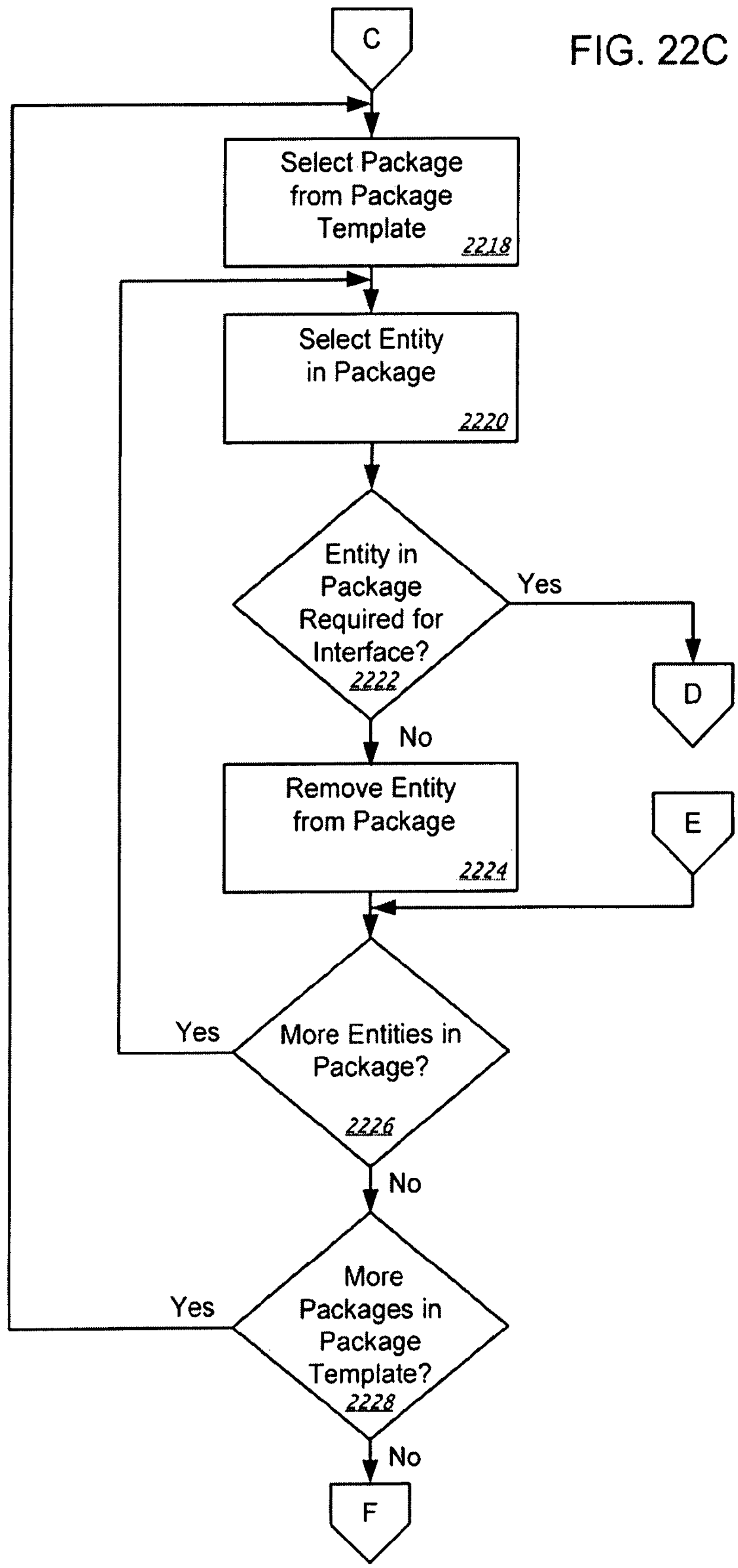

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
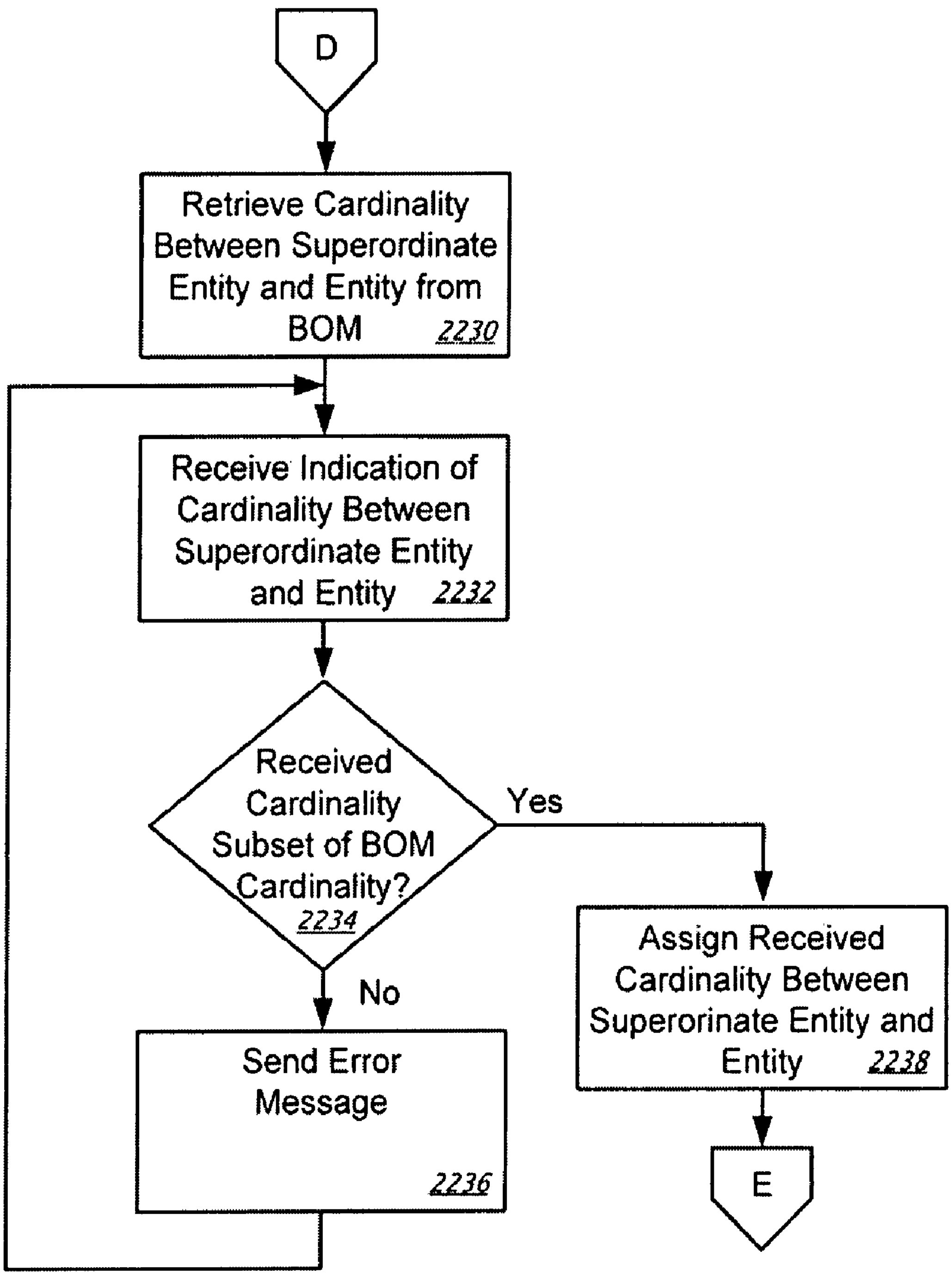

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
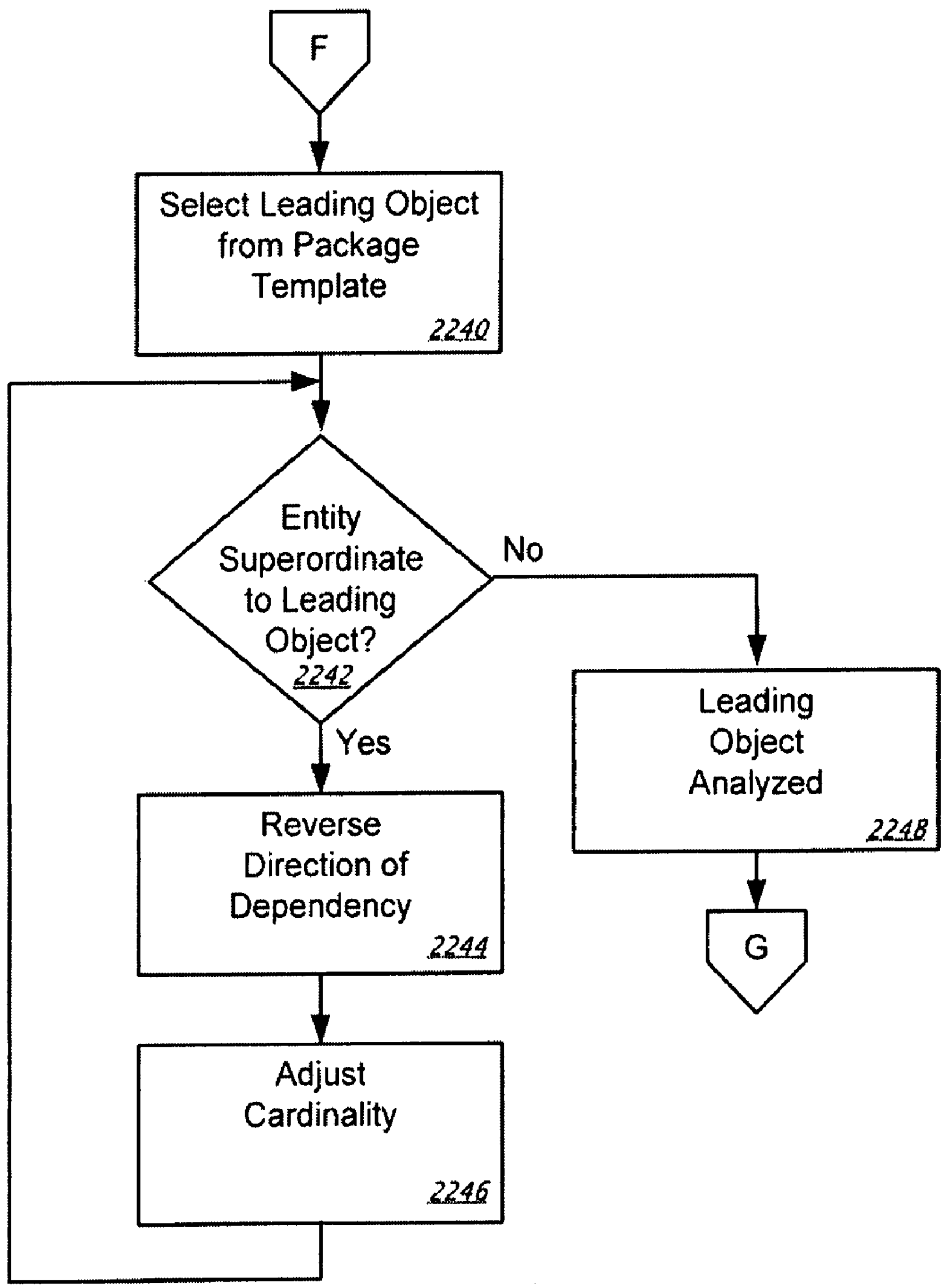

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
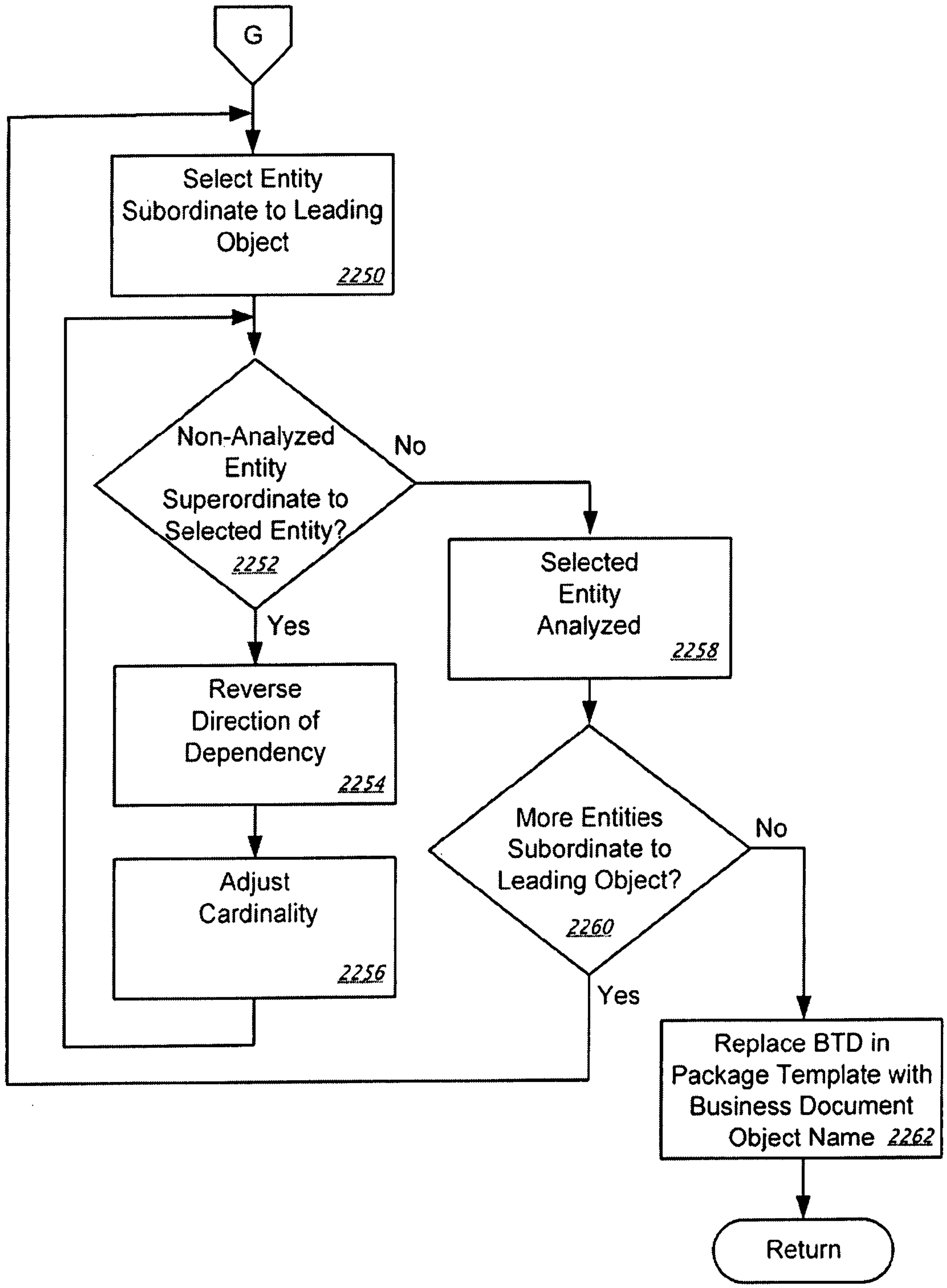

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

Use of an Interface

Figure 23:
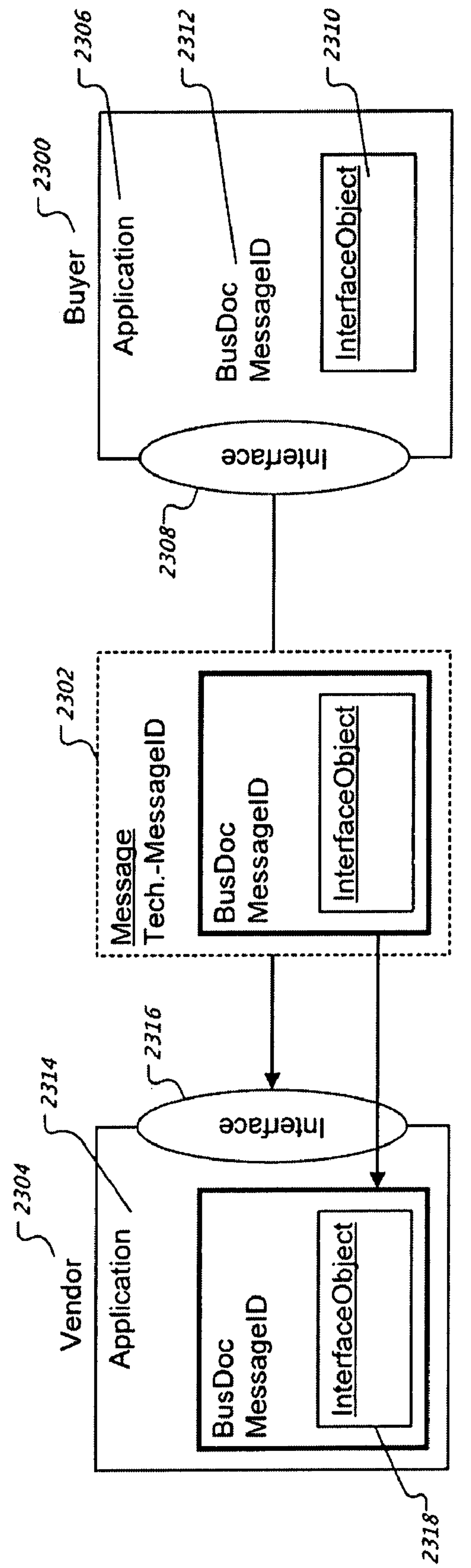
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
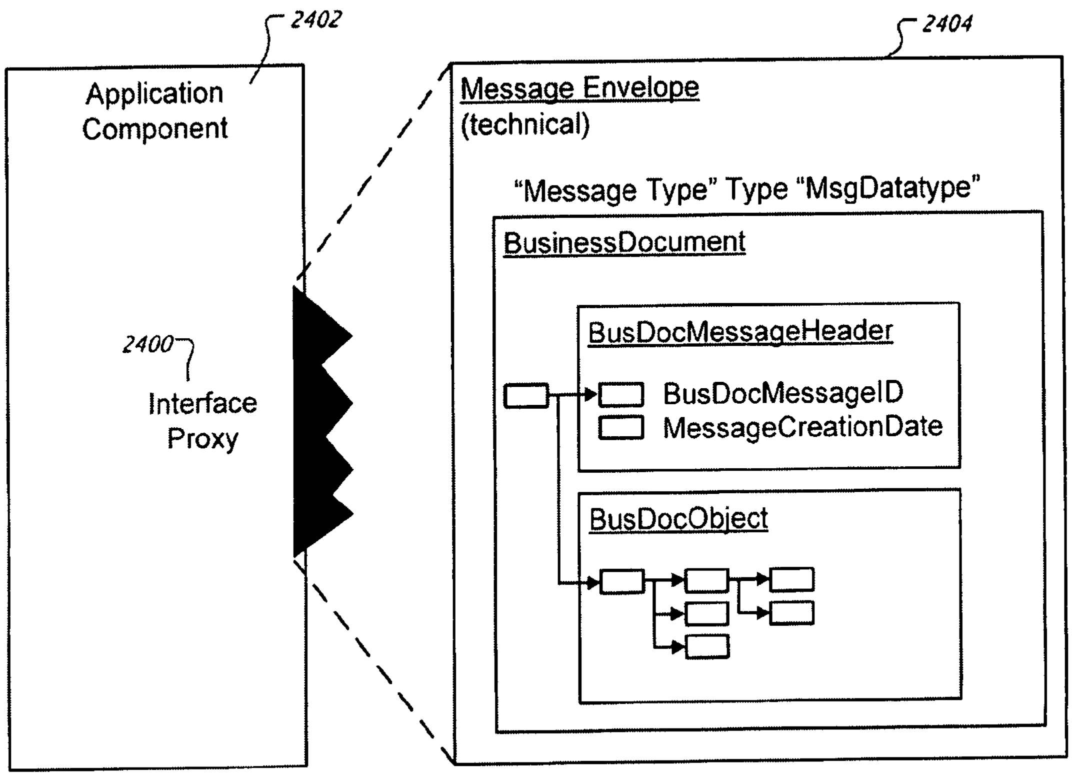
FIG. 24 depicts an interface proxy in accordance with methods and systems consistent with the subject matter described herein.
Figure 25:
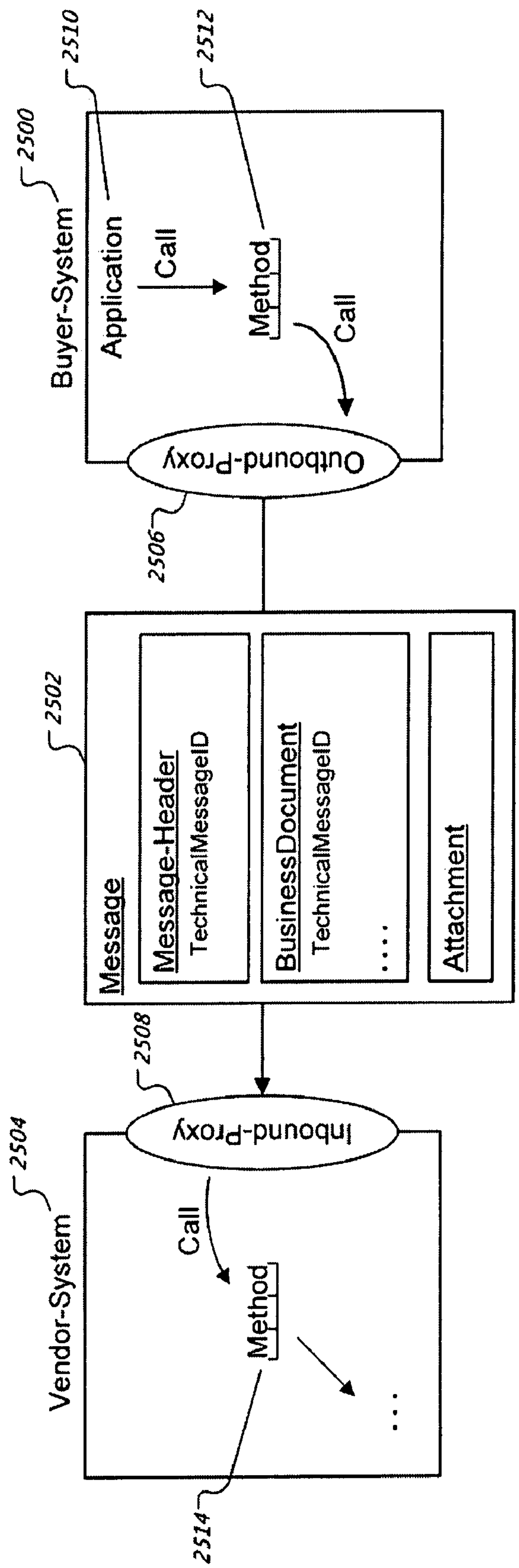
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
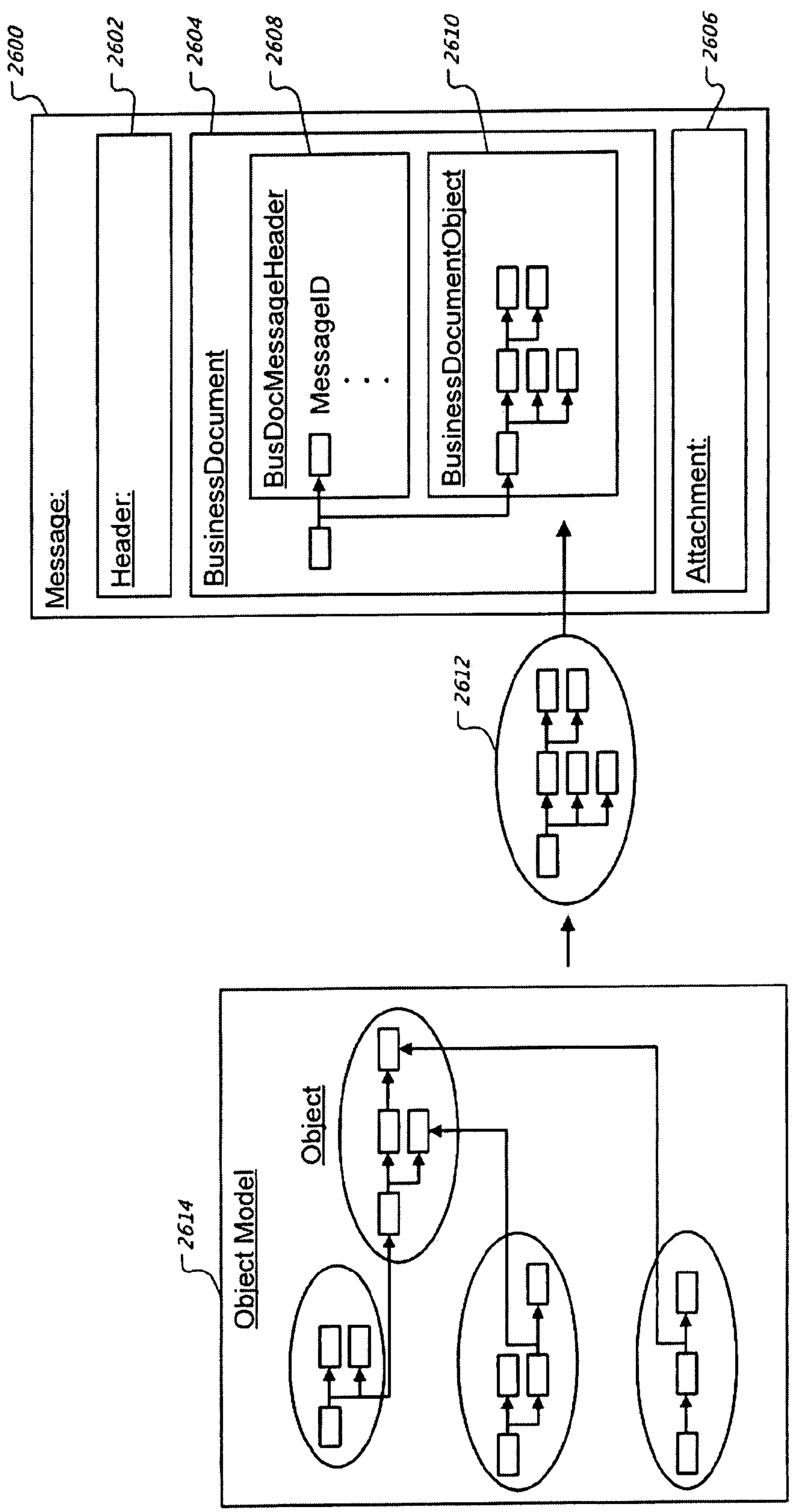
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
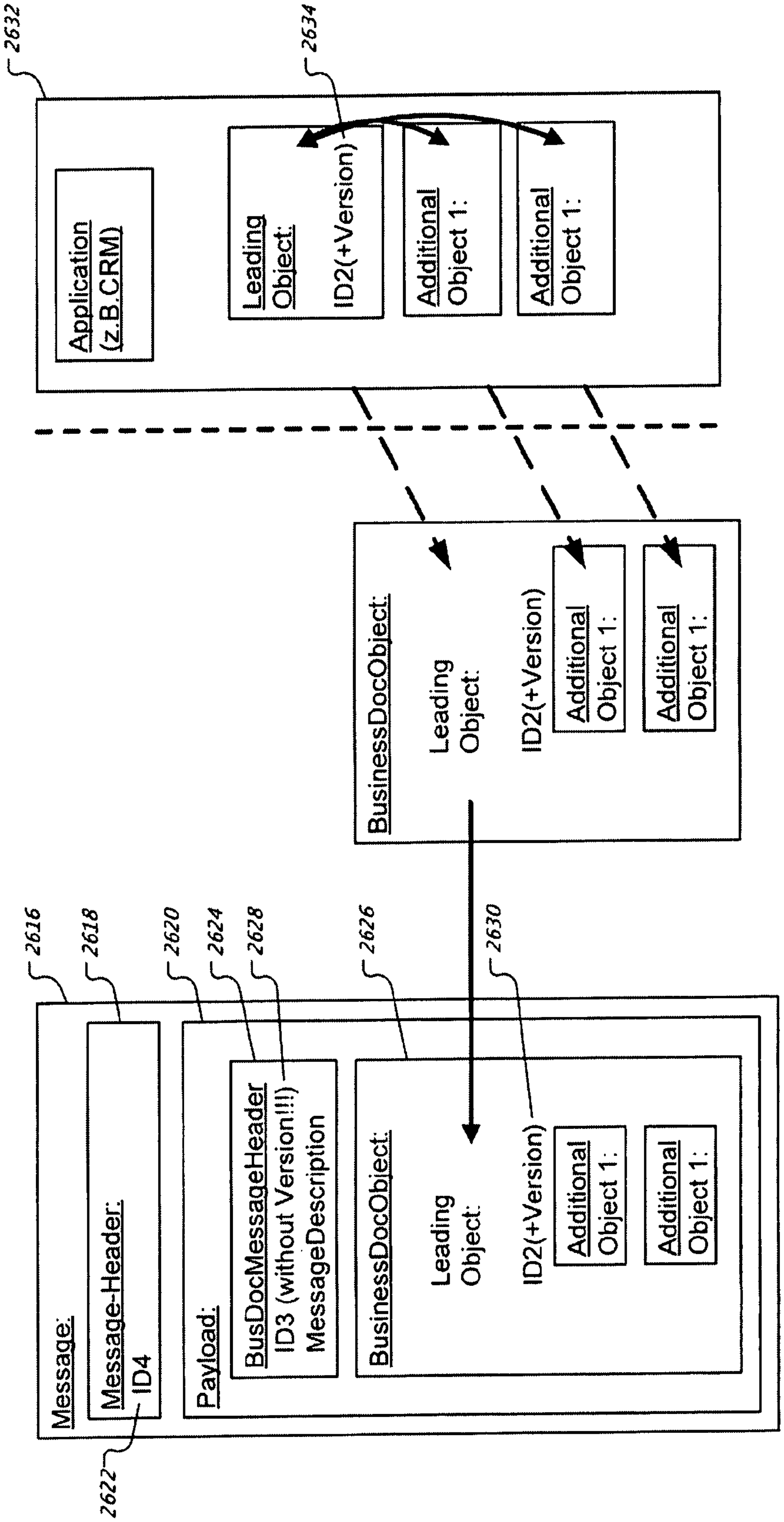
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces that can be used across different industry standards.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Employee Interfaces

In a personnel administration point of view, an organisation maintains the details of an employee who is working for it. Employees use the Employee Self Service (ESS) scenario to maintain their data in the personal administration and to keep the details up to date.

In an organizational point of view, employees of a company are part of the organizational structure. With an employee self-service, the employees are able to find their place in this organization and their assigned managers. Additionally, they can list their colleagues or the employees with the same level of responsibility as them.

Message Choreography

Figure 28:
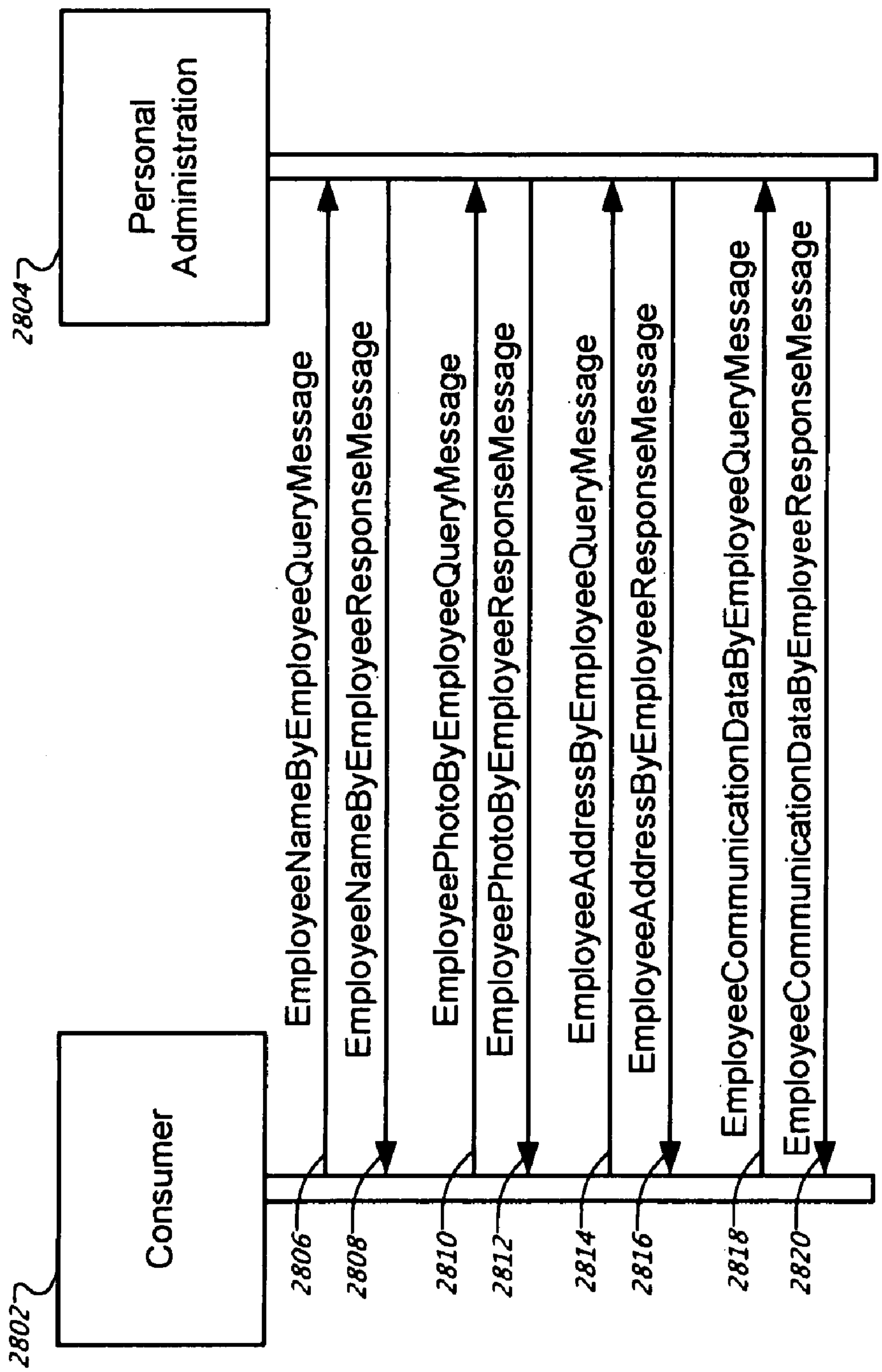
FIG. 28 shows an exemplary Employee Message Choreography.
Figure 29:
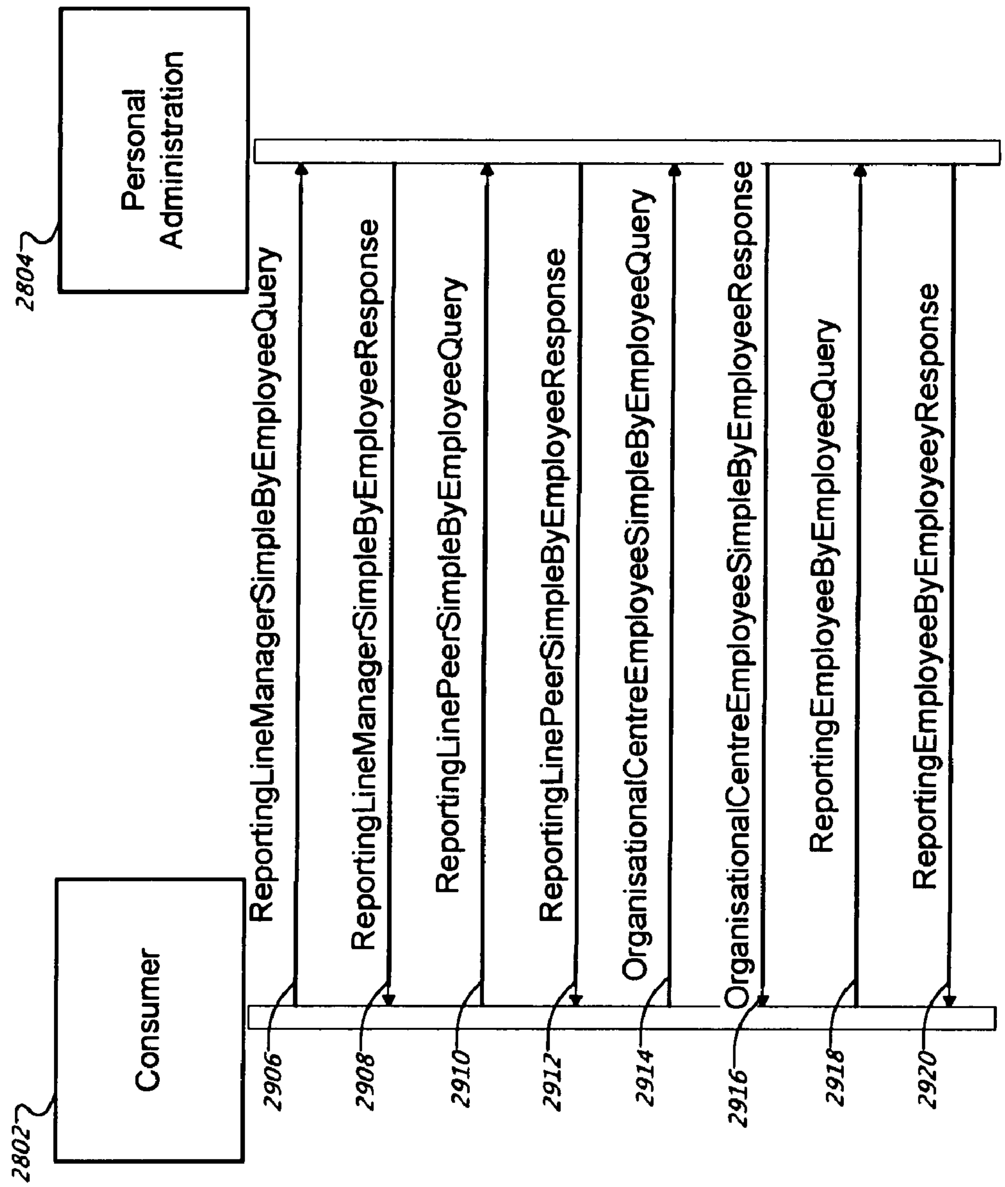
FIG. 29 shows an exemplary Personnel Administration Message Choreography.

The message choreographies of FIGS. 28 and 29 describe possible logical sequences of messages that can be used to realize an advertising issue business scenario.

EmployeeNameByEmployeeQuery

An EmployeeNameByEmployeeQuery is the inquiry to the Employee about the name of an employee. The structure of the message type EmployeeNameByEmployeeQuery is specified by the message data type EmployeeNameByEmployeeQueryMessage.

EmployeeNameByEmployeeResponse

An EmployeeNameByEmployeeResponse is the response to EmployeeNameByEmployeeQuery and contains the name of an Employee. The structure of the message type EmployeeNameByEmployeeResponse is specified by the message data type EmployeeNameByEmployeeResponseMessage. Employee name is defined by the HR-XML consortium and has consists of several parts like formatted name, given name, preferred given name, middle name, family name and affix. The HR-XML consortium is an independent organisation dedicated to development and promotion of a standard suite of XML-specifications to enable e-business and automation of human resource related data exchanges.

EmployeePhotoByEmployeeQuery

An EmployeePhotoByEmployeeQuery is the inquiry to the Employee about the photo of an employee. The structure of the message type EmployeePhotoByEmployeeQuery is specified by the message data type EmployeePhotoByEmployeeQueryMessage.

EmployeePhotoByEmployeeResponse

An EmployeePhotoByEmployeeResponse is the response to EmployeePhotoByEmployeeQuery and contains the photo of an employee. The structure of the message type EmployeePhotoByEmployeeResponse is specified by the message data type EmployeePhotoByEmployeeResponseMessage. The photo returned can be in the binary format.

ReportingLineManagerSimpleByEmployeeQuery

A ReportingLineManagerSimpleByEmployeeQuery is the inquiry to an Employee about the information identifying the employees who have direct personnel responsibility (e.g., Reporting Line Managers) for the employee. The structure of the message type ReportingLineManagerSimpleByEmployeeQuery is specified by the message data type ReportingLineManagerSimpleByEmployeeQueryMessage.

ReportingLineManagerSimpleByEmployeeResponse

A ReportingLineManagerSimpleByEmployeeResponse is the response to a ReportingLineManagerSimpleByEmployeeQuery and contains information identifying the employees who have direct personnel responsibility (e.g., Reporting Line Managers) for a specific employee. The structure of the message type ReportingLineManagerSimpleByEmployeeResponse is specified by the message data type ReportingLineManagerSimpleByEmployeeMessage.

ReportingLinePeerSimpleByEmployeeQuery

A ReportingLinePeerSimpleByEmployee is the inquiry to an Employee about the information identifying the employees who report directly to the same employee as this employee. The structure of the message type ReportingLinePeerSimpleByEmployeeQuery is specified by the message data type ReportingLinePeerSimpleByEmployeeQueryMessage.

ReportingLinePeerSimpleByEmployeeResponse

A ReportingLinePeerSimpleByEmployeeResponse is the response to a ReportingLinePeerSimpleByEmployeeQuery and contains information identifying the employees, who report directly to the same employee as a specific employee does. The structure of the message type ReportingLinePeerSimpleByEmployeeResponse is specified by the message data type ReportingLinePeerSimpleByEmployeeResponseMessage.

OrganisationalCentreEmployeeSimpleByEmployeeQuery

An OrganisationalCentreEmployeeSimpleByEmployeeQuery is the inquiry to an Employee about the information identifying the employees who belong to the same organizational centers as the employee. The structure of the message type OrganisationalCentreEmployeeSimpleByEmployeeQuery is specified by the message data type OrganisationalCentreEmployeeSimpleByEmployeeQueryMessage.

OrganisationalCentreEmployeeSimpleByEmployeeResponse

An OrganisationalCentreEmployeeSimpleByEmployeeResponse is the response to an OrganisationalCentreEmployeeSimpleByEmployeeQuery and contains information identifying the employees who belong to the same organizational centers as the employee. The structure of the message type OrganisationalCentreEmployeeSimpleByEmployeeResponse is specified by the message data type OrganisationalCentreEmployeeSimpleByEmployeeMessage.

ReportingEmployeeByEmployeeQuery

A ReportingEmployeeByEmployeeQuery is the inquiry to an Employee about the information identifying the employees who report to an employee. In this message direct and indirect reports are returned depending on the selection. The structure of the message type ReportingEmployeeByEmployeeQuery is specified by the message data type ReportingEmployeeByEmployeeQueryMessage.

Message Data Type ReportingEmployeeByEmployeeResponse

A ReportingEmployeeByEmployeeResponse is the response to a ReportingEmployeeByEmployeeQuery and contains information identifying the employees who report to a specific employee. In this message direct and indirect reports are returned depending on the selection. Additionally the message includes basic organizational data to classify the reporting area. The structure of the message type ReportingEmployeeByEmployeeResponse is specified by the message data type ReportingEmployeeByEmployeeResponse Message.

Figure 30:
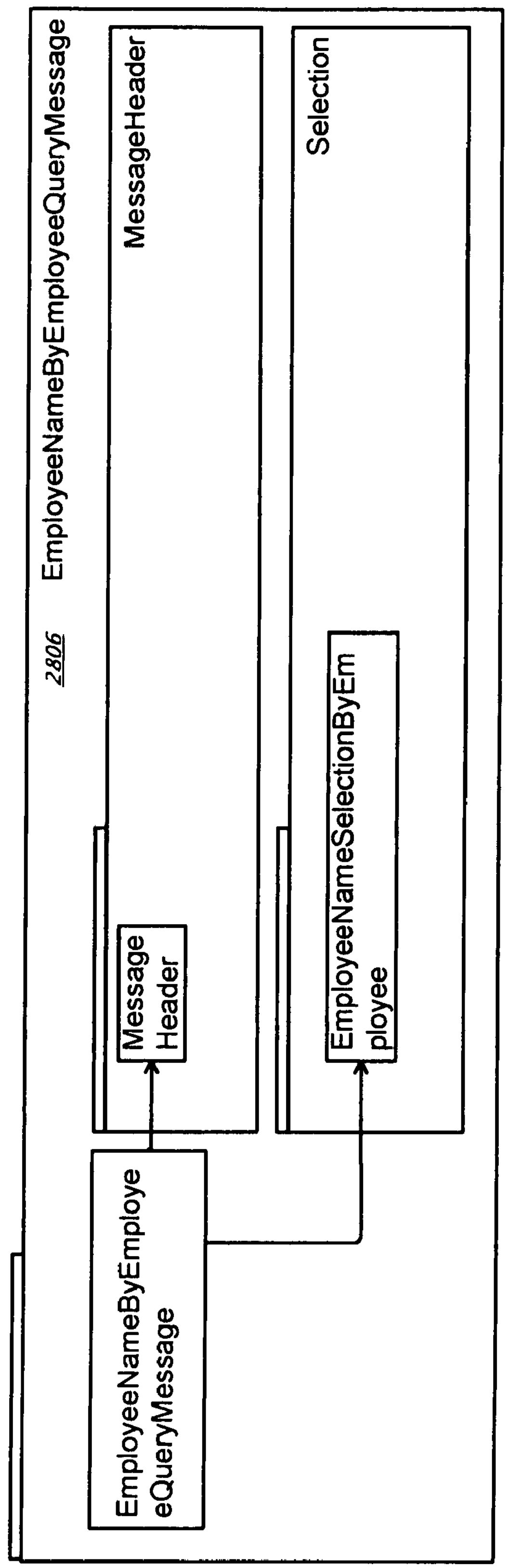
FIG. 30 shows an exemplary EmployeeNameByEmployee QueryMessage Message Data Type.
Figure 31:
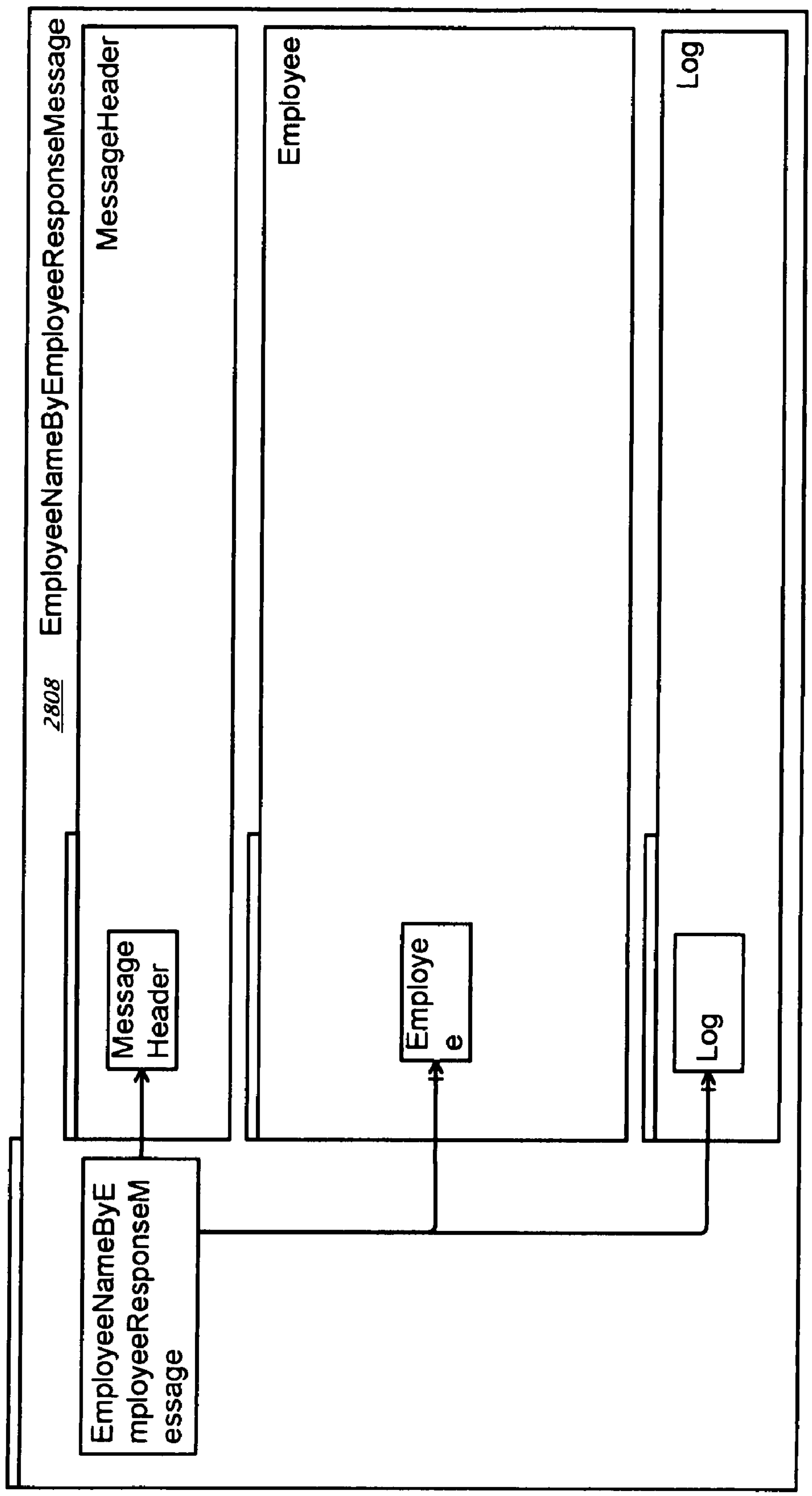
FIG. 31 shows an exemplary EmployeeNameByEmployee ResponseMessage Message Data Type.

For example, a "Consumer" system 2802 can request to query a "Personal Administration" system 2804 using an EmployeeNameByEmployeeQuery message 2806 as shown, for example, in FIG. 30. The "Personal Administration" system 2804 can respond to the query using an EmployeeNameByEmployeeResponse message 2808 as shown, for example, in FIG. 31.

Figure 32:
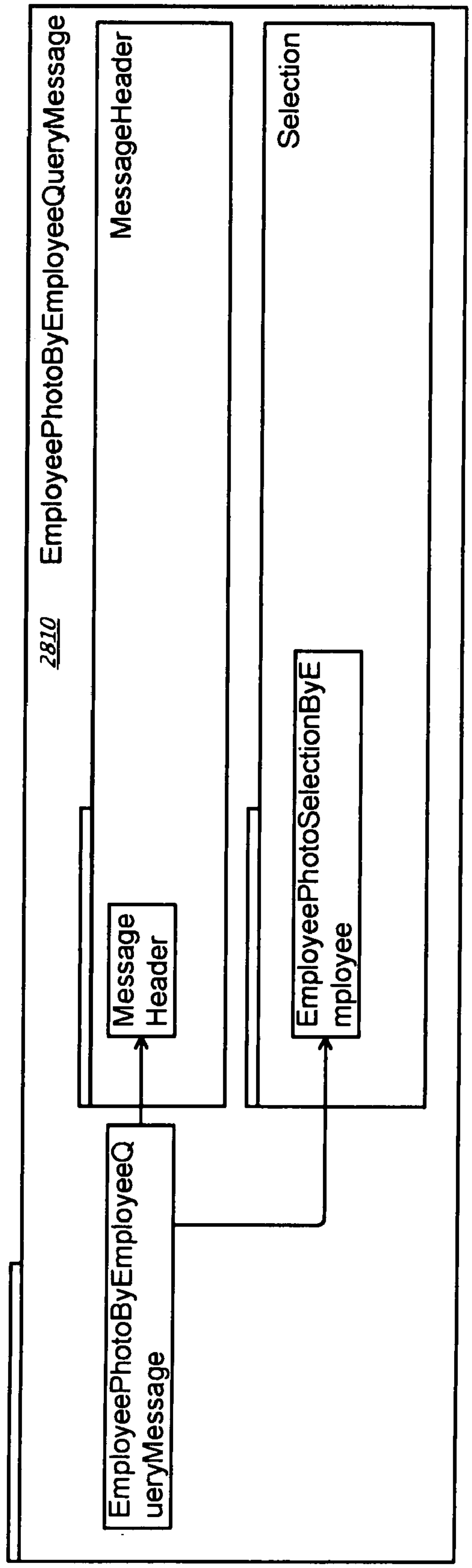
FIG. 32 shows an exemplary EmployeePhotoByEmployee QueryMessage Message Data Type.
Figure 33:
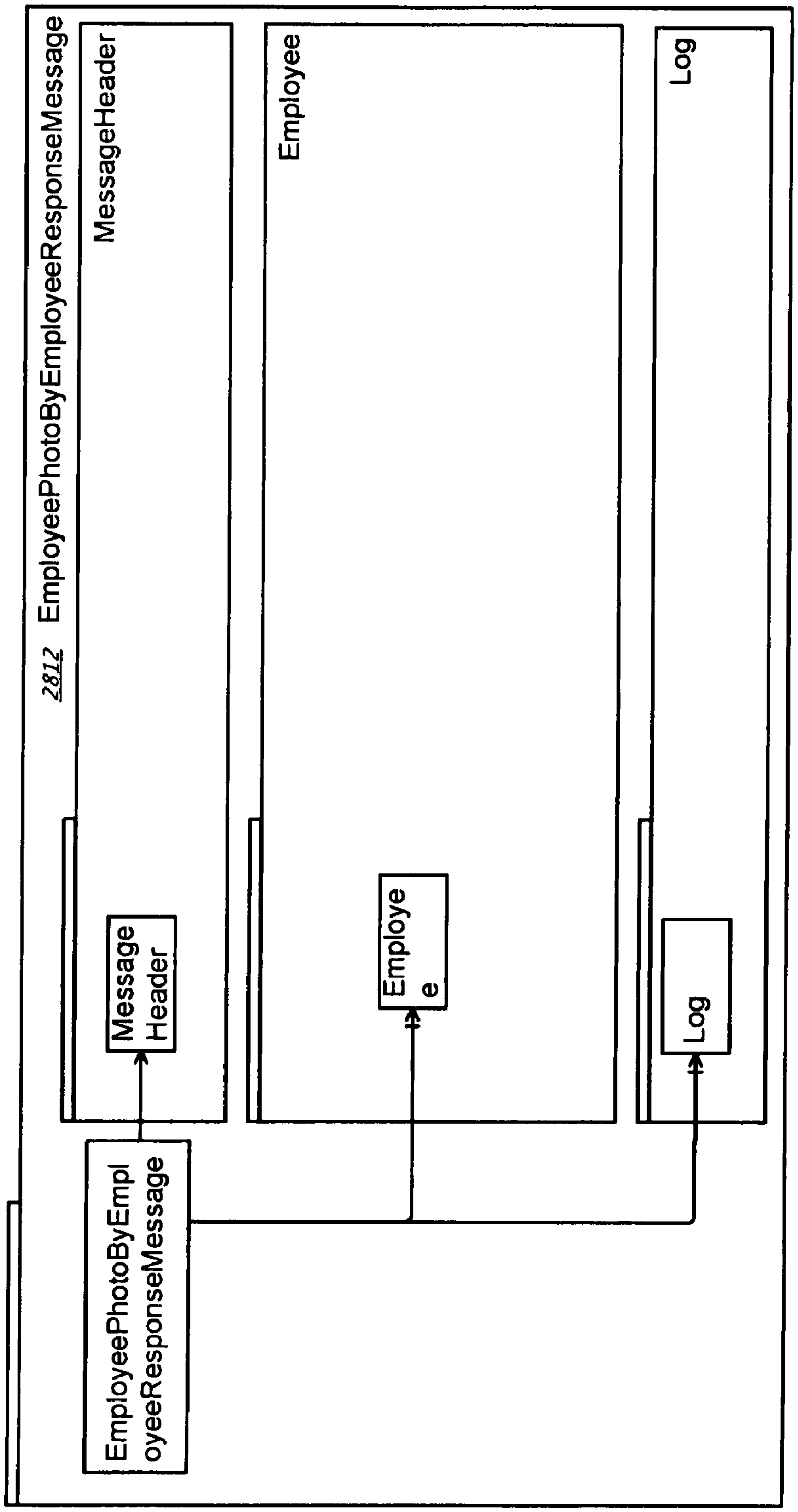
FIG. 33 shows an exemplary EmployeePhotoByEmployee ResponseMessage Message Data Type.

The "Consumer" system 2802 can request to query the "Personal Administration" system 2804 using an EmployeePhotoByEmployeeQuery message 2810 as shown, for example, in FIG. 32. The "Personal Administration" system 2804 can respond to the query using an EmployeePhotoByEmployeeResponse message 2812 as shown, for example, in FIG. 33.

Figure 34:
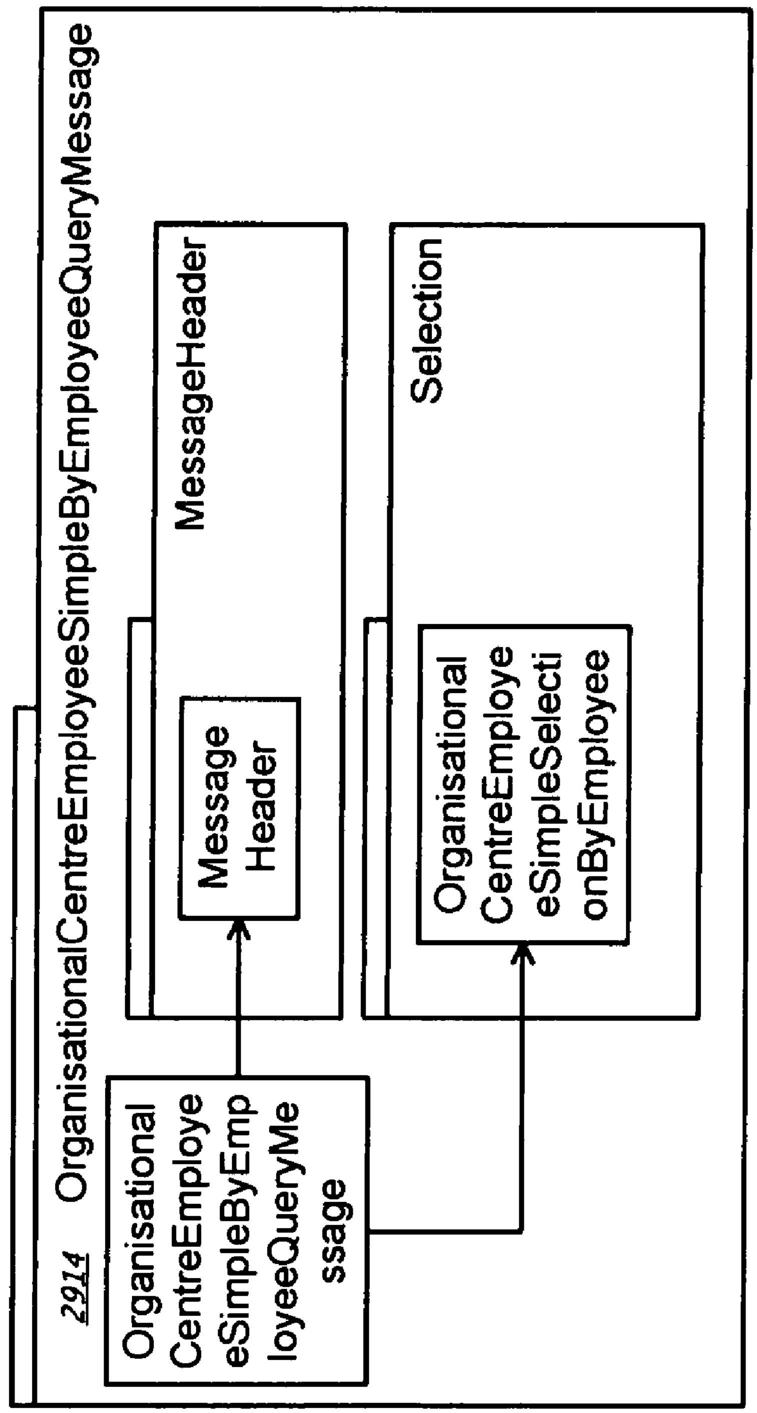
FIG. 34 shows an exemplary OrganisationalCentreEmployeeSimpleByEmployeeQuery Message Data Type.
Figure 35:
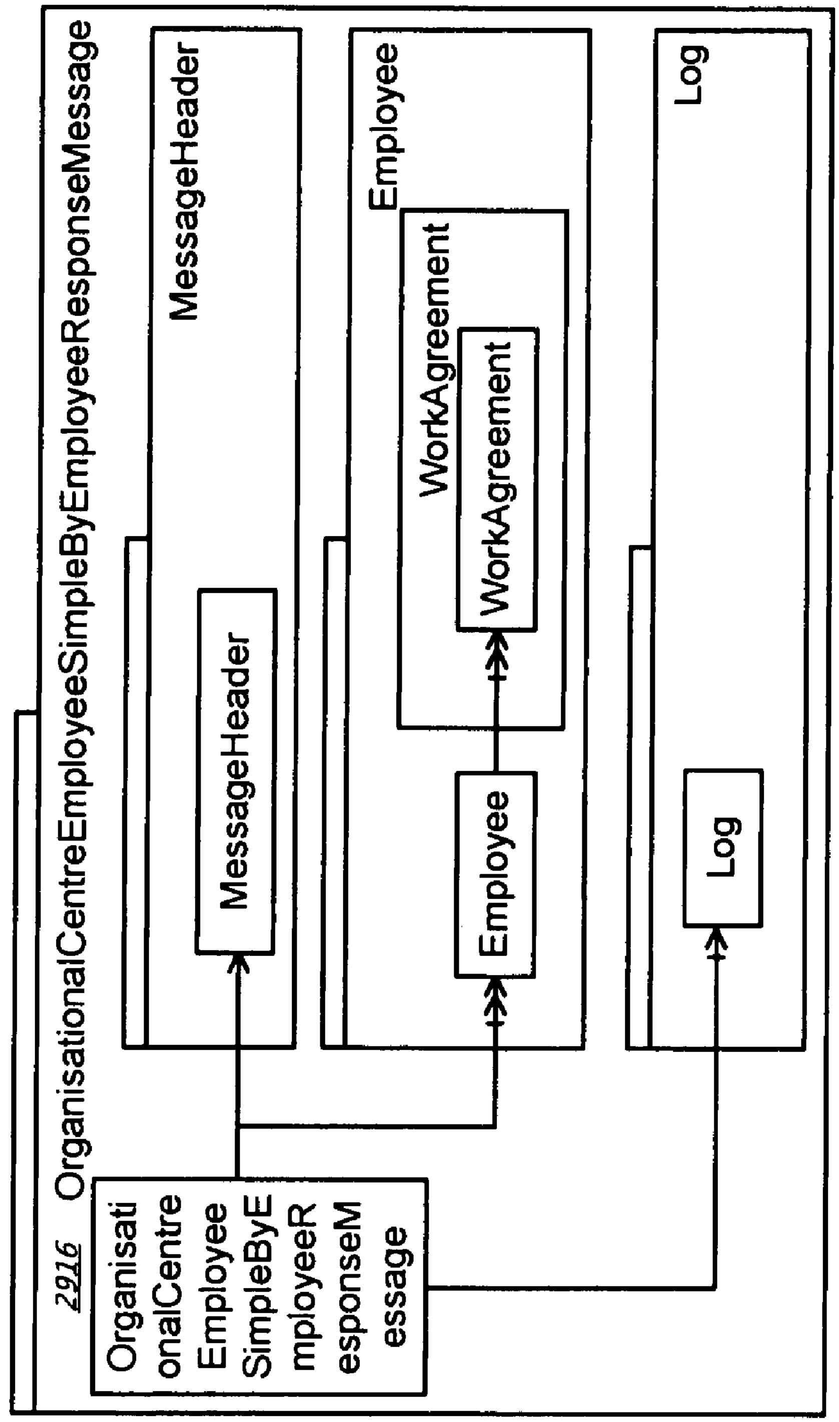
FIG. 35 shows an exemplary OrganisationalCentreEmployeeSimpleByEmployeeResponse Message Data Type.

The "Consumer" system 2802 can request to query the "Personal Administration" system 2804 using an OrganisationalCentreEmployeeSimpleByEmployeeQuery message 2914 as shown, for example, in FIG. 34. The "Personal Administration" system 2804 can respond to the query using an OrganisationalCentreEmployeeSimpleByEmployeeResponse message 2916 as shown, for example, in FIG. 35.

Figure 36:
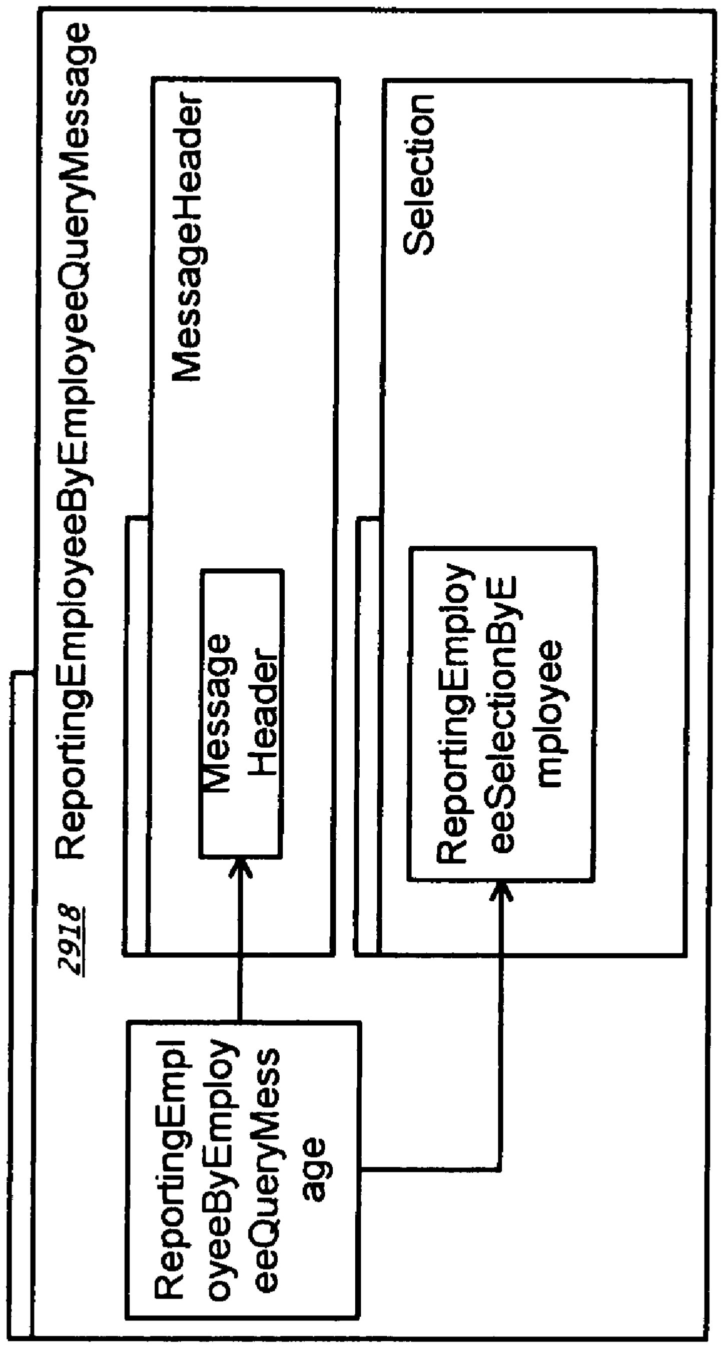
FIG. 36 shows an exemplary ReportingEmployeeByEmployeeQuery Message Data Type.
Figure 37:
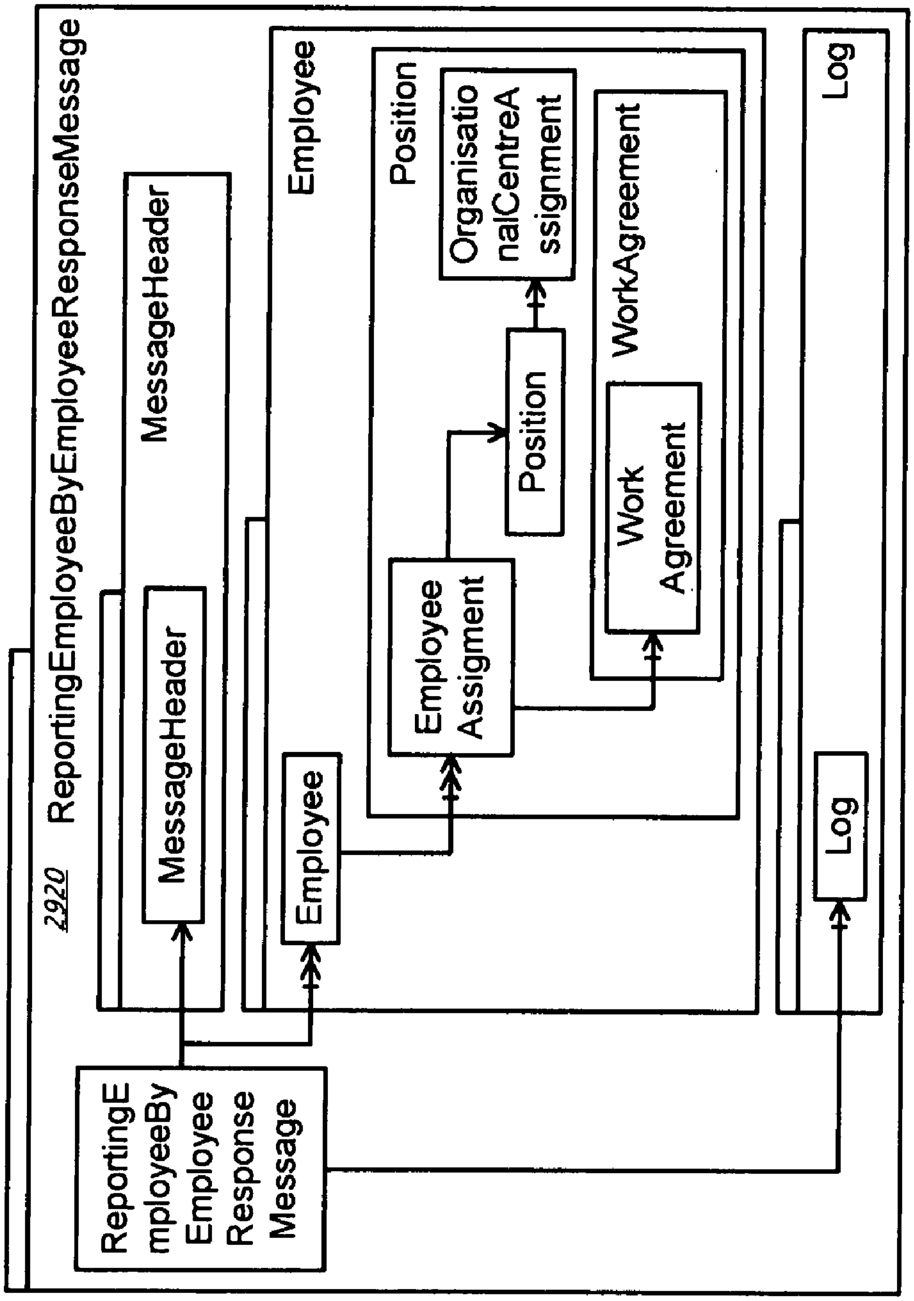
FIG. 37 shows an exemplary ReportingEmployeeByEmployeeResponse Message Data Type.

The "Consumer" system 2802 can request to query the "Personal Administration" system 2804 using a ReportingEmployeeByEmployeeQuery message 2918 as shown, for example, in FIG. 36. The "Personal Administration" system 2804 can respond to the query using a ReportingEmployeeByEmployeeResponse message 2920 as shown, for example, in FIG. 37.

Figure 38:
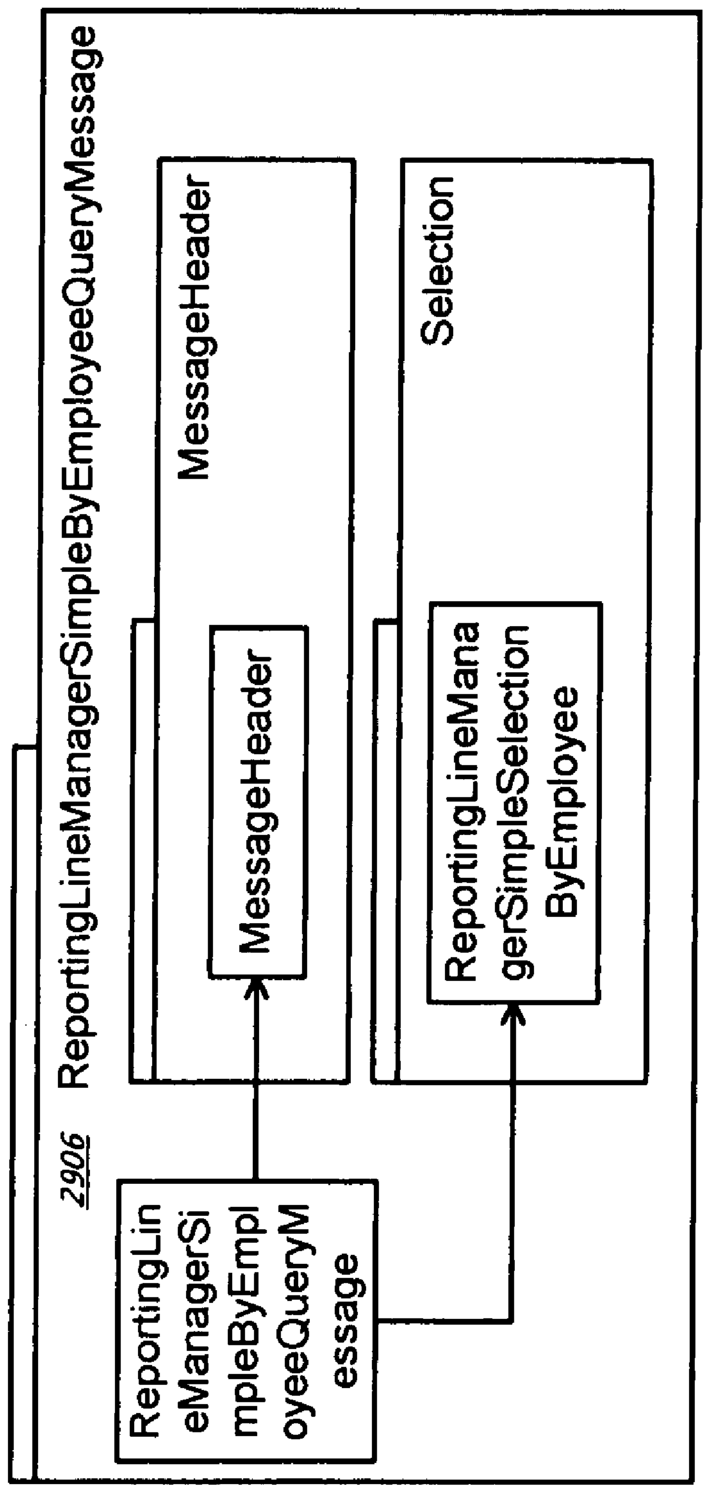
FIG. 38 shows an exemplary ReportingLineManagerSimpleByEmployeeQuery Message Data Type.
Figure 39:
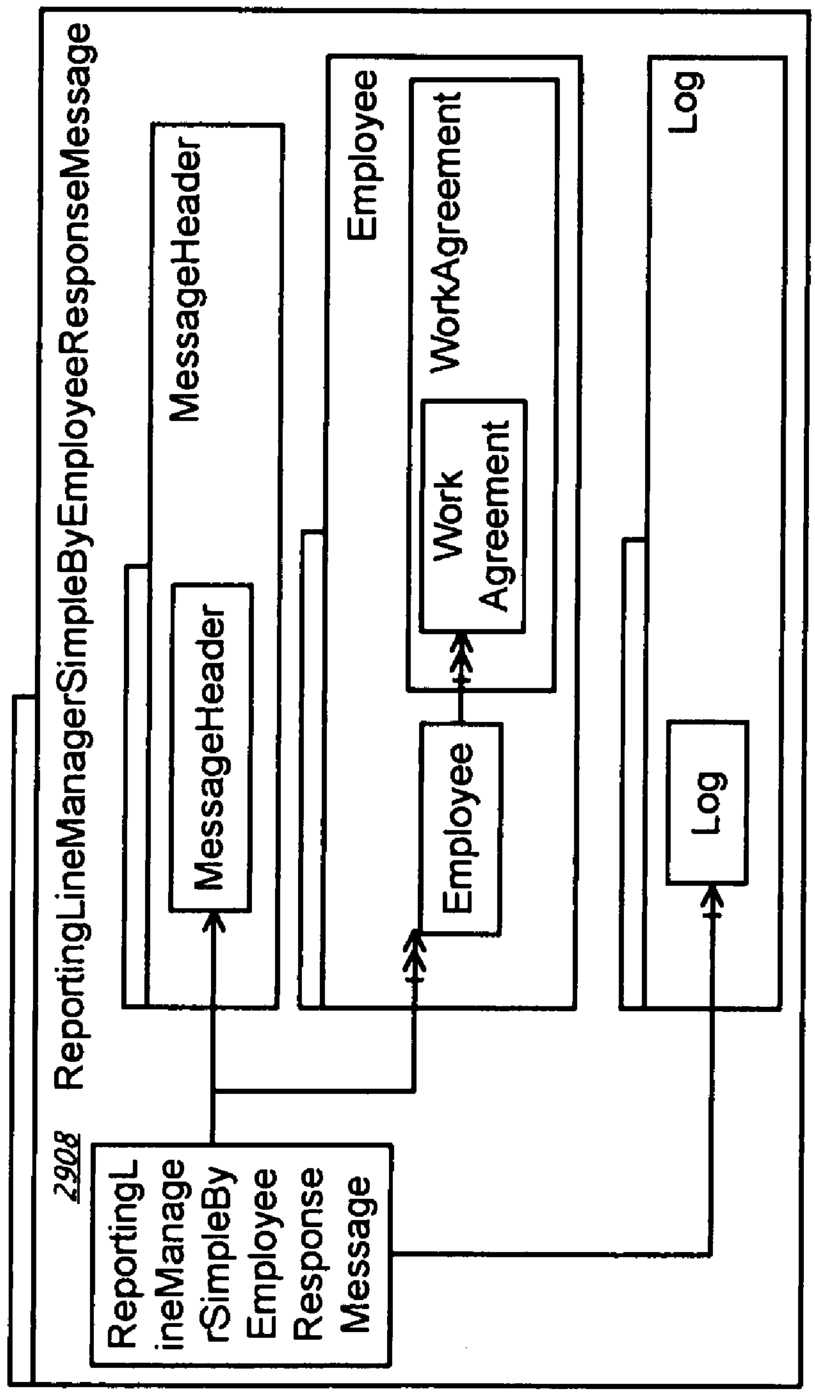
FIG. 39 shows an exemplary ReportingLineManagerSimpleByEmployeeResponse Message Data Type.

The "Consumer" system 2802 can request to query the "Personal Administration" system 2804 using a ReportingLineManagerSimpleByEmployeeQuery message 2906 as shown, for example, in FIG. 38. The "Personal Administration" system 2804 can respond to the query using a ReportingLineManagerSimpleByEmployeeResponse message 2908 as shown, for example, in FIG. 39.

Figure 40:
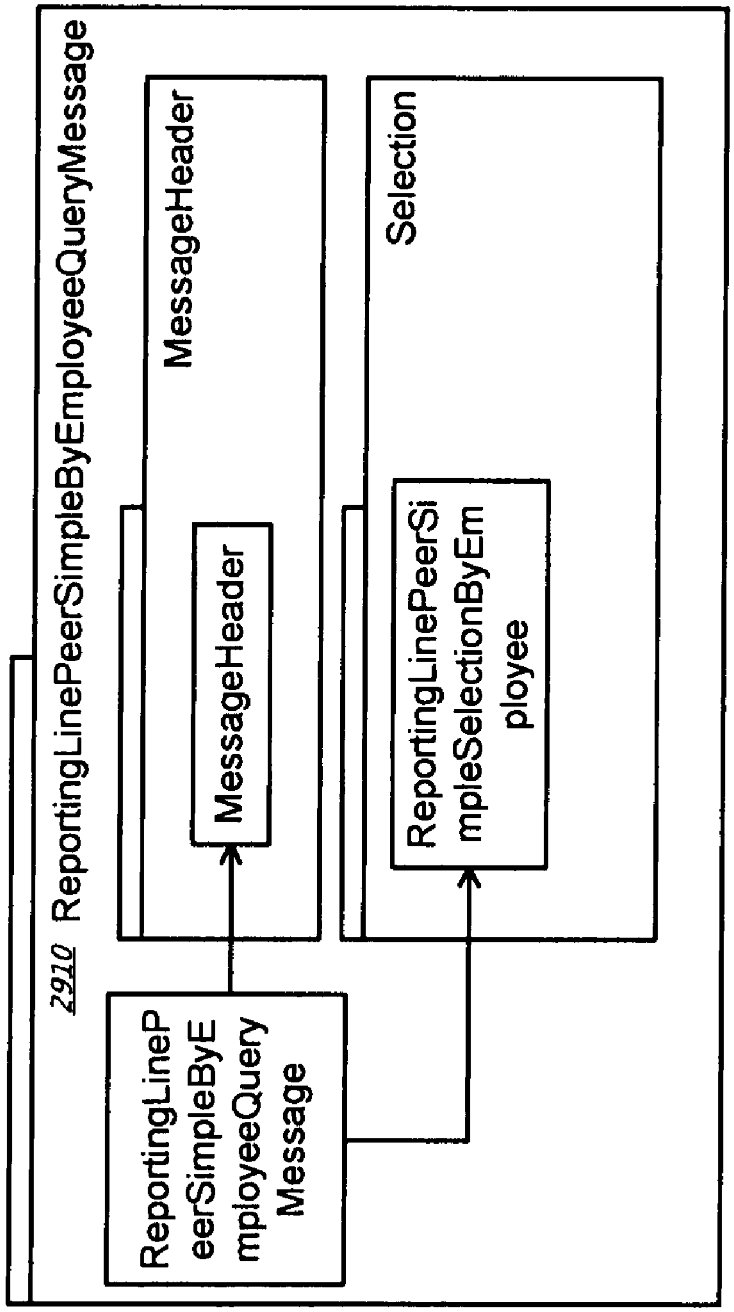
FIG. 40 shows an exemplary ReportingLinePeerSimpleByEmployeeQuery Message Data Type.
Figure 41:
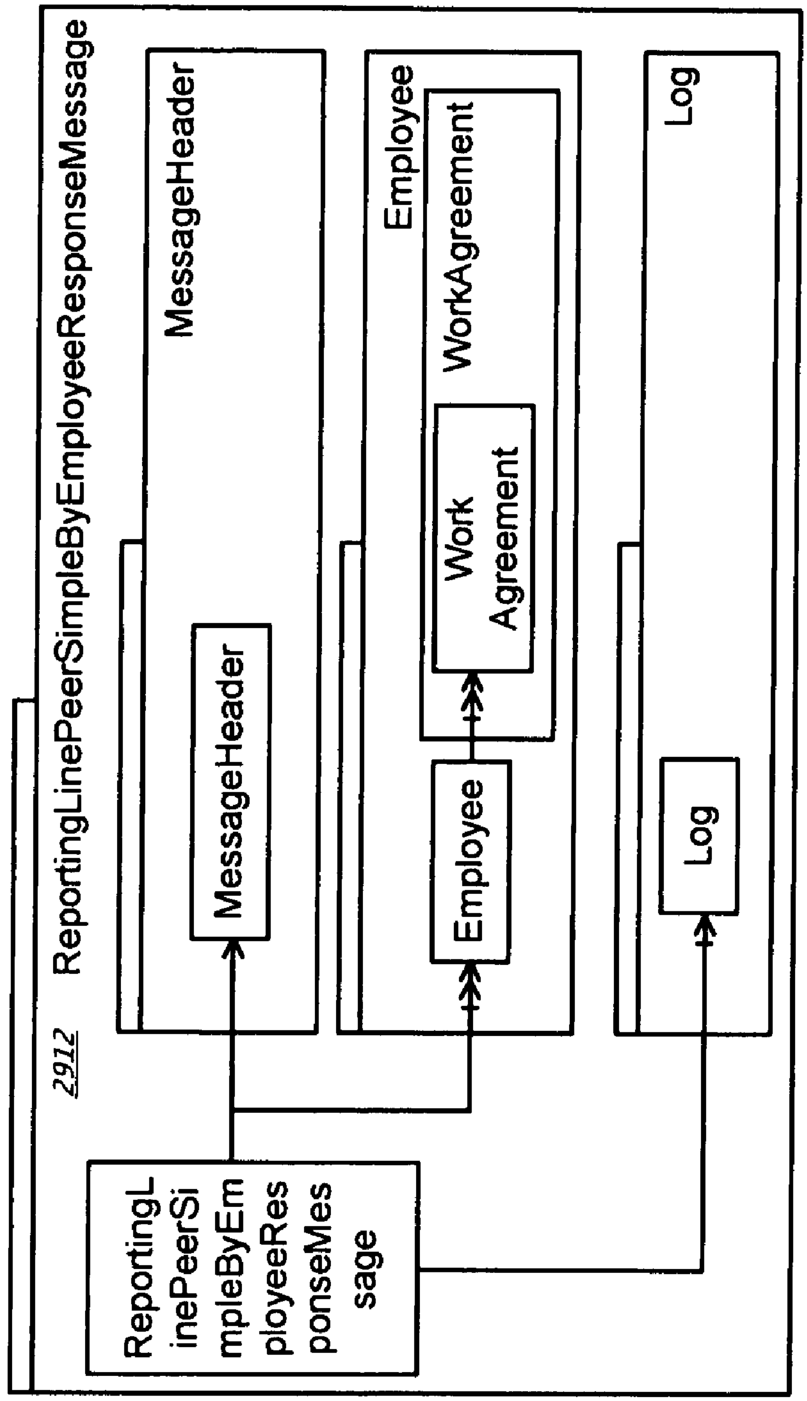
FIG. 41 shows an exemplary ReportingLinePeerSimpleByEmployeeResponse Message Data Type.

The "Consumer" system 2802 can request to query the "Personal Administration" system 2804 using a ReportingLinePeerSimpleByEmployeeQuery message 2910 as shown, for example, in FIG. 40. The "Personal Administration" system 2804 can respond to the query using a ReportingLinePeerSimpleByEmployeeResponse message 2912 as shown, for example, in FIG. 41.

Message Data Type EmployeeNameByEmployeeResponseMessage

FIGS. 43-1 through 43-2 show an EmployeeNameByEmployeeResponseMessage 4300 package. The EmployeeNameByEmployeeResponseMessage 4300 package is a <MessageDataType> 4304 datatype. The EmployeeNameByEmployeeResponseMessage 4300 package includes an EmployeeNameByEmployeeResponseMessage 4302 entity. The EmployeeNameByEmployeeResponseMessage 4300 package includes various packages, namely MessageHeader 4306, Employee 4314 and Log 4326.

The MessageHeader 4306 package is a BusinessDocumentMessageHeader 4312 datatype. The MessageHeader 4306 package includes a MessageHeader 4308 entity. The MessageHeader 4308 entity has a cardinality of one 4310 meaning that for each instance of the EmployeeNameByEmployeeResponseMessage 4302 entity there is one MessageHeader 4308 entity.

The Employee 4314 package includes an Employee 4316 entity. The Employee 4316 entity has a cardinality of zero or one 4318 meaning that for each instance of the EmployeeNameByEmployeeResponseMessage 4302 entity there may be one Employee 4316 entity. The Employee 4316 entity includes a Name 4320 attribute. The Name 4320 attribute is a PersonName 4324 datatype. The Name 4320 attribute has a cardinality of one 4322 meaning that for each instance of the Employee 4316 entity there is one Name 4320 attribute.

The Log 4326 package is a Log 4332 datatype. The Log 4326 package includes a Log 4328 entity. The Log 4328 entity has a cardinality of zero or one 4330 meaning that for each instance of the EmployeeNameByEmployeeResponseMessage 4302 entity there may be one Log 4328 entity. The Log 4328 entity includes various attributes, namely MaximumLogItemSeverityCode 4334 and Item 4340. The MaximumLogItemSeverityCode 4334 attribute is a LogItemSeverityCode 4338 datatype. The MaximumLogItemSeverityCode 4334 attribute has a cardinality of zero or one 4336 meaning that for each instance of the Log 4328 entity there may be one MaximumLogItemSeverityCode 4334 attribute. The Item 4340 attribute is a LogItem 4344 datatype. The Item 4340 attribute has a cardinality of one or n 4342 meaning that for each instance of the Log 4328 entity there are one or more Item 4340 attributes.

MessageHeader Package

A MessageHeader package groups the business information that is relevant for sending a business document in a message. A MessageHeader groups business information from the perspective of the sending application, such as information to identify the business document in a message, information about the sender, and (possibly) information about the recipient. A SenderParty is the party responsible for sending a business document at business application level. The SenderParty can be filled by the sending application to name a contact person for any problems with the message. The SenderParty is used to transfer the message and can be ignored by the receiving application. A RecipientParty is the party responsible for receiving a business document at the business application level. The RecipientParty can be filled by the sending application to name a contact person for any problems that occurs with the message. The RecipientParty is used to transfer the message and can be ignored by the receiving application.

Employee Package

The Employee package groups the employee name information. An employee is a person who contributes or has contributed to the creation of goods or services for a company. In the viewpoint of this message, the employee entity contains the name of an employee. A name contains the name components of an employee.

Log Package

A Log package groups the error messages used for user interaction. A Log is a sequence of messages that result when an application executes a task. The Log package can be used in the message data types used for outbound messages from the perspective of the personal administration.

Message Data Type EmployeePhotoByEmployeeResponseMessage

An EmployeePhotoByEmployeeResponse is the response to EmployeePhotoByEmployeeQuery and contains the photo of an employee. The structure of the message type EmployeePhotoByEmployeeResponse is specified by the message data type EmployeePhotoByEmployeeResponseMessage. The photo returned can be in the binary format. The message data type EmployeePhotoByEmployeeResponseMessage contains an Employee included in the business document and the business information that is relevant for sending a business document in a message.

FIGS. 44-1 through 44-2 show an EmployeePhotoByEmployeeResponseMessage 4400 package. The EmployeePhotoByEmployeeResponseMessage 4400 package is a <MessageDataType> 4404 datatype. The EmployeePhotoByEmployeeResponseMessage 4400 package includes an EmployeePhotoByEmployeeResponseMessage 4402 entity. The EmployeePhotoByEmployeeResponseMessage 4400 package includes various packages, namely MessageHeader 4406, Employee 4414 and Log 4426.

The MessageHeader 4406 package is a BusinessDocumentMessageHeader 4412 datatype. The MessageHeader 4406 package includes a MessageHeader 4408 entity. The MessageHeader 4408 entity has a cardinality of one 4410 meaning that for each instance of the EmployeePhotoByEmployeeResponseMessage 4402 entity there is one MessageHeader 4408 entity.

The Employee 4414 package includes an Employee 4416 entity. The Employee 4416 entity has a cardinality of zero or one 4418 meaning that for each instance of the EmployeePhotoByEmployeeResponseMessage 4402 entity there may be one Employee 4416 entity. The Employee 4416 entity includes a Photo 4420 attribute. The Photo 4420 attribute is a BinaryObject 4424 datatype. The Photo 4420 attribute has a cardinality of one 4422 meaning that for each instance of the Employee 4416 entity there is one Photo 4420 attribute.

The Log 4426 package is a Log 4432 datatype. The Log 4426 package includes a Log 4428 entity. The Log 4428 entity has a cardinality of zero or one 4430 meaning that for each instance of the EmployeePhotoByEmployeeResponseMessage 4402 entity there may be one Log 4428 entity. The Log 4428 entity includes various attributes, namely MaximumLogItemSeverityCode 4434 and Item 4440. The MaximumLogItemSeverityCode 4434 attribute is a LogItemSeverityCode 4438 datatype. The MaximumLogItemSeverityCode 4434 attribute has a cardinality of zero or one 4436 meaning that for each instance of the Log 4428 entity there may be one MaximumLogItemSeverityCode 4434 attribute. The Item 4440 attribute is a LogItem 4444 datatype. The Item 4440 attribute has a cardinality of one or n 4442 meaning that for each instance of the Log 4428 entity there are one or more Item 4440 attributes.

Message Data Type OrganisationalCentreEmployeeSimpleByEmployeeQuery

An OrganisationalCentreEmployeeSimpleByEmployeeQuery is the inquiry to an Employee about the information identifying the employees who belong to the same organizational centers as the employee. The structure of the message type OrganisationalCentreEmployeeSimpleByEmployeeQuery is specified by the message data type OrganisationalCentreEmployeeSimpleByEmployeeQueryMessage.

FIG. 45 shows an EmployeeMessage 4500 package. The EmployeeMessage 4500 package is a <MessageDataType> 4504 datatype. The EmployeeMessage 4500 package includes an OrganisationalCentreEmployeeSimpleByEmployeeQueryMessage 4502 entity. The EmployeeMessage 4500 package includes various packages, namely MessageHeader 4506 and Employee 4514.

The MessageHeader 4506 package is a BusinessDocumentMessageHeader 4512 datatype. The MessageHeader 4506 package includes a MessageHeader 4508 entity. The MessageHeader 4508 entity has a cardinality of one 4510 meaning that for each instance of the OrganisationalCentreEmployeeSimpleByEmployeeQueryMessage 4502 entity there is one MessageHeader 4508 entity.

The Employee 4514 package includes an OrganisationalCentreEmployeeSimpleSelectionByEmployee 4516 entity. The OrganisationalCentreEmployeeSimpleSelection ByEmployee 4516 entity has a cardinality of 1 . . . 1 4518 meaning that for each instance of the OrganisationalCentreEmployeeSimpleByEmployeeQueryMessage 4502 entity there is one OrganisationalCentreEmployeeSimpleSelection ByEmployee 4516 entity. The OrganisationalCentreEmployeeSimpleSelectionByEmployee 4516 entity includes various attributes, namely EmployeeID 4520, WorkAgreememtID 4526 and KeyDate 4532. The EmployeeID 4520 attribute is an EmployeeID 4524 datatype. The EmployeeID 4520 attribute has a cardinality of zero or one 4522 meaning that for each instance of the OrganisationalCentreEmployeeSimpleSelectionByEmployee 4516 entity there may be one EmployeeID 4520 attribute. The WorkAgreememtID 4526 attribute is a WorkAgreementID 4530 datatype. The WorkAgreememtID 4526 attribute has a cardinality of zero or one 4528 meaning that for each instance of the OrganisationalCentreEmployeeSimpleSelection ByEmployee 4516 entity there may be one WorkAgreememtID 4526 attribute. The KeyDate 4532 attribute is a Date 4536 datatype. The KeyDate 4532 attribute has a cardinality of zero or one 4534 meaning that for each instance of the OrganisationalCentreEmployeeSimpleSelectionByEmployee 4516 entity there may be one KeyDate 4532 attribute. The Selection Package The Selection Package collects all the selection criteria for an Employee. The OrganisationalCentreEmployeeSimpleSelectionByEmployee specifies an Employee to select OrganisationalCentreEmployeeSimple. EmployeeID is the unique identifier of the employee for whom the employees belonging to the same Organizational Centers as that employee are queried. WorkAgreement_ID is the unique identifier of the work agreement for whom the employees belonging to the same Organizational Centers as that work agreement are queried. The KeyDate is the date for which the OrganisationalCentreEmployeeSimple is read. The default value can be the current date.

Message Data Type OrganisationalCentreEmployeeSimpleByEmployeeResponse

An OrganisationalCentreEmployeeSimpleByEmployee Response is the response to an OrganisationalCentreEmployeeSimpleByEmployeeQuery and contains information identifying the employees who belong to the same organizational centers as the employee. The structure of the message type OrganisationalCentreEmployeeSimpleByEmployeeResponse is specified by the message data type OrganisationalCentreEmployeeSimple ByEmployeeMessage. The message data type OrganisationalCentreEmployeeSimpleByEmployeeResponse Message contains the Employee included in the business document and the business information that is relevant for sending a business document in a message FIGS. 46-1 through 46-2 show an EmployeeMessage 4600 package. The EmployeeMessage 4600 package is a <MessageDataType> 4604 datatype. The EmployeeMessage 4600 package includes an OrganisationalCentreEmployee SimpleByEmployeeResponse 4602 entity. The Employee Message 4600 package includes various packages, namely MessageHeader 4606, Employee 4614 and Log 4644.

The MessageHeader 4606 package is a BusinessDocumentMessageHeader 4612 datatype. The MessageHeader 4606 package includes a MessageHeader 4608 entity. The MessageHeader 4608 entity has a cardinality of one 4610 meaning that for each instance of the OrganisationalCentreEmployeeSimpleByEmployeeResponse 4602 entity there is one MessageHeader 4608 entity.

The Employee 4614 package includes an Employee 4616 entity. The Employee 4614 package includes a WorkAgreement 4632 package. The Employee 4616 entity has a cardinality of zero or n 4618 meaning that for each instance of the OrganisationalCentreEmployeeSimpleByEmployeeResponse 4602 entity there may be one or more Employee 4616 entities. The Employee 4616 entity includes various attributes, namely ID 4620 and PersonFormattedName 4626. The ID 4620 attribute is an EmployeeID 4624 datatype. The ID 4620 attribute has a cardinality of one 4622 meaning that for each instance of the Employee 4616 entity there is one ID 4620 attribute. The PersonFormattedName 4626 attribute is a PersonFormattedName 4630 datatype. The PersonFormattedName 4626 attribute has a cardinality of one 4628 meaning that for each instance of the Employee 4616 entity there is one PersonFormattedName 4626 attribute.

The WorkAgreement 4632 package includes a WorkAgreement 4634 entity. The WorkAgreement 4634 entity has a cardinality of zero or n 4636 meaning that for each instance of the Employee 4616 entity there may be one or more WorkAgreement 4634 entities. The WorkAgreement 4634 entity includes an ID 4638 attribute. The ID 4638 attribute is a WorkAgreementID 4642 datatype. The ID 4638 attribute has a cardinality of one 4640 meaning that for each instance of the WorkAgreement 4634 entity there is one ID 4638 attribute.

The Log 4644 package is a Log 4650 datatype. The Log 4644 package includes a Log 4646 entity. The Log 4646 entity has a cardinality of zero or one 4648 meaning that for each instance of the OrganisationalCentreEmployeeSimpleByEmployeeResponse 4602 entity there may be one Log 4646 entity.

WorkAgreement Package

The WorkAgreement package groups the information about the WorkAgreement. A WorkAgreement is a contract between employer and employee by means of which the employee is obliged to provide his or her labor while the employer is obliged to provide the agreed compensation. The activities and responsibilities of the employee are specified in the work agreement. This agreement establishes an employment. It is the foundation for further particulars such as working time and salary details specified in other objects. The ID is the unique identifier of the work agreement.

Message Data Type ReportingEmployeeByEmployeeQuery

A ReportingEmployeeByEmployeeQuery is the inquiry to an Employee about the information identifying the employees who report to an employee. In this message direct and indirect reports are returned depending on the selection. The structure of the message type ReportingEmployeeByEmployeeQuery is specified by the message data type ReportingEmployeeByEmployeeQueryMessage. The message data type EmployeeNameByEmployeeQueryMessage contains the selection included in the business document and the business information that is relevant for sending a business document in a message.

FIGS. 47-1 through 47-2 show an EmployeeMessage 4700 package. The EmployeeMessage 4700 package is a <MessageDataType> 4704 datatype. The EmployeeMessage 4700 package includes a ReportingEmployeeSimpleByEmployeeQueryMessage 4702 entity. The EmployeeMessage 4700 package includes various packages, namely MessageHeader 4706 and Employee 4714.

The MessageHeader 4706 package is a BusinessDocumentMessageHeader 4712 datatype. The MessageHeader 4706 package includes a MessageHeader 4708 entity. The MessageHeader 4708 entity has a cardinality of one 4710 meaning that for each instance of the ReportingEmployeeSimpleByEmployeeQueryMessage 4702 entity there is one MessageHeader 4708 entity.

The Employee 4714 package includes a ReportingEmployeeSimpleSelectionByEmploye 4716 entity. The ReportingEmployeeSimpleSelectionByEmploye 4716 entity has a cardinality of 1 . . . 1 4718 meaning that for each instance of the ReportingEmployeeSimpleByEmployeeQueryMessage 4702 entity there is one ReportingEmployeeSimpleSelectionByEmploye 4716 entity. The ReportingEmployeeSimpleSelectionByEmploye 4716 entity includes various attributes, namely EmployeeID 4720, WorkAgreememt_ID 4726, ReportingLineRelativeLevelValue 4732 and KeyDate 4738. The EmployeeID 4720 attribute is an EmployeeID 4724 datatype. The EmployeeID 4720 attribute has a cardinality of zero or one 4722 meaning that for each instance of the ReportingEmployeeSimpleSelectionByEmploye 4716 entity there may be one EmployeeID 4720 attribute. The WorkAgreememt_ID 4726 attribute is a WorkAgreementID 4730 datatype. The WorkAgreememt_ID 4726 attribute has a cardinality of zero or one 4728 meaning that for each instance of the ReportingEmployeeSimpleSelectionByEmploye 4716 entity there may be one WorkAgreememt_ID 4726 attribute. The ReportingLineRelativeLevelValue 4732 attribute is a ReportingLineRelativeLevelValue 4736 datatype. The ReportingLineRelativeLevelValue 4732 attribute has a cardinality of zero or one 4734 meaning that for each instance of the ReportingEmployeeSimpleSelectionByEmploye 4716 entity there may be one ReportingLineRelativeLevelValue 4732 attribute. The KeyDate 4738 attribute is a Date 4742 datatype. The KeyDate 4738 attribute has a cardinality of zero or one 4740 meaning that for each instance of the ReportingEmployeeSimpleSelectionByEmploye 4716 entity there may be one KeyDate 4738 attribute.

Selection Package

A Selection package collects all the selection criteria for an employee name. An EmployeeNameSelectionByEmployee specifies an Employee to select EmployeeName. The KeyDate defines the date for which the employee name is to be read from Employee. The default value can be the current date. EmployeeID is an identifier of an employee. WorkAgreement_ID is an identifier for a work agreement. Employee ID or WorkAgreement_ID can be provided as an input.

Message Data Type ReportingEmployeeByEmployeeResponse

The message data type ReportingEmployeeByEmployeeResponseMessage contains the Employee included in the business document and the business information that is relevant for sending a business document in a message.

FIGS. 48-1 through 48-3 show an EmployeeMessage 4800 package. The EmployeeMessage 4800 package is a <MessageDataType> 4804 datatype. The EmployeeMessage 4800 package includes a ReportingEmployeeSimpleByEmployeeResponse 4802 entity. The EmployeeMessage 4800 package includes various packages, namely MessageHeader 4806, Employee 4814 and Log 4894.

The MessageHeader 4806 package is a BusinessDocumentMessageHeader 4812 datatype. The MessageHeader 4806 package includes a MessageHeader 4808 entity. The MessageHeader 4808 entity has a cardinality of one 4810 meaning that for each instance of the ReportingEmployeeSimpleByEmployeeResponse 4802 entity there is one MessageHeader 4808 entity.

The Employee 4814 package includes an Employee 4816 entity. The Employee 4814 package includes various packages, namely Position 4832 and WorkAgreement 4882. The Employee 4816 entity has a cardinality of zero or n 4818 meaning that for each instance of the ReportingEmployeeSimpleByEmployeeResponse 4802 entity there may be one or more Employee 4816 entities. The Employee 4816 entity includes various attributes, namely ID 4820 and PersonFormattedName 4826. The ID 4820 attribute is an EmployeeID 4824 datatype. The ID 4820 attribute has a cardinality of one 4822 meaning that for each instance of the Employee 4816 entity there is one ID 4820 attribute. The PersonFormattedName 4826 attribute is a PersonFormattedName 4830 datatype. The PersonFormattedName 4826 attribute has a cardinality of one 4828 meaning that for each instance of the Employee 4816 entity there is one PersonFormattedName 4826 attribute.

The Position 4832 package includes an EmployeeAssignment 4834 entity. The EmployeeAssignment 4834 entity has a cardinality of zero or n 4836 meaning that for each instance of the Employee 4816 entity there may be one or more EmployeeAssignment 4834 entities. The EmployeeAssignment 4834 entity includes a Position 4838 subordinate entity. The Position 4838 entity has a cardinality of one 4840 meaning that for each instance of the EmployeeAssignment 4834 entity there is one Position 4838 entity. The Position 4838 entity includes various attributes, namely ID 4842, Description 4848 and OrganisationalCentreManagingPositionIndicator 4854. The Position 4838 entity includes an OrganisationalCentreAssignmnent 4860 subordinate entity. The ID 4842 attribute is a PositionID 4846 datatype. The ID 4842 attribute has a cardinality of one 4844 meaning that for each instance of the Position 4838 entity there is one ID 4842 attribute. The Description 4848 attribute is a Description 4852 datatype. The Description 4848 attribute has a cardinality of one 4850 meaning that for each instance of the Position 4838 entity there is one Description 4848 attribute. The OrganisationalCentreManagingPositionIndicator 4854 attribute is a ManagingPositionIndicator 4858 datatype. The OrganisationalCentreManagingPositionIndicator 4854 attribute has a cardinality of zero or one 4856 meaning that for each instance of the Position 4838 entity there may be one OrganisationalCentreManagingPositionIndicator 4854 attribute. The OrganisationalCentreAssigmnent 4860 entity has a cardinality of zero or one 4862 meaning that for each instance of the Position 4838 entity there may be one OrganisationalCentreAssigmnent 4860 entity. The OrganisationalCentreAssigmnent 4860 entity includes various attributes, namely OrganisationalCentreID 4864, OrganisationalCentreName 4870 and OrganisationalCentreBusinessCharacterCode 4876. The OrganisationalCentreID 4864 attribute is an OrganisationalCentreID 4868 datatype. The OrganisationalCentreID 4864 attribute has a cardinality of one 4866 meaning that for each instance of the OrganisationalCentreAssignment 4860 entity there is one OrganisationalCentreID 4864 attribute. The OrganisationalCentreName 4870 attribute is a MEDIUM_Name 4874 datatype. The OrganisationalCentreName 4870 attribute has a cardinality of one 4872 meaning that for each instance of the OrganisationalCentreAssigmnent 4860 entity there is one OrganisationalCentreName 4870 attribute. The OrganisationalCentreBusinessCharacterCode 4876 attribute is an OrganisationalCentreBusinessCharacterCode 4880 datatype. The OrganisationalCentreBusinessCharacterCode 4876 attribute has a cardinality of one 4878 meaning that for each instance of the OrganisationalCentreAssignment 4860 entity there is one OrganisationalCentreBusinessCharacterCode 4876 attribute.

The WorkAgreement 4882 package includes a WorkAgreement 4884 entity. The WorkAgreement 4884 entity has a cardinality of zero or one 4886 meaning that for each instance of the EmployeeAssignment 4834 entity there may be one WorkAgreement 4884 entity. The WorkAgreement 4884 entity includes an ID 4888 attribute. The ID 4888 attribute is a WorkAgreementID 4892 datatype. The ID 4888 attribute has a cardinality of one 4890 meaning that for each instance of the WorkAgreement 4884 entity there is one ID 4888 attribute.

The Log 4894 package is a Log 48100 datatype. The Log 4894 package includes a Log 4896 entity. The Log 4896 entity has a cardinality of zero or one 4898 meaning that for each instance of the ReportingEmployeeSimpleByEmployeeResponse 4802 entity there may be one Log 4896 entity.

Employee Package

The Employee package groups the information about the Employee and contains the entity Employee. An Employee is a person who contributes or has contributed to the creation of goods or services for a company. There can be internal and external employees. Unlike external employees, internal employees are bound by the instructions and are subject to the control of the labor organization. The ID is the unique identifier of the Employee. The PersonFormattedName is the formatted name of the employee.

Position Package

The Position package groups the information about the Position. EmployeeAssignment is the assignment of an employee to a position during a validity period. A position is an organizational element within the organizational plan of an enterprise. It combines tasks, competencies and responsibilities permanently that can be taken care of by one or more suitable employees. The ID is the unique identifier of the Position. The Description is the description of a position. The ManagingPositionIndicator states whether the Position is a managing Position of an Organizational Center or not. OrganisationalCentreAssignment is the assignment of a position to an organizational center during a validity period. The OrganisationalCentreID is the unique identifier of the Organizational Center. The OrganisationalCentreName is the name of an Organizational Center. The OrganisationalCentreBusinessCharacterCode is used to identify the nature of an Organizational Center.

Message Data Type ReportingLineManagerSimpleByEmployeeQuery

The message data type ReportingLineManagerSimpleByEmployeeQueryMessage contains the Selection included in the business document and the business information that is relevant for sending a business document in a message.

FIG. 49 shows an EmployeeMessage 4900 package. The EmployeeMessage 4900 package is a <MessageDataType> 4904 datatype. The EmployeeMessage 4900 package includes a ReportingLineManagerSimpleByEmployeeQueryMessage 4902 entity. The EmployeeMessage 4900 package includes various packages, namely MessageHeader 4906 and Employee 4914.

The MessageHeader 4906 package is a BusinessDocumentMessageHeader 4912 datatype. The MessageHeader 4906 package includes a MessageHeader 4908 entity. The MessageHeader 4908 entity has a cardinality of one 4910 meaning that for each instance of the ReportingLineManagerSimpleByEmployeeQueryMessage 4902 entity there is one MessageHeader 4908 entity.

The Employee 4914 package includes a ReportingLineManagerSimpleSelectionByEmployee 4916 entity. The ReportingLineManagerSimpleSelectionByEmployee 4916 entity has a cardinality of one 4918 meaning that for each instance of the ReportingLineManagerSimpleByEmployeeQueryMessage 4902 entity there is one ReportingLineManagerSimpleSelectionByEmployee 4916 entity. The ReportingLineManagerSimpleSelectionByEmployee 4916 entity includes various attributes, namely EmployeeID 4920, WorkAgreememtID 4926 and KeyDate 4932. The EmployeeID 4920 attribute is an EmployeeID 4924 datatype. The EmployeeID 4920 attribute has a cardinality of zero or one 4922 meaning that for each instance of the ReportingLineManagerSimpleSelectionByEmployee 4916 entity there may be one EmployeeID 4920 attribute. The WorkAgreememtID 4926 attribute is a WorkAgreementID 4930 datatype. The WorkAgreememtID 4926 attribute has a cardinality of zero or one 4928 meaning that for each instance of the ReportingLineManagerSimpleSelectionByEmployee 4916 entity there may be one WorkAgreememtID 4926 attribute. The KeyDate 4932 attribute is a Date 4936 datatype. The KeyDate 4932 attribute has a cardinality of zero or one 4934 meaning that for each instance of the ReportingLineManagerSimpleSelectionByEmployee 4916 entity there may be one KeyDate 4932 attribute.

Message Data Type ReportingLineManagerSimpleByEmployeeResponse

A ReportingLineManagerSimpleByEmployeeResponse is the response to a ReportingLineManagerSimpleByEmployeeQuery and contains information identifying the employees who have direct personnel responsibility (e.g., Reporting Line Managers) for a specific employee. The structure of the message type ReportingLineManagerSimpleByEmployeeResponse is specified by the message data type ReportingLineManagerSimpleByEmployeeMessage. The message data type ReportingLineManagerSimpleByEmployeeResponseMessage contains the Employee included in the business document and the business information that is relevant for sending a business document in a message.

FIGS. 50-1 through 50-2 show an EmployeeMessage 5000 package. The EmployeeMessage 5000 package is a <MessageDataType> 5004 datatype. The EmployeeMessage 5000 package includes a ReportingLineManagerSimpleByEmployeeResponse 5002 entity. The EmployeeMessage 5000 package includes various packages, namely MessageHeader 5006, Employee 5014 and Log 5044.

The MessageHeader 5006 package is a BusinessDocumentMessageHeader 5012 datatype. The MessageHeader 5006 package includes a MessageHeader 5008 entity. The MessageHeader 5008 entity has a cardinality of one 5010 meaning that for each instance of the ReportingLineManagerSimpleByEmployeeResponse 5002 entity there is one MessageHeader 5008 entity.

The Employee 5014 package includes an Employee 5016 entity. The Employee 5014 package includes a WorkAgreement 5032 package. The Employee 5016 entity has a cardinality of zero or n 5018 meaning that for each instance of the ReportingLineManagerSimpleByEmployeeResponse 5002 entity there may be one or more Employee 5016 entities. The Employee 5016 entity includes various attributes, namely ID 5020 and PersonFormattedName 5026. The ID 5020 attribute is an EmployeeID 5024 datatype. The ID 5020 attribute has a cardinality of one 5022 meaning that for each instance of the Employee 5016 entity there is one ID 5020 attribute. The PersonFormattedName 5026 attribute is a PersonFormattedName 5030 datatype. The PersonFormattedName 5026 attribute has a cardinality of one 5028 meaning that for each instance of the Employee 5016 entity there is one PersonFormattedName 5026 attribute.

The WorkAgreement 5032 package includes a WorkAgreement 5034 entity. The WorkAgreement 5034 entity has a cardinality of zero or n 5036 meaning that for each instance of the Employee 5016 entity there may be one or more WorkAgreement 5034 entities. The WorkAgreement 5034 entity includes an ID 5038 attribute. The ID 5038 attribute is a WorkAgreementID 5042 datatype. The ID 5038 attribute has a cardinality of one 5040 meaning that for each instance of the WorkAgreement 5034 entity there is one ID 5038 attribute.

The Log 5044 package is a Log 5050 datatype. The Log 5044 package includes a Log 5046 entity. The Log 5046 entity has a cardinality of zero or one 5048 meaning that for each instance of the ReportingLineManagerSimpleByEmployeeResponse 5002 entity there may be one Log 5046 entity. The ReportingLineManagerSimpleSelectionByEmployee specifies Employee to select ReportingLineManagerSimple. EmployeeID is the unique identifier of the employee whose direct Managers are queried. WorkAgreement_ID is the unique identifier of the work agreement whose direct Managers are queried. The KeyDate defines the date for which the ReportingLineManagerSimple is read. The default value can be the current date. If only EmployeeID is filled, the ReportingLineManager for all related WorkAgreements are returned.

Message Data Type ReportingLinePeerSimpleByEmployeeQuery

A ReportingLinePeerSimpleByEmployee is the inquiry to an Employee about the information identifying the employees who report directly to the same employee as this employee. The structure of the message type ReportingLinePeerSimpleByEmployeeQuery is specified by the message data type ReportingLinePeerSimpleByEmployeeQueryMessage.

FIG. 51 shows an EmployeeMessage 5100 package. The EmployeeMessage 5100 package is a <MessageDataType> 5104 datatype. The EmployeeMessage 5100 package includes a ReportingLinePeerByEmployeeQueryMessage 5102 entity. The EmployeeMessage 5100 package includes various packages, namely MessageHeader 5106 and Employee 5114.

The MessageHeader 5106 package is a BusinessDocumentMessageHeader 5112 datatype. The MessageHeader 5106 package includes a MessageHeader 5108 entity. The MessageHeader 5108 entity has a cardinality of one 5110 meaning that for each instance of the ReportingLinePeerByEmployeeQueryMessage 5102 entity there is one MessageHeader 5108 entity.

The Employee 5114 package includes a ReportingLinePeerSelectionByEmployee 5116 entity. The ReportingLinePeerSelectionByEmployee 5116 entity has a cardinality of one 5118 meaning that for each instance of the ReportingLinePeerByEmployeeQueryMessage 5102 entity there is one ReportingLinePeerSelectionByEmployee 5116 entity. The ReportingLinePeerSelectionByEmployee 5116 entity includes various attributes, namely EmployeeID 5120, Work- AgreememtID 5126 and KeyDate 5132. The EmployeeID 5120 attribute is an EmployeeID 5124 datatype. The EmployeeID 5120 attribute has a cardinality of zero or one 5122 meaning that for each instance of the ReportingLinePeerSelectionByEmployee 5116 entity there may be one EmployeeID 5120 attribute. The WorkAgreememtID 5126 attribute is a WorkAgreementID 5130 datatype. The WorkAgreememtID 5126 attribute has a cardinality of zero or one 5128 meaning that for each instance of the ReportingLinePeerSelectionByEmployee 5116 entity there may be one WorkAgreememtID 5126 attribute. The KeyDate 5132 attribute is a Date 5136 datatype. The KeyDate 5132 attribute has a cardinality of zero or one 5134 meaning that for each instance of the ReportingLinePeerSelectionByEmployee 5116 entity there may be one KeyDate 5132 attribute.

The message data type ReportingLinePeerSimpleByEmployeeQueryMessage contains the Selection included in the business document and the business information that is relevant for sending a business document in a message. The ReportingLinePeerSimpleSelectionByEmployee specifies an Employee to select ReportingLinePeerSimpleSelection. EmployeeID is the unique identifier of the employee for whom the employees reporting directly to the same manager as that employee, are queried. WorkAgreement_ID is a unique identifier of the work agreement for whom the employees reporting directly to the same manager as that work agreement, are queried. The KeyDate defines the date for which the ReportingLinePeerSimple is read. The default value can be the current date.

Message Data Type ReportingLinePeerSimpleByEmployeeResponse

A ReportingLinePeerSimpleByEmployeeResponse is the response to a ReportingLinePeerSimpleByEmployeeQuery and contains information identifying the employees, who report directly to the same employee as a specific employee does. The structure of the message type ReportingLinePeerSimpleByEmployeeResponse is specified by the message data type ReportingLinePeerSimpleByEmployeeResponseMessage. The message data type ReportingLinePeerSimpleByEmployeeResponseMessage contains the Employee included in the business document and the business information that is relevant for sending a business document in a message FIG. 52 shows an EmployeeMessage 5200 package. The EmployeeMessage 5200 package is a <MessageDataType> 5204 datatype. The EmployeeMessage 5200 package includes a ReportingLinePeerByEmployeeResponse 5202 entity. The EmployeeMessage 5200 package includes various packages, namely MessageHeader 5206, Employee 5214 and Log 5244.

The MessageHeader 5206 package is a BusinessDocumentMessageHeader 5212 datatype. The MessageHeader 5206 package includes a MessageHeader 5208 entity. The MessageHeader 5208 entity has a cardinality of one 5210 meaning that for each instance of the ReportingLinePeerByEmployeeResponse 5202 entity there is one MessageHeader 5208 entity.

The Employee 5214 package includes an Employee 5216 entity. The Employee 5214 package includes a WorkAgreement 5232 package. The Employee 5216 entity has a cardinality of zero or n 5218 meaning that for each instance of the ReportingLinePeerByEmployeeResponse 5202 entity there may be one or more Employee 5216 entities. The Employee 5216 entity includes various attributes, namely ID 5220 and PersonFormattedName 5226. The ID 5220 attribute is an EmployeeID 5224 datatype. The ID 5220 attribute has a cardinality of one 5222 meaning that for each instance of the Employee 5216 entity there is one ID 5220 attribute. The PersonFormattedName 5226 attribute is a PersonFormattedName 5230 datatype. The PersonFormattedName 5226 attribute has a cardinality of one 5228 meaning that for each instance of the Employee 5216 entity there is one PersonFormattedName 5226 attribute.

The WorkAgreement 5232 package includes a WorkAgreement 5234 entity. The WorkAgreement 5234 entity has a cardinality of zero or n 5236 meaning that for each instance of the Employee 5216 entity there may be one or more WorkAgreement 5234 entities. The WorkAgreement 5234 entity includes an ID 5238 attribute. The ID 5238 attribute is a WorkAgreementID 5242 datatype. The ID 5238 attribute has a cardinality of one 5240 meaning that for each instance of the WorkAgreement 5234 entity there is one ID 5238 attribute.

The Log 5244 package is a Log 5250 datatype. The Log 5244 package includes a Log 5246 entity. The Log 5246 entity has a cardinality of zero or one 5248 meaning that for each instance of the ReportingLinePeerByEmployeeResponse 5202 entity there may be one Log 5246 entity.

EmployeeLeaveRequest Interfaces

An employee in a company, who wants or has to be on leave, can request for this leave. Therefore he or she can use an Employee Self Service to send a leave request to a manager. This request contains information about the planned leave besides request information such as Submission Date and the selected Approver. The manager receives information about the requested leave and (depending on the leave type (e.g. leave of absence, sick leave)) has the possibility to approve or reject the request. After potential further steps (depending on the business scenario) the request leads to the creation of an active leave, but still exists in parallel. Due to the fact that an employee can be able to request for a leave and the manager can be able to approve or reject it, even if the data might lead to conflicts or other possible errors, a time administrator might be involved into the process as well. This administrator can process a leave request as well.

Message Choreography

Figure 53:
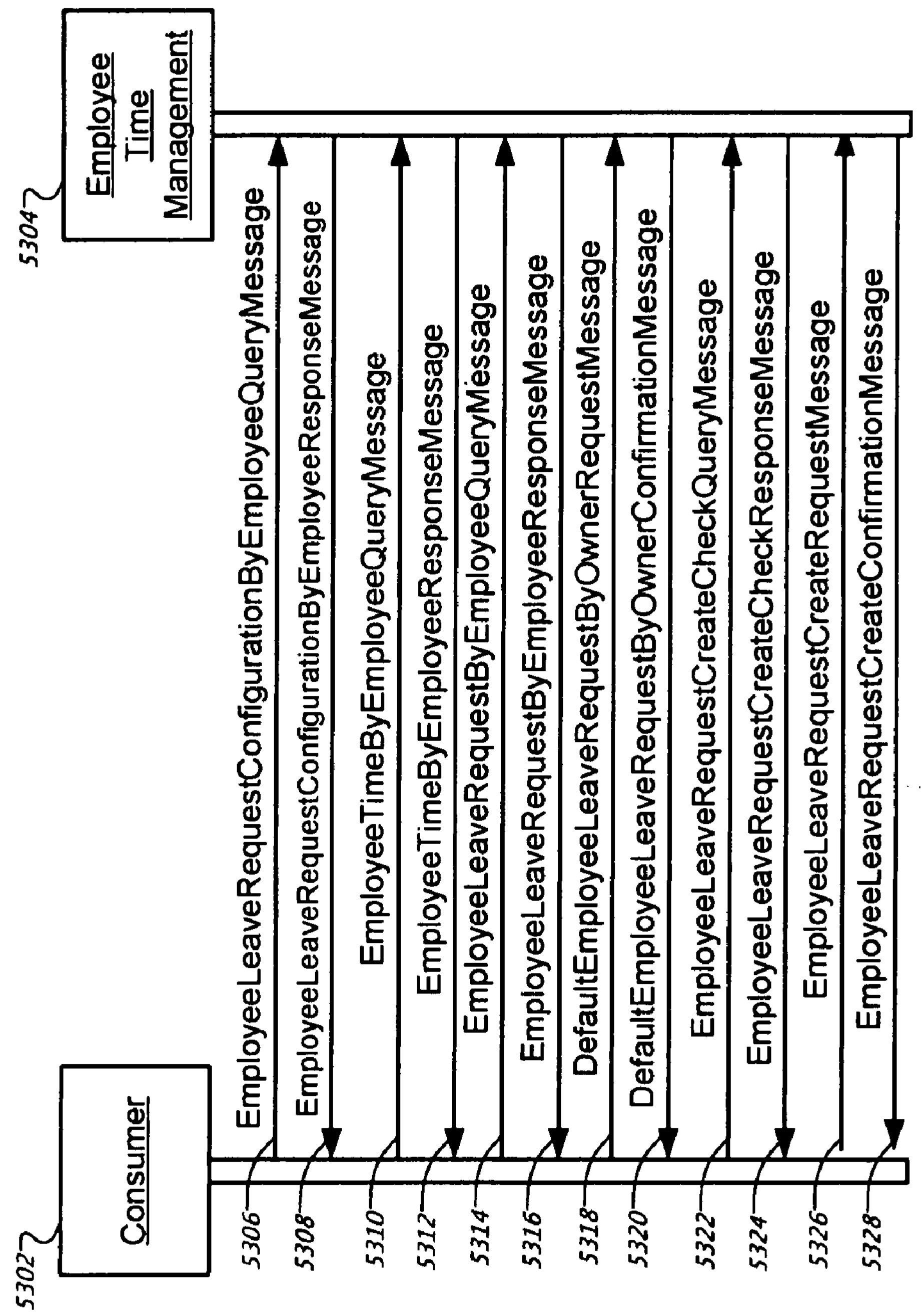
FIG. 53 shows an exemplary Employee Leave Request Message Choreography.

The message choreography of FIG. 53 describes a possible logical sequence of messages that can be used to realize an employee leave request business scenario.

EmployeeLeaveRequestCreateRequest

An EmployeeLeaveRequestCreateRequest is an order to the Employee Time Management to create an EmployeeLeaveRequest. The structure of the message type EmployeeLeaveRequestCreateRequest is specified by the message data type EmployeeLeaveRequestCreateRequestMessage, which is derived from the message data type EmployeeLeaveRequestMessage.

EmployeeLeaveRequestCreateConfirmation

An EmployeeLeaveRequestCreateConfirmation is a confirmation to an EmployeeLeaveRequestCreateRequest and contains the created EmployeeLeaveRequest. The created EmployeeLeaveRequest might have been adjusted to the Employee's working time schedule and it might have been enriched (e.g. by an approver) and other information depending on the business scenario. The structure of the message type EmployeeLeaveRequestCreateConfirmation is specified by the message data type EmployeeLeaveRequestCreateConfirmationMessage, which is derived from the message data type EmployeeLeaveRequestMessage.

EmployeeLeaveRequestCreateCheckQuery

An EmployeeLeaveRequestCreateCheckQuery is an inquiry to the Employee Time Management to check the processing of an EmployeeLeaveRequestCreateRequest message. The structure of the message type EmployeeLeaveRequestCreateCheckQuery is specified by the message data type EmployeeLeaveRequestCreateCheckQueryMessage, which is derived from the message data type EmployeeLeaveRequestMessage.

EmployeeLeaveRequestCreateCheckResponse

An EmployeeLeaveRequestCreateCheckResponse is a response to an EmployeeLeaveRequestCreateCheckQuery and contains the adjusted and enriched EmployeeLeaveRequest as result of the check of the processing of an EmployeeLeaveRequestCreateRequest message. Additionally, all information, warnings and errors can be returned that would occur due to further processing if the checked EmployeeLeave RequestCreateRequest document was not changed. The structure of the message type EmployeeLeaveRequestCreate CheckResponse is specified by the message data type EmployeeLeaveRequestCreateCheckResponse, which is derived from the message data type EmployeeLeaveRequestMessage.

EmployeeLeaveRequestUpdateRequest

An EmployeeLeaveRequestUpdateRequest is an order to the Employee Time Management to update an existing EmployeeLeaveRequest. The structure of the message type EmployeeLeaveRequestUpdateRequest is specified by the message data type EmployeeLeaveRequestUpdateRequestMessage, which is derived from the message data type EmployeeLeaveRequestMessage.

EmployeeLeaveRequestUpdateConfirmation

An EmployeeLeaveRequestUpdateConfirmation is a confirmation of an EmployeeLeaveRequestUpdateRequest and contains the Updated EmployeeLeaveRequest. The updated EmployeeLeaveRequest might have been adjusted to the Employee's working time schedule and it might have been enriched (e.g., by an approver) and other information depending on the business scenario. The structure of the message type EmployeeLeaveRequestUpdateConfirmation is specified by the message data type EmployeeLeaveRequestUpdateConfirmationMessage, which is derived from the message data type EmployeeLeaveRequestMessage.

EmployeeLeaveRequestUpdateCheckQuery

An EmployeeLeaveRequestUpdateCheckQuery is an inquiry to the Employee Time Management to check the processing of an EmployeeLeaveRequestUpdateRequest message. The structure of the message type EmployeeLeaveRequestUpdateCheckQuery is specified by the message data type EmployeeLeaveRequestUpdateCheckQueryMessage, which is derived from the message data type EmployeeLeaveRequestMessage.

EmployeeLeaveRequestUpdateCheckResponse

An EmployeeLeaveRequestUpdateCheckResponse is a response to an EmployeeLeaveRequestUpdateCheckQuery and contains the adjusted and enriched EmployeeLeaveRequest as the result of a check of the processing of an EmployeeLeaveRequestUpdateRequest message. Additionally all information, warnings and errors can be returned that would occur due to further processing if the checked EmployeeLeaveRequestUpdateRequest document was not changed. The structure of the message type EmployeeLeaveRequestUpdateCheckResponse is specified by the message data type EmployeeLeaveRequestUpdateCheckResponse, which is derived from the message data type EmployeeLeaveRequestMessage.

EmployeeLeaveRequestCancelRequest

An EmployeeLeaveRequestCancelRequest is an order to the Employee Time Management to cancel an existing EmployeeLeaveRequest. The structure of the message type EmployeeLeaveRequestCancelRequest is specified by the message data type EmployeeLeaveRequestCancelRequestMessage, which is derived from the message data type EmployeeLeaveRequestStatusChangeMessage.

EmployeeLeaveRequestCancelConfirmation

An EmployeeLeaveRequestCancelConfirmation is a confirmation of an EmployeeLeaveRequestCancelRequest and contains identifying information and the new status of the EmployeeLeaveRequest. The structure of the message type EmployeeLeaveRequestCancelConfirmation is specified by the message data type EmployeeLeaveRequestCancelConfirmationMessage, which is derived from the message data type EmployeeLeaveRequestStatusChangeMessage.

EmployeeLeaveRequestCancelCheckQuery

An EmployeeLeaveRequestCancelCheckQuery is the inquiry to the Employee Time Management to check the processing of an EmployeeLeaveRequestCancelRequest message. The structure of the message type EmployeeLeaveRequestCancelCheckQuery is specified by the message data type EmployeeLeaveRequestCancelCheckQueryMessage, which is derived from the message data type EmployeeLeaveRequestStatusChangeMessage.

EmployeeLeaveRequestCancelCheckResponse

An EmployeeLeaveRequestCancelCheckResponse is a response to an EmployeeLeaveRequestCancelCheckQuery and contains identifying information and the new status of the EmployeeLeaveRequest. Additionally, all information, warnings and errors can be returned that would occur due to further processing if the checked EmployeeLeaveRequestCancelRequest document was not changed. The structure of the message type EmployeeLeaveRequestCancelCheckResponse is specified by the message data type EmployeeLeaveRequestCancelCheckResponseMessage, which is derived from the message data type EmployeeLeaveRequestStatusChangeMessage.

EmployeeLeaveRequestApproveRequest

An EmployeeLeaveRequestApproveRequest is an order to the Employee Time Management to approve an EmployeeLeaveRequest. The structure of the message type EmployeeLeaveRequestApproveRequest is specified by the message data type EmployeeLeaveRequestApproveRequestMessage, which is derived from the message data type EmployeeLeaveRequestStatusChangeMessage.

EmployeeLeaveRequestApproveConfirmation

An EmployeeLeaveRequestApproveConfirmation is a confirmation of an EmployeeLeaveRequestApproveRequest and identifying information and the new status of the EmployeeLeaveRequest. The structure of the message type EmployeeLeaveRequestApproveConfirmation is specified by the message data type EmployeeLeaveRequestApproveConfirmationMessage, which is derived from the message data type EmployeeLeaveRequestStatusChangeMessage.

EmployeeLeaveRequestApproveCheckQuery

An EmployeeLeaveRequestApproveCheckQuery is an inquiry to the Employee Time Management to check the processing of an EmployeeLeaveRequestApproveRequest message The structure of the message type EmployeeLeaveRequestApproveCheckQuery is specified by the message data type EmployeeLeaveRequestApproveCheckQueryMessage, which is derived from the message data type EmployeeLeaveRequestStatusChangeMessage.

EmployeeLeaveRequestApproveCheckResponse

An EmployeeLeaveRequestApproveCheckResponse is a response to an EmployeeLeaveRequestApproveCheckQuery and contains the ID and new Status of the EmployeeLeaveRequest. Additionally, all information, warnings and errors can be returned that would occur due to further processing if the checked EmployeeLeaveRequestApproveRequest document was not changed. The structure of the message type EmployeeLeaveRequestApproveConfirmation is specified by the message data type EmployeeLeaveRequestApprove-ConfirmationMessage, which is derived from the message data type EmployeeLeaveRequestStatusChangeMessage.

EmployeeLeaveRequestRejectRequest

An EmployeeLeaveRequestCancelRequest is an order to the Employee Time Management to reject an EmployeeLeaveRequest. The structure of the message type EmployeeLeaveRequestRejectRequest is specified by the message data type EmployeeLeaveRequestRejectRequestMessage, which is derived from the message data type EmployeeLeaveRequestStatusChangeMessage.

EmployeeLeaveRequestRejectConfirmation

An EmployeeLeaveRequestRejectConfirmation is a confirmation of an EmployeeLeaveRequestRejectRequest and contains identifying information and the new status of the EmployeeLeaveRequest. The structure of the message type EmployeeLeaveRequestRejectConfirmation is specified by the message data type EmployeeLeaveRequestReject-ConfirmationMessage, which is derived from the message data type EmployeeLeaveRequestMessage.

EmployeeLeaveRequestRejectCheckQuery

An EmployeeLeaveRequestRejectCheckQuery is an inquiry to the Employee Time Management to check the processing of an EmployeeLeaveRequestRejectRequest message. The structure of the message type EmployeeLeaveRequestRejectCheckQuery is specified by the message data type EmployeeLeaveRequestRejectCheckQueryMessage, which is derived from the message data type EmployeeLeaveRequestStatusChangeMessage.

EmployeeLeaveRequestRejectCheckResponse

An EmployeeLeaveRequestRejectCheckResponse is a response of an EmployeeLeaveRequestRejectCheckQuery and contains the identifying information and the new status of the EmployeeLeaveRequest. Additionally, all information, warnings and errors can be returned that would occur due to further processing if the checked EmployeeLeaveRequestRejectRequest document was not changed. The structure of the message type EmployeeLeaveRequestRejectConfirmation is specified by the message data type EmployeeLeaveRequestRejectConfirmationMessage, which is derived from the message data type EmployeeLeaveRequestStatusChange Message.

EmployeeLeaveRequestAllowedApproverByIdentifying ElementsQuery

An EmployeeLeaveRequestAllowedApprover ByIdentifyingElementsQuery is an inquiry to the Employee Leave Request to provide a list of allowed approvers of an EmployeeLeaveRequest for a specific Employee. The structure of the message type EmployeeLeaveRequestAllowed Approver-ByIdentifyingElementsQuery is specified by the message data type EmployeeLeaveRequestAllowedApprover ByIdentifyingElementsQueryMessage.

EmployeeLeaveRequestAllowedApproverByIdentifying ElementsResponse

An EmployeeLeaveRequestAllowedApprover ByIdentifyingElementsResponse is a response to an EmployeeLeaveRequestAllowedApproverByIdentifyingElementsQuery and contains a list of possible approvers of an EmployeeLeaveRequest for a specific Employee. The structure of the message type EmployeeLeaveRequestAllowedApproverByIdentifyingElementsResponse is specified by the message data type EmployeeLeaveRequestAllowedApproverByIdentifyingElementsResponseMessage.

DefaultEmployeeLeaveRequestByOwnerQuery

A DefaultEmployeeLeaveRequestByOwnerQuery is an inquiry to the Employee Time Management to provide an EmployeeLeaveRequest with default values for a specific employee who wants to request a leave (e.g., the owner). The structure of the message type DefaultEmployeeLeaveRequestByOwnerQuery is specified by the message data type DefaultEmployeeLeaveRequestByOwnerQueryMessage.

DefaultEmployeeLeaveRequestByOwnerResponse

A DefaultEmployeeLeaveRequestByOwnerResponse is a response to an DefaultEmployeeLeaveRequest-ByOwnerQuery and contains an EmployeeLeaveRequest with default values for a specific employee. Default values might, for example, be provided for EmployeeTimeItemType, Approver, StartDate and EndDate. The structure of the message type DefaultEmployeeLeaveRequest-ByOwnerResponse is specified by the message data type DefaultEmployeeLeaveRequest-ByOwnerResponseMessage, which is derived from the message data type EmployeeLeaveRequestMessage.

EmployeeLeaveRequestByParticipantQuery

An EmployeeLeaveRequestByParticipantQuery is an inquiry to the EmployeeLeaveRequest to list all EmployeeLeaveRequests for a specific Employee, depending on his or her EmployeeLeaveRequestParticipantType. The participants of an EmployeeLeaveRequest are Owner, Approver and Administrator. The structure of the message type EmployeeLeaveRequestByParticipantQuery is specified by the message data type EmployeeLeaveRequestByParticipantQuery.

Message Data Type EmployeeLeaveRequestByParticipantResponse

An EmployeeLeaveRequestByParticipantResponse is a response to an EmployeeLeaveRequestByParticipantQuery and contains a list of EmployeeLeaveRequests for a specific employee with a specific EmployeeLeaveRequestParticipantType. The structure of the message type EmployeeLeaveRequestByParticipantResponse is specified by the message data type EmployeeLeaveRequestByParticipantResponseMessage, which is derived from the message data type EmployeeLeaveRequestMessage.

For example, a "Consumer" system 5302 can request to query an "Employee Time Management" system 5304 using an EmployeeLeaveRequestConfigurationByEmployeeQuery message 5306. The "Employee Time Management" system 5304 can respond to the query using an EmployeeLeaveRequestConfigurationByEmployeeResponse message 5308.

The "Consumer" system 5302 can request to query the "Employee Time Management" system 5304 using an EmployeeTimeByEmployeeQuery message 5310. The "Employee Time Management" system 2804 can respond to the query using an EmployeeTimeByEmployeeResponse message 5312.

Figure 54:
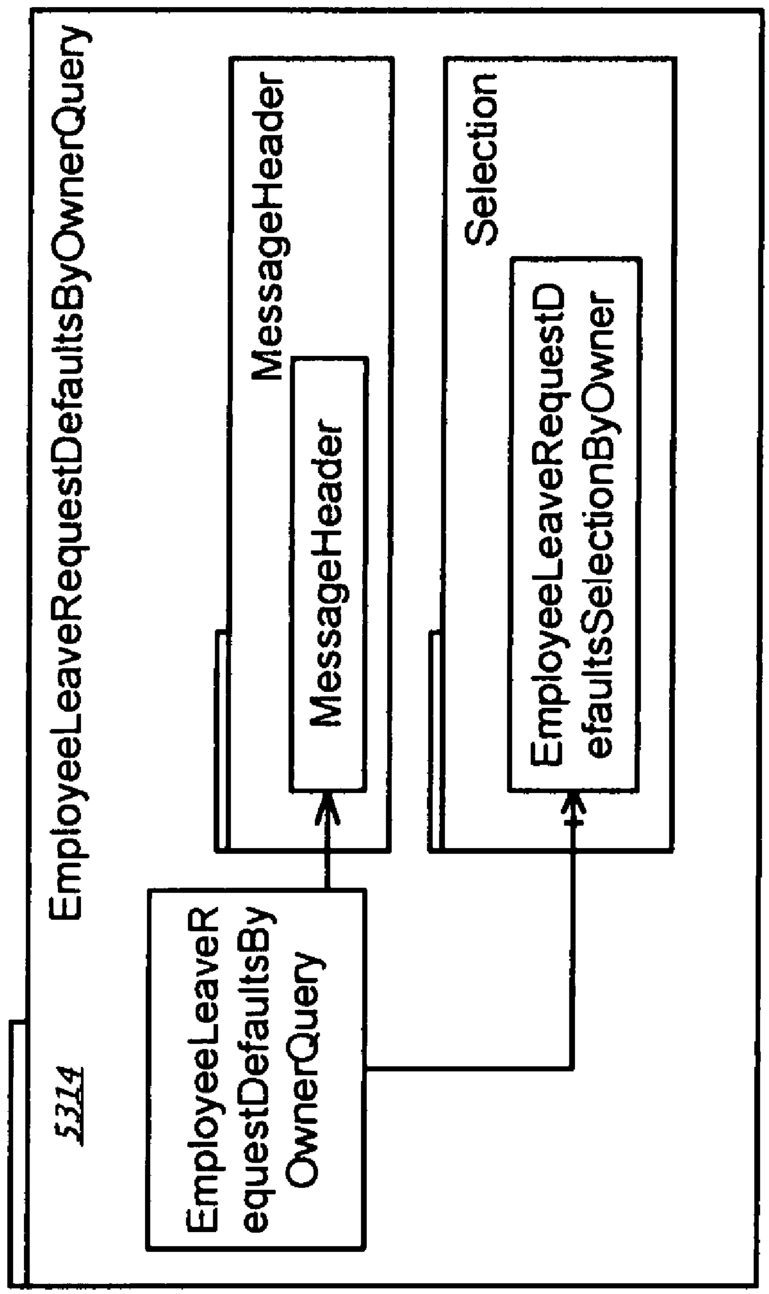
FIG. 54 shows an exemplary DefaultEmployeeLeaveRequestByOwnerQuery Message Data Type.
Figure 55:
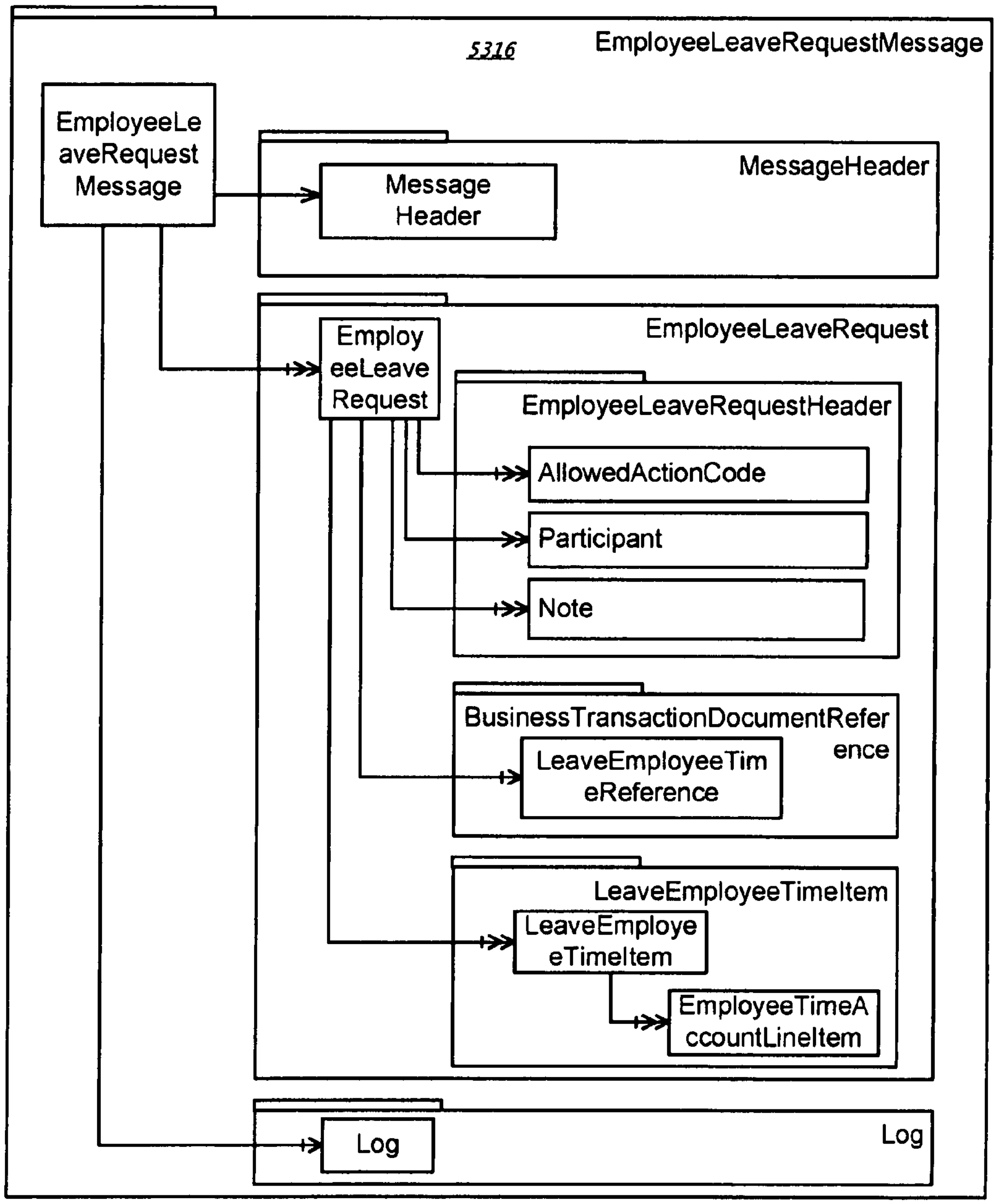
FIG. 55 shows an exemplary EmployeeLeaveRequest Message Data Type.

The "Consumer" system 5302 can request to query the "Employee Time Management" system 5304 using an EmployeeLeaveRequestByEmployeeQuery message 5314 as shown, for example, in FIG. 54. The "Employee Time Management" system 2804 can respond to the query using an EmployeeLeaveRequestByEmployeeResponse message 5316 as shown, for example, in FIG. 55.

The "Consumer" system 5302 can request to query the "Employee Time Management" system 5304 using a DefaultEmployeeLeaveRequestByOwnerRequest message 5318 The "Employee Time Management" system 2804 can respond to the query using a DefaultEmployeeLeaveRequest-ByOwnerConfirmation message 5320.

Figure 56:
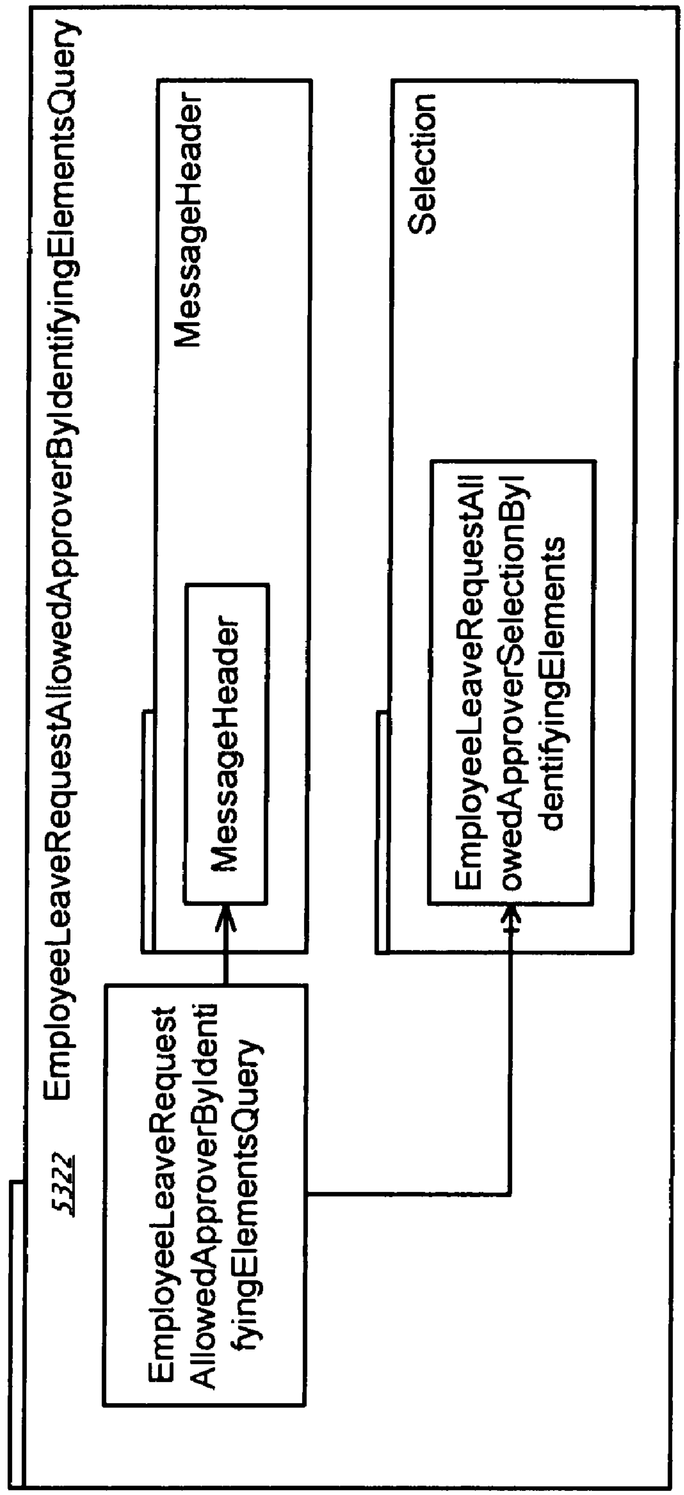
FIG. 56 shows an exemplary EmployeeLeaveRequestAllowedApproverByIdentifyingElementsQuery Message Data Type.
Figure 57:
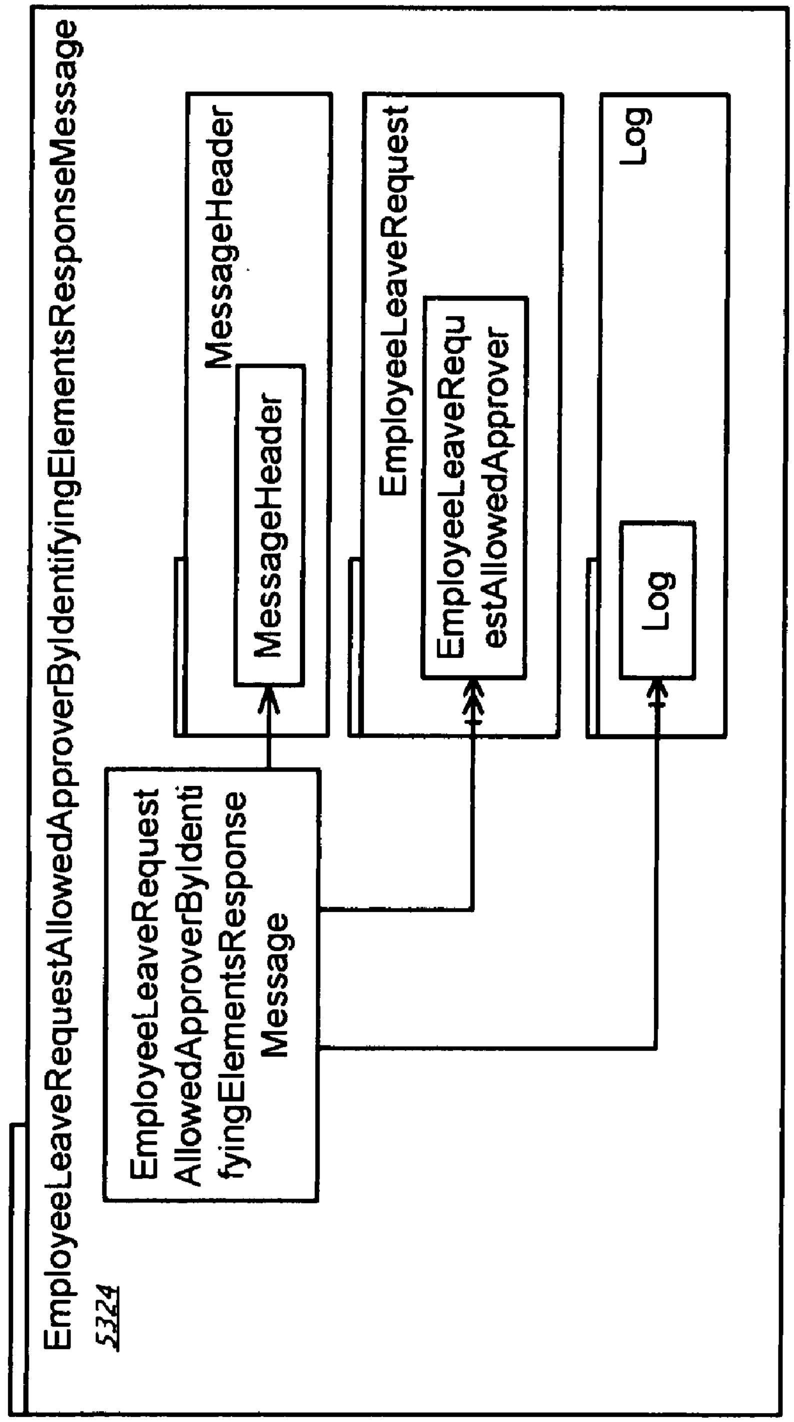
FIG. 57 shows an exemplary EmployeeLeaveRequestAllowedApproverByIdentifyingElementsResponse Message Data Type.

The "Consumer" system 5302 can request to query the "Employee Time Management" system 5304 using an EmployeeLeaveRequestCreateCheckQuery message 5322 as shown, for example, in FIG. 56. The "Employee Time Management" system 2804 can respond to the query using an EmployeeLeaveRequestCreateCheckResponse message 5324 as shown, for example, in FIG. 57.

Figure 58:
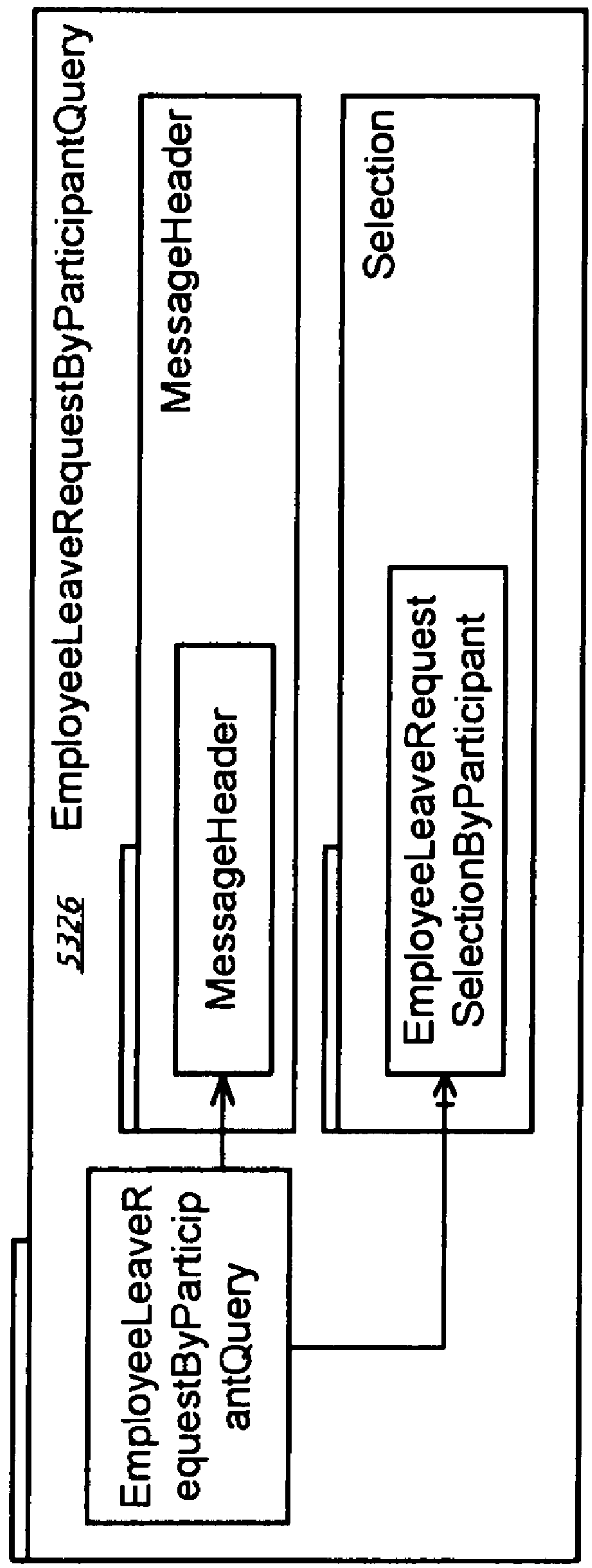
FIG. 58 shows an exemplary EmployeeLeaveRequestByParticipantQuery Message Data Type.
Figure 59:
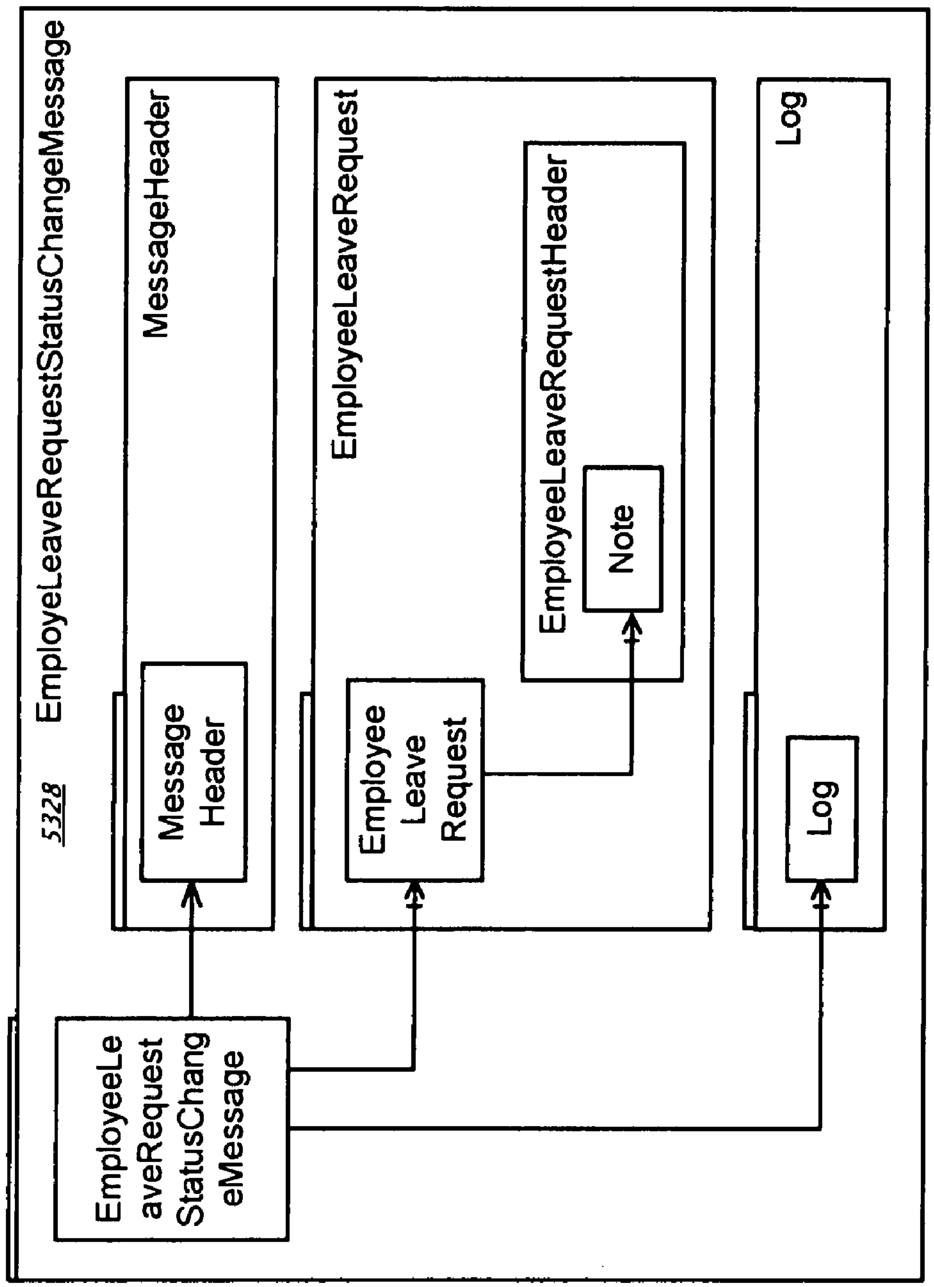
FIG. 59 shows an exemplary EmployeeLeaveRequestStatusChange Message Data Type.

The "Consumer" system 5302 can request to query the "Employee Time Management" system 5304 using an EmployeeLeaveRequestCreateRequest message 5326 as shown, for example, in FIG. 58. The "Employee Time Management" system 2804 can respond to the query using an EmployeeLeaveRequestCreateConfirmation message 5328 as shown, for example, in FIG. 59.

Message Data Type EmployeeLeaveRequestRejectCheckResponse

An EmployeeLeaveRequestRejectCheckResponse is a response of an EmployeeLeaveRequestRejectCheckQuery and contains the identifying information and the new status of the EmployeeLeaveRequest. Additionally, all information, warnings and errors can be returned that would occur due to further processing if the checked EmployeeLeaveRequestRejectRequest document was not changed. The structure of the message type EmployeeLeaveRequestRejectConfirmation is specified by the message data type EmployeeLeaveRequestRejectConfirmationMessage, which is derived from the message data type EmployeeLeaveRequestStatusChangeMessage.

FIGS. 42-1 through 42-2 show an EmployeeLeaveRequest RejectCheckResponse 4200 package. The EmployeeLeave RequestRejectCheckResponse 4200 package is an Employee LeaveRequestRejectCheckResponse 4204 datatype. The EmployeeLeaveRequestRejectCheckResponse 4200 package includes an EmployeeLeaveRequestRejectCheckResponse 4202 entity. The EmployeeLeaveRequestRejectCheckResponse 4200 package includes various packages, namely MessageHeader 4206, EmployeeLeaveRequest 4214 and Log 4240.

The MessageHeader 4206 package is a BusinessDocumentMessageHeader 4212 datatype. The MessageHeader 4206 package includes a MessageHeader 4208 entity. The MessageHeader 4208 entity has a cardinality of one 4210 meaning that for each instance of the EmployeeLeaveRequestRejectCheckResponse 4202 entity there is one MessageHeader 4208 entity.

The EmployeeLeaveRequest 4214 package is an Employee LeaveRequest 4220 datatype. The Employee-Leave Request 4214 package includes an EmployeeLeaveRequest 4216 entity. The EmployeeLeaveRequest 4216 entity has a cardinality of zero or one 4218 meaning that for each instance of the EmployeeLeaveRequestRejectCheckResponse 4202 entity there may be one EmployeeLeaveRequest 4216 entity. The EmployeeLeaveRequest 4216 entity includes various attributes, namely ID 4222, VersionID 4228 and LifeCycleStatusCode 4234. The ID 4222 attribute is a BusinessTransactionDocumentID 4226 datatype. The ID 4222 attribute has a cardinality of one 4224 meaning that for each instance of the EmployeeLeaveRequest 4216 entity there is one ID 4222 attribute. The VersionID 4228 attribute is a VersionID 4232 datatype. The VersionID 4228 attribute has a cardinality of one 4230 meaning that for each instance of the EmployeeLeaveRequest 4216 entity there is one VersionID 4228 attribute. The LifeCycleStatusCode 4234 attribute is an EmployeeLeaveRequestLifeCycleStatusCode 4238 datatype. The LifeCycleStatusCode 4234 attribute has a cardinality of one 4236 meaning that for each instance of the EmployeeLeaveRequest 4216 entity there is one LifeCycleStatusCode 4234 attribute.

The Log 4240 package is a Log 4246 datatype. The Log 4240 package includes a Log 4242 entity. The Log 4242 entity has a cardinality of zero or one 4244 meaning that for each instance of the EmployeeLeaveRequestRejectCheckResponse 4202 entity there may be one Log 4242 entity.

Message Data type EmployeeNameByEmployeeResponse Message

The message data type EmployeeNameByEmployeeResponseMessage contains the Employee included in the business document and the business information that is relevant for sending a business document in a message.

Message Data Type EmployeeLeaveRequestAllowedApproverByIdentifyingElementsResponse The message data type EmployeeLeaveRequestAllowedApproverByIdentifyingElementsResponseMessage contains the EmployeeLeaveRequestAllowedApprover included in the business document and the business information that is relevant for sending a business document in a message. An EmployeeLeaveRequestAllowedApproverByIdentifyingElementsResponse is a response to an EmployeeLeaveRequestAllowedApproverByIdentifyingElementsQuery and contains a list of possible approvers of an EmployeeLeaveRequest for a specific Employee. The structure of the message type EmployeeLeaveRequestAllowedApproverByIdentifyingElementsResponse is specified by the message data type EmployeeLeaveRequestAllowedApproverByIdentifyingElementsResponseMessage.

FIG. 60 shows an EmployeeLeaveRequestAllowedApproverByIdentifyingElementsResponse 6000 package. The EmployeeLeaveRequestAllowedApproverByIdentifyingElementsResponse 6000 package is an EmployeeLeaveRequestAllowedApproverByIdentifyingElementsResponse 6004 datatype. The EmployeeLeaveRequestAllowedApproverByIdentifyingElementsResponse 6000 package includes an EmployeeLeaveRequestAllowedApproverByIdentifyingElementsResponse 6002 entity. The EmployeeLeaveRequestAllowedApproverByIdentifyingElementsResponse 6000 package includes various packages, namely MessageHeader 6006, EmployeeLeaveRequest 6014 and Log 6040.

The MessageHeader 6006 package is a BusinessDocumentMessageHeader 6012 datatype. The MessageHeader 6006 package includes a MessageHeader 6008 entity. The MessageHeader 6008 entity has a cardinality of one 6010 meaning that for each instance of the EmployeeLeaveRequestAllowedApproverByIdentifyingElementsResponse 6002 entity there is one MessageHeader 6008 entity.

The EmployeeLeaveRequest 6014 package is an EmployeeLeaveRequestConfigurationSelectionByEmployee 6020 datatype. The EmployeeLeaveRequest 6014 package includes an EmployeeLeaveRequestAllowedApprover 6016 entity. The EmployeeLeaveRequestAllowedApprover 6016 entity has a cardinality of zero or n 6018 meaning that for each instance of the EmployeeLeaveRequestAllowedApproverByIdentifyingElementsResponse 6002 entity there may be one or more EmployeeLeaveRequestAllowedApprover 6016 entities. The EmployeeLeaveRequest-AllowedApprover 6016 entity includes various attributes, namely EmployeeID 6022, WorkAgreementID 6028 and SortableName 6034. The EmployeeID 6022 attribute is a WorkAgreementID 6026 datatype. The EmployeeID 6022 attribute has a cardinality of one 6024 meaning that for each instance of the EmployeeLeaveRequestAllowedApprover 6016 entity there is one EmployeeID 6022 attribute. The WorkAgreementID 6028 attribute is a Text 6032 datatype. The WorkAgreementID 6028 attribute has a cardinality of one 6030 meaning that for each instance of the EmployeeLeaveRequestAllowedApprover 6016 entity there is one WorkAgreementID 6028 attribute. The SortableName 6034 attribute is a PersonSortableName 6038 datatype. The SortableName 6034 attribute has a cardinality of one 6036 meaning that for each instance of the EmployeeLeaveRequestAllowedApprover 6016 entity there is one SortableName 6034 attribute.

The Log 6040 package is a Log 6046 datatype. The Log 6040 package includes a Log 6042 entity. The Log 6042 entity has a cardinality of zero or one 6044 meaning that for each instance of the EmployeeLeaveRequestAllowedApproverByIdentifyingElementsResponse 6002 entity there may be one Log 6042 entity.

EmployeeLeaveRequest Package

The EmployeeLeaveRequest package contains the AllowedApprover of an EmployeeLeaveRequest. An EmployeeLeaveRequestAllowedApprover is an Employee which is allowed to Approve an specific Employees' Leave Request. The EmployeeID is the unique identifier of the Approver that is allowed to approve an EmployeeLeaveRequest. The WorkAgreementID is the unique identifier of the WorkAgreement with which the Approver is allowed to approve an EmployeeLeaveRequest. The SortableName is the name of an Approver which is formatted in a way to easily sort Approvers by Name. A Log is a sequence of messages that result when an application executes a task. The Log package can be used in the message data types used for outbound messages from the perspective of the Time And Labor Management.

Message Data Type EmployeeLeaveRequestAllowedApproverByIdentifyingElementsQuery

An EmployeeLeaveRequestAllowedApproverByIdentifyingElementsQuery is an inquiry to the Employee Leave Request to provide a list of allowed approvers of an EmployeeLeaveRequest for a specific Employee. The structure of the message type EmployeeLeaveRequestAllowedApproverByIdentifyingElementsQuery is specified by the message data type EmployeeLeaveRequestAllowedApproverByIdentifyingElementsQueryMessage.

FIGS. 61-1 through 61-2 show an EmployeeLeaveRequestAllowedApproverByIdentifyingElementsQuery 6100 package. The EmployeeLeaveRequestAllowedApproverByIdentifyingElementsQuery 6100 package is an EmployeeLeaveRequestAllowedApproverByIdentifyingElementsQuery 6104 datatype. The EmployeeLeaveRequestAllowedApproverByIdentifyingElementsQuery 6100 package includes an EmployeeLeaveRequestAllowedApproverByIdentifyingElementsQuery 6102 entity. The EmployeeLeaveRequestAllowedApproverByIdentifyingElementsQuery 6100 package includes various packages, namely MessageHeader 6106 and Selection 6114.

The MessageHeader 6106 package is a BusinessDocumentMessageHeader 6112 datatype. The MessageHeader 6106 package includes a MessageHeader 6108 entity. The MessageHeader 6108 entity has a cardinality of one 6110 meaning that for each instance of the EmployeeLeaveRequestAllowedApproverByIdentifyingElementsQuery 6102 entity there is one MessageHeader 6108 entity.

The Selection 6114 package is an EmployeeLeaveRequestAllowedApproverSelectionByIdentifyingElements 6120 datatype. The Selection 6114 package includes an EmployeeLeaveRequestAllowedApproverSelectionByIdentifyingElements 6116 entity. The EmployeeLeaveRequestAllowedApproverSelectionByIdentifyingElements 6116 entity has a cardinality of one 6118 meaning that for each instance of the EmployeeLeaveRequestAllowedApproverByIdentifyingElementsQuery 6102 entity there is one EmployeeLeaveRequestAllowedApproverSelectionByIdentifyingElements 6116 entity. The EmployeeLeaveRequestAllowedApproverSelectionByIdentifyingElements 6116 entity includes various attributes, namely EmployeeLeaveRequest_OwnerWorkAgreementID 6122, ApproverSearchText 6128, EmployeeLeaveRequest_ApproverSortableName 6134, EmployeeLeaveRequest_ApproverEmployeeID 6140 and EmployeeLeaveRequest_ApproverWorkAgreementID 6146. The EmployeeLeaveRequest_OwnerWorkAgreementID 6122 attribute is a WorkAgreementID 6126 datatype. The EmployeeLeaveRequest_OwnerWorkAgreementID 6122 attribute has a cardinality of zero or one 6124 meaning that for each instance of the EmployeeLeaveRequestAllowedApproverSelectionByIdentifyingElements 6116 entity there may be one EmployeeLeaveRequest_OwnerWorkAgreementID 6122 attribute. The ApproverSearchText 6128 attribute is a SearchText 6132 datatype. The ApproverSearchText 6128 attribute has a cardinality of zero or one 6130 meaning that for each instance of the EmployeeLeaveRequestAllowedApproverSelectionByIdentifyingElements 6116 entity there may be one ApproverSearchText 6128 attribute. The EmployeeLeaveRequest_ApproverSortableName 6134 attribute is a PersonSortableName 6138 datatype. The EmployeeLeaveRequest_ApproverSortableName 6134 attribute has a cardinality of zero or one 6136 meaning that for each instance of the EmployeeLeaveRequestAllowedApproverSelectionByIdentifyingElements 6116 entity there may be one EmployeeLeaveRequest_ApproverSortableName 6134 attribute. The EmployeeLeaveRequest_ApproverEmployeeID 6140 attribute is an EmployeeID 6144 datatype. The EmployeeLeaveRequest_ApproverEmployeeID 6140 attribute has a cardinality of zero or one 6142 meaning that for each instance of the EmployeeLeaveRequestAllowedApproverSelectionByIdentifyingElements 6116 entity there may be one EmployeeLeaveRequest_ApproverEmployeeID 6140 attribute. The EmployeeLeaveRequest_ApproverWorkAgreementID 6146 attribute is a WorkAgreementID 6150 datatype. The EmployeeLeaveRequest_ApproverWorkAgreementID 6146 attribute has a cardinality of zero or one 6148 meaning that for each instance of the EmployeeLeaveRequestAllowedApproverSelectionByIdentifyingElements 6116 entity there may be one EmployeeLeaveRequest_ApproverWorkAgreementID 6146 attribute.

Message Data Type EmployeeLeaveRequestAllowedApproverByIdentifyingElementsQuery

The message data type EmployeeLeaveRequestAllowedApproverByIdentifyingElementsQueryMessage contains the Selection included in the business document and the business information that is relevant for sending a business document in a message. A MessageHeader groups business information from the perspective of the sending application, such as information to identify the business document in a message, information about the sender, and (possibly) information about the recipient. A SenderParty is the party responsible for sending a business document at the business application level. A RecipientParty is the party responsible for receiving a business document at the business application level. The Selection Package collects all the selection criteria for the EmployeeLeaveRequestAllowedApprover.

Message Data Type EmployeeLeaveRequestAllowedApproverSelectionByIdentifyingElements The EmployeeLeaveRequestAllowedApproverSelectionByIdentifyingElements specifies IdentifingElements to select EmployeeLeaveRequestAllowedApprover. The EmployeeLeaveRequestOwnerWorkAgreementID is the ID of the WorkAgreement of the Owner of an EmployeeLeaveRequest for whom an approver is searched. The EmployeeLeaveRequestApproverSearchText is a free text item used to search for an approver. The field can hold parts of a name, a WorkAgreementID, an EmployeeID or SystemAccountUser of the possible approver. The EmployeeLeaveRequestApprover_ SortableName is the name (or parts of it) of an Approver which is formatted in a way to easily sort Approver by Name. The EmployeeLeaveRequestApprover_EmployeeID is the identifier (or parts of it) of the Approver who is searched to approve an EmployeeLeaveRequest. The EmployeeLeaveRequestApprover_WorkAgreementID is the ID (or parts of it) of the WorkAgreement of an Approver who is searched to approve an EmployeeLeaveRequestApprover is assigned to.

Message Data Type EmployeeLeaveRequestApproveConfirmation

An EmployeeLeaveRequestApproveConfirmation is a confirmation of an EmployeeLeaveRequestApproveRequest and identifying information and the new status of the EmployeeLeaveRequest. The structure of the message type EmployeeLeaveRequestApproveConfirmation is specified by the message data type EmployeeLeaveRequestApproveConfirmationMessage, which is derived from the message data type EmployeeLeaveRequestStatusChangeMessage.

FIGS. 62-1 through 62-2 show an EmployeeLeaveRequest ApproveConfirmation 6200 package. The EmployeeLeave RequestApproveConfirmation 6200 package is an Employee LeaveRequestApproveConfirmation 6204 datatype. The EmployeeLeaveRequestApproveConfirmation 6200 package includes an EmployeeLeaveRequestApproveConfirmation 6202 entity. The EmployeeLeaveRequestApproveConfirmation 6200 package includes various packages, namely MessageHeader 6206, EmployeeLeaveRequest 6214 and Log 6240.

The MessageHeader 6206 package is a BusinessDocumentMessageHeader 6212 datatype. The MessageHeader 6206 package includes a MessageHeader 6208 entity. The MessageHeader 6208 entity has a cardinality of one 6210 meaning that for each instance of the EmployeeLeaveRequestApproveConfirmation 6202 entity there is one MessageHeader 6208 entity.

The EmployeeLeaveRequest 6214 package is an EmployeeLeaveRequest 6220 datatype. The EmployeeLeaveRequest 6214 package includes an EmployeeLeaveRequest 6216 entity. The EmployeeLeaveRequest 6216 entity has a cardinality of zero or one 6218 meaning that for each instance of the EmployeeLeaveRequestApproveConfirmation 6202 entity there may be one EmployeeLeaveRequest 6216 entity. The EmployeeLeaveRequest 6216 entity includes various attributes, namely ID 6222, VersionID 6228 and LifeCycleStatusCode 6234. The ID 6222 attribute is a BusinessTransactionDocumentID 6226 datatype. The ID 6222 attribute has a cardinality of one 6224 meaning that for each instance of the EmployeeLeaveRequest 6216 entity there is one ID 6222 attribute. The VersionID 6228 attribute is a VersionID 6232 datatype. The VersionID 6228 attribute has a cardinality of one 6230 meaning that for each instance of the EmployeeLeaveRequest 6216 entity there is one VersionID 6228 attribute. The LifeCycleStatusCode 6234 attribute is an EmployeeLeaveRequestLifeCycleStatusCode 6238 datatype. The LifeCycleStatusCode 6234 attribute has a cardinality of one 6236 meaning that for each instance of the EmployeeLeaveRequest 6216 entity there is one LifeCycleStatusCode 6234 attribute.

The Log 6240 package is a Log 6246 datatype. The Log 6240 package includes a Log 6242 entity. The Log 6242 entity has a cardinality of zero or one 6244 meaning that for each instance of the EmployeeLeaveRequestApproveConfirmation 6202 entity there may be one Log 6242 entity.

Message Data Type EmployeeLeaveRequestApproveRequest

An EmployeeLeaveRequestApproveRequest is an order to the Employee Time Management to approve an EmployeeLeaveRequest. The structure of the message type EmployeeLeaveRequestApproveRequest is specified by the message data type EmployeeLeaveRequestApproveRequestMessage, which is derived from the message data type EmployeeLeaveRequestStatusChangeMessage.

FIG. 63 shows an EmployeeLeaveRequestApproveRequest 6300 package. The EmployeeLeaveRequestApproveRequest 6300 package is an EmployeeLeaveRequestApproveRequest 6304 datatype. The EmployeeLeaveRequestApproveRequest 6300 package includes an EmployeeLeaveRequestApproveRequest 6302 entity. The EmployeeLeaveRequestApproveRequest 6300 package includes various packages, namely MessageHeader 6306 and EmployeeLeaveRequest 6314.

The MessageHeader 6306 package is a BusinessDocumentMessageHeader 6312 datatype. The MessageHeader 6306 package includes a MessageHeader 6308 entity. The MessageHeader 6308 entity has a cardinality of one 6310 meaning that for each instance of the EmployeeLeaveRequestApproveRequest 6302 entity there is one MessageHeader 6308 entity.

The EmployeeLeaveRequest 6314 package is an EmployeeLeaveRequest 6320 datatype. The EmployeeLeaveRequest 6314 package includes an EmployeeLeaveRequest 6316 entity. The EmployeeLeaveRequest 6314 package includes an EmployeeLeaveRequestHeader 6334 package. The EmployeeLeaveRequest 6316 entity has a cardinality of one 6318 meaning that for each instance of the EmployeeLeaveRequestApproveRequest 6302 entity there is one EmployeeLeaveRequest 6316 entity. The EmployeeLeaveRequest 6316 entity includes various attributes, namely ID 6322 and VersionID 6328. The ID 6322 attribute is a BusinessTransactionDocumentID 6326 datatype. The ID 6322 attribute has a cardinality of one 6324 meaning that for each instance of the EmployeeLeaveRequest 6316 entity there is one ID 6322 attribute. The VersionID 6328 attribute is a VersionID 6332 datatype. The VersionID 6328 attribute has a cardinality of one 6330 meaning that for each instance of the EmployeeLeaveRequest 6316 entity there is one VersionID 6328 attribute.

The EmployeeLeaveRequestHeader 6334 package is a Note 6340 datatype. The EmployeeLeaveRequestHeader 6334 package includes a Note 6336 entity. The Note 6336 entity has a cardinality of zero or one 6338 meaning that for each instance of the EmployeeLeaveRequest 6316 entity there may be one Note 6336 entity. The Note 6336 entity includes a Text 6342 attribute. The Text 6342 attribute is a Text 6346 datatype. The Text 6342 attribute has a cardinality of one 6344 meaning that for each instance of the Note 6336 entity there is one Text 6342 attribute.

Message Data Type EmployeeLeaveRequestByParticipantQueryMessage

The message data type EmployeeLeaveRequestCreateForLeaveRequestCreationRequestMessage contains the Selection included in the business document and the business information that is relevant for sending a business document in a message. An EmployeeLeaveRequestByParticipantQuery is an inquiry to the EmployeeLeaveRequest to list all EmployeeLeaveRequests for a specific Employee, depending on his or her EmployeeLeaveRequestParticipantType. The participants of an EmployeeLeaveRequest are Owner, Approver and Administrator. The structure of the message type EmployeeLeaveRequestByParticipantQuery is specified by the message data type EmployeeLeaveRequestByParticipantQuery.

FIGS. 64-1 through 64-2 show an EmployeeLeaveRequestByParticipantQueryMessage 6400 package. The EmployeeLeaveRequestByParticipantQueryMessage 6400 package is an EmployeeLeaveRequestByParticipantQueryMessage 6404 datatype. The EmployeeLeaveRequestByParticipantQueryMessage 6400 package includes an EmployeeLeaveRequestByParticipantQueryMessage 6402 entity. The EmployeeLeaveRequestByParticipantQueryMessage 6400 package includes various packages, namely MessageHeader 6406 and Selection 6414.

The MessageHeader 6406 package is a BusinessDocumentMessageHeader 6412 datatype. The MessageHeader 6406 package includes a MessageHeader 6408 entity. The MessageHeader 6408 entity has a cardinality of one 6410 meaning that for each instance of the EmployeeLeaveRequestByParticipantQueryMessage 6402 entity there is one MessageHeader 6408 entity.

The Selection 6414 package is an EmployeeLeaveRequestSelectionByParticipant 6420 datatype. The Selection 6414 package includes an EmployeeLeaveRequestSelectionByParticipant 6416 entity. The EmployeeLeaveRequestSelectionByParticipant 6416 entity has a cardinality of one 6418 meaning that for each instance of the EmployeeLeaveRequestByParticipantQueryMessage 6402 entity there is one EmployeeLeaveRequestSelectionByParticipant 6416 entity. The EmployeeLeaveRequestSelectionByParticipant 6416 entity includes various attributes, namely EmployeeLeaveRequestParticipantRoleCode 6422, EmployeeLeaveRequestParticipantEmployeeIDInterval 6428, EmloyeeLeaveRequestParticipantWorkAgreementIDInterval 6434, EmloyeeLeaveRequestLifeCycleStatusCodeInterval 6440 and AsOfDate 6446. The EmployeeLeaveRequestParticipantRoleCode 6422 attribute is an EmployeeLeaveRequestParticipantRoleCode 6426 datatype. The EmployeeLeaveRequestParticipantRoleCode 6422 attribute has a cardinality of one 6424 meaning that for each instance of the EmployeeLeaveRequestSelectionByParticipant 6416 entity there is one EmployeeLeaveRequestParticipantRoleCode 6422 attribute. The EmployeeLeaveRequestParticipantEmployeeIDInterval 6428 attribute is an EmployeeIDInterval 6432 datatype. The EmployeeLeaveRequestParticipantEmployeeIDInterval 6428 attribute has a cardinality of zero or n 6430 meaning that for each instance of the EmployeeLeaveRequestSelectionByParticipant 6416 entity there may be one or more EmployeeLeaveRequestParticipantEmployeeIDInterval 6428 attributes. The EmloyeeLeaveRequestParticipantWorkAgreementIDInterval 6434 attribute is a WorkAgreementIDInterval 6438 datatype. The EmloyeeLeaveRequestParticipantWorkAgreementIDInterval 6434 attribute has a cardinality of zero or n 6436 meaning that for each instance of the EmployeeLeaveRequestSelectionByParticipant 6416 entity there may be one or more EmloyeeLeaveRequestParticipantWorkAgreementIDInterval 6434 attributes. The EmloyeeLeaveRequestLifeCycleStatusCodeInterval 6440 attribute is an EmployeeRequestLifeCycleStatusInterval 6444 datatype. The EmloyeeLeaveRequestLifeCycleStatusCodeInterval 6440 attribute has a cardinality of zero or n 6442 meaning that for each instance of the EmployeeLeaveRequestSelectionByParticipant 6416 entity there may be one or more EmloyeeLeaveRequestLifeCycleStatusCodeInterval 6440 attributes. The AsOfDate 6446 attribute is a Date 6450 datatype. The AsOfDate 6446 attribute has a cardinality of zero or one 6448 meaning that for each instance of the EmployeeLeaveRequestSelectionByParticipant 6416 entity there may be one AsOfDate 6446 attribute. The Selection Package collects all the selection criteria for the EmployeeLeaveRequest.

EmployeeLeaveRequestSelectionByParticipant

The EmployeeLeaveRequestSelectionByParticipant specifies a Participant to select EmployeeLeaveRequest. The EmployeeLeaveRequest_ParticipantTypeCode is the coded representation of the role the participant has to own in the selected EmployeeTimeRequests. The EmployeeLeaveRequestParticipantEmployeeIDInterval is an interval of a unique identifier of the Employees that participates the EmployeeLeaveRequest. The EmployeeLeaveRequestOwnerWorkAgreementIDInterval is an interval of a unique identifier of the WorkAgreement with which the Employee participants the EmployeeLeaveRequest. The EmployeeLeaveRequestStatusInterval is an interval for the status of an EmployeeLeaveRequest. The AsOfDate is the Date as of which EmployeeLeaveRequests are requested to be returned.

Message Data Type EmployeeLeaveRequestByParticipantResponse

An EmployeeLeaveRequestByParticipantResponse is a response to an EmployeeLeaveRequestByParticipantQuery and contains a list of EmployeeLeaveRequests for a specific employee with a specific EmployeeLeaveRequestParticipantType. The structure of the message type EmployeeLeaveRequestByParticipantResponse is specified by the message data type EmployeeLeaveRequestByParticipantResponseMessage, which is derived from the message data type EmployeeLeaveRequestMessage.

FIGS. 65-1 through 65-6 show an EmployeeLeaveRequestByParticipantResponseMessage 6500 package. The EmployeeLeaveRequestByParticipantResponseMessage 6500 package is an EmployeeLeaveRequestByParticipantResponseMessage 6504 datatype. The EmployeeLeaveRequestByParticipantResponseMessage 6500 package includes an EmployeeLeaveRequestByParticipantResponseMessage 6502 entity. The EmployeeLeaveRequestByParticipantResponseMessage 6500 package includes various packages, namely MessageHeader 6506, EmployeeLeaveRequest 6514 and Log 65190.

The MessageHeader 6506 package is a BusinessDocumentMessageHeader 6512 datatype. The MessageHeader 6506 package includes a MessageHeader 6508 entity. The MessageHeader 6508 entity has a cardinality of one 6510 meaning that for each instance of the EmployeeLeaveRequestByParticipantResponseMessage 6502 entity there is one MessageHeader 6508 entity.

The EmployeeLeaveRequest 6514 package is an EmployeeLeaveRequest 6520 datatype. The EmployeeLeaveRequest 6514 package includes an EmployeeLeaveRequest 6516 entity. The EmployeeLeaveRequest 6514 package includes various packages, namely EmployeeRequestHeader 6552, BusinessTransactionDocumentReference 65120 and EmployeeTimeItem 65140. The EmployeeLeaveRequest 6516 entity has a cardinality of zero or n 6518 meaning that for each instance of the EmployeeLeaveRequestByParticipantResponseMessage 6502 entity there may be one or more EmployeeLeaveRequest 6516 entities. The EmployeeLeaveRequest 6516 entity includes various attributes, namely ID 6522, VersionID 6528, FirstSubmissionDateTime 6534, LifeCycleStatusCode 6540 and Action 6546. The ID 6522 attribute is a BusinessTransactionDocumentID 6526 datatype. The ID 6522 attribute has a cardinality of one 6524 meaning that for each instance of the EmployeeLeaveRequest 6516 entity there is one ID 6522 attribute. The VersionID 6528 attribute is a VersionID 6532 datatype. The VersionID 6528 attribute has a cardinality of one 6530 meaning that for each instance of the EmployeeLeaveRequest 6516 entity there is one VersionID 6528 attribute. The FirstSubmissionDateTime 6534 attribute is a DateTime 6538 datatype. The FirstSubmissionDateTime 6534 attribute has a cardinality of one 6536 meaning that for each instance of the EmployeeLeaveRequest 6516 entity there is one FirstSubmissionDateTime 6534 attribute. The LifeCycleStatusCode 6540 attribute is an EmployeeLeaveRequestLifeCycleStatusCode 6544 datatype. The LifeCycleStatusCode 6540 attribute has a cardinality of one 6542 meaning that for each instance of the EmployeeLeaveRequest 6516 entity there is one LifeCycleStatusCode 6540 attribute. The Action 6546 attribute is an EmployeeRequestActionCode 6550 datatype. The Action 6546 attribute has a cardinality of zero or n 6548 meaning that for each instance of the EmployeeLeaveRequest 6516 entity there may be one or more Action 6546 attributes.

The EmployeeRequestHeader 6552 package is a Participant 6558 datatype. The EmployeeRequestHeader 6552 package includes various entities, namely Participant 6554 and Note 6584. The Participant 6554 entity has a cardinality of one or n 6556 meaning that for each instance of the EmployeeLeaveRequest 6516 entity there are one or more Participant 6554 entities. The Participant 6554 entity includes various attributes, namely RoleCode 6560, EmployeeID 6566, WorkAgreementID 6572 and FormattedName 6578. The RoleCode 6560 attribute is an EmployeeLeaveRequestParticipantRoleCode 6564 datatype. The RoleCode 6560 attribute has a cardinality of one 6562 meaning that for each instance of the Participant 6554 entity there is one RoleCode 6560 attribute. The EmployeeID 6566 attribute is an EmployeeID 6570 datatype. The EmployeeID 6566 attribute has a cardinality of one 6568 meaning that for each instance of the Participant 6554 entity there is one EmployeeID 6566 attribute. The WorkAgreementID 6572 attribute is a WorkAgreementID 6576 datatype. The WorkAgreementID 6572 attribute has a cardinality of one 6574 meaning that for each instance of the Participant 6554 entity there is one WorkAgreementID 6572 attribute. The FormattedName 6578 attribute is a PersonFormattedName 6582 datatype. The FormattedName 6578 attribute has a cardinality of one 6580 meaning that for each instance of the Participant 6554 entity there is one FormattedName 6578 attribute.

The Note 6584 entity has a cardinality of zero or n 6586 meaning that for each instance of the EmployeeLeaveRequest 6516 entity there may be one or more Note 6584 entities. The Note 6584 entity includes various attributes, namely AuthorEmployeeID 6590, AuthorWorkAgreementID 6596, AuthorFormattedName 65102, DateTime 65108 and Text 65114. The AuthorEmployeeID 6590 attribute is an EmployeeID 6594 datatype. The AuthorEmployeeID 6590 attribute has a cardinality of one 6592 meaning that for each instance of the Note 6584 entity there is one AuthorEmployeeID 6590 attribute. The AuthorWorkAgreementID 6596 attribute is a WorkAgreementID 65100 datatype. The AuthorWorkAgreementID 6596 attribute has a cardinality of one 6598 meaning that for each instance of the Note 6584 entity there is one AuthorWorkAgreementID 6596 attribute. The AuthorFormattedName 65102 attribute is a PersonFormattedName 65106 datatype. The AuthorFormattedName 65102 attribute has a cardinality of one 65104 meaning that for each instance of the Note 6584 entity there is one AuthorFormattedName 65102 attribute. The DateTime 65108 attribute is a DateTime 65112 datatype. The DateTime 65108 attribute has a cardinality of one 65110 meaning that for each instance of the Note 6584 entity there is one DateTime 65108 attribute. The Text 65114 attribute is a Text 65118 datatype. The Text 65114 attribute has a cardinality of one 65116 meaning that for each instance of the Note 6584 entity there is one Text 65114 attribute.

The BusinessTransactionDocumentReference 65120 package is a BusinessTransactionDocumentReference/EmployeeTimeID 65126 datatype. The BusinessTransactionDocumentReference 65120 package includes a LeaveEmployeeTimeReference 65122 entity. The LeaveEmployeeTimeReference 65122 entity has a cardinality of zero or one 65124 meaning that for each instance of the EmployeeLeaveRequest 6516 entity there may be one LeaveEmployeeTimeReference 65122 entity. The LeaveEmployeeTimeReference 65122 entity includes various attributes, namely ActionCode 65128 and LeaveEmployeeTimeReference 65134. The ActionCode 65128 attribute is an ActionCode 65132 datatype. The ActionCode 65128 attribute has a cardinality of one 65130 meaning that for each instance of the LeaveEmployeeTimeReference 65122 entity there is one ActionCode 65128 attribute. The LeaveEmployeeTimeReference 65134 attribute is a BusinessTransactionDocumentReference 65138 datatype. The LeaveEmployeeTimeReference 65134 attribute has a cardinality of one 65136 meaning that for each instance of the LeaveEmployeeTimeReference 65122 entity there is one LeaveEmployeeTimeReference 65134 attribute.

The EmployeeTimeItem 65140 package is a LeaveEmployeeTimeItem 65146 datatype. The EmployeeTimeItem 65140 package includes a LeaveEmployeeTimeItem 65142 entity. The LeaveEmployeeTimeItem 65142 entity has a cardinality of zero or n 65144 meaning that for each instance of the EmployeeLeaveRequest 6516 entity there may be one or more LeaveEmployeeTimeItem 65142 entities. The LeaveEmployeeTimeItem 65142 entity includes various attributes, namely CategoryCode 65148, TypeCode 65154, Validity 65160 and EmployeeTimeAccountLineItem 65166. The CategoryCode 65148 attribute is an EmployeeTimeItemCategoryCode 65152 datatype. The CategoryCode 65148 attribute has a cardinality of one 65150 meaning that for each instance of the LeaveEmployeeTimeItem 65142 entity there is one CategoryCode 65148 attribute. The TypeCode 65154 attribute is an EmployeeTimeItemTypeCode 65158 datatype. The TypeCode 65154 attribute has a cardinality of one 65156 meaning that for each instance of the LeaveEmployeeTimeItem 65142 entity there is one TypeCode 65154 attribute. The Validity 65160 attribute is an EmployeeTimeItemValidity 65164 datatype. The Validity 65160 attribute has a cardinality of one 65162 meaning that for each instance of the LeaveEmployeeTimeItem 65142 entity there is one Validity 65160 attribute. The EmployeeTimeAccountLineItem 65166 attribute is an EmployeeTimeAccountLineItem 65170 datatype. The EmployeeTimeAccountLineItem 65166 attribute has a cardinality of zero or n 65168 meaning that for each instance of the LeaveEmployeeTimeItem 65142 entity there may be one or more EmployeeTimeAccountLineItem 65166 attributes.

The Log 65190 package is a Log 65196 datatype. The Log 65190 package includes a Log 65192 entity. The Log 65192 entity has a cardinality of zero or one 65194 meaning that for each instance of the EmployeeLeaveRequestByParticipantResponseMessage 6502 entity there may be one Log 65192 entity.

Message Data Type EmployeeLeaveRequestCancelConfirmation

An EmployeeLeaveRequestCancelConfirmation is a confirmation of an EmployeeLeaveRequestCancelRequest and contains identifying information and the new status of the EmployeeLeaveRequest. The structure of the message type EmployeeLeaveRequestCancelConfirmation is specified by the message data type EmployeeLeaveRequestCancelConfirmationMessage, which is derived from the message data type EmployeeLeaveRequestStatusChangeMessage.

FIGS. 66-1 through 66-2 show an EmployeeLeaveRequestCancelConfirmation 6600 package. The EmployeeLeaveRequestCancelConfirmation 6600 package is an EmployeeLeaveRequestCancelConfirmation 6604 datatype. The EmployeeLeaveRequestCancelConfirmation 6600 package includes an EmployeeLeaveRequestCancelConfirmation 6602 entity. The EmployeeLeaveRequestCancelConfirmation 6600 package includes various packages, namely MessageHeader 6606, EmployeeLeaveRequest 6614 and Log 6640.

The MessageHeader 6606 package is a BusinessDocumentMessageHeader 6612 datatype. The MessageHeader 6606 package includes a MessageHeader 6608 entity. The MessageHeader 6608 entity has a cardinality of one 6610 meaning that for each instance of the EmployeeLeaveRequestCancelConfirmation 6602 entity there is one MessageHeader 6608 entity.

The EmployeeLeaveRequest 6614 package is an EmployeeLeaveRequest 6620 datatype. The EmployeeLeaveRequest 6614 package includes an EmployeeLeaveRequest 6616 entity. The EmployeeLeaveRequest 6616 entity has a cardinality of zero or one 6618 meaning that for each instance of the EmployeeLeaveRequestCancelConfirmation 6602 entity there may be one EmployeeLeaveRequest 6616 entity. The EmployeeLeaveRequest 6616 entity includes various attributes, namely ID 6622, VersionID 6628 and LifeCycleStatusCode 6634. The ID 6622 attribute is a BusinessTransactionDocumentID 6626 datatype. The ID 6622 attribute has a cardinality of one 6624 meaning that for each instance of the EmployeeLeaveRequest 6616 entity there is one ID 6622 attribute. The VersionID 6628 attribute is a VersionID 6632 datatype. The VersionID 6628 attribute has a cardinality of one 6630 meaning that for each instance of the EmployeeLeaveRequest 6616 entity there is one VersionID 6628 attribute. The LifeCycleStatusCode 6634 attribute is an EmployeeLeaveRequestLifeCycleStatusCode 6638 datatype. The LifeCycleStatusCode 6634 attribute has a cardinality of one 6636 meaning that for each instance of the EmployeeLeaveRequest 6616 entity there is one LifeCycleStatusCode 6634 attribute.

The Log 6640 package is a Log 6646 datatype. The Log 6640 package includes a Log 6642 entity. The Log 6642 entity has a cardinality of zero or one 6644 meaning that for each instance of the EmployeeLeaveRequestCancelConfirmation 6602 entity there may be one Log 6642 entity.

Message Data Type EmployeeLeaveRequestCancelRequest

An EmployeeLeaveRequestCancelRequest is an order to the Employee Time Management to cancel an existing EmployeeLeaveRequest. The structure of the message type EmployeeLeaveRequestCancelRequest is specified by the message data type EmployeeLeaveRequestCancelRequestMessage, which is derived from the message data type EmployeeLeaveRequestStatusChangeMessage.

FIG. 67 shows an EmployeeLeaveRequestCancelRequest 6700 package. The EmployeeLeaveRequestCancelRequest 6700 package is an EmployeeLeaveRequestCancelRequest 6704 datatype. The EmployeeLeaveRequestCancelRequest 6700 package includes an EmployeeLeaveRequestCancelRequest 6702 entity. The EmployeeLeaveRequestCancelRequest 6700 package includes various packages, namely MessageHeader 6706 and EmployeeLeaveRequest 6714.

The MessageHeader 6706 package is a BusinessDocumentMessageHeader 6712 datatype. The MessageHeader 6706 package includes a MessageHeader 6708 entity. The MessageHeader 6708 entity has a cardinality of one 6710 meaning that for each instance of the EmployeeLeaveRequestCancelRequest 6702 entity there is one MessageHeader 6708 entity.

The EmployeeLeaveRequest 6714 package is an EmployeeLeaveRequest 6720 datatype. The EmployeeLeaveRequest 6714 package includes an EmployeeLeaveRequest 6716 entity. The EmployeeLeaveRequest 6714 package includes an EmployeeLeaveRequestHeader 6734 package. The EmployeeLeaveRequest 6716 entity has a cardinality of one 6718 meaning that for each instance of the EmployeeLeaveRequestCancelRequest 6702 entity there is one EmployeeLeaveRequest 6716 entity. The EmployeeLeaveRequest 6716 entity includes various attributes, namely ID 6722 and VersionID 6728. The ID 6722 attribute is a BusinessTransactionDocumentID 6726 datatype. The ID 6722 attribute has a cardinality of one 6724 meaning that for each instance of the EmployeeLeaveRequest 6716 entity there is one ID 6722 attribute. The VersionID 6728 attribute is a VersionID 6732 datatype. The VersionID 6728 attribute has a cardinality of one 6730 meaning that for each instance of the EmployeeLeaveRequest 6716 entity there is one VersionID 6728 attribute.

The EmployeeLeaveRequestHeader 6734 package is a Note 6740 datatype. The EmployeeLeaveRequestHeader 6734 package includes a Note 6736 entity. The Note 6736 entity has a cardinality of zero or one 6738 meaning that for each instance of the EmployeeLeaveRequest 6716 entity there may be one Note 6736 entity. The Note 6736 entity includes a Text 6742 attribute. The Text 6742 attribute is a Text 6746 datatype. The Text 6742 attribute has a cardinality of one 6744 meaning that for each instance of the Note 6736 entity there is one Text 6742 attribute.

Message Data Type EmployeeLeaveRequestCreateCheckResponse

An EmployeeLeaveRequestCreateCheckResponse is a response to an EmployeeLeaveRequestCreateCheckQuery and contains the adjusted and enriched EmployeeLeaveRequest as result of the check of the processing of an EmployeeLeaveRequestCreateRequest message. Additionally, all information, warnings and errors can be returned that would occur due to further processing if the checked EmployeeLeaveRequestCreateRequest document was not changed. The structure of the message type EmployeeLeaveRequestCreateCheckResponse is specified by the message data type EmployeeLeaveRequestCreateCheckResponse, which is derived from the message data type EmployeeLeaveRequestMessage.

FIGS. 68-1 through 68-5 show an EmployeeLeaveRequestCreateCheckResponse 6800 package. The EmployeeLeaveRequestCreateCheckResponse 6800 package is an EmployeeLeaveRequestCreateCheckResponse 6804 datatype. The EmployeeLeaveRequestCreateCheckResponse 6800 package includes an EmployeeLeaveRequestCreateCheckResponse 6802 entity. The EmployeeLeaveRequestCreateCheckResponse 6800 package includes various packages, namely MessageHeader 6806, EmployeeLeaveRequest 6814 and Log 68166.

The MessageHeader 6806 package is a BusinessDocumentMessageHeader 6812 datatype. The MessageHeader 6806 package includes a MessageHeader 6808 entity. The MessageHeader 6808 entity has a cardinality of one 6810 meaning that for each instance of the EmployeeLeaveRequestCreateCheckResponse 6802 entity there is one MessageHeader 6808 entity.

The EmployeeLeaveRequest 6814 package is an EmployeeLeaveRequest 6820 datatype. The EmployeeLeaveRequest 6814 package includes an EmployeeLeaveRequest 6816 entity. The EmployeeLeaveRequest 6814 package includes various packages, namely EmployeeLeaveRequestHeader 6828, BusinessTransactionDocumentReference 6896 and EmployeeTimeItem 68116. The EmployeeLeaveRequest 6816 entity has a cardinality of zero or one 6818 meaning that for each instance of the EmployeeLeaveRequestCreateCheckResponse 6802 entity there may be one EmployeeLeaveRequest 6816 entity. The EmployeeLeaveRequest 6816 entity includes a LifeCycleStatusCode 6822 attribute. The LifeCycleStatusCode 6822 attribute is an EmployeeLeaveRequestLifeCycleStatusCode 6826 datatype. The LifeCycleStatusCode 6822 attribute has a cardinality of one 6824 meaning that for each instance of the EmployeeLeaveRequest 6816 entity there is one LifeCycleStatusCode 6822 attribute.

The EmployeeLeaveRequestHeader 6828 package is a Participant 6834 datatype. The EmployeeLeaveRequestHeader 6828 package includes various entities, namely Participant 6830 and Note 6860. The Participant 6830 entity has a cardinality of one or n 6832 meaning that for each instance of the EmployeeLeaveRequest 6816 entity there are one or more Participant 6830 entities. The Participant 6830 entity includes various attributes, namely RoleCode 6836, EmployeeID 6842, WorkAgreementID 6848 and FormattedName 6854. The RoleCode 6836 attribute is an EmployeeLeaveRequestParticipantRoleCode 6840 datatype. The RoleCode 6836 attribute has a cardinality of one 6838 meaning that for each instance of the Participant 6830 entity there is one RoleCode 6836 attribute. The EmployeeID 6842 attribute is an EmployeeID 6846 datatype. The EmployeeID 6842 attribute has a cardinality of one 6844 meaning that for each instance of the Participant 6830 entity there is one EmployeeID 6842 attribute. The WorkAgreementID 6848 attribute is a WorkAgreementID 6852 datatype. The WorkAgreementID 6848 attribute has a cardinality of one 6850 meaning that for each instance of the Participant 6830 entity there is one WorkAgreementID 6848 attribute. The FormattedName 6854 attribute is a PersonFormattedName 6858 datatype. The FormattedName 6854 attribute has a cardinality of one 6856 meaning that for each instance of the Participant 6830 entity there is one FormattedName 6854 attribute.

The Note 6860 entity has a cardinality of zero or n 6862 meaning that for each instance of the EmployeeLeaveRequest 6816 entity there may be one or more Note 6860 entities. The Note 6860 entity includes various attributes, namely AuthorEmployeeID 6866, AuthorWorkAgreementID 6872, AuthorFormattedName 6878, DateTime 6884 and Text 6890. The AuthorEmployeeID 6866 attribute is an EmployeeID 6870 datatype. The AuthorEmployeeID 6866 attribute has a cardinality of one 6868 meaning that for each instance of the Note 6860 entity there is one AuthorEmployeeID 6866 attribute. The AuthorWorkAgreementID 6872 attribute is a WorkAgreementID 6876 datatype. The AuthorWorkAgreementID 6872 attribute has a cardinality of one 6874 meaning that for each instance of the Note 6860 entity there is one AuthorWorkAgreementID 6872 attribute. The AuthorFormattedName 6878 attribute is a PersonFormattedName 6882 datatype. The AuthorFormattedName 6878 attribute has a cardinality of one 6880 meaning that for each instance of the Note 6860 entity there is one AuthorFormattedName 6878 attribute. The DateTime 6884 attribute is a DateTime 6888 datatype. The DateTime 6884 attribute has a cardinality of one 6886 meaning that for each instance of the Note 6860 entity there is one DateTime 6884 attribute. The Text 6890 attribute is a Text 6894 datatype. The Text 6890 attribute has a cardinality of one 6892 meaning that for each instance of the Note 6860 entity there is one Text 6890 attribute.

The BusinessTransactionDocumentReference 6896 package is a LeaveEmployeeTimeReference 68102 datatype. The BusinessTransactionDocumentReference 6896 package includes a LeaveEmployeeTimeReference 6898 entity. The LeaveEmployeeTimeReference 6898 entity has a cardinality of zero or one 68100 meaning that for each instance of the EmployeeLeaveRequest 6816 entity there may be one LeaveEmployeeTimeReference 6898 entity. The LeaveEmployeeTimeReference 6898 entity includes various attributes, namely ActionCode 68104 and LeaveEmployeeTimeReference 68110. The ActionCode 68104 attribute is an ActionCode 68108 datatype. The ActionCode 68104 attribute has a cardinality of one 68106 meaning that for each instance of the LeaveEmployeeTimeReference 6898 entity there is one ActionCode 68104 attribute. The LeaveEmployeeTimeReference 68110 attribute is a BusinessTransactionDocumentReference 68114 datatype. The LeaveEmployeeTimeReference 68110 attribute has a cardinality of one 68112 meaning that for each instance of the LeaveEmployeeTimeReference 6898 entity there is one LeaveEmployeeTimeReference 68110 attribute.

The EmployeeTimeItem 68116 package is a LeaveEmployeeTimeItem 68122 datatype. The EmployeeTimeItem 68116 package includes a LeaveEmployeeTimeItem 68118 entity. The LeaveEmployeeTimeItem 68118 entity has a cardinality of zero or n 68120 meaning that for each instance of the EmployeeLeaveRequest 6816 entity there may be one or more LeaveEmployeeTimeItem 68118 entities. The LeaveEmployeeTimeItem 68118 entity includes various attributes, namely CategoryCode 68124, TypeCode 68130, Validity 68136 and EmployeeTimeAccountLineItem 68142. The CategoryCode 68124 attribute is an EmployeeTimeItemCategoryCode 68128 datatype. The CategoryCode 68124 attribute has a cardinality of one 68126 meaning that for each instance of the LeaveEmployeeTimeItem 68118 entity there is one CategoryCode 68124 attribute. The TypeCode 68130 attribute is an EmployeeTimeItemTypeCode 68134 datatype. The TypeCode 68130 attribute has a cardinality of one 68132 meaning that for each instance of the LeaveEmployeeTimeItem 68118 entity there is one TypeCode 68130 attribute. The Validity 68136 attribute is an EmployeeTimeItemValidity 68140 datatype. The Validity 68136 attribute has a cardinality of one 68138 meaning that for each instance of the LeaveEmployeeTimeItem 68118 entity there is one Validity 68136 attribute. The EmployeeTimeAccountLineItem 68142 attribute is an EmployeeTimeAccountLineItem 68146 datatype. The EmployeeTimeAccountLineItem 68142 attribute has a cardinality of zero or n 68144 meaning that for each instance of the LeaveEmployeeTimeItem 68118 entity there may be one or more EmployeeTimeAccountLineItem 68142 attributes.

The Log 68166 package is a Log 68172 datatype. The Log 68166 package includes a Log 681 68 entity. The Log 681 68 entity has a cardinality of zero or one 68170 meaning that for each instance of the EmployeeLeaveRequestCreate Check-Response 6802 entity there may be one Log 681 68 entity.

Message Data Type EmployeeLeaveRequestCreateConfirmation

An EmployeeLeaveRequestCreateConfirmation is a confirmation to an EmployeeLeaveRequestCreateRequest and contains the created EmployeeLeaveRequest. The created EmployeeLeaveRequest might have been adjusted to the Employee's working time schedule and it might have been enriched (e.g. by an approver) and other information depending on the business scenario. The structure of the message type EmployeeLeaveRequestCreateConfirmation is specified by the message data type EmployeeLeaveRequestCreateConfirmationMessage, which is derived from the message data type EmployeeLeaveRequestMessage.

FIGS. 69-1 through 69-7 show an EmployeeLeaveRequestCreateConfirmation 6900 package. The EmployeeLeaveRequestCreateConfirmation 6900 package is an EmployeeLeaveRequestCreateConfirmation 6904 datatype. The EmployeeLeaveRequestCreateConfirmation 6900 package includes an EmployeeLeaveRequestCreateConfirmation 6902 entity. The EmployeeLeaveRequestCreateConfirmation 6900 package includes various packages, namely MessageHeader 6906, EmployeeLeaveRequest 6914 and Log 69184.

The MessageHeader 6906 package is a BusinessDocumentMessageHeader 6912 datatype. The MessageHeader 6906 package includes a MessageHeader 6908 entity. The MessageHeader 6908 entity has a cardinality of one 6910 meaning that for each instance of the EmployeeLeaveRequestCreateConfirmation 6902 entity there is one MessageHeader 6908 entity.

The EmployeeLeaveRequest 6914 package is an EmployeeLeaveRequest 6920 datatype. The EmployeeLeaveRequest 6914 package includes an EmployeeLeaveRequest 6916 entity. The EmployeeLeaveRequest 6914 package includes various packages, namely EmployeeLeaveRequestHeader 6946, BusinessTransactionDocumentReference 69114 and EmployeeTimeItem 69134. The EmployeeLeaveRequest 6916 entity has a cardinality of zero or one 6918 meaning that for each instance of the EmployeeLeaveRequestCreateConfirmation 6902 entity there may be one EmployeeLeaveRequest 6916 entity. The EmployeeLeaveRequest 6916 entity includes various attributes, namely ID 6922, VersionID 6928, FirstSubmissionDateTime 6934 and LifeCycleStatusCode 6940. The ID 6922 attribute is a BusinessTransactionDocumentID 6926 datatype. The ID 6922 attribute has a cardinality of one 6924 meaning that for each instance of the EmployeeLeaveRequest 6916 entity there is one ID 6922 attribute. The VersionID 6928 attribute is a VersionID 6932 datatype. The VersionID 6928 attribute has a cardinality of one 6930 meaning that for each instance of the EmployeeLeaveRequest 6916 entity there is one VersionID 6928 attribute. The FirstSubmissionDateTime 6934 attribute is a DateTime 6938 datatype. The FirstSubmissionDateTime 6934 attribute has a cardinality of one 6936 meaning that for each instance of the EmployeeLeaveRequest 6916 entity there is one FirstSubmissionDateTime 6934 attribute. The LifeCycleStatusCode 6940 attribute is an EmployeeLeaveRequestLifeCycleStatusCode 6944 datatype. The LifeCycleStatusCode 6940 attribute has a cardinality of one 6942 meaning that for each instance of the EmployeeLeaveRequest 6916 entity there is one LifeCycleStatusCode 6940 attribute.

The EmployeeLeaveRequestHeader 6946 package is a Participant 6952 datatype. The EmployeeLeaveRequestHeader 6946 package includes various entities, namely Participant 6948 and Note 6978. The Participant 6948 entity has a cardinality of one or n 6950 meaning that for each instance of the EmployeeLeaveRequest 6916 entity there are one or more Participant 6948 entities. The Participant 6948 entity includes various attributes, namely RoleCode 6954, EmployeeID 6960, WorkAgreementID 6966 and FormattedName 6972. The RoleCode 6954 attribute is an EmployeeLeaveRequestParticipantRoleCode 6958 datatype. The RoleCode 6954 attribute has a cardinality of one 6956 meaning that for each instance of the Participant 6948 entity there is one RoleCode 6954 attribute. The EmployeeID 6960 attribute is an EmployeeID 6964 datatype. The EmployeeID 6960 attribute has a cardinality of one 6962 meaning that for each instance of the Participant 6948 entity there is one EmployeeID 6960 attribute. The WorkAgreementID 6966 attribute is a WorkAgreementID 6970 datatype. The WorkAgreementID 6966 attribute has a cardinality of one 6968 meaning that for each instance of the Participant 6948 entity there is one WorkAgreementID 6966 attribute. The FormattedName 6972 attribute is a PersonFormattedName 6976 datatype. The FormattedName 6972 attribute has a cardinality of one 6974 meaning that for each instance of the Participant 6948 entity there is one FormattedName 6972 attribute. The Note 6978 entity has a cardinality of zero or n 6980 meaning that for each instance of the EmployeeLeaveRequest 6916 entity there may be one or more Note 6978 entities. The Note 6978 entity includes various attributes, namely AuthorEmployeeID 6984, AuthorWorkAgreementID 6990, AuthorFormattedName 6996, DateTime 69102 and Text 69108. The AuthorEmployeeID 6984 attribute is an EmployeeID 6988 datatype. The AuthorEmployeeID 6984 attribute has a cardinality of one 6986 meaning that for each instance of the Note 6978 entity there is one AuthorEmployeeID 6984 attribute. The AuthorWorkAgreementID 6990 attribute is a WorkAgreementID 6994 datatype. The AuthorWorkAgreementID 6990 attribute has a cardinality of one 6992 meaning that for each instance of the Note 6978 entity there is one AuthorWorkAgreementID 6990 attribute. The AuthorFormattedName 6996 attribute is a PersonFormattedName 69100 datatype. The AuthorFormattedName 6996 attribute has a cardinality of one 6998 meaning that for each instance of the Note 6978 entity there is one AuthorFormattedName 6996 attribute. The DateTime 69102 attribute is a DateTime 69106 datatype. The DateTime 69102 attribute has a cardinality of one 69104 meaning that for each instance of the Note 6978 entity there is one DateTime 69102 attribute. The Text 69108 attribute is a Text 69112 datatype. The Text 69108 attribute has a cardinality of one 69110 meaning that for each instance of the Note 6978 entity there is one Text 69108 attribute.

The BusinessTransactionDocumentReference 69114 package is a LeaveEmployeeTimeReference 69120 datatype. The BusinessTransactionDocumentReference 69114 package includes a LeaveEmployeeTimeReference 69116 entity. The LeaveEmployeeTimeReference 69116 entity has a cardinality of zero or one 69118 meaning that for each instance of the EmployeeLeaveRequest 6916 entity there may be one LeaveEmployeeTimeReference 69116 entity. The LeaveEmployeeTimeReference 69116 entity includes various attributes, namely ActionCode 69122 and LeaveEmployeeTimeReference 69128. The ActionCode 69122 attribute is an ActionCode 69126 datatype. The ActionCode 69122 attribute has a cardinality of one 69124 meaning that for each instance of the LeaveEmployeeTimeReference 69116 entity there is one ActionCode 69122 attribute. The LeaveEmployeeTimeReference 69128 attribute is a BusinessTransactionDocumentReference 69132 datatype. The LeaveEmployeeTimeReference 69128 attribute has a cardinality of one 69130 meaning that for each instance of the LeaveEmployeeTimeReference 69116 entity there is one LeaveEmployeeTimeReference 69128 attribute.

The EmployeeTimeItem 69134 package is a LeaveEmployeeTimeItem 69140 datatype. The EmployeeTimeItem 69134 package includes a LeaveEmployeeTimeItem 69136 entity. The LeaveEmployeeTimeItem 69136 entity has a cardinality of zero or n 69138 meaning that for each instance of the EmployeeLeaveRequest 6916 entity there may be one or more LeaveEmployeeTimeItem 69136 entities. The LeaveEmployeeTimeItem 69136 entity includes various attributes, namely CategoryCode 69142, TypeCode 69148, Validity 69154 and EmployeeTimeAccountLineItem 69160. The CategoryCode 69142 attribute is an EmployeeTimeItemCategoryCode 69146 datatype. The CategoryCode 69142 attribute has a cardinality of one 69144 meaning that for each instance of the LeaveEmployeeTimeItem 69136 entity there is one CategoryCode 69142 attribute. The TypeCode 69148 attribute is an EmployeeTimeItemTypeCode 69152 datatype. The TypeCode 69148 attribute has a cardinality of one 69150 meaning that for each instance of the LeaveEmployeeTimeItem 69136 entity there is one TypeCode 69148 attribute. The Validity 69154 attribute is an EmployeeTimeItemValidity 69158 datatype. The Validity 69154 attribute has a cardinality of one 69156 meaning that for each instance of the LeaveEmployeeTimeItem 69136 entity there is one Validity 69154 attribute. The EmployeeTimeAccountLineItem 69160 attribute is an EmployeeTimeAccountLineItem 69164 datatype. The EmployeeTimeAccountLineItem 69160 attribute has a cardinality of zero or n 69162 meaning that for each instance of the LeaveEmployeeTimeItem 69136 entity there may be one or more EmployeeTimeAccountLineItem 69160 attributes.

The Log 69184 package is a Log 69190 datatype. The Log 69184 package includes a Log 69186 entity. The Log 69186 entity has a cardinality of zero or one 69188 meaning that for each instance of the EmployeeLeaveRequestCreateConfirmation 6902 entity there may be one Log 69186 entity.

Message Data Type EmployeeLeaveRequestCreateRequest

An EmployeeLeaveRequestCreateRequest is an order to the Employee Time Management to create an EmployeeLeaveRequest. The structure of the message type EmployeeLeaveRequestCreateRequest is specified by the message data type EmployeeLeaveRequestCreateRequestMessage, which is derived from the message data type EmployeeLeaveRequestMessage.

FIGS. 70-1 through 70-3 show an EmployeeLeaveRequestCreateRequest 7000 package. The EmployeeLeaveRequestCreateRequest 7000 package is an EmployeeLeaveRequestCreateRequest 7004 datatype. The EmployeeLeaveRequestCreateRequest 7000 package includes an EmployeeLeaveRequestCreateRequest 7002 entity. The EmployeeLeaveRequestCreateRequest 7000 package includes various packages, namely MessageHeader 7006 and EmployeeLeaveRequest 7014.

The MessageHeader 7006 package is a BusinessDocumentMessageHeader 7012 datatype. The MessageHeader 7006 package includes a MessageHeader 7008 entity.

The MessageHeader 7008 entity has a cardinality of one 7010 meaning that for each instance of the EmployeeLeaveRequestCreateRequest 7002 entity there is one MessageHeader 7008 entity.

The EmployeeLeaveRequest 7014 package is an EmployeeLeaveRequest 7020 datatype. The EmployeeLeaveRequest 7014 package includes an EmployeeLeaveRequest 7016 entity. The EmployeeLeaveRequest 7014 package includes various packages, namely EmployeeLeaveRequestHeader 7022, BusinessTransactionDocumentReference 7054 and EmployeeTimeItem 7074. The EmployeeLeaveRequest 7016 entity has a cardinality of one 7018 meaning that for each instance of the EmployeeLeaveRequestCreateRequest 7002 entity there is one EmployeeLeaveRequest 7016 entity.

The EmployeeLeaveRequestHeader 7022 package is a Participant 7028 datatype. The EmployeeLeaveRequestHeader 7022 package includes various entities, namely Participant 7024 and Note 7042. The Participant 7024 entity has a cardinality of zero or n 7026 meaning that for each instance of the EmployeeLeaveRequest 7016 entity there may be one or more Participant 7024 entities. The Participant 7024 entity includes various attributes, namely RoleCode 7030 and WorkAgreementID 7036. The RoleCode 7030 attribute is an EmployeeLeaveRequestParticipantRoleCode 7034 datatype. The RoleCode 7030 attribute has a cardinality of one 7032 meaning that for each instance of the Participant 7024 entity there is one RoleCode 7030 attribute. The WorkAgreementID 7036 attribute is a WorkAgreementID 7040 datatype. The WorkAgreementID 7036 attribute has a cardinality of one 7038 meaning that for each instance of the Participant 7024 entity there is one WorkAgreementID 7036 attribute. The Note 7042 entity has a cardinality of zero or one 7044 meaning that for each instance of the EmployeeLeaveRequest 7016 entity there may be one Note 7042 entity. The Note 7042 entity includes a Text 7048 attribute. The Text 7048 attribute is a Text 7052 datatype. The Text 7048 attribute has a cardinality of one 7050 meaning that for each instance of the Note 7042 entity there is one Text 7048 attribute.

The BusinessTransactionDocumentReference 7054 package is a LeaveEmployeeTimeReference 7060 datatype. The BusinessTransactionDocumentReference 7054 package includes a LeaveEmployeeTimeReference 7056 entity. The LeaveEmployeeTimeReference 7056 entity has a cardinality of zero or one 7058 meaning that for each instance of the EmployeeLeaveRequest 7016 entity there may be one LeaveEmployeeTimeReference 7056 entity. The LeaveEmployeeTimeReference 7056 entity includes various attributes, namely ActionCode 7062 and LeaveEmployeeTimeReference 7068. The ActionCode 7062 attribute is an ActionCode 7066 datatype. The ActionCode 7062 attribute has a cardinality of one 7064 meaning that for each instance of the LeaveEmployeeTimeReference 7056 entity there is one ActionCode 7062 attribute. The LeaveEmployeeTimeReference 7068 attribute is a BusinessTransactionDocumentReference 7072 datatype. The LeaveEmployeeTimeReference 7068 attribute has a cardinality of one 7070 meaning that for each instance of the LeaveEmployeeTimeReference 7056 entity there is one LeaveEmployeeTimeReference 7068 attribute.

The EmployeeTimeItem 7074 package is a LeaveEmployeeTimeItem 7080 datatype. The EmployeeTimeItem 7074 package includes a LeaveEmployeeTimeItem 7076 entity. The LeaveEmployeeTimeItem 7076 entity has a cardinality of zero or n 7078 meaning that for each instance of the EmployeeLeaveRequest 7016 entity there may be one or more LeaveEmployeeTimeItem 7076 entities. The LeaveEmployeeTimeItem 7076 entity includes various attributes, namely CategoryCode 7082, TypeCode 7088 and Validity

7094. The CategoryCode 7082 attribute is an EmployeeTimeItemCategoryCode 7086 datatype. The CategoryCode 7082 attribute has a cardinality of one 7084 meaning that for each instance of the LeaveEmployeeTimeItem 7076 entity there is one CategoryCode 7082 attribute. The TypeCode 7088 attribute is an EmployeeTimeItemTypeCode 7092 datatype. The TypeCode 7088 attribute has a cardinality of one 7090 meaning that for each instance of the LeaveEmployeeTimeItem 7076 entity there is one TypeCode 7088 attribute. The Validity 7094 attribute is an EmployeeTimeItemValidity 7098 datatype. The Validity 7094 attribute has a cardinality of one 7096 meaning that for each instance of the LeaveEmployeeTimeItem 7076 entity there is one Validity 7094 attribute.

Message Data Type DefaultEmployeeLeaveRequestByOwnerQuery

A DefaultEmployeeLeaveRequestByOwnerQuery is an inquiry to the Employee Time Management to provide an EmployeeLeaveRequest with default values for a specific employee who wants to request a leave (e.g., the owner). The structure of the message type DefaultEmployeeLeaveRequestByOwnerQuery is specified by the message data type DefaultEmployeeLeaveRequestByOwnerQueryMessage.

FIG. 71 shows an EmployeeLeaveRequestDefaultByEmployeeQueryMessage 7100 package. The EmployeeLeaveRequestDefaultByEmployeeQueryMessage 7100 package is an EmployeeLeaveRequestDefaultByEmployeeQueryMessage 7104 datatype. The EmployeeLeaveRequestDefaultByEmployeeQueryMessage 7100 package includes an EmployeeLeaveRequestDefaultByEmployeeQueryMessage 7102 entity. The EmployeeLeaveRequestDefaultByEmployeeQueryMessage 7100 package includes various packages, namely MessageHeader 7106 and Selection 7114.

The MessageHeader 7106 package is a BusinessDocumentMessageHeader 7112 datatype. The MessageHeader 7106 package includes a MessageHeader 7108 entity. The MessageHeader 7108 entity has a cardinality of one 7110 meaning that for each instance of the EmployeeLeaveRequestDefaultByEmployeeQueryMessage 7102 entity there is one MessageHeader 7108 entity.

The Selection 7114 package is an EmployeeLeaveRequestDefaultSelectionByEmployee 7120 datatype. The Selection 7114 package includes an EmployeeLeaveRequestDefaultsSelectionByEmployee 7116 entity. The EmployeeLeaveRequestDefaultsSelectionByEmployee 7116 entity has a cardinality of one 7118 meaning that for each instance of the EmployeeLeaveRequestDefaultByEmployeeQueryMessage 7102 entity there is one EmployeeLeaveRequestDefaultsSelectionByEmployee 7116 entity. The EmployeeLeaveRequestDefaultsSelectionByEmployee 7116 entity includes various attributes, namely Employee_ID 7122 and WorkAgreement_ID 7128. The Employee_ID 7122 attribute is an EmployeeID 7126 datatype. The Employee_ID 7122 attribute has a cardinality of zero or one 7124 meaning that for each instance of the EmployeeLeaveRequestDefaultsSelectionByEmployee 7116 entity there may be one Employee_ID 7122 attribute. The WorkAgreement_ID 7128 attribute is a WorkAgreementID 7132 datatype. The WorkAgreement_ID 7128 attribute has a cardinality of zero or one 7130 meaning that for each instance of the EmployeeLeaveRequestDefaultsSelectionByEmployee 7116 entity there may be one WorkAgreement_ID 7128 attribute. The DefaultEmployeeLeaveRequestsSelectionByOwner specifies an Owner to select DefaultEmployeeLeaveRequests. The EmployeeLeaveRequest_ParticipantEmployeeID is the unique identifier of the for which the defaults can be returned. The EmployeeLeaveRequest_OwnerWorkAgreementID is the WorkAgreementID of the owner of an EmployeeLeaveRequest for which the defaults can be returned.

Message Data Type DefaultEmployeeLeaveRequestByOwnerResponse

A DefaultEmployeeLeaveRequestByOwnerResponse is a response to an DefaultEmployeeLeaveRequestByOwnerQuery and contains an EmployeeLeaveRequest with default values for a specific employee. Default values might, for example, be provided for EmployeeTimeItemType, Approver, StartDate and EndDate. The structure of the message type DefaultEmployeeLeaveRequestByOwnerResponse is specified by the message data type DefaultEmployeeLeaveRequestByOwnerResponseMessage, which is derived from the message data type EmployeeLeaveRequestMessage.

FIGS. 72-1 through 72-4 show an EmployeeLeaveRequestDefaultByEmployeeResponseMessage 7200 package. The EmployeeLeaveRequestDefaultByEmployeeResponseMessage 7200 package is an EmployeeLeaveRequestDefaultByEmployeeResponseMessage 7204 datatype. The EmployeeLeaveRequestDefaultByEmployeeResponseMessage 7200 package includes an EmployeeLeaveRequestDefaultByEmployeeResponseMessage 7202 entity. The EmployeeLeaveRequestDefaultByEmployeeResponseMessage 7200 package includes various packages, namely MessageHeader 7206, EmployeeLeaveRequest 7214 and Log 72116.

The MessageHeader 7206 package is a BusinessDocumentMessageHeader 7212 datatype. The MessageHeader 7206 package includes a MessageHeader 7208 entity. The MessageHeader 7208 entity has a cardinality of one 7210 meaning that for each instance of the EmployeeLeaveRequestDefaultByEmployeeResponseMessage 7202 entity there is one MessageHeader 7208 entity.

The EmployeeLeaveRequest 7214 package is an EmployeeLeaveRequest 7220 datatype. The EmployeeLeaveRequest 7214 package includes an EmployeeLeaveRequest 7216 entity. The EmployeeLeaveRequest 7214 package includes various packages, namely EmployeeLeaveRequestHeader 7222 and EmployeeTimeItem 7290. The EmployeeLeaveRequest 7216 entity has a cardinality of zero or n 7218 meaning that for each instance of the EmployeeLeaveRequestDefaultByEmployeeResponseMessage 7202 entity there may be one or more EmployeeLeaveRequest 7216 entities.

The EmployeeLeaveRequestHeader 7222 package is a Participant 7228 datatype. The EmployeeLeaveRequestHeader 7222 package includes various entities, namely Participant 7224 and Note 7254. The Participant 7224 entity has a cardinality of zero or n 7226 meaning that for each instance of the EmployeeLeaveRequest 7216 entity there may be one or more Participant 7224 entities. The Participant 7224 entity includes various attributes, namely RoleCode 7230, EmployeeID 7236, WorkAgreementID 7242 and FormattedName 7248. The RoleCode 7230 attribute is an EmployeeLeaveRequestParticipantRoleCode 7234 datatype. The RoleCode 7230 attribute has a cardinality of one 7232 meaning that for each instance of the Participant 7224 entity there is one RoleCode 7230 attribute. The EmployeeID 7236 attribute is an EmployeeID 7240 datatype. The EmployeeID 7236 attribute has a cardinality of one 7238 meaning that for each instance of the Participant 7224 entity there is one EmployeeID 7236 attribute. The WorkAgreementID 7242 attribute is a WorkAgreementID 7246 datatype. The WorkAgreementID 7242 attribute has a cardinality of one 7244 meaning that for each instance of the Participant 7224 entity there is one WorkAgreementID 7242 attribute. The FormattedName 7248 attribute is a PersonFormattedName 7252 datatype. The FormattedName 7248 attribute has a cardinality of one 7250 meaning that for each instance of the Participant 7224 entity there is one FormattedName 7248 attribute.

The Note 7254 entity has a cardinality of zero or one 7256 meaning that for each instance of the EmployeeLeaveRequest 7216 entity there may be one Note 7254 entity. The Note 7254 entity includes various attributes, namely AuthorEmployeeID 7260, AuthorWorkAgreementID 7266, AuthorFormattedName 7272, DateTime 7278 and Text 7284. The AuthorEmployeeID 7260 attribute is an EmployeeID 7264 datatype. The AuthorEmployeeID 7260 attribute has a cardinality of one 7262 meaning that for each instance of the Note 7254 entity there is one AuthorEmployeeID 7260 attribute. The AuthorWorkAgreementID 7266 attribute is a WorkAgreementID 7270 datatype. The AuthorWorkAgreementID 7266 attribute has a cardinality of one 7268 meaning that for each instance of the Note 7254 entity there is one AuthorWorkAgreementID 7266 attribute. The AuthorFormattedName 7272 attribute is a PersonFormattedName 7276 datatype. The AuthorFormattedName 7272 attribute has a cardinality of one 7274 meaning that for each instance of the Note 7254 entity there is one AuthorFormattedName 7272 attribute. The DateTime 7278 attribute is a DateTime 7282 datatype. The DateTime 7278 attribute has a cardinality of one 7280 meaning that for each instance of the Note 7254 entity there is one DateTime 7278 attribute. The Text 7284 attribute is a Text 7288 datatype. The Text 7284 attribute has a cardinality of one 7286 meaning that for each instance of the Note 7254 entity there is one Text 7284 attribute.

The EmployeeTimeItem 7290 package is a LeaveEmployeeTimeItem 7296 datatype. The EmployeeTimeItem 7290 package includes a LeaveEmployeeTimeItem 7292 entity. The LeaveEmployeeTimeItem 7292 entity has a cardinality of one or n 7294 meaning that for each instance of the EmployeeLeaveRequest 7216 entity there are one or more LeaveEmployeeTimeItem 7292 entities. The LeaveEmployeeTimeItem 7292 entity includes various attributes, namely CategoryCode 7298, TypeCode 72104 and Validity 72110. The CategoryCode 7298 attribute is an EmployeeTimeItemCategoryCode 72102 datatype. The CategoryCode 7298 attribute has a cardinality of one 72100 meaning that for each instance of the LeaveEmployeeTimeItem 7292 entity there is one CategoryCode 7298 attribute. The TypeCode 72104 attribute is an EmployeeTimeItemTypeCode 72108 datatype. The TypeCode 72104 attribute has a cardinality of one 72106 meaning that for each instance of the LeaveEmployeeTimeItem 7292 entity there is one TypeCode 72104 attribute. The Validity 72110 attribute is an EmployeeTimeItemValidity 72114 datatype. The Validity 72110 attribute has a cardinality of one 72112 meaning that for each instance of the LeaveEmployeeTimeItem 7292 entity there is one Validity 72110 attribute.

The Log 72116 package is a Log 72122 datatype. The Log 72116 package includes a Log 72118 entity. The Log 72118 entity has a cardinality of zero or one 72120 meaning that for each instance of the EmployeeLeaveRequestDefaultByEmployeeResponseMessage 7202 entity there may be one Log 72118 entity.

Message Data Type EmployeeLeaveRequestRejectConfirmation

An EmployeeLeaveRequestRejectConfirmation is a confirmation of an EmployeeLeaveRequestRejectRequest and contains identifying information and the new status of the EmployeeLeaveRequest. The structure of the message type EmployeeLeaveRequestRejectConfirmation is specified by the message data type EmployeeLeaveRequestRejectConfirmationMessage, which is derived from the message data type EmployeeLeaveRequestMessage.

FIG. 73 shows an EmployeeLeaveRequestRejectConfirmation 7300 package. The EmployeeLeaveRequestRejectConfirmation 7300 package is an EmployeeLeaveRequestRejectConfirmation 7304 datatype. The EmployeeLeaveRequestRejectConfirmation 7300 package includes an EmployeeLeaveRequestRejectConfirmation 7302 entity. The EmployeeLeaveRequestRejectConfirmation 7300 package includes various packages, namely MessageHeader 7306, EmployeeLeaveRequest 7314 and Log 7340.

The MessageHeader 7306 package is a BusinessDocumentMessageHeader 7312 datatype. The MessageHeader 7306 package includes a MessageHeader 7308 entity. The MessageHeader 7308 entity has a cardinality of one 7310 meaning that for each instance of the EmployeeLeaveRequestRejectConfirmation 7302 entity there is one MessageHeader 7308 entity.

The EmployeeLeaveRequest 7314 package is an EmployeeLeaveRequest 7320 datatype. The EmployeeLeaveRequest 7314 package includes an EmployeeLeaveRequest 7316 entity. The EmployeeLeaveRequest 7316 entity has a cardinality of zero or one 7318 meaning that for each instance of the EmployeeLeaveRequestRejectConfirmation 7302 entity there may be one EmployeeLeaveRequest 7316 entity. The EmployeeLeaveRequest 7316 entity includes various attributes, namely ID 7322, VersionID 7328 and LifeCycleStatusCode 7334. The ID 7322 attribute is a BusinessTransactionDocumentID 7326 datatype. The ID 7322 attribute has a cardinality of one 7324 meaning that for each instance of the EmployeeLeaveRequest 7316 entity there is one ID 7322 attribute. The VersionID 7328 attribute is a VersionID 7332 datatype. The VersionID 7328 attribute has a cardinality of one 7330 meaning that for each instance of the EmployeeLeaveRequest 7316 entity there is one VersionID 7328 attribute. The LifeCycleStatusCode 7334 attribute is an EmployeeLeaveRequestLifeCycleStatusCode 7338 datatype. The LifeCycleStatusCode 7334 attribute has a cardinality of one 7336 meaning that for each instance of the EmployeeLeaveRequest 7316 entity there is one LifeCycleStatusCode 7334 attribute.

The Log 7340 package is a Log 7346 datatype. The Log 7340 package includes a Log 7342 entity. The Log 7342 entity has a cardinality of zero or one 7344 meaning that for each instance of the EmployeeLeaveRequestRejectConfirmation 7302 entity there may be one Log 7342 entity.

Message Data Type EmployeeLeaveRequestRejectRequest

An EmployeeLeaveRequestCancelRequest is an order to the Employee Time Management to reject an EmployeeLeaveRequest. The structure of the message type EmployeeLeaveRequestRejectRequest is specified by the message data type EmployeeLeaveRequestRejectRequestMessage, which is derived from the message data type EmployeeLeaveRequestStatusChangeMessage.

FIG. 74 shows an EmployeeLeaveRequestRejectRequest 7400 package. The EmployeeLeaveRequestRejectRequest 7400 package is an EmployeeLeaveRequestRejectRequest 7404 datatype. The EmployeeLeaveRequestRejectRequest 7400 package includes an EmployeeLeaveRequestRejectRequest 7402 entity. The EmployeeLeaveRequestRejectRequest 7400 package includes various packages, namely MessageHeader 7406 and EmployeeLeaveRequest 7414.

The MessageHeader 7406 package is a BusinessDocumentMessageHeader 7412 datatype. The MessageHeader 7406 package includes a MessageHeader 7408 entity. The MessageHeader 7408 entity has a cardinality of one 7410 meaning that for each instance of the EmployeeLeaveRequestRejectRequest 7402 entity there is one MessageHeader 7408 entity. The EmployeeLeaveRequest 7414 package is an EmployeeLeaveRequest 7420 datatype. The EmployeeLeaveRequest 7414 package includes an EmployeeLeaveRequest 7416 entity. The EmployeeLeaveRequest 7414 package includes an EmployeeLeaveRequestHeader 7434 package. The EmployeeLeaveRequest 7416 entity has a cardinality of one 7418 meaning that for each instance of the EmployeeLeaveRequestRejectRequest 7402 entity there is one EmployeeLeaveRequest 7416 entity. The EmployeeLeaveRequest 7416 entity includes various attributes, namely ID 7422 and VersionID 7428. The ID 7422 attribute is a BusinessTransactionDocumentID 7426 datatype. The ID 7422 attribute has a cardinality of one 7424 meaning that for each instance of the EmployeeLeaveRequest 7416 entity there is one ID 7422 attribute. The VersionID 7428 attribute is a VersionID 7432 datatype. The VersionID 7428 attribute has a cardinality of one 7430 meaning that for each instance of the EmployeeLeaveRequest 7416 entity there is one VersionID 7428 attribute.

The EmployeeLeaveRequestHeader 7434 package is a Note 7440 datatype. The EmployeeLeaveRequestHeader 7434 package includes a Note 7436 entity. The Note 7436 entity has a cardinality of zero or one 7438 meaning that for each instance of the EmployeeLeaveRequest 7416 entity there may be one Note 7436 entity. The Note 7436 entity includes a Text 7442 attribute. The Text 7442 attribute is a Text 7446 datatype. The Text 7442 attribute has a cardinality of one 7444 meaning that for each instance of the Note 7436 entity there is one Text 7442 attribute.

Message Data Type EmployeeLeaveRequestUpdateConfirmation

An EmployeeLeaveRequestUpdateConfirmation is a confirmation of an EmployeeLeaveRequestUpdateRequest and contains the Updated EmployeeLeaveRequest. The updated EmployeeLeaveRequest might have been adjusted to the Employee's working time schedule and it might have been enriched (e.g., by an approver) and other information depending on the business scenario. The structure of the message type EmployeeLeaveRequestUpdateConfirmation is specified by the message data type EmployeeLeaveRequestUpdateConfirmationMessage, which is derived from the message data type EmployeeLeaveRequestMessage.

FIGS. 75-1 through 75-6 show an EmployeeLeaveRequestUpdateConfirmation 7500 package. The EmployeeLeaveRequestUpdateConfirmation 7500 package is an EmployeeLeaveRequestUpdateConfirmation 7504 datatype. The EmployeeLeaveRequestUpdateConfirmation 7500 package includes an EmployeeLeaveRequestUpdateConfirmation 7502 entity. The EmployeeLeaveRequestUpdateConfirmation 7500 package includes various packages, namely MessageHeader 7506, EmployeeLeaveRequest 7514 and Log 75184.

The MessageHeader 7506 package is a BusinessDocumentMessageHeader 7512 datatype. The MessageHeader 7506 package includes a MessageHeader 7508 entity. The MessageHeader 7508 entity has a cardinality of one 7510 meaning that for each instance of the EmployeeLeaveRequestUpdateConfirmation 7502 entity there is one MessageHeader 7508 entity.

The EmployeeLeaveRequest 7514 package is an EmployeeLeaveRequest 7520 datatype. The EmployeeLeaveRequest 7514 package includes an EmployeeLeaveRequest 7516 entity. The EmployeeLeaveRequest 7514 package includes various packages, namely EmployeeLeaveRequestHeader 7546, BusinessTransactionDocumentReference 75114 and EmployeeTimeItem 75134. The EmployeeLeaveRequest 7516 entity has a cardinality of zero or one 7518 meaning that for each instance of the EmployeeLeaveRequestUpdateConfirmation 7502 entity there may be one EmployeeLeaveRequest 7516 entity. The EmployeeLeaveRequest 7516 entity includes various attributes, namely ID 7522, VersionID 7528, FirstSubmissionDateTime 7534 and LifeCycleStatusCode 7540. The ID 7522 attribute is a BusinessTransactionDocumentID 7526 datatype. The ID 7522 attribute has a cardinality of one 7524 meaning that for each instance of the EmployeeLeaveRequest 7516 entity there is one ID 7522 attribute. The VersionID 7528 attribute is a VersionID 7532 datatype. The VersionID 7528 attribute has a cardinality of one 7530 meaning that for each instance of the EmployeeLeaveRequest 7516 entity there is one VersionID 7528 attribute. The FirstSubmissionDateTime 7534 attribute is a DateTime 7538 datatype. The FirstSubmissionDateTime 7534 attribute has a cardinality of one 7536 meaning that for each instance of the EmployeeLeaveRequest 7516 entity there is one FirstSubmissionDateTime 7534 attribute. The LifeCycleStatusCode 7540 attribute is an EmployeeLeaveRequestLifeCycleStatusCode 7544 datatype. The LifeCycleStatusCode 7540 attribute has a cardinality of one 7542 meaning that for each instance of the EmployeeLeaveRequest 7516 entity there is one LifeCycleStatusCode 7540 attribute.

The EmployeeLeaveRequestHeader 7546 package is a Participant 7552 datatype. The EmployeeLeaveRequestHeader 7546 package includes various entities, namely Participant 7548 and Note 7578. The Participant 7548 entity has a cardinality of one or n 7550 meaning that for each instance of the EmployeeLeaveRequest 7516 entity there are one or more Participant 7548 entities. The Participant 7548 entity includes various attributes, namely RoleCode 7554, EmployeeID 7560, WorkAgreementID 7566 and FormattedName 7572. The RoleCode 7554 attribute is an EmployeeRequestParticipantRoleCode 7558 datatype. The RoleCode 7554 attribute has a cardinality of one 7556 meaning that for each instance of the Participant 7548 entity there is one RoleCode 7554 attribute. The EmployeeID 7560 attribute is an EmployeeID 7564 datatype. The EmployeeID 7560 attribute has a cardinality of one 7562 meaning that for each instance of the Participant 7548 entity there is one EmployeeID 7560 attribute. The WorkAgreementID 7566 attribute is a WorkAgreementID 7570 datatype. The WorkAgreementID 7566 attribute has a cardinality of one 7568 meaning that for each instance of the Participant 7548 entity there is one WorkAgreementID 7566 attribute. The FormattedName 7572 attribute is a PersonFormattedName 7576 datatype. The FormattedName 7572 attribute has a cardinality of one 7574 meaning that for each instance of the Participant 7548 entity there is one FormattedName 7572 attribute.

The Note 7578 entity has a cardinality of zero or n 7580 meaning that for each instance of the EmployeeLeaveRequest 7516 entity there may be one or more Note 7578 entities. The Note 7578 entity includes various attributes, namely AuthorEmployeeID 7584, AuthorWorkAgreementID 7590, AuthorFormattedName 7596, DateTime 75102 and Text 75108. The AuthorEmployeeID 7584 attribute is an EmployeeID 7588 datatype. The AuthorEmployeeID 7584 attribute has a cardinality of one 7586 meaning that for each instance of the Note 7578 entity there is one AuthorEmployeeID 7584 attribute. The AuthorWorkAgreementID 7590 attribute is a WorkAgreementID 7594 datatype. The AuthorWorkAgreementID 7590 attribute has a cardinality of one 7592 meaning that for each instance of the Note 7578 entity there is one AuthorWorkAgreementID 7590 attribute. The AuthorFormattedName 7596 attribute is a PersonFormattedName 75100 datatype. The AuthorFormattedName 7596 attribute has a cardinality of one 7598 meaning that for each instance of the Note 7578 entity there is one AuthorFormattedName 7596 attribute. The DateTime 75102 attribute is a DateTime 75106 datatype. The DateTime 75102 attribute has a cardinality of one 75104 meaning that for each instance of the Note 7578 entity there is one DateTime 75102 attribute. The Text 75108 attribute is a Text 75112 datatype. The Text 75108 attribute has a cardinality of one 75110 meaning that for each instance of the Note 7578 entity there is one Text 75108 attribute.

The BusinessTransactionDocumentReference 75114 package is a LeaveEmployeeTimeReference 75120 datatype. The BusinessTransactionDocumentReference 75114 package includes a LeaveEmployeeTimeReference 75116 entity. The LeaveEmployeeTimeReference 75116 entity has a cardinality of zero or one 75118 meaning that for each instance of the EmployeeLeaveRequest 7516 entity there may be one LeaveEmployeeTimeReference 75116 entity. The LeaveEmployeeTimeReference 75116 entity includes various attributes, namely ActionCode 75122 and LeaveEmployeeTimeReference 75128. The ActionCode 75122 attribute is an ActionCode 75126 datatype. The ActionCode 75122 attribute has a cardinality of one 75124 meaning that for each instance of the LeaveEmployeeTimeReference 75116 entity there is one ActionCode 75122 attribute. The LeaveEmployeeTimeReference 75128 attribute is a BusinessTransactionDocumentReference 75132 datatype. The LeaveEmployeeTimeReference 75128 attribute has a cardinality of one 75130 meaning that for each instance of the LeaveEmployeeTimeReference 75116 entity there is one LeaveEmployeeTimeReference 75128 attribute.

The EmployeeTimeItem 75134 package is a LeaveEmployeeTimeItem 75140 datatype. The EmployeeTimeItem 75134 package includes a LeaveEmployeeTimeItem 75136 entity. The LeaveEmployeeTimeItem 75136 entity has a cardinality of zero or n 75138 meaning that for each instance of the EmployeeLeaveRequest 7516 entity there may be one or more LeaveEmployeeTimeItem 75136 entities. The LeaveEmployeeTimeItem 75136 entity includes various attributes, namely CategoryCode 75142, TypeCode 75148, Validity 75154 and EmployeeTimeAccountLineItem 75160. The CategoryCode 75142 attribute is an EmployeeTimeItemCategoryCode 75146 datatype. The CategoryCode 75142 attribute has a cardinality of one 75144 meaning that for each instance of the LeaveEmployeeTimeItem 75136 entity there is one CategoryCode 75142 attribute. The TypeCode 75148 attribute is an EmployeeTimeItemTypeCode 75152 datatype. The TypeCode 75148 attribute has a cardinality of one 75150 meaning that for each instance of the LeaveEmployeeTimeItem 75136 entity there is one TypeCode 75148 attribute. The Validity 75154 attribute is an EmployeeTimeItemValidity 75158 datatype. The Validity 75154 attribute has a cardinality of one 75156 meaning that for each instance of the LeaveEmployeeTimeItem 75136 entity there is one Validity 75154 attribute. The EmployeeTimeAccountLineItem 75160 attribute is an EmployeeTimeAccountLineItem 75164 datatype. The EmployeeTimeAccountLineItem 75160 attribute has a cardinality of zero or n 75162 meaning that for each instance of the LeaveEmployeeTimeItem 75136 entity there may be one or more EmployeeTimeAccountLineItem 75160 attributes.

The Log 75184 package is a Log 75190 datatype. The Log 75184 package includes a Log 75186 entity. The Log 75186 entity has a cardinality of zero or one 75188 meaning that for each instance of the EmployeeLeaveRequestUpdateConfirmation 7502 entity there may be one Log 75186 entity.

Message Data Type EmployeeLeaveRequestUpdateRequest

An EmployeeLeaveRequestUpdateRequest is an order to the Employee Time Management to update an existing EmployeeLeaveRequest. The structure of the message type EmployeeLeaveRequestUpdateRequest is specified by the message data type EmployeeLeaveRequestUpdateRequestMessage, which is derived from the message data type EmployeeLeaveRequestMessage.

FIGS. 76-1 through 76-3 show an EmployeeLeaveRequest UpdateRequest 7600 package. The EmployeeLeaveRequest UpdateRequest 7600 package is an EmployeeLeaveRequest UpdateRequest 7604 datatype. The EmployeeLeaveRequest UpdateRequest 7600 package includes an EmployeeLeaveRequestUpdateRequest 7602 entity. The EmployeeLeaveRequestUpdateRequest 7600 package includes various packages, namely MessageHeader 7606 and EmployeeLeaveRequest 7614.

The MessageHeader 7606 package is a BusinessDocumentMessageHeader 7612 datatype. The MessageHeader 7606 package includes a MessageHeader 7608 entity. The MessageHeader 7608 entity has a cardinality of one 7610 meaning that for each instance of the EmployeeLeaveRequestUpdateRequest 7602 entity there is one MessageHeader 7608 entity.

The EmployeeLeaveRequest 7614 package is an EmployeeLeaveRequest 7620 datatype. The EmployeeLeaveRequest 7614 package includes an EmployeeLeaveRequest 7616 entity. The EmployeeLeaveRequest 7614 package includes various packages, namely EmployeeLeaveRequestHeader 7634 and EmployeeTimeItem 7666. The EmployeeLeaveRequest 7616 entity has a cardinality of one 7618 meaning that for each instance of the EmployeeLeaveRequestUpdateRequest 7602 entity there is one EmployeeLeaveRequest 7616 entity. The EmployeeLeaveRequest 7616 entity includes various attributes, namely ID 7622 and VersionID 7628. The ID 7622 attribute is a BusinessTransactionDocumentID 7626 datatype. The ID 7622 attribute has a cardinality of one 7624 meaning that for each instance of the EmployeeLeaveRequest 7616 entity there is one ID 7622 attribute. The VersionID 7628 attribute is a VersionID 7632 datatype. The VersionID 7628 attribute has a cardinality of one 7630 meaning that for each instance of the EmployeeLeaveRequest 7616 entity there is one VersionID 7628 attribute.

The EmployeeLeaveRequestHeader 7634 package is a Participant 7640 datatype. The EmployeeLeaveRequestHeader 7634 package includes various entities, namely Participant 7636 and Note 7654. The Participant 7636 entity has a cardinality of zero or one 7638 meaning that for each instance of the EmployeeLeaveRequest 7616 entity there may be one Participant 7636 entity. The Participant 7636 entity includes various attributes, namely RoleCode 7642 and WorkAgreementID 7648. The RoleCode 7642 attribute is an EmployeeLeaveRequestParticipantRoleCode 7646 datatype. The RoleCode 7642 attribute has a cardinality of one 7644 meaning that for each instance of the Participant 7636 entity there is one RoleCode 7642 attribute. The WorkAgreementID 7648 attribute is a WorkAgreementID 7652 datatype. The WorkAgreementID 7648 attribute has a cardinality of one 7650 meaning that for each instance of the Participant 7636 entity there is one WorkAgreementID 7648 attribute. The Note 7654 entity has a cardinality of zero or one 7656 meaning that for each instance of the EmployeeLeaveRequest 7616 entity there may be one Note 7654 entity. The Note 7654 entity includes a Text 7660 attribute. The Text 7660 attribute is a Text 7664 datatype. The Text 7660 attribute has a cardinality of one 7662 meaning that for each instance of the Note 7654 entity there is one Text 7660 attribute.

The EmployeeTimeItem 7666 package is a LeaveEmployeeTimeItem 7672 datatype. The EmployeeTimeItem 7666 package includes a LeaveEmployeeTimeItem 7668 entity. The LeaveEmployeeTimeItem 7668 entity has a cardinality of zero or n 7670 meaning that for each instance of the EmployeeLeaveRequest 7616 entity there may be one or more LeaveEmployeeTimeItem 7668 entities. The LeaveEmployeeTimeItem 7668 entity includes various attributes, namely Category 7674, Type 7680 and Validity 7686. The Category 7674 attribute is an EmployeeTimeItemCategoryCode 7678 datatype. The Category 7674 attribute has a cardinality of one 7676 meaning that for each instance of the LeaveEmployeeTimeItem 7668 entity there is one Category 7674 attribute. The Type 7680 attribute is an EmployeeTimeItemTypeCode 7684 datatype. The Type 7680 attribute has a cardinality of one 7682 meaning that for each instance of the LeaveEmployeeTimeItem 7668 entity there is one Type 7680 attribute. The Validity 7686 attribute is an EmployeeTimeItemValidity 7690 datatype. The Validity 7686 attribute has a cardinality of one 7688 meaning that for each instance of the LeaveEmployeeTimeItem 7668 entity there is one Validity 7686 attribute.

Message Data Type EmployeeLeaveRequestApproveCheckResponse

An EmployeeLeaveRequestApproveCheckResponse is a response to an EmployeeLeaveRequestApproveCheckQuery and contains the ID and new Status of the EmployeeLeaveRequest. Additionally, all information, warnings and errors can be returned that would occur due to further processing if the checked EmployeeLeaveRequestApproveRequest document was not changed. The structure of the message type EmployeeLeaveRequestApproveConfirmation is specified by the message data type EmployeeLeaveRequestApproveConfirmationMessage, which is derived from the message data type EmployeeLeaveRequestStatusChangeMessage.

FIG. 77 shows an EmployeeLeaveRequestApproveCheckResponse 7700 package. The EmployeeLeaveRequestApproveCheckResponse 7700 package is an EmployeeLeaveRequestApproveCheckResponse 7704 datatype. The EmployeeLeaveRequestApproveCheckResponse 7700 package includes an EmployeeLeaveRequestApproveCheckResponse 7702 entity. The EmployeeLeaveRequestApproveCheckResponse 7700 package includes various packages, namely MessageHeader 7706, EmployeeLeaveRequest 7714 and Log 7740.

The MessageHeader 7706 package is a BusinessDocumentMessageHeader 7712 datatype. The MessageHeader 7706 package includes a MessageHeader 7708 entity. The MessageHeader 7708 entity has a cardinality of one 7710 meaning that for each instance of the EmployeeLeaveRequestApproveCheckResponse 7702 entity there is one MessageHeader 7708 entity.

The EmployeeLeaveRequest 7714 package is an EmployeeLeaveRequest 7720 datatype. The EmployeeLeaveRequest 7714 package includes an EmployeeLeaveRequest 7716 entity. The EmployeeLeaveRequest 7716 entity has a cardinality of zero or one 7718 meaning that for each instance of the EmployeeLeaveRequestApproveCheckResponse 7702 entity there may be one EmployeeLeaveRequest 7716 entity. The EmployeeLeaveRequest 7716 entity includes various attributes, namely ID 7722, VersionID 7728 and LifeCycleStatusCode 7734. The ID 7722 attribute is a BusinessTransactionDocumentID 7726 datatype. The ID 7722 attribute has a cardinality of one 7724 meaning that for each instance of the EmployeeLeaveRequest 7716 entity there is one ID 7722 attribute. The VersionID 7728 attribute is a VersionID 7732 datatype. The VersionID 7728 attribute has a cardinality of one 7730 meaning that for each instance of the EmployeeLeaveRequest 7716 entity there is one VersionID 7728 attribute. The LifeCycleStatusCode 7734 attribute is an EmployeeLeaveRequestLifeCycleStatusCode 7738 datatype. The LifeCycleStatusCode 7734 attribute has a cardinality of one 7736 meaning that for each instance of the EmployeeLeaveRequest 7716 entity there is one LifeCycleStatusCode 7734 attribute.

The Log 7740 package is a Log 7746 datatype. The Log 7740 package includes a Log 7742 entity. The Log 7742 entity has a cardinality of zero or one 7744 meaning that for each instance of the EmployeeLeaveRequestApproveCheckResponse 7702 entity there may be one Log 7742 entity.

Message Data Type EmployeeLeaveRequestApproveCheckQuery

An EmployeeLeaveRequestApproveCheckQuery is an inquiry to the Employee Time Management to check the processing of an EmployeeLeaveRequestApproveRequest message The structure of the message type EmployeeLeaveRequestApproveCheckQuery is specified by the message data type EmployeeLeaveRequestApproveCheckQueryMessage, which is derived from the message data type EmployeeLeaveRequestStatusChangeMessage.

FIGS. 78-1 through 78-2 show an EmployeeLeaveRequestApproveCheckQuery 7800 package. The EmployeeLeaveRequestApproveCheckQuery 7800 package is an EmployeeLeaveRequestApproveCheckQuery 7804 datatype. The EmployeeLeaveRequestApproveCheckQuery 7800 package includes an EmployeeLeaveRequestApproveCheckQuery 7802 entity. The EmployeeLeaveRequestApproveCheckQuery 7800 package includes various packages, namely MessageHeader 7806 and EmployeeLeaveRequest 7814.

The MessageHeader 7806 package is a BusinessDocumentMessageHeader 7812 datatype. The MessageHeader 7806 package includes a MessageHeader 7808 entity. The MessageHeader 7808 entity has a cardinality of one 7810 meaning that for each instance of the EmployeeLeaveRequestApproveCheckQuery 7802 entity there is one MessageHeader 7808 entity.

The EmployeeLeaveRequest 7814 package is an EmployeeLeaveRequest 7820 datatype. The EmployeeLeaveRequest 7814 package includes an EmployeeLeaveRequest 7816 entity. The EmployeeLeaveRequest 7816 entity has a cardinality of one 7818 meaning that for each instance of the EmployeeLeaveRequestApproveCheckQuery 7802 entity there is one EmployeeLeaveRequest 7816 entity. The EmployeeLeaveRequest 7816 entity includes various attributes, namely ID 7822 and VersionID 7828. The ID 7822 attribute is a BusinessTransactionDocumentID 7826 datatype. The ID 7822 attribute has a cardinality of one 7824 meaning that for each instance of the EmployeeLeaveRequest 7816 entity there is one ID 7822 attribute. The VersionID 7828 attribute is a VersionID 7832 datatype. The VersionID 7828 attribute has a cardinality of one 7830 meaning that for each instance of the EmployeeLeaveRequest 7816 entity there is one VersionID 7828 attribute.

Message Data Type EmployeeLeaveRequestCancelCheckResponse

An EmployeeLeaveRequestCancelCheckResponse is a response to an EmployeeLeaveRequestCancelCheckQuery and contains identifying information and the new status of the EmployeeLeaveRequest. Additionally, all information, warnings and errors can be returned that would occur due to further processing if the checked EmployeeLeaveRequestCancel- Request document was not changed. The structure of the message type EmployeeLeaveRequestCancelCheckResponse is specified by the message data type EmployeeLeaveRequestCancelCheckResponseMessage, which is derived from the message data type EmployeeLeaveRequestStatusChangeMessage.

FIG. 79 shows an EmployeeLeaveRequestCancelCheckResponse 7900 package. The EmployeeLeaveRequestCancelCheckResponse 7900 package is an EmployeeLeaveRequestCancelCheckResponse 7904 datatype. The EmployeeLeaveRequestCancelCheckResponse 7900 package includes an EmployeeLeaveRequestCancelCheckResponse 7902 entity. The EmployeeLeaveRequestCancelCheckResponse 7900 package includes various packages, namely MessageHeader 7906, EmployeeLeaveRequest 7914 and Log 7940.

The MessageHeader 7906 package is a BusinessDocumentMessageHeader 7912 datatype. The MessageHeader 7906 package includes a MessageHeader 7908 entity. The MessageHeader 7908 entity has a cardinality of one 7910 meaning that for each instance of the EmployeeLeaveRequestCancelCheckResponse 7902 entity there is one MessageHeader 7908 entity.

The EmployeeLeaveRequest 7914 package is an EmployeeLeaveRequest 7920 datatype. The EmployeeLeaveRequest 7914 package includes an EmployeeLeaveRequest 7916 entity. The EmployeeLeaveRequest 7916 entity has a cardinality of zero or one 7918 meaning that for each instance of the EmployeeLeaveRequestCancelCheckResponse 7902 entity there may be one EmployeeLeaveRequest 7916 entity. The EmployeeLeaveRequest 7916 entity includes various attributes, namely ID 7922, VersionID 7928 and LifeCycleStatusCode 7934. The ID 7922 attribute is a BusinessTransactionDocumentID 7926 datatype. The ID 7922 attribute has a cardinality of one 7924 meaning that for each instance of the EmployeeLeaveRequest 7916 entity there is one ID 7922 attribute. The VersionID 7928 attribute is a VersionID 7932 datatype. The VersionID 7928 attribute has a cardinality of one 7930 meaning that for each instance of the EmployeeLeaveRequest 7916 entity there is one VersionID 7928 attribute. The LifeCycleStatusCode 7934 attribute is an EmployeeLeaveRequestLifeCycleStatusCode 7938 datatype. The LifeCycleStatusCode 7934 attribute has a cardinality of one 7936 meaning that for each instance of the EmployeeLeaveRequest 7916 entity there is one LifeCycleStatusCode 7934 attribute.

The Log 7940 package is a Log 7946 datatype. The Log 7940 package includes a Log 7942 entity. The Log 7942 entity has a cardinality of zero or one 7944 meaning that for each instance of the EmployeeLeaveRequestCancelCheckResponse 7902 entity there may be one Log 7942 entity.

Message Data Type EmployeeLeaveRequestCancelCheckQuery

An EmployeeLeaveRequestCancelCheckQuery is the inquiry to the Employee Time Management to check the processing of an EmployeeLeaveRequestCancelRequest message. The structure of the message type EmployeeLeaveRequestCancelCheckQuery is specified by the message data type EmployeeLeaveRequestCancelCheckQueryMessage, which is derived from the message data type EmployeeLeaveRequestStatusChangeMessage.

FIG. 80 shows an EmployeeLeaveRequestCancelCheckQuery 8000 package. The EmployeeLeaveRequestCancelCheckQuery 8000 package is an EmployeeLeaveRequestCancelCheckQuery 8004 datatype. The EmployeeLeaveRequestCancelCheckQuery 8000 package includes an EmployeeLeaveRequestCancelCheckQuery 8002 entity. The EmployeeLeaveRequestCancelCheckQuery 8000 package includes various packages, namely MessageHeader 8006 and EmployeeLeaveRequest 8014.

The MessageHeader 8006 package is a BusinessDocumentMessageHeader 8012 datatype. The MessageHeader 8006 package includes a MessageHeader 8008 entity. The MessageHeader 8008 entity has a cardinality of one 8010 meaning that for each instance of the EmployeeLeaveRequestCancelCheckQuery 8002 entity there is one MessageHeader 8008 entity.

The EmployeeLeaveRequest 8014 package is an EmployeeLeaveRequest 8020 datatype. The EmployeeLeaveRequest 8014 package includes an EmployeeLeaveRequest 8016 entity. The EmployeeLeaveRequest 8014 package includes an EmployeeLeaveRequestHeader 8034 package. The EmployeeLeaveRequest 8016 entity has a cardinality of one 8018 meaning that for each instance of the EmployeeLeaveRequestCancelCheckQuery 8002 entity there is one EmployeeLeaveRequest 8016 entity. The EmployeeLeaveRequest 8016 entity includes various attributes, namely ID 8022 and VersionID 8028. The ID 8022 attribute is a BusinessTransactionDocumentID 8026 datatype. The ID 8022 attribute has a cardinality of one 8024 meaning that for each instance of the EmployeeLeaveRequest 8016 entity there is one ID 8022 attribute. The VersionID 8028 attribute is a VersionID 8032 datatype. The VersionID 8028 attribute has a cardinality of one 8030 meaning that for each instance of the EmployeeLeaveRequest 8016 entity there is one VersionID 8028 attribute.

The EmployeeLeaveRequestHeader 8034 package is a Note 8040 datatype. The EmployeeLeaveRequestHeader 8034 package includes a Note 8036 entity. The Note 8036 entity has a cardinality of zero or one 8038 meaning that for each instance of the EmployeeLeaveRequest 8016 entity there may be one Note 8036 entity. The Note 8036 entity includes a Text 8042 attribute. The Text 8042 attribute is a Text 8046 datatype. The Text 8042 attribute has a cardinality of one 8044 meaning that for each instance of the Note 8036 entity there is one Text 8042 attribute.

Message Data Type EmployeeLeaveRequestCreateCheckQuery

An EmployeeLeaveRequestCreateCheckQuery is an inquiry to the Employee Time Management to check the processing of an EmployeeLeaveRequestCreateRequest message. The structure of the message type EmployeeLeaveRequestCreateCheckQuery is specified by the message data type EmployeeLeaveRequestCreateCheckQueryMessage, which is derived from the message data type EmployeeLeaveRequestMessage.

FIGS. 81-1 through 81-3 show an EmployeeLeaveRequestCreateCheckQuery 8100 package. The EmployeeLeaveRequestCreateCheckQuery 8100 package is an EmployeeLeaveRequestCreateCheckQuery 8104 datatype. The EmployeeLeaveRequestCreateCheckQuery 8100 package includes an EmployeeLeaveRequestCreateCheckQuery 8102 entity. The EmployeeLeaveRequestCreateCheckQuery 8100 package includes various packages, namely MessageHeader 8106 and EmployeeLeaveRequest 8114.

The MessageHeader 8106 package is a BusinessDocumentMessageHeader 8112 datatype. The MessageHeader 8106 package includes a MessageHeader 8108 entity. The MessageHeader 8108 entity has a cardinality of one 8110 meaning that for each instance of the EmployeeLeaveRequestCreateCheckQuery 8102 entity there is one MessageHeader 8108 entity.

The EmployeeLeaveRequest 8114 package is an EmployeeLeaveRequest 8120 datatype. The EmployeeLeaveRequest 8114 package includes an EmployeeLeaveRequest 8116 entity. The EmployeeLeaveRequest 8114 package includes various packages, namely EmployeeLeaveRequestHeader 8122, BusinessTransactionDocumentReference 8154 and EmployeeTimeItem 8174. The EmployeeLeaveRequest 8116 entity has a cardinality of one 8118 meaning that for each instance of the EmployeeLeaveRequestCreateCheckQuery 8102 entity there is one EmployeeLeaveRequest 8116 entity.

The EmployeeLeaveRequestHeader 8122 package is a Participant 8128 datatype. The EmployeeLeaveRequestHeader 8122 package includes various entities, namely Participant 8124 and Note 8142. The Participant 8124 entity has a cardinality of zero or n 8126 meaning that for each instance of the EmployeeLeaveRequest 8116 entity there may be one or more Participant 8124 entities. The Participant 8124 entity includes various attributes, namely RoleCode 8130 and WorkAgreementID 8136. The RoleCode 8130 attribute is an EmployeeLeaveRequestParticipantRoleCode 8134 datatype. The RoleCode 8130 attribute has a cardinality of one 8132 meaning that for each instance of the Participant 8124 entity there is one RoleCode 8130 attribute. The WorkAgreementID 8136 attribute is a WorkAgreementID 8140 datatype. The WorkAgreementID 8136 attribute has a cardinality of one 8138 meaning that for each instance of the Participant 8124 entity there is one WorkAgreementID 8136 attribute. The Note 8142 entity has a cardinality of zero or one 8144 meaning that for each instance of the EmployeeLeaveRequest 8116 entity there may be one Note 8142 entity. The Note 8142 entity includes a Text 8148 attribute. The Text 8148 attribute is a Text 8152 datatype. The Text 8148 attribute has a cardinality of one 8150 meaning that for each instance of the Note 8142 entity there is one Text 8148 attribute.

The BusinessTransactionDocumentReference 8154 package is a LeaveEmployeeTimeReference 8160 datatype. The BusinessTransactionDocumentReference 8154 package includes a LeaveEmployeeTimeReference 8156 entity. The LeaveEmployeeTimeReference 8156 entity has a cardinality of zero or one 8158 meaning that for each instance of the EmployeeLeaveRequest 8116 entity there may be one LeaveEmployeeTimeReference 8156 entity. The LeaveEmployeeTimeReference 8156 entity includes various attributes, namely ActionCode 8162 and LeaveEmployeeTimeReference 8168. The ActionCode 8162 attribute is an ActionCode 8166 datatype. The ActionCode 8162 attribute has a cardinality of one 8164 meaning that for each instance of the LeaveEmployeeTimeReference 8156 entity there is one ActionCode 8162 attribute. The LeaveEmployeeTimeReference 8168 attribute is a BusinessTransactionDocumentReference 8172 datatype. The LeaveEmployeeTimeReference 8168 attribute has a cardinality of one 8170 meaning that for each instance of the LeaveEmployeeTimeReference 8156 entity there is one LeaveEmployeeTimeReference 8168 attribute.

The EmployeeTimeItem 8174 package is a LeaveEmployeeTimeItem 8180 datatype. The EmployeeTimeItem 8174 package includes a LeaveEmployeeTimeItem 8176 entity. The LeaveEmployeeTimeItem 8176 entity has a cardinality of zero or n 8178 meaning that for each instance of the EmployeeLeaveRequest 8116 entity there may be one or more LeaveEmployeeTimeItem 8176 entities. The LeaveEmployeeTimeItem 8176 entity includes various attributes, namely CategoryCode 8182, TypeCode 8188 and Validity 8194. The CategoryCode 8182 attribute is an EmployeeTimeItemCategoryCode 8186 datatype. The CategoryCode 8182 attribute has a cardinality of one 8184 meaning that for each instance of the LeaveEmployeeTimeItem 8176 entity there is one CategoryCode 8182 attribute. The TypeCode 8188 attribute is an EmployeeTimeItemTypeCode 8192 datatype. The TypeCode 8188 attribute has a cardinality of one 8190 meaning that for each instance of the LeaveEmployeeTimeItem 8176 entity there is one TypeCode 8188 attribute. The Validity 8194 attribute is an EmployeeTimeItemValidity 8198 datatype. The Validity 8194 attribute has a cardinality of one 8196 meaning that for each instance of the LeaveEmployeeTimeItem 8176 entity there is one Validity 8194 attribute.

Message Data Type EmployeeLeaveRequestRejectCheckQuery

An EmployeeLeaveRequestRejectCheckQuery is an inquiry to the Employee Time Management to check the processing of an EmployeeLeaveRequestRejectRequest message. The structure of the message type EmployeeLeaveRequestRejectCheckQuery is specified by the message data type EmployeeLeaveRequestRejectCheckQueryMessage, which is derived from the message data type EmployeeLeaveRequestStatusChangeMessage.

FIG. 82 shows an EmployeeLeaveRequestRejectCheckQuery 8200 package. The EmployeeLeaveRequestRejectCheckQuery 8200 package is an EmployeeLeaveRequestRejectCheckQuery 8204 datatype. The EmployeeLeaveRequestRejectCheckQuery 8200 package includes an EmployeeLeaveRequestRejectCheckQuery 8202 entity. The EmployeeLeaveRequestRejectCheckQuery 8200 package includes various packages, namely MessageHeader 8206 and EmployeeLeaveRequest 8214.

The MessageHeader 8206 package is a BusinessDocumentMessageHeader 8212 datatype. The MessageHeader 8206 package includes a MessageHeader 8208 entity. The MessageHeader 8208 entity has a cardinality of one 8210 meaning that for each instance of the EmployeeLeaveRequestRejectCheckQuery 8202 entity there is one MessageHeader 8208 entity.

The EmployeeLeaveRequest 8214 package is an EmployeeLeaveRequest 8220 datatype. The EmployeeLeaveRequest 8214 package includes an EmployeeLeaveRequest 8216 entity. The EmployeeLeaveRequest 8214 package includes an EmployeeLeaveRequestHeader 8234 package. The EmployeeLeaveRequest 8216 entity has a cardinality of one 8218 meaning that for each instance of the EmployeeLeaveRequestRejectCheckQuery 8202 entity there is one EmployeeLeaveRequest 8216 entity. The EmployeeLeaveRequest 8216 entity includes various attributes, namely ID 8222 and VersionID 8228. The ID 8222 attribute is a BusinessTransactionDocumentID 8226 datatype. The ID 8222 attribute has a cardinality of one 8224 meaning that for each instance of the EmployeeLeaveRequest 8216 entity there is one ID 8222 attribute. The VersionID 8228 attribute is a VersionID 8232 datatype. The VersionID 8228 attribute has a cardinality of one 8230 meaning that for each instance of the EmployeeLeaveRequest 8216 entity there is one VersionID 8228 attribute.

The EmployeeLeaveRequestHeader 8234 package is a Note 8240 datatype. The EmployeeLeaveRequestHeader 8234 package includes a Note 8236 entity. The Note 8236 entity has a cardinality of zero or one 8238 meaning that for each instance of the EmployeeLeaveRequest 8216 entity there may be one Note 8236 entity. The Note 8236 entity includes a Text 8242 attribute. The Text 8242 attribute is a Text 8246 datatype. The Text 8242 attribute has a cardinality of one 8244 meaning that for each instance of the Note 8236 entity there is one Text 8242 attribute.

Message Data Type EmployeeLeaveRequestUpdateCheckResponse

An EmployeeLeaveRequestUpdateCheckResponse is a response to an EmployeeLeaveRequestUpdateCheckQuery and contains the adjusted and enriched EmployeeLeaveRequest as the result of a check of the processing of an EmployeeLeaveRequestUpdateRequest message. Additionally all information, warnings and errors can be returned that would occur due to further processing if the checked EmployeeLeaveRequestUpdateRequest document was not changed. The structure of the message type EmployeeLeaveRequestUpdateCheckResponse is specified by the message data type EmployeeLeaveRequestUpdateCheckResponse, which is derived from the message data type EmployeeLeaveRequestMessage.

FIGS. 83-1 through 83-6 show an EmployeeLeaveRequestUpdateCheckResponse 8300 package. The EmployeeLeaveRequestUpdateCheckResponse 8300 package is an EmployeeLeaveRequestUpdateCheckResponse 8304 datatype. The EmployeeLeaveRequestUpdateCheckResponse 8300 package includes an EmployeeLeaveRequestUpdateCheckResponse 8302 entity. The EmployeeLeaveRequestUpdateCheckResponse 8300 package includes various packages, namely MessageHeader 8306, EmployeeLeaveRequest 8314 and Log 83184.

The MessageHeader 8306 package is a BusinessDocumentMessageHeader 8312 datatype. The MessageHeader 8306 package includes a MessageHeader 8308 entity. The MessageHeader 8308 entity has a cardinality of one 8310 meaning that for each instance of the EmployeeLeaveRequestUpdateCheckResponse 8302 entity there is one MessageHeader 8308 entity.

The EmployeeLeaveRequest 8314 package is an EmployeeLeaveRequest 8320 datatype. The EmployeeLeaveRequest 8314 package includes an EmployeeLeaveRequest 8316 entity. The EmployeeLeaveRequest 8314 package includes various packages, namely EmployeeLeaveRequestHeader 8346, BusinessTransactionDocumentReference 83114 and EmployeeTimeItem 83134. The EmployeeLeaveRequest 8316 entity has a cardinality of zero or one 8318 meaning that for each instance of the EmployeeLeaveRequestUpdateCheckResponse 8302 entity there may be one EmployeeLeaveRequest 8316 entity. The EmployeeLeaveRequest 8316 entity includes various attributes, namely ID 8322, VersionID 8328, FirstSubmissionDateTime 8334 and LifeCycleStatusCode 8340. The ID 8322 attribute is a BusinessTransactionDocumentID 8326 datatype. The ID 8322 attribute has a cardinality of one 8324 meaning that for each instance of the EmployeeLeaveRequest 8316 entity there is one ID 8322 attribute. The VersionID 8328 attribute is a VersionID 8332 datatype. The VersionID 8328 attribute has a cardinality of one 8330 meaning that for each instance of the EmployeeLeaveRequest 8316 entity there is one VersionID 8328 attribute. The FirstSubmissionDateTime 8334 attribute is a DateTime 8338 datatype. The FirstSubmissionDateTime 8334 attribute has a cardinality of one 8336 meaning that for each instance of the EmployeeLeaveRequest 8316 entity there is one FirstSubmissionDateTime 8334 attribute. The LifeCycleStatusCode 8340 attribute is an EmployeeLeaveRequestLifeCycleStatusCode 8344 datatype. The LifeCycleStatusCode 8340 attribute has a cardinality of one 8342 meaning that for each instance of the EmployeeLeaveRequest 8316 entity there is one LifeCycleStatusCode 8340 attribute.

The EmployeeLeaveRequestHeader 8346 package is a Participant 8352 datatype. The EmployeeLeaveRequestHeader 8346 package includes various entities, namely Participant 8348 and Note 8378. The Participant 8348 entity has a cardinality of one or n 8350 meaning that for each instance of the EmployeeLeaveRequest 8316 entity there are one or more Participant 8348 entities. The Participant 8348 entity includes various attributes, namely RoleCode 8354, EmployeeID 8360, WorkAgreementID 8366 and FormattedName 8372. The RoleCode 8354 attribute is an EmployeeRequestParticipantRoleCode 8358 datatype. The RoleCode 8354 attribute has a cardinality of one 8356 meaning that for each instance of the Participant 8348 entity there is one RoleCode 8354 attribute. The EmployeeID 8360 attribute is an EmployeeID 8364 datatype. The EmployeeID 8360 attribute has a cardinality of one 8362 meaning that for each instance of the Participant 8348 entity there is one EmployeeID 8360 attribute. The WorkAgreementID 8366 attribute is a WorkAgreementID 8370 datatype. The WorkAgreementID 8366 attribute has a cardinality of one 8368 meaning that for each instance of the Participant 8348 entity there is one WorkAgreementID 8366 attribute. The FormattedName 8372 attribute is a PersonFormattedName 8376 datatype. The FormattedName 8372 attribute has a cardinality of one 8374 meaning that for each instance of the Participant 8348 entity there is one FormattedName 8372 attribute. The Note 8378 entity has a cardinality of zero or n 8380 meaning that for each instance of the EmployeeLeaveRequest 8316 entity there may be one or more Note 8378 entities. The Note 8378 entity includes various attributes, namely AuthorEmployeeID 8384, AuthorWorkAgreementID 8390, AuthorFormattedName 8396, DateTime 83102 and Text 83108. The AuthorEmployeeID 8384 attribute is an EmployeeID 8388 datatype. The AuthorEmployeeID 8384 attribute has a cardinality of one 8386 meaning that for each instance of the Note 8378 entity there is one AuthorEmployeeID 8384 attribute. The AuthorWorkAgreementID 8390 attribute is a WorkAgreementID 8394 datatype. The AuthorWorkAgreementID 8390 attribute has a cardinality of one 8392 meaning that for each instance of the Note 8378 entity there is one AuthorWorkAgreementID 8390 attribute. The AuthorFormattedName 8396 attribute is a PersonFormattedName 83100 datatype. The AuthorFormattedName 8396 attribute has a cardinality of one 8398 meaning that for each instance of the Note 8378 entity there is one AuthorFormattedName 8396 attribute. The DateTime 83102 attribute is a DateTime 83106 datatype. The DateTime 83102 attribute has a cardinality of one 83104 meaning that for each instance of the Note 8378 entity there is one DateTime 83102 attribute. The Text 83108 attribute is a Text 83112 datatype. The Text 83108 attribute has a cardinality of one 83110 meaning that for each instance of the Note 8378 entity there is one Text 83108 attribute.

The BusinessTransactionDocumentReference 83114 package is a LeaveEmployeeTimeReference 83120 datatype. The BusinessTransactionDocumentReference 83114 package includes a LeaveEmployeeTimeReference 83116 entity. The LeaveEmployeeTimeReference 83116 entity has a cardinality of zero or one 83118 meaning that for each instance of the EmployeeLeaveRequest 8316 entity there may be one LeaveEmployeeTimeReference 83116 entity. The LeaveEmployeeTimeReference 83116 entity includes various attributes, namely ActionCode 83122 and LeaveEmployeeTimeReference 83128. The ActionCode 83122 attribute is an ActionCode 83126 datatype. The ActionCode 83122 attribute has a cardinality of one 83124 meaning that for each instance of the LeaveEmployeeTimeReference 83116 entity there is one ActionCode 83122 attribute. The LeaveEmployeeTimeReference 83128 attribute is a BusinessTransactionDocumentReference 83132 datatype. The LeaveEmployeeTimeReference 83128 attribute has a cardinality of one 83130 meaning that for each instance of the LeaveEmployeeTimeReference 83116 entity there is one LeaveEmployeeTimeReference 83128 attribute.

The EmployeeTimeItem 83134 package is a LeaveEmployeeTimeItem 83140 datatype. The EmployeeTimeItem 83134 package includes a LeaveEmployeeTimeItem 83136 entity. The LeaveEmployeeTimeItem 83136 entity has a cardinality of zero or n 83138 meaning that for each instance of the EmployeeLeaveRequest 8316 entity there may be one or more LeaveEmployeeTimeItem 83136 entities. The LeaveEmployeeTimeItem 83136 entity includes various attributes, namely CategoryCode 83142, TypeCode 83148, Validity 83154 and EmployeeTimeAccountLineItem 83160. The CategoryCode 83142 attribute is an EmployeeTimeItemCategoryCode 83146 datatype. The CategoryCode 83142 attribute has a cardinality of one 83144 meaning that for each instance of the LeaveEmployeeTimeItem 83136 entity there is one CategoryCode 83142 attribute. The TypeCode 83148 attribute is an EmployeeTimeItemTypeCode 83152 datatype. The TypeCode 83148 attribute has a cardinality of one 83150 meaning that for each instance of the LeaveEmployeeTimeItem 83136 entity there is one TypeCode 83148 attribute. The Validity 83154 attribute is an EmployeeTimeItemValidity 83158 datatype. The Validity 83154 attribute has a cardinality of one 83156 meaning that for each instance of the LeaveEmployeeTimeItem 83136 entity there is one Validity 83154 attribute. The EmployeeTimeAccountLineItem 83160 attribute is an EmployeeTimeAccountLineItem 83164 datatype. The EmployeeTimeAccountLineItem 83160 attribute has a cardinality of zero or n 83162 meaning that for each instance of the LeaveEmployeeTimeItem 83136 entity there may be one or more EmployeeTimeAccountLineItem 83160 attributes.

The Log 83184 package is a Log 83190 datatype. The Log 83184 package includes a Log 83186 entity. The Log 83186 entity has a cardinality of zero or one 83188 meaning that for each instance of the EmployeeLeaveRequestUpdate CheckResponse 8302 entity there may be one Log 83186 entity.

Message Data Type EmployeeLeaveRequestUpdate CheckQuery

An EmployeeLeaveRequestUpdateCheckQuery is an inquiry to the Employee Time Management to check the processing of an EmployeeLeaveRequestUpdateRequest message. The structure of the message type EmployeeLeaveRequestUpdateCheckQuery is specified by the message data type EmployeeLeaveRequestUpdateCheckQueryMessage, which is derived from the message data type EmployeeLeaveRequestMessage.

FIGS. 84-1 through 84-3 show an EmployeeLeaveRequest UpdateCheckQuery 8400 package. The EmployeeLeaveRequestUpdateCheckQuery 8400 package is an EmployeeLeaveRequestUpdateCheckQuery 8404 datatype. The EmployeeLeaveRequestUpdateCheckQuery 8400 package includes an EmployeeLeaveRequestUpdateCheckQuery 8402 entity. The EmployeeLeaveRequestUpdateCheckQuery 8400 package includes various packages, namely MessageHeader 8406 and EmployeeLeaveRequest 8414.

The MessageHeader 8406 package is a BusinessDocumentMessageHeader 8412 datatype. The MessageHeader 8406 package includes a MessageHeader 8408 entity. The MessageHeader 8408 entity has a cardinality of one 8410 meaning that for each instance of the EmployeeLeaveRequestUpdateCheckQuery 8402 entity there is one MessageHeader 8408 entity.

The EmployeeLeaveRequest 8414 package is an EmployeeLeaveRequest 8420 datatype. The EmployeeLeaveRequest 8414 package includes an EmployeeLeaveRequest 8416 entity. The EmployeeLeaveRequest 8414 package includes various packages, namely EmployeeLeaveRequestHeader 8434 and EmployeeTimeItem 8466. The EmployeeLeaveRequest 8416 entity has a cardinality of one 8418 meaning that for each instance of the EmployeeLeaveRequestUpdateCheckQuery 8402 entity there is one EmployeeLeaveRequest 8416 entity. The EmployeeLeaveRequest 8416 entity includes various attributes, namely ID 8422 and VersionID 8428. The ID 8422 attribute is a BusinessTransactionDocumentID 8426 datatype. The ID 8422 attribute has a cardinality of one 8424 meaning that for each instance of the EmployeeLeaveRequest 8416 entity there is one ID 8422 attribute. The VersionID 8428 attribute is a VersionID 8432 datatype. The VersionID 8428 attribute has a cardinality of one 8430 meaning that for each instance of the EmployeeLeaveRequest 8416 entity there is one VersionID 8428 attribute.

The EmployeeLeaveRequestHeader 8434 package is a Participant 8440 datatype. The EmployeeLeaveRequestHeader 8434 package includes various entities, namely Participant 8436 and Note 8454. The Participant 8436 entity has a cardinality of zero or one 8438 meaning that for each instance of the EmployeeLeaveRequest 8416 entity there may be one Participant 8436 entity. The Participant 8436 entity includes various attributes, namely RoleCode 8442 and WorkAgreementID 8448. The RoleCode 8442 attribute is an EmployeeLeaveRequestParticipantRoleCode 8446 datatype. The RoleCode 8442 attribute has a cardinality of one 8444 meaning that for each instance of the Participant 8436 entity there is one RoleCode 8442 attribute. The WorkAgreementID 8448 attribute is a WorkAgreementID 8452 datatype. The WorkAgreementID 8448 attribute has a cardinality of one 8450 meaning that for each instance of the Participant 8436 entity there is one WorkAgreementID 8448 attribute. The Note 8454 entity has a cardinality of zero or one 8456 meaning that for each instance of the EmployeeLeaveRequest 8416 entity there may be one Note 8454 entity. The Note 8454 entity includes a Text 8460 attribute. The Text 8460 attribute is a Text 8464 datatype. The Text 8460 attribute has a cardinality of one 8462 meaning that for each instance of the Note 8454 entity there is one Text 8460 attribute.

The EmployeeTimeItem 8466 package is a LeaveEmployeeTimeItem 8472 datatype. The EmployeeTimeItem 8466 package includes a LeaveEmployeeTimeItem 8468 entity. The LeaveEmployeeTimeItem 8468 entity has a cardinality of zero or n 8470 meaning that for each instance of the EmployeeLeaveRequest 8416 entity there may be one or more LeaveEmployeeTimeItem 8468 entities. The LeaveEmployeeTimeItem 8468 entity includes various attributes, namely Category 8474, Type 8480 and Validity 8486. The Category 8474 attribute is an EmployeeTimeItemCategoryCode 8478 datatype. The Category 8474 attribute has a cardinality of one 8476 meaning that for each instance of the LeaveEmployeeTimeItem 8468 entity there is one Category 8474 attribute. The Type 8480 attribute is an EmployeeTimeItemTypeCode 8484 datatype. The Type 8480 attribute has a cardinality of one 8482 meaning that for each instance of the LeaveEmployeeTimeItem 8468 entity there is one Type 8480 attribute. The Validity 8486 attribute is an EmployeeTimeItemValidity 8490 datatype. The Validity 8486 attribute has a cardinality of one 8488 meaning that for each instance of the LeaveEmployeeTimeItem 8468 entity there is one Validity 8486 attribute.

Message Data Type EmployeeLeaveRequestMessage

The message data type EmployeeLeaveRequestMessage contains the EmployeeLeaveRequest included in the business document and the business information that is relevant for sending a business document in a message. The message data type EmployeeLeaveRequestMessage is used as an abstract maximal message data type, which unifies all packages and entities for the following concrete message data types: EmployeeLeaveRequestCreateRequest, EmployeeLeaveRequestCreateConfirmationMessage, EmployeeLeaveRequestCreateCheckQuery, EmployeeLeaveRequestCreate CheckResponseMessage, EmployeeLeaveRequestUpdateRequest, EmployeeLeave RequestUpdateConfirmationMessage, EmployeeLeaveRequestUpdateCheckQuery, EmployeeLeave RequestUpdate CheckResponseMessage, DefaultEmployee LeaveRequestsByOwnerResponseMessage, Employee LeaveRequestByParticipantResponseMessage. The EmployeeLeaveRequestMessage can include a MessageHeader, SenderParty and RecipientParty.

EmployeeLeaveRequest Package

An EmployeeLeaveRequest is the application used by an Employee to inform an approver of a leave and (depending on the business scenario) request its approval. A leave in the EmployeeLeaveRequest can be a planned future leave or a leave in the past (e.g., sick leave). The ID is the identifier of an EmployeeLeaveRequest. The VersionID identifies the version of an EmployeeLeaveRequest. The FirstSubmissionDate Time is the first submission date and time of an Employee LeaveRequest. The Status Code is the coded representation of the status of an EmployeeLeaveRequest. The VersionID is used to check if a message is still using the latest data. If a newer version exists then the transferred message won't be processed. For example, an employee cannot change an EmployeeLeaveRequest that was changed by an approver or administrator before. As another example, an approver may not be able to approve an EmployeeLeaveRequest in the case that new data is available. The InformationOutdatedIndicator is set in that case.

An EmployeeLeaveRequestHeader package groups the header information of an EmployeeLeaveRequest. The AllowedActionCode is a coded representation of the way the transmitted document can be processed. Examples for an AllowedActionCode are "Delete", "Modify", and "Approve". The AllowedActionCode can be used in the message data types used for Outbound messages from the perspective of the Employee Time Management that read or list EmployeeLeaveRequests. The Participant of an EmployeeLeaveRequest is an Employee who currently participates in the to EmployeeLeaveRequest. The owner is a permanent Participant of the EmployeeLeaveRequest. Additional Participants can be, for example, an approver or administrator. The RoleCode of a Participant is the coded representation of the role the participant owns. The EmployeeID is the unique identifier of the Employee that participants the EmployeeLeaveRequest. The WorkAgreementID is the unique identifier of the WorkAgreement with which the Employee participants the EmployeeLeaveRequest. The PersonFormattedName is the formatted name of the participant. The Owner of an EmployeeLeaveRequest can be determined by the system user account data of the person logged on to the Employee Time Management.

A Note is a free text item of information about its author and the date and time of creation. The AuthorEmployeeID it the unique identifier of the Employee which added the note. The AuthorWorkAgreementID is the unique identifier of the WorkAgreement of the author, who added the note. The AuthorFormattedName is the formatted name of the author. The DateTime is the date and time of the note. The Text is the text the author wrote in the note. The note entity is used for short messages that the Participants of an EmployeeLeaveRequest wants to add to an EmployeeLeaveRequest to inform another Participant about something. The Authors WorkAgreementID, EmployeeID and FormattedName are determined from the data of the person logged on to the system.

BusinessTransactionDocumentReference Package

The BusinessTransactionDocumentReference package groups the information of the reference to another BusinessTransactionDocument. The LeaveEmployeeTimeReference is the Reference to an existing EmployeeTime. The ActionCode is a coded representation of an instruction to the recipient of a message telling it how to process a transmitted element. LeaveEmployeeTimeReference is the unique identifier of the referenced LeaveEmployeeTime. The LeaveEmployeeTimeReference is used if an existing LeaveEmployeeTime is requested to be changed or canceled.

LeaveEmployeeTimeItem Package

The LeaveEmployeeTimeItem package groups the information about the employee's desired leave. An Item of an EmployeeTime is a document item concerning an employee's planned or recorded working time or other time (such as leave, break, or availability). An EmployeeTimeItemCategoryCode is the coded representation of a classification of the times and activities of a document item of an employee. The TypeCode is the coded representation of the type of a document item of an employee time according to its company, collective agreement or statutory meaning. The Validity of an EmployeeTime is a structure describing the date, time and duration of day or time intervals in which the employee time item is valid. The LeaveEmployeeTimeItem is used to request the creation of a new leave or to describe the desired changes of the LeaveEmployeeTime referenced in the LeaveEmployee TimeReference. The LineItem is a quantitative change of an EmployeeTimeAccount on a certain date. A LineItem is characterized by a type, which can be "Deduction" in the viewpoint of the EmployeeLeaveRequest. EmployeeTimeAccountTypeCode is the coded representation of the type of an employee time account, according to criteria resulting from laws, agreements, company requirements, control tasks, etc. TypeCode is the coded representation of the type of a line item of an EmployeeTimeAccount according to criteria resulting from laws, agreements, company requirements, control tasks, etc. The Quantity is the quantitative change of the EmployeeTimeAccount. The EmployeeLeaveRequestMessage can include a Log package.

Message Data Type EmployeeLeaveRequestStatusChangeMessage

The message data type EmployeeLeaveRequestStatusChangeMessage contains the EmployeeLeaveRequest included in the business document and the business information that is relevant for sending a business document in a message. The message data type EmployeeLeaveRequestStatusChangeMessage is used as an abstract maximal message data type, which unifies all packages and entities for the following concrete message data types: EmployeeLeaveRequestCancelRequestMessage, EmployeeLeaveRequestCancelCheckQueryMessage, EmployeeLeaveRequestApproveRequest Message, EmployeeLeaveRequestApprove CheckQueryMessage, EmployeeLeaveRequestReject Request Message, EmployeeLeaveRequestRejectCheckQueryMessage EmployeeLeaveRequestCancelConfirmationMessage, EmployeeLeaveRequestCancel Check ResponseMessage, EmployeeLeaveRequestApproveConfirmation Message, EmployeeLeaveRequestApproveCheckResponseMessage, EmployeeLeaveRequestRejectConfirmation Message, and EmployeeLeave RequestRejectCheckResponseMessage. The Employee-Leave RequestStatusChangeMessage can include a Message-Header, SenderParty and RecipientParty.

EmployeeLeaveRequest Package

The EmployeeLeaveRequest package contains the Business Object EmployeeLeaveRequest. An EmployeeLeaveRequest is an application used by an Employee to inform an approver of a leave and (depending on the business scenario), request its approval. A leave in the EmployeeLeaveRequest can be a planned future leave or a leave in the past (e.g., sick leave). The ID is the identifier of an EmployeeLeaveRequest. The VersionID identifies the version of an EmployeeLeaveRequest. The StatusCode is the coded representation of the new Status of an EmployeeLeaveRequest.

EmployeeLeaveRequestHeader Package

An EmployeeLeaveRequestHeader package groups the header information of an EmployeeLeaveRequest. A Note is free text with information about its author and the date and time of creation. The Text is the text the author wrote in the note. The entity Note can be used for inbound messages from the perspective of the Employee Time Management. The EmployeeLeaveRequestStatusChangeMessage can include a Log package. The Log package can be used in the message data types used for outbound messages from the perspective of the Time And Labor Management. The messages EmployeeLeaveRequestCancelConfirmationMessage, Employee-LeaveRequestCancelCheckResponseMessage, Employee-LeaveRequestApproveConfirmationMessage, EmployeeLeaveRequestApproveCheckResponseMessage, EmployeeLeaveRequestRejectConfirmationMessage, and EmployeeLeaveRequestRejectCheckResponseMessage use the log.

What is claimed is:

1. A tangible computer readable medium including program code for providing a message-based interface for maintaining employee data and organizational structure data, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for inquiring with regard to a first employee the one or more other employees with direct personnel responsibilities for the first employee that includes a first message package derived from the common business object model and hierarchically organized in memory as:

a reporting line manager simple by employee query message entity; and an employee package comprising a reporting line manager simple selection by employee entity;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

2. The computer readable medium of claim 1, wherein the reporting line manager simple selection by employee entity further includes at least one of the following: an employee ID, a work agreement ID, and a key date.

3. A tangible computer readable medium including program code for providing a message-based interface for maintaining employee data and organizational structure data, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for inquiring with regard to a first employee about information identifying one or more other employees who belong to the same organizational center as the first employee that includes a first message package derived from the common business object model and hierarchically organized in memory as:

an organizational center employee simple by employee query message entity; and an employee package comprising an organizational center employee simple by employee entity;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

4. The computer readable medium of claim 3, wherein the organizational center employee simple by employee entity further includes at least one of the following: an employee ID, a work agreement ID, and a key date.

5. A tangible computer readable medium including program code for providing a message-based interface for maintaining employee data and organizational structure data, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for inquiring to a first employee about information identifying one or more other employees who report to the first employee that includes a first message package derived from the common business object model and hierarchically organized in memory as:

a reporting employee simple by employment query message entity; and an employee package comprising a reporting employee simple selection by employee entity;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

6. The computer readable medium of claim 5, wherein the reporting employee simple selection by employee entity further includes at least one of the following: an employee ID, a work agreement ID, a reporting line relative level value, and a key date.

7. A tangible computer readable medium including program code for providing a message-based interface for requesting, planning, approving, and processing an employee's leave from an employer, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting an employee time management system to create an employee leave request that includes a first message package derived from the common business object model and hierarchically organized in memory as:

an employee leave request create request message entity; and an employee leave request package comprising an employee leave request entity;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

8. The computer readable medium of claim 7, wherein the employee leave request package further includes at least one of the following: an employee leave request header package, a business transaction document reference package, and an employee time item package.

9. The computer readable medium of claim 8, wherein the employee leave request header package includes at least one of the following: a participant and a note, wherein the participant further comprises an action code and a leave employee time reference and the note further comprises text.

10. A tangible computer readable medium including program code for providing a message-based interface for requesting, planning, approving, and processing an employee's leave from an employer, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting an employee time management system to cancel an existing employee leave request that includes a first message package derived from the common business object model and hierarchically organized in memory as:

an employee leave request cancel request message entity; and an employee leave request package comprising an employee leave request entity, where the employee leave request entity includes an ID and a version ID;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

11. The computer readable medium of claim 10, wherein the employee leave request package further includes an employee leave request header package.

12. The computer readable medium of claim 11, wherein the employee leave request header package further includes a note, wherein the note further comprises text.

13. A distributed system operating in a landscape of computer systems providing message-based services defined in a service registry, the system comprising:

a graphical user interface comprising computer readable instructions, embedded on tangible media, for inquiring with regard to a first employee the one or more other employees with direct personnel responsibilities for the first employee;

a first memory storing a user interface controller for processing the request and involving a message including a message package derived from a common business object model, where the common business object model includes business objects having relationships that enable derivation of message-based service interfaces and message packages, the message package hierarchically organized as:

a reporting line manager simple by employee query message entity; and an employee package comprising a reporting line manager simple selection by employee entity; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

14. The distributed system of claim 13, wherein the first memory is remote from the graphical user interface.

15. The distributed system of claim 13, wherein the first memory is remote from the second memory.

16. A distributed system operating in a landscape of computer systems providing message-based services defined in a service registry, the system comprising:

a graphical user interface comprising computer readable instructions, embedded on tangible media, for inquiring with regard to a first employee about information identifying one or more other employees who belong to the same organizational center as the first employee;

a first memory storing a user interface controller for processing the request and involving a message including a message package derived from a common business object model, where the common business object model includes business objects having relationships that enable derivation of message-based service interfaces and message packages, the message package hierarchically organized as:

an organizational center employee simple by employee query message entity; and an employee package comprising an organizational center employee simple by employee entity; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

17. The distributed system of claim 16, wherein the first memory is remote from the graphical user interface.

18. The distributed system of claim 16, wherein the first memory is remote from the second memory.

19. A distributed system operating in a landscape of computer systems providing message-based services defined in a service registry, the system comprising:

a graphical user interface comprising computer readable instructions, embedded on tangible media, for inquiring to a first employee about information identifying one or more other employees who report to the first employee;

a first memory storing a user interface controller for processing the request and involving a message including a message package derived from a common business object model, where the common business object model includes business objects having relationships that enable derivation of message-based service interfaces and message packages, the message package hierarchically organized as:

a reporting employee simple by employment query message entity; and an employee package comprising a reporting employee simple selection by employee entity; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

20. The distributed system of claim 19, wherein the first memory is remote from the graphical user interface.

21. The distributed system of claim 19, wherein the first memory is remote from the second memory.

22. A distributed system operating in a landscape of computer systems providing message-based services defined in a service registry, the system comprising:

a graphical user interface comprising computer readable instructions, embedded on tangible media, for requesting an employee time management system to create an employee leave request;

a first memory storing a user interface controller for processing the request and involving a message including a message package derived from a common business object model, where the common business object model includes business objects having relationships that enable derivation of message-based service interfaces and message packages, the message package hierarchically organized as:

an employee leave request create request message entity; and an employee leave request package comprising an employee leave request entity; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

23. The distributed system of claim 22, wherein the first memory is remote from the graphical user interface.

24. The distributed system of claim 22, wherein the first memory is remote from the second memory.

25. A distributed system operating in a landscape of computer systems providing message-based services defined in a service registry, the system comprising:

a graphical user interface comprising computer readable instructions, embedded on tangible media, for requesting an employee time management system to cancel an existing employee leave request;

a first memory storing a user interface controller for processing the request and involving a message including a message package derived from a common business object model, where the common business object model includes business objects having relationships that enable derivation of message-based service interfaces and message packages, the message package hierarchically organized as:

an employee leave request cancel request message entity; and an employee leave request package comprising an employee leave request entity, where the employee leave request entity includes an ID and a version ID; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

26. The distributed system of claim 25, wherein the first memory is remote from the graphical user interface.

27. The distributed system of claim 25, wherein the first memory is remote from the second memory.

* * * * *